US010347936B2

(12) United States Patent
Choi et al.

(10) Patent No.: US 10,347,936 B2
(45) Date of Patent: Jul. 9, 2019

(54) GARNET MATERIALS FOR LI SECONDARY BATTERIES AND METHODS OF MAKING AND USING GARNET MATERIALS

(71) Applicant: QuantumScape Corporation, San Jose, CA (US)

(72) Inventors: Dong Hee Anna Choi, San Jose, CA (US); Niall Donnelly, St. Paul, MN (US); Tim Holme, Mountain View, CA (US); Will Hudson, Belmont, CA (US); Sriram Iyer, Cupertino, CA (US); Oleh Karpenko, San Jose, CA (US); Mohit Singh, Santa Clara, CA (US); Adrian Winoto, San Francisco, CA (US)

(73) Assignee: QuantumScape Corporation, San Jose, CA (US)

( * ) Notice: Subject to any disclaimer, the term of this patent is extended or adjusted under 35 U.S.C. 154(b) by 0 days.

(21) Appl. No.: 15/480,475

(22) Filed: Apr. 6, 2017

(65) Prior Publication Data
US 2017/0346135 A1 Nov. 30, 2017

Related U.S. Application Data

(60) Division of application No. 15/430,375, filed on Feb. 10, 2017, which is a continuation of application No. 14/509,029, filed on Oct. 7, 2014.
(Continued)

(51) Int. Cl.
*H01M 10/00* (2006.01)
*H01M 10/0562* (2010.01)
(Continued)

(52) U.S. Cl.
CPC ...... *H01M 10/0562* (2013.01); *C01G 25/006* (2013.01); *C04B 35/117* (2013.01);
(Continued)

(58) Field of Classification Search
CPC ............. C04B 35/4885; C04B 35/486; C04B 41/5027; C04B 35/62218; C04B 2235/6025; B28B 1/14; B28B 1/16
(Continued)

(56) References Cited

U.S. PATENT DOCUMENTS 4,259,061 A 3/1981 Dubetsky
4,340,436 A 7/1982 Dubetsky et al.
(Continued)

FOREIGN PATENT DOCUMENTS

CN 1746757 3/2006
CN 101518164 8/2009
(Continued)

OTHER PUBLICATIONS

Machine Translation of JP 2012224520 A, Imagawa Haruo, Extracted Jan. 30, 2018 (Year: 2012).*
(Continued)

*Primary Examiner* — Milton I Cano
*Assistant Examiner* — Abibatu O Ojo-Amoo
(74) *Attorney, Agent, or Firm* — Squire Patton Boggs (US) LLP

(57) ABSTRACT

Set forth herein are garnet material compositions, e.g., lithium-stuffed garnets and lithium-stuffed garnets doped with alumina, which are suitable for use as electrolytes and catholytes in solid state battery applications. Set forth herein are lithium-stuffed garnet thin films having fine grains therein. Disclosed herein are novel and inventive methods of making and using lithium-stuffed garnets as catholytes, electrolytes and/or anolytes for all solid state lithium rechargeable batteries. Disclosed herein are novel electrochemical devices which incorporate these garnet catholytes, electrolytes and/or anolytes. Set forth herein are methods for preparing novel structures, including dense thin free stand-
(Continued)

ing membranes of an ionically conducting material for use as a catholyte, electrolyte, and, or, anolyte, in an electrochemical device, a battery component (positive or negative electrode materials), or a complete solid state electrochemical energy storage device. The methods set forth herein disclose novel sintering techniques, for solid state energy storage devices and the components thereof.

15 Claims, 63 Drawing Sheets

Related U.S. Application Data

(60) Provisional application No. 62/026,271, filed on Jul. 18, 2014, provisional application No. 62/026,440, filed on Jul. 18, 2014, provisional application No. 62/007,417, filed on Jun. 4, 2014, provisional application No. 61/926,910, filed on Jan. 13, 2014, provisional application No. 61/887,451, filed on Oct. 7, 2013.

(51) Int. Cl.
| | |
|---|---|
| *H01M 10/0525* | (2010.01) |
| *C04B 35/626* | (2006.01) |
| *C04B 35/65* | (2006.01) |
| *H01M 10/0585* | (2010.01) |
| *C01G 25/00* | (2006.01) |
| *C04B 35/488* | (2006.01) |
| *C04B 35/622* | (2006.01) |
| *C04B 35/64* | (2006.01) |
| *C04B 35/486* | (2006.01) |
| *C04B 35/495* | (2006.01) |
| *C04B 35/645* | (2006.01) |
| *C04B 41/00* | (2006.01) |
| *C04B 41/50* | (2006.01) |
| *C04B 35/117* | (2006.01) |
| *H01M 10/052* | (2010.01) |
| *H01M 10/056* | (2010.01) |
| *H01M 10/0561* | (2010.01) |

(52) U.S. Cl.
CPC ........ *C04B 35/486* (2013.01); *C04B 35/4885* (2013.01); *C04B 35/495* (2013.01); *C04B 35/6261* (2013.01); *C04B 35/6262* (2013.01); *C04B 35/62218* (2013.01); *C04B 35/64* (2013.01); *C04B 35/645* (2013.01); *C04B 35/65* (2013.01); *C04B 41/009* (2013.01); *C04B 41/5027* (2013.01); *H01M 10/0525* (2013.01); *H01M 10/0585* (2013.01); *C01P 2006/40* (2013.01); *C04B 2235/3203* (2013.01); *C04B 2235/3205* (2013.01); *C04B 2235/3208* (2013.01); *C04B 2235/3213* (2013.01); *C04B 2235/3215* (2013.01); *C04B 2235/3217* (2013.01); *C04B 2235/3222* (2013.01); *C04B 2235/3227* (2013.01); *C04B 2235/3229* (2013.01); *C04B 2235/3244* (2013.01); *C04B 2235/3248* (2013.01); *C04B 2235/3251* (2013.01); *C04B 2235/3255* (2013.01); *C04B 2235/3256* (2013.01); *C04B 2235/3258* (2013.01); *C04B 2235/3294* (2013.01); *C04B 2235/6025* (2013.01); *C04B 2235/656* (2013.01); *C04B 2235/6567* (2013.01); *C04B 2235/661* (2013.01); *C04B 2235/666* (2013.01); *C04B 2235/764* (2013.01); *C04B 2235/786* (2013.01); *C04B 2235/96* (2013.01); *H01M 10/052* (2013.01); *H01M 10/056* (2013.01); *H01M 10/0561* (2013.01); *H01M 2300/0071* (2013.01); *H01M 2300/0091* (2013.01)

(58) Field of Classification Search
USPC .......................................................... 429/322
See application file for complete search history.

(56) References Cited

U.S. PATENT DOCUMENTS

| | | |
|---|---|---|
| 4,492,783 A | 1/1985 | Tanaka et al. |
| 5,014,763 A * | 5/1991 | Frank .................... B28B 1/007 164/15 |
| 5,130,067 A | 7/1992 | Flaitz et al. |
| 5,256,242 A | 10/1993 | Imaeda et al. |
| 5,279,994 A | 1/1994 | Kerkar |
| 5,296,318 A | 3/1994 | Gozdz et al. |
| 5,456,000 A | 10/1995 | Gozdz et al. |
| 5,460,904 A | 10/1995 | Gozdz et al. |
| 5,620,637 A | 4/1997 | Kaga et al. |
| 5,874,162 A | 2/1999 | Bastian et al. |
| 5,922,493 A | 7/1999 | Humphrey, Jr. et al. |
| 6,277,524 B1 | 8/2001 | Kanno |
| 6,306,535 B1 | 10/2001 | Tomimatsu et al. |
| 6,322,923 B1 | 11/2001 | Spotnitz et al. |
| 6,447,712 B1 | 9/2002 | Dogan et al. |
| 6,656,641 B1 | 12/2003 | Kumar |
| 6,852,138 B1 | 2/2005 | Topsoe et al. |
| 6,863,862 B2 | 3/2005 | Rasouli et al. |
| 6,924,065 B2 | 8/2005 | Noh |
| 7,108,827 B1 | 9/2006 | Hata et al. |
| 7,736,810 B2 | 6/2010 | Noh |
| 7,794,557 B2 | 9/2010 | Hui et al. |
| 7,901,658 B2 | 3/2011 | Weppner et al. |
| 7,923,149 B2 | 4/2011 | Hwang et al. |
| 8,092,941 B2 | 1/2012 | Weppner et al. |
| 8,268,488 B2 | 9/2012 | Neudecker |
| 8,283,843 B2 | 10/2012 | Pan et al. |
| 8,309,258 B2 | 11/2012 | Kanamura et al. |
| 8,329,605 B2 | 12/2012 | Bernard-Granger et al. |
| 8,431,287 B2 | 4/2013 | Teramoto |
| 8,658,317 B2 | 2/2014 | Weppner et al. |
| 8,697,292 B2 | 4/2014 | Kanno et al. |
| 8,828,580 B2 | 9/2014 | Visco et al. |
| 8,865,355 B2 | 10/2014 | Iriyama et al. |
| 8,877,388 B1 | 11/2014 | Ihlefeld et al. |
| 8,940,446 B1 | 1/2015 | Holme et al. |
| 9,034,526 B2 | 5/2015 | Teshima et al. |
| 9,093,717 B2 | 7/2015 | Sakamoto et al. |
| 2002/0054419 A1 | 5/2002 | Beteille et al. |
| 2003/0049499 A1 | 3/2003 | Murakawa et al. |
| 2003/0072870 A1 | 4/2003 | Brandle et al. |
| 2003/0148179 A1 | 8/2003 | Uyama et al. |
| 2004/0191617 A1 | 9/2004 | Visco et al. |
| 2005/0016839 A1 | 1/2005 | Horne et al. |
| 2006/0197245 A1 | 9/2006 | Cheng et al. |
| 2007/0015061 A1 | 1/2007 | Klaassen |
| 2007/0148553 A1 | 6/2007 | Weppner et al. |
| 2007/0231704 A1 | 10/2007 | Inda |
| 2008/0145751 A1 | 6/2008 | Ogumi et al. |
| 2009/0162755 A1 | 6/2009 | Neudecker |
| 2009/0194222 A1 | 8/2009 | Teramoto |
| 2009/0197172 A1 | 8/2009 | Inda |
| 2009/0226790 A1 | 9/2009 | Kanamura et al. |
| 2009/0301769 A1 | 12/2009 | Seppa et al. |
| 2009/0311567 A1 | 12/2009 | Visco et al. |
| 2009/0317724 A1 | 12/2009 | Kumar et al. |
| 2010/0047696 A1 | 2/2010 | Yoshida et al. |
| 2010/0203383 A1 | 8/2010 | Weppner et al. |
| 2011/0045355 A1 | 2/2011 | Ichikawa et al. |
| 2011/0052972 A1* | 3/2011 | Sohn ................... H01M 2/1646 429/161 |
| 2011/0053000 A1 | 3/2011 | Kanamura et al. |
| 2011/0053001 A1 | 3/2011 | Babic et al. |
| 2011/0053002 A1 | 3/2011 | Yamamura et al. |
| 2011/0133136 A1 | 6/2011 | Weppner et al. |
| 2011/0223487 A1 | 9/2011 | Johnson et al. |

(56) References Cited

U.S. PATENT DOCUMENTS

| | | |
|---|---|---|
| 2011/0244337 A1 | 10/2011 | Ohta et al. |
| 2011/0262796 A1 | 10/2011 | Shimooka et al. |
| 2011/0281175 A1 | 11/2011 | Hudson et al. |
| 2012/0196189 A1 | 8/2012 | Babic et al. |
| 2012/0237834 A1 | 9/2012 | Ogasa |
| 2012/0276439 A1 | 11/2012 | Fujita et al. |
| 2013/0085055 A1 | 4/2013 | Raj et al. |
| 2013/0122380 A1 | 5/2013 | Visco et al. |
| 2013/0177811 A1 | 7/2013 | Roffat et al. |
| 2013/0189562 A1 | 7/2013 | Dolle et al. |
| 2013/0216783 A1 | 8/2013 | Duan et al. |
| 2013/0230778 A1 | 9/2013 | Saimen et al. |
| 2013/0260257 A1 | 10/2013 | Choi |
| 2013/0281175 A1 | 10/2013 | MacDonald et al. |
| 2013/0288875 A1 | 10/2013 | Miyagawa et al. |
| 2013/0344416 A1 | 12/2013 | Sakamoto et al. |
| 2014/0057153 A1 | 2/2014 | Visco et al. |
| 2014/0060723 A1 | 3/2014 | Herle et al. |
| 2014/0072870 A1 | 3/2014 | Otsuka et al. |
| 2014/0093785 A1 | 4/2014 | Sugiura et al. |
| 2014/0099538 A1 | 4/2014 | Johnson et al. |
| 2014/0120409 A1 | 5/2014 | Ouchi et al. |
| 2014/0120421 A1 | 5/2014 | Ouchi et al. |
| 2014/0134483 A1 | 5/2014 | Ouchi et al. |
| 2014/0162113 A1 | 6/2014 | Ohta et al. |
| 2014/0170504 A1 | 6/2014 | Baek et al. |
| 2014/0186720 A1 | 7/2014 | Kintaka |
| 2014/0193695 A1 | 7/2014 | Hoshina |
| 2014/0205910 A1 | 7/2014 | Weppner et al. |
| 2014/0287305 A1 | 9/2014 | Wachsman et al. |
| 2014/0295287 A1 | 10/2014 | Eisele et al. |
| 2014/0377665 A1 | 12/2014 | Yoshida et al. |
| 2015/0015542 A1 | 1/2015 | Hou |
| 2015/0024292 A1 | 1/2015 | Yamada et al. |
| 2015/0037688 A1 | 2/2015 | Otsuka et al. |
| 2015/0044576 A1 | 2/2015 | Eisele et al. |
| 2015/0056520 A1 | 2/2015 | Thokchom et al. |
| 2015/0099188 A1 | 4/2015 | Holme et al. |
| 2015/0099190 A1 | 4/2015 | Holme et al. |
| 2015/0130115 A1 | 5/2015 | Sung et al. |
| 2015/0180001 A1 | 6/2015 | Johnson et al. |
| 2015/0200420 A1 | 7/2015 | Holme et al. |
| 2015/0243974 A1 | 8/2015 | Holme et al. |
| 2015/0295274 A1 | 10/2015 | Engel et al. |
| 2015/0333307 A1 | 11/2015 | Thokchom et al. |
| 2016/0056500 A1 | 2/2016 | Holme et al. |
| 2016/0087321 A1 | 3/2016 | Wöhrle et al. |
| 2016/0111751 A1 | 4/2016 | Badding et al. |
| 2016/0149260 A1 | 5/2016 | Badding et al. |
| 2016/0190639 A1 | 6/2016 | Sung et al. |
| 2016/0204466 A1 | 7/2016 | Nogami et al. |
| 2016/0211547 A1 | 7/2016 | Hwang et al. |
| 2016/0240887 A1 | 8/2016 | Hatta et al. |
| 2016/0244665 A1 | 8/2016 | Vosgroene et al. |
| 2016/0293988 A1 | 10/2016 | Sakamoto et al. |
| 2016/0308243 A1 | 10/2016 | Herle et al. |
| 2016/0308244 A1 | 10/2016 | Badding et al. |
| 2017/0005367 A1 | 1/2017 | Van Berkel et al. |
| 2017/0054139 A1 | 2/2017 | Kerkamm |
| 2017/0162901 A1 | 6/2017 | Chen et al. |
| 2017/0214048 A1 | 7/2017 | Qian et al. |

FOREIGN PATENT DOCUMENTS

| | | | |
|---|---|---|---|
| CN | 102010183 | | 4/2011 |
| CN | 102280659 A | | 12/2011 |
| CN | 103117413 | | 5/2013 |
| JP | 2000-128629 | | 5/2000 |
| JP | 2004-63261 | | 2/2004 |
| JP | 2006-8488 | | 1/2006 |
| JP | 2012224520 A | * | 11/2012 |
| JP | 2012-243743 | | 12/2012 |
| JP | 2013-107779 A | | 6/2013 |
| JP | 2013134852 | | 7/2013 |
| JP | 2013214421 | | 10/2013 |
| JP | 2015-130481 A | | 7/2015 |
| JP | 2015215998 | | 12/2015 |
| WO | WO 2011/038773 | | 4/2011 |
| WO | WO 2012/114175 | | 8/2012 |
| WO | WO 2013/010692 | | 1/2013 |
| WO | WO 2013/128769 | | 9/2013 |
| WO | WO 2015/054320 | | 4/2015 |
| WO | WO 2015/076944 | | 5/2015 |
| WO | WO 2016/069749 | | 5/2016 |
| WO | WO 2017/197406 A1 | | 11/2017 |
| WO | WO 2018/075972 A1 | | 4/2018 |

OTHER PUBLICATIONS

Charles Geiger et al. Crystal Chemistry and Stability of Li7La3Zr2O12 Garnet: A Fast Lithium-Ion Conductor (Year: 2011).*

The Second Office Action of Chinese Application No. 201480055386.4 dated Nov. 1, 2017, together with English translation, 10 pages.

Ahmad, Mohamad M. et al., "Concentration and mobility of mobile $Li^+$ ions in $Li_6BaLa_2Ta_2O_{12}$ and $Li_5La_3Ta_2O_{12}$ garnet lithium ion conductors," J Mater Sci: Mater Electron, 2015, 7 pages.

Ahmad, Mohamad M., "Lithium ionic conduction and relaxation dynamics of spark plasma sintered $Li_5La_3Ta_2O_{12}$ garnet nanoceramics," Nanoscale Research Letters, 2015, http://dxdoi.org10.1186/s11671-015-0777-7, 24 pages.

Ahn, Jee Hyun et al., "Local impedance spectroscopic and microstructural analyses of Al-in-diffused $Li_7La_3Zr_2O_{12}$," Journal of Power Sources, 2014, vol. 254, pp. 287-292.

Allen J.L. et al., "Effect of substitution (Ta, Al, Ga) on the conductivity of $Li_7La_3Zr_2O_{12}$", issued on Journal of Power Sources 2012, vol. 206, pp. 315319.

Baek, Seung-wook et al., "Garnet related lithium ion conductor processed by spark plasma sintering for all solid state batteries," Journal of Power Sources, 2014, vol. 249, pp. 197-206.

Bernuy-Lopez, Carlos et al., "Atmosphere Controlled Processing of Ga-Substituted Garnets for High Li-Ion Conductivity Ceramics," Chem. Mater. 2014, vol. 26, pp. 3610-3617.

Bonderer, et al., "Free-Standing Ultrathin Ceramic Foils," Journal of the American Ceramic Society (Impact Facto: 2.11), Nov. 2010; 93(11):2514-3631.

Bruce et al.,"$Li-O_2$ andLi—S batteries with high energy storage", Nature Materials, Jan. 2012, vol. 11, pp. 19-29.

Buschmann, Henrik et al. "Lithium metal electrode kinetics and ionic conductivity of the solid lithium ion conductors '$Li_7La_3Zr_2O_{12}$· and $Li_7,La_3Zr_2,Ta_xO_{12}$ with garnet-type strucutre," Journal of Power Sources, May 15, 2012, vol. 206, pp. 236-244.

Buschmann, Henrik, et al., "Structure and dynamics of the fast lithium ion conductor :$Li_2La_3Zr_2O_{12}$," Phys. Chem. Chem. Phys., 2011, vol. 13, pp. 19378-19392.

Cao, Zhenzhu et al., "Effect of Sb—Ba codoping on the ionic conductivity of $Li_7La_3Zr_2O_{12}$ ceramic," Ceramics International, 2015, http://dxdoi.org/10.1016/j.ceramint.2015.01.030, pp. 1-5.

Chen, Yan et al., "Origin of High Li+ Conduction in Doped $Li_7La_3Zr_2O_{12}$ Garnets," Chem. Mater., 2015, 27 (16), pp. 5491-5494.

Cheng, Lei et al., "Effect of Surface Microstructure on Electrochemical Performance of Garnet Solid Electrolytes," ACS Appl. Mater. Interfaces, 2015, vol. 7, pp. 2073-2081.

Cheng, Lei et al., "Interrelationships among Grain Size, Surface Composition Air Stability, and Interfacial Resistance of Al-Substitued $Li_7La_3Zr_2O_{12}$ Solid Electrolytes," ACS Appl. Mater. Interfaces, 2015, vol. 7, pp. 17649-17655.

Cheng, Lei, et al., "Effect of microstructure and surface impurity segregation on the electrical and electrochemical properties of dense Al-substituted $Li_7La_3Zr_2O_{12}$," J. Mater. Chem., 2014, 10 pages.

Cheng et al., "The origin of high electrolyte-electrode interfacial resistances in lithium cells containing garnet type solid electrolytes," Phys. Chem. Chem. Phys., 2014, 7 pages.

David et al., "Microstructure and Li-Ion Conductivity of Hot-Pressed Cubic $Li_7La_3Zr_2O_{12}$," J. Am. Cerami. Soc., 2015, pp. 1-6.

Deng, Yu-Feng et al., "Effect of the morphology of Li—La—Zr—O Solid electrolyte coating on the electrochemical performance of spinel $LiMn_{1.95}Ni_{0.05}O_{3.98}F_{0.02}$ cathode materials," J. Mater. Chem. A, 2014, 2, pp. 18889-18897.

(56) References Cited

OTHER PUBLICATIONS

Dhivya L. et al., "Effect of Simultaneous Substitution of Y and Ta on the Stabilization of Cubic Phase, Microstructure, and $Li^+$ Conductivity of $Li_7La_3Zr_2O_{12}$ Lithium Garnet," ACS Appl. Mater. Interfaces, 2014, 6 (20), pp. 17606-17615.

Dhivya L. et al., "$Li^+$ transport properties of W substituted $Li_7La_3Zr_2O_{12}$ cubic lithium garnets," AIP Advances, 2013, vol. 3, No. 082115, 22 pages.

Djenadic, Ruzica et al., "Nebulized spray pyrolysis of Al-doped $Li_7La_3Zr_2O_{12}$ solid electrolyte for battery applications," Solid State Ionics, 2014, vol. 263, pp. 49-56.

Dong, Youzhong et al., "Electrochemical perofmrance and lithium-ion insertion/extraction mechanism studies of the novel $Li_2ZrO_3$ anode materials," Electrochimica Acta, 2015, vol. 161, pp. 219-225.

Duvel, Andre, et al., "Mechanosynthesis of Solid Electrolytes: Preparation, Characterization, and Li Ion Transport Properties of Garnet-Type Al-Doped $Li_7La_3Zr_2O_{12}$ Crystallizing with Cubic Symmetry," The Journal of Physical Chemistry, 2012, vol. 116, pp. 15192-15202.

Extended European Search Report dated Feb. 22, 2017 for European application No. 14864783.7; 9 pages.

Fries, R. et al., "Fabrication and properties of an anisotropic PZT/Polymer 0-3 composite," J. Mater. Sci.: Mater. in Electronics, 1994, vol. 5, pp. 238-243.

Geiger, Charles, A., et al., "Crystal Chemistry and Stability of "$Li_7La_3Zr_2O_2$" Garnet: A Fast Lithium-Ion Conductor," Inorganic Chemistry, 2011, vol. 50, pp. 1089-1097.

Goodenough, John, B., "Solid Electrolytes for Next Generation Batteries," Texas Materials Institute, The University of Texas at Austin, May 14-18, 2012, DOE Vehicle Technologies Annual Merit Review Meeting, 18 pages.

Gu et al., "Effects of penta-and trivalent dopants on structures and conductivity $Li_7La_3Zr_2O_{12}$," Solid State Ionics, 2015, vol. 274, pp. 100-105.

Han, Jiantao, et a., "Experimental visualization of lithium conduction pathways in garnet-type $Li_7La_3Zr_2O_{12}$," Chem. Commun., 2012, vol. 48, pp. 9840-9842.

Hayashi, K. et al., "New Phases in $La_2O_3$—$Li_2O$—$Ta_2O_5$ System," Mat. Res. Bull. 1986, vol. 21, No. 3, pp. 289-293.

Herrmann, M. et al., "Micro-sgregations in liquid phase sintered silicon carbide ceramics," Journal of the European Ceramic Society, 2010, 30, pp. 1495-1501.

Hitz et al., "Highly Li-Stuffed Garnet-Type $Li_{7+x}La_3Zr_{2-x}Y_xO_{12}$," Journal of the Electrochemical Society, 2013, vol. 160, No. 8, pp. 248-255.

Hyooma, H. et al.,"Crystal Structures of $La_3Li_5M_2O_{12}$ (M=Nb, Ta)," Mat Res. Bull. 1988, vol. 23, No. 10, pp. 1399-1407.

International Search Report and Written Opinion dated Apr. 15, 2016 in PCT/US2016/015209, 14 pages.

International Search Report and Written Opinion dated Mar. 10, 2015 in PCT/US2014/059578, 16 pages.

International Search Report and Written Opinion dated Mar. 23, 2015 in PCT/US2014/059575, 18 pages.

International Search Report and Written Opinion dated Dec. 1, 2016 in PCT/2016/043428, 11 pages.

Ishiguro, K., et al., "Stability of Nb-Doped Cubic $Li_2La_3Zr_2O_2$ with Lithium Metal," Journal of the Electrochemical Society, 2013, vol. 160, No. 10, pp. 690-693.

Ito, Seitaro et al., "A rocking chair type all-solid-state lithium ion battery adopting $Li_2O$—$ZrO_2$ coated $LiNi_{0.8}Co_{0.15}Al_{0.05}O_2$ and a sulfide based electrolyte," Journal of Power Sources, 248, 2014, pp. 943-950.

Jalem et al., "Effects of Gallium doping in Garnet-Type $Li_7La_3Zr_2O_{12}$ Solid Electrolytes," Chem. Mater., XXXX, XXX, XXX-XXX, 11 pages.

Jalem, Randy et al., "Insights into the Lithium-Ion Conduction Mechanism of Garnet-Type Cubic $Li_5La_3Ta_2O_{12}$ by ab-Initio Calculations," J. Phys. Chem. C 2015, vol. 119, pp. 20783-20791.

Janani, Narayanasamy et al., "Influence of sintering additives on densification and $Li^+$ conductivity of Al doped $Li_7La_3Zr_2O_{12}$ lithium garnet," RSC Adv. 2014, vol. 4, pp. 51228-51238.

Janani, Narayanasamy et al., "Optimization of Lithium Content and Sintering Aid for Maximized $Li+$ Conductivity and Density in Ta-Doped $Li_7La_3Zr_2O_{12}$," J. Am. Ceram. Soc., 2015, pp. 1-8.

Jin et al., "Al-doped $Li_2La_3Zr_2O_2$ synthesized by a polymerized complex method," Journal of Power Sources, 2011, vol. 196, pp. 8683-8687.

Jung, Yun-Chae et al., "Ceramic separators based on Liþ -conducting inorganic electrolyte for high-performance lithium-ion batteries with enhanced safety," Journal of Power Sources, 2015, vol. 293, pp. 675-683.

Kang, Sung Gu et al., "First-Principles Study of Chemical Stability of Lithium Oxide Garnets $Li_7La_3M_2O_{12}$ (M=Zr, Sn, or Hf)," J. Phys. Chem. C, 2014, 118 (31), pp. 17402-17406.

Kato, Takehisa et al., "Preparation of thick-film electrode-solid electrolyte composites on $Li_7La_3Zr_2O_{12}$ and their electrochemical properties," Journal of Power Sources, 303, 2016, pp. 65-72.

Katsui, H. et al., "Preparation of cubic and tetragonal $Li_7La_3Zr_2O_{12}$ flim by metal organic chemical vapor deposition," Thin Solid Films, vol. 584, Jun. 2015, pp. 130-134.

KC, Santosh et al., "Point defects in garnet-type solid electrolyte (c-$Li_7La_3Zr_2O_{12}$) for Li-ion batteries," Solid State Ionics, 2014, vol. 261, pp. 100-105.

Kihira, Yuki et al., "Effect of Simultaneous Substitution of Alkali Metals and Nb in $Li_7La_3Zr_2O_{12}$ on Lithium-Ion Conductivity," ECS Electrochemistry Letters, 2013, vol. 2, No. 7, pp. A56-A59.

Kim, Ki Hyun et al., "Characterization of the interface between LiCoO2 and $Li_7La_3Zr_2O_{12}$ in an all-solid-state rechargeable lithium battery," Journal of Power Sources, 196, 2011, pp. 764-767.

Kim, Yunsung et al., "The Effect of Relative Density on the Mechanical Properties of Hot-Pressed Cubic $Li_7La_3Zr_2O_{12}$," J. Am. Ceram. Soc., 2016, pp. 1-8.

Klenk, Matthew et al., "Local structure and dyanmics of lithium garnet ionic conductors: tetragonal and cubic $Li_7La_3Zr_2O_7$," Phys. Chem. Chem. Phys., 2015, 11 pages.

Kokal, I., et al., "Preparation and characterization of three dimensionally ordered macroporous $Li_5La_3Zr_2O_{12}$ by colloidal crystal templating for all-solid-state lithium-ion batteries," Ceramics International, 2015, 41(1), pp. 737-741.

Kokal, I., et al., "Sol-gel synthesis and lithium ion conductivity of $Li_7La_3Zr_2O_{12}$ with garnet-related type structure," Solid State Ionics, 2011, vol. 185, pp. 42-46.

Kong, L.B. et al., "Transparent Ceramics, Topics in Mining," Springer International Publishing Switzerland, 2015, pp. 29-91.

Kotobuki, Masashi et al., "Preparation of Sintered $Li_5La_3Nb_2O_{12}$ Garnet-type Li Ion Conductor via Spark Plasma Sintering Synthesis," Int. J. Electroact. Mater. 2014, vol. 2, pp. 17-21.

Kotobuki, Masashi et al., "Fabrication of all-solid-state lithium battery with lithium metal anode using $Al_2O_3$-added $Li_7La_3Zr_2O_{12}$ solid electrolyte," Journal of Power Sources, 196, 2011, pp. 7750-7754.

Kotobuki, Masashi, et al., "Compatibility of $Li_2La_3Zr_2O_2$ Solid Electrolyte to All-Solid-State Battery Using Li Metal Anode," Journal of the Electrochemical Society, 2010, vol. 157, No. 10, pp. 076-079.

Kotobuki, Masashi, et al., "Fabrication of all-solid-state lithium battery with lithium metal anode using $_2O_3$-added $Li_2La_3Zr_2O_{12}$ solid electrolyte," Journal of Power Sources, 2011, vol. 196, pp. 7750-7754.

Lai, Wei et al., "Ultrahigh-Energy-Density Microbatteries Enabled by New Electrode Architecture and Micropackaging Design," Adv. Mater. 2010, 22, E139-E144.

Lallemant et al., "Transparent polycrystalline alumina obtained by SPS: Green bodies processing effect," Journal of the European Ceramic Society, 2012.

Langer et al., "Syntheis of single phase cubic Al-substituted $Li_7La_3Zr_2O_{12}$ by solid state lithiation of mixed hydroxides,"Journal of Alloys and Compounds, 2015, vol. 645, pp. 64-69.

(56) References Cited

OTHER PUBLICATIONS

Lau et al., "Density Functional Investigation of the Thermodynamic Stability of Lithium Oxide Bulk Crystalline Structures as a Function of Oxygen Pressure", issued on J. Phys. Chem. C XXXX, XXX, 000-000, 9 pages.

Lee et al., "High lithium ion conductivity of $Li_2La_3Zr_2O_{12}$ synthesized by solid state reaction," Solid State Ionics, 2014, vol. 258, pp. 13-17.

Li et al., "W-Doped $Li_7La_3Zr_2O_{12}$ Ceramic Electrolytes for Solid State Li-ion Batteries," Electrochimica Acta, 2015, vol. 180, pp. 37-42.

Li et al., "The reaction of $Li_{6.5}La_3Zr_{1.5}Ta_{0.5}O_{12}$ with water," Solid State Ionics, 2015, vol. 269, pp. 57-61.

Li et al., "Optimizing Li conductivity in a garnet framework," J. Mater. Chem., 2012, vol. 22, pp. 15357-15361.

Liu et al., "High Ion Conductivity in Garnet-type F-doped $Li_7La_3Zr_2O_{12}$," Journal of Inorganic Materials, Sep. 2015, vol. 30, No. 9, pp. 995-1001.

Liu et al., "Reversible ion exchange and structural stability of garnet-type Nb-doped $Li_7La_3Zr_2O_{12}$ in water for applications in lithium batteries," Journal of Power Sources, 2015, vol. 282, pp. 286-293.

Liu et al., "Achieving high capacity in bulk-type solid-state lithium ion battery based on $Li_{6.75}La_3Zr_{1.75}Ta_{0.25}O_{12}$ electrolyte: Interfacial resistance," Journal of Power Sources, 324, 2016, pp. 349-357.

Matsuda et al., "Phase formation of a garnet-type lithium-ion conductor $Li_{7-3x}Al_xLa_3Zr_2O_{12}$," Solid State Ionics, 2015, vol. 277, pp. 23-29.

Matsui et al., "Phase stability of a garnet-type lithium ion conductor $Li_7La_3Zr_2O_{12}$," Dalton Trans., 2014, 43, pp. 1019-1024.

Matsui et al., "Phase transformation of the garnet structured lithium ion conductor: $Li_7La_3Zr_2O_{12}$," Solid State Ionics, Sep. 1, 2014, 262, pp. 155-159.

McCloskey et al., On the Mechanism of Nonaqueous Li-O2 Electrochemistry on C and Its Kinetic Overpotentials: Some Implications for Li-Air Batteries, issued on "J. Phys. Chem. C XXXX, XXX, XXX-XXX," 9 pages.

Miara et al., "Effect of Rb and Ta Doping on the Ionic Conductivity and Stability of the Garnet $Li_{7+2x-y}(La_{3-x}Rb_x)(Zr_{2-y}Ta_y)O_{12}$ ($0 \le x \le 0.375$, $0 \le y \le 1$) Superionic Conductor: A First Principles Investigation," Chem. Mater. 2013, vol. 25, pp. 3048-3055.

Miara et al., "First-Principles Studies on Cation Dopants and Electrolyte|Cathode Interphases for Lithium Garnets," Chem. Mater., 2015, 27 (11), pp. 4040-4047.

Mitterdorfer et al., "Fabrication of thin electrolytes for second-generation solid oxide fuel cells," Solid State Ionics, vol. 131, 2000, pp. 79-96.

Miyauchi et al., "New Amorphous Thin Films of Lithium Ion Conductive Solid Electrolyte," Solid State Ionics 9 & 10, 1983, pp. 1469-1472.

Mizuno et al., "Environmentally Friendly Flux Growth of High-Quality, Idiomorphic $Li_5La_3Nb_2O_{12}$ Crystals," Cryst. Growth Des., 2013, 13, pp. 479-484.

Moshkovich et al., "The study of the anodic stability of alkyl carbonate solutions by in situ FTIR spectroscopy, EQCM, NMR and MS," Journal of Electroanalytical Chemistry, 2001, vol. 497, pp. 84-96.

Mukhopadhyay et al., "Structure and Stoichiometry in Supervalent Doped $Li_7La_3Zr_2O_{12}$," Chem. Mater., 2015, vol. 27, pp. 3658-3665.

Murugan et al., "Schnelle Lithiumionenleitung in granatartigem $Li_7La_3Zr_2O_{12}$", issued on Angew. Chem. 2007, vol. 119, pp. 7925-7928.

Murugan et al., "Fast Lithium Ion Conduction in Garnet-Type $Li_7La_3Zr_2O_{12}$," Angew. Chem. Int. Ed., 2007, 46, pp. 7778-7781.

Narayanan, Sumaletha et al., "Dopant Concentration-Porosity-Li-Ion Conductivity Relationship in Garnet-Type $Li_{5+2x}La_3Ta_{2-x}Y_xO_{12}$ ($0.05 \le x \le 0.75$) and Their Stability in Water and 1 M LiCl," Inorg. Chem., XXXX, XXX, XXX-XXX, 10 pages.

Nemori et al., "Stability of garnet-type solid electrolyte $Li_xLa_3A_{2-y}B_yO_{12}$ (A=Nb or Ta, B=Sc or Zr)," Solid State Ionics, 2015, vol. 282, pp. 7-12.

Neudecker, B.J., et al., "'Lithium-Free' Thin-Film Battery with in Situ Plated Li Anode," Journal of the Electrochemical Society, vol. 147 No. 2, 2000, pp. 517-523.

Ni, Jennifer, et al., "Room temperature elastic moduli and Vickers hardness of hot-pressed LLZO cubic garnet," J. Mater. Sci., 2012, vol. 47, pp. 7979-7985.

Nyman, May et al., "Alternative Approach to Increasing Li Mobility in Li—La—Nb/Ta Garnet Electrolytes," Chem. Mater., 2010, vol. 22, No. 19, pp. 5401-5410.

Office Action dated May 8, 2015 in U.S. Appl. No. 14/531,929, 12 pages.

Ohta, Shingo et al., "Co-sinterable lithium garnet-type oxide electrolyte with cathode for all-solid-state lithium ion battery," Journal of Power Sources, 2014, vol. 265, pp. 40-44.

Ohta, Shingo et al., "All-solid-state lithium ion battery using garnet-type oxide and Li3BO3 solid electrolytes fabricated by screen-printing," Journal of Power Sources, 238, 2013, pp. 53-56.

Ohta, Shingo et al., "Electrochemical performance of an all-solid-state lithium ion battery with garnet-type oxide electrolyte," Journal of Power Sources, 202, 2012, pp. 332-335.

Ohta, Shingo, et al., "High lithium ionic conductivity in the garnet-type oxide $Li_{7-x}La_3(Zr_{2-x}, Nb_x)O_{12}$ (X=0-2)," Journal of Power Sources, 2011, vol. 196, pp. 33423345.

Onodera, H., et al., "Flux Growth of Idiomorphic Garnet-Type Solid Electrolyte Crystals for All-Solid-State Lithium-Ion Rechargeable Batteries," 2012, The Electrochemical Society, Abstract #1198, 1 page.

Park, Joong Sun et al., "Effects of crystallinity and impurities on the electrical conductivity of Li—La—Zr—O thin films," Thin Solid Films, 2015, vol. 576, pp. 55-60.

Peng et al., "A Reversible and Higher-Rate Li—O2 Battery", issued on http://www.sciencemag.org/content/early/recent / 19 July 2012 / Page 1 / 10.1126/science.1223985, 6 pages.

Puech, Laurent et al., "Elaboration and characterization of a free standing LiSICON membrane for aqueous lithiumeair battery," Journal of Power Sources, 214, 2012, pp. 330-336.

Ramakumar, S. et al., "Structure and Li+ dyanmics of Sb-doped $Li_7La_3Zr_2O_{12}$ fast lithium ion conductors," Phys. Chem. Chem. Phys. 2013, vol. 15, pp. 11327-11338.

Ramzy et al., "Tailor-Made Development of Fast Li Ion Conducting Garnet-Like Solid Electrolytes," American Chemical Society, Applied Materials and Interfaces, 2010, vol. 2, No. 2, pp. 385-390.

Rangasamy et al., "A High Conducting Oxide-Sulfide Composite Lithium Superionic Conductor," J. Mater. Chem. A, 2014, 2, pp. 4111-4116.

Rangasamy, E., et al., "The effect of 24c-site (A) cation substitution on the tetragonal-cubic phase transition in $Li_{7-x}La_{3-x}A_x Zr_2O_{12}$ garnet-based ceramic electrolyte," Journal of Power Sources, 2013, vol. 230, pp. 261-266.

Rangasamy, E., et al., "The role of Al and Li concentration on the formation of cubic garnet solid electrolyte of nominal composition $Li_7La_3Zr_2O_{12}$," Solid State Ionics, 2012, vol. 206, pp. 28-32.

Rao, R. Prasada et al., "In Situ Neutron Diffraction Monitoring of $Li_7La_3Zr_2O_{12}$ Formation: Toward a Rational Synthesis of Garnet Solid Electrolytes," Chem. Mater. XXXX, XXX, XXX-XXX, 8 pages.

Raskovalov et al, "Structure and transport properties of $Li_7La_3Zr_{2-0.75x}Al_xO_{12}$ supersonic solid electrolytes," Journal of Power Sources, 2013, 238, pp. 48-52.

Reed, James S., Principles of Ceramics Processing, 2nd Edition, John Wiley & Sons, Inc., New York, pp. 60-61.

Reinacher et al., "Preparation an electrical properties of garnet-type $Li_6BaLa_2Ta_2O_{12}$ lithium solid electrolyte thin films prepared by pulsed laser deposition," Solid State Ionics, 2014, vol. 258, 7 pages.

Ren et al., "Direct observation of lithium dendrites inside garnet-type lithium-ion solid electrolyte," Electrochemistry Communications, 2015, vol. 57, pp. 27-30.

Ren et al., "Effects of Li source microstructure and ionic conductivity of Al-contained $Li_{6.75}La_3Zr_{1.75}Ta_{0.25}O_{12}$ cermics," Journal of the European Ceramic Society, 2015, vol. 35, pp. 561-572.

(56) References Cited

OTHER PUBLICATIONS

Rettenwander et al., "Site Occupation of Ga and Al in Stabilized Cubic $Li_{7-3(x+y)}Ga_xAl_yLa_3Zr_2O_{12}$ Garnets as Deduced from $^{27}Al$ and $^{71}Ga$ MAS NMR at Ultrahigh Magnetic Fields," Chem. Mater., 2015, 27 (8), pp. 3135-3142.

Rettenwander et al., "Synthesis, Crystal Chemistry, and Electrochemical Properties of $Li_{7-x}La_3Zr_{2-x}Mo_xO_{12}$ (x=0.1-0.4): Stabilization of the Cubic Garnet Polymorph via Substitution of $Zr^{4+}$ by $Mo^{6+}$," Inorg. Chem., 2015, 54 (21), pp. 10440-10449.

Rettenwander et al., "DFT study of the role of $Al^{3+}$ in the fast ion-conductor $Li_{7-3x}Al^{3+}{}_xLa_3Zr_2O_{12}$ Garnet," Chem. Mater. 2014, vol. 26, pp. 2617-2623.

Rosero-Navarro et al., "Preparation of $Li_7La_3(Zr_{2-x}Nb_x)O_{12}$ (x=0-1.5) and $Li_3BO_3/LiBO_2$ composites at low temperatures using a sol-gel process," Solid State Ionics, 2015, http://dxdoi.org/10.1016/j.ssi.2015.06.015, 7 pages.

Sakamoto, Jeff, "Garnet-based ceramic electrolyte: Enabling Li metal anodes and solid state batteries," Beyond Lithium Ion VI, Jun. 4-6, 2013, Boulder, CO., 36 pages.

Satyanarayana et al., "Structure and Li+ dynamics of Sb-doped $Li_7La_3Zr_2O_{12}$ fast lithium ion conductors", issued on Phys. Chem. Chem. Phys., 2013, vol. 15, pp. 11327-11335.

Sharafi et al., Characterizing the $Li—Li_7La_3Zr_2O_{12}$ interface stability and kinetics as a function of temperature and current density, Journal of Power Sources, 2016, vol. 302, pp. 135-139.

Shimonishi et al., "Synthesis of garnet-type $Li_{7-x}La_3Zr_2)_{12-1/2x}$ and its stability in aqueous solutions," Solid State Ionics, 2011, vol. 183, pp. 48-53.

Shin et al., "Synergistic multi-doping effects on the $Li_7La_3Zr_2O_{12}$ solid electrolyte for fast lithium ion conduction," Scientific Reports, 2015, pp. 1-9.

Song et al., "Crystal structure, migration mechanism and electrochemical performance of Cr-stabilized garnet," 2014, vol. 268, pp. 135-139.

Suárez, Marta et al., "Sintering to Transparency of Polycrystalline Ceramic Materials," Mar. 2, 2012, pp. 527-553: http://www.intechopen.com/books/sintering-of-ceramics-new-emerging-techniques/sintering-to-transparencyof-polycrystalline-ceramic-materials.

Sudo, R., et al., "Interface behavior between garnet-type lithium-conducting solid electrolyte and lithium metal," Solid State Ionics, Aug. 2014, 262, pp. 151-154.

Suzuki et al., "Transparent cubic garnet-type solid electrolyte of $Al_2O_3$-doped $Li_7La_3Zr_2O_{12}$," Solid State Ionics, 2015, vol. 278, pp. 172-176.

Tadanaga et al., "Low temperature synthesis of highly ion conductive $Li_7La_3Zr_2O_{12}—Li_3BO_3$ composites," Electrochemistry Communications, 2013, vol. 33, pp. 51-54.

Takeda et al., "High Pressure Form of Fluoride Garnets $Na_3M_2Li_3F_{12}$ (M=& Fe)," Mat. Res. Bull., 1977, vol. 12, No. 7, pp. 689-692.

Tan et al., "Fabrication and characterization of $Li_7La_3Zr_2O_{12}$ thin films for lithium ion battery," ECS Solid Sate Letters, vol. 6, Oct. 3, 2012, pp. 57-60.

Teng, Shiang, et al., "Recent Developments in garnet based solid state electrolytes for thin film batteries," Current Opinion in Solid State and Materials Science, Feb. 2014, vol. 18, Issue 18, pp. 29-38.

Thangadurai et al., "Fast Solid-State Li Ion Conducting Garnet-Type Structure Metal Oxides for Energy Storage," J. Phys. Chem. Lett, 2015, vol. 6, pp. 292-299.

Thangadurai et al., "$Li_6ALa_2N\,O_{12}$ (A=Ca, Sr, Ba): A New Class of Fast Lithium Ion Conductors with Garnet-Like Structure," J. Am. Ceram. Soc., 2005, vol. 88, No. 2, pp. 411-418.

Thangadurai et al., "Novel Fast Lithium Ion Conduction in Garnet-Type $Li_5La_3M_2O_{12}$ (M=Nb, Ta)," J. Am. Ceram. Soc., 2003, vol. 86, No. 3, pp. 437-440.

Thompson et al., "A Tale of Two Sites: On Defining the Carrier Concentration in Garnet-Based Ionic Conductors for Advanced Li Batteries," Adv. Energy Mater., 2015, 1500096, pp. 1-9.

Toda, S., et al., "Low temperature cubic garnet-type $CO_2$-doped $Li_7La_3Zr_2O_{12}$," Solid State Ionics, 2013, vol. 233, pp. 102-106.

Tong, Xia, "Highly Conductive Li Garnets by a Multielement Doping Strategy," Inorg. Chem., XXXX, XXX, XXX-XXX, 8 pages.

Ulissi, Ulderico et al., "All solid-state battery using layered oxide cathode, lithium-carbon composite anode and thio-LISICON electrolyte," Solid State Ionics, 296, 2016, pp. 13-17.

Wainwright et al., "Forces generated by anode growth in cylindrical $Li/MoS_2$ cells," Journal of Power Sources, 1991, vol. 34, pp. 31-38.

Wang et al., "The synergistic effects of al and Te on the structure and Li+-mobility of garnet-type solid electrolytes," J. Mater. Chem. A. 2014, 9 pages.

Wang et al., "Transparent ceramics: Processing, materials and applications," Progress in Solid State Chemistry, 41, 2013, pp. 20-54.

Wang et al., "Correlation and mechanism of lithium ion diffusion with the crystal strcutre of $Li_7La_3Zr_2O_{12}$ revealed by an internal friction technique," Phys. Chem. Chem. Phys., 2014, vol. 16, pp. 7006-7014.

Wang, Yuxing et al., "Phase transition in lithium garnet oxide ionic conductors $Li_7La_3Zr_2O_{12}$: The role of Ta substitution and $H_2O/CO_2$ exposure," Journal of Power Sources, 2015, vol. 275, pp. 612-620.

Wilkinson, D.P. et al., "Effects of physical constraints on Li cycability," Journal of Power Sources, 1991, vol. 36, pp. 517-527.

Wolfenstine, J. et al., "Chemical stability of cubic $Li_7La_3Zr_2O_{12}$ with molten lithium at elevated temperature," J. Mater. Sci. 2013, 6 pages.

Wolfenstine, Jeff et al., "A preliminary investigation of fracture toughness of $Li_7La_3Zr_2O_{12}$ and its comparisoin to other solid Li-ion conductors," Materials letters, 2013, vol. 96, pp. 117-120.

Xie Hui et al., "Lithium Distribution in Aluminum-Free Cubic $Li_7La_3Zr_2O_{12}$", issued on Chem. Mater. 2011, 23, 3587-3589.

Xie, Hui, et al., "Low-temperature synthesis of $Li_7La_3Zr_2O_{12}$ with cubic garnet-type structure," Materials Research Bulletin, 2012, vol. 47, pp. 1229-1232.

Xu, Biyi et al., "Multistep sintering to synthesize fast lithium garnets," Journal of Power Sources, 2016, vol. 302, pp. 291-297.

Yang, Ting et al., "Nanostructured Garnet-Type Solid Electrolytes for Lithium Batteries: Electrospinning Synthesis of $Li_7La_3Zr_2O_{12}$ Nanowires and Particle Size-Dependent Phase Transformation," J. Phys. Chem. C. XXXX, XXX, XXX-XXX, 7 pages.

Yi, Eongyu et al., "Flame made nanoparticles permit processing of dense, flexible, Li+ conducting ceramic electrolyte thin films of cubic-$Li_7La_3Zr_2O_{12}$ (c-LLZO)," J. Mater. Chem. A, 2016, 4, pp. 12947-12954.

Yoshima, Kazuomi et al., "Thin hybrid electrolyte based on garnet-type lithium-ion conductor $Li_7La_3Zr_2O_{12}$ for 12 V-class bipolar batteries," Journal of Power Sources, 2016, vol. 302, pp. 283-290.

Zaiß et al., "Fast ionic conduction in cubic hafnium garnet $Li_7La_3Hf_2O_{12}$," Ionics, Springer-Verlag, 2010, vol. 16, pp. 855-858.

Zhang, Yanhua et al., "Effect of lithium ion concentration on the microstructure evolution and its association with the ionic conductivity of cubic garnet-type nominal $Li_7Al_{0.25}La_3Zr_2O_{12}$ solid electrolytes,"Solid State Ionics, 2015, XXX, XXX-XXX, 8 pages.

Zhang, Yanhua et al., "Preparation of cubic $Li_7La_3Zr_2O_{12}$ solid electrolyte using a nano-sized core-shell structured precursor," Journal of Alloys and Compounds, 2015, vol. 644, pp. 793-798.

Zhang, Yanhua, et al., "Field assisted sintering of dense Al-substituted cubic phase $Li_7La_3Zr_2O_{12}$ solid electrolytes," Journal of Power Sources, 2014, vol. 268, pp. 960-964.

English translation of Office Action of Chinese application No. 201480055387.9 dated Dec. 22, 2016; 7 pages.

English translation of Office Action of Chinese application No. 201480055386.4 dated Jan. 4, 2017; 9 pages.

Hitz et al., "Highly Li-Stuffed Garnet-Type $Li_{7+x}La_3Zr_{2-x}Y_xO_{12}$," Journal of the Electrochemical Society, 2013, vol. 160, No. 8, pp. A1248-A1255.

Ishiguro et al., "Stability of Nb-Doped Cubic $Li_7La_3Zr_2O_2$ with Lithium Metal," Journal of the Electrochemical Society, 2013, vol. 160, No. 10, pp. A1690-A1693.

Kotobuki et al., "Compatibility of $Li_7La_3Zr_2O_{12}$ Solid Electrolyte to All-Solid-State Battery Using Li Metal Anode," *Journal of the Electrochemical Society*, 2010, vol. 157, No. 10, pp. A1076-A1079.

(56) References Cited

OTHER PUBLICATIONS

Lallemant et al., "Transparent polycrystalline alumina obtained by SPS: Green bodies processing effect," Journal of the European Ceramic Society, 2012, JECS-8675, 7 pages.

Satyanarayana et al., "Structure and Li+ dynamics of Sb-doped $Li_7La_3Zr_2O_{12}$ fast lithium ion conductors", Phys. Chem. Chem. Phys., 2013, vol. 15, pp. 11327-11338.

Wang, Dawei et al., "Toward Understanding the Lithium Transport Mechanism in Garnet-type Solid Electrolytes: Li+ Ion Exchanges and Their Mobility at Octahedral/Tetrahedral Sites," Chem. Mater., 2015, vol. 27, pp. 6650-6659.

Wang, Shutao et al., "Syntheses and structures of lithium zirconates for high-temperature $CO_2$ absorption," Journal of Mater. Chem. A, 2013, vol. 1, pp. 3540-3550.

Wolfenstine et al., "Chemical stability of cubic $Li_7La_3Zr_2O_{12}$ with molten lithium at elevated temperature", J. Mater. Sci., 2013, vol. 48, pp. 5846-5851.

Zhang et al., "Effect of lithium ion concentration on the microstructure evolution and its association with the ionic conductivity of cubic garnet-type nominal $Li_7Al_{0.25}La_3Zr_2O_{12}$ solid electrolytes", Solid State Ionics, 2016, vol. 284, pp. 53-60.

Office Action of Japanese application No. 2016-520586 dated Nov. 28, 2017 together with English translation; 8 pages.

Agrawal et al., "Solid polymer electrolytes: materials designing and all-solid-state battery applications: an overview", Journal of Physics D: Applied Physics 41, 2008, 223001, 18 pages.

Ahmad et al., "Concentration and mobility of mobile Li+ ions in $Li_6BaLa_2Ta_2O_{12}$ and $Li_5La_3Ta_2O_{12}$ garnet lithium ion conductors," J Mater Sci: Mater Electron, 2015, vol. 26, pp. 8136-8142.

Ahmad, Mohamad M., "Lithium ionic conduction and relaxation dynamics of spark plasma sintered $Li_5La_3Ta_2O_{12}$ garnet nanoceramics," Ahmad Nanoscale Research Letters, 2015, 10:58, 10 pages.

Arora et al., "Battery Separators", Chemical Reviews, 2004, vol. 104, pp. 4419-4462.

Baggetto et al., "High Energy Density All-Solid-State Batteries: A Challenging Concept Towards 3D Integration", Advanced Functional Materials, 2008, vol. 18, pp. 1057-1066.

Bonderer et al., "Free-Standing Ultrathin Ceramic Foils," Journal of the American Ceramic Society, 2010, vol. 93, No. 11, pp. 3624-3631.

Cao et al., "Effect of Sb—Ba codoping on the ionic conductivity of $Li_7La_3Zr_2O_{12}$ ceramic," Ceramics International, 2015, vol. 41, pp. 6232-6236.

Chen et al., "Sol-gel derived Li—La—Zr—O thin films as solid electrolytes for lithium-ion batteries", Journal of Materials Chemistry A, 2014, vol. 2, pp. 13277-13282.

Cheng et al., "Effect of microstructure and surface impurity segregation on the electrical and electrochemical properties of dense Al-substituted $Li_7La_3Zr_2O_{12}$," J. Mater. Chem. A, 2014, vol. 2, pp. 172-181.

Cheng et al., "The origin of high electrolyte-electrode interfacial resistances in lithium cells containing garnet type solid electrolytes," Phys. Chem. Chem. Phys., 2014, vol. 16, pp. 18294-18300.

Ferrese et al., "Lithium Redistribution in Lithium-Metal Batteries", Journal of the Electrochemical Society, 159, 2012, pp. A1615-A1623.

Gorte et al., "Anodes for Direct Oxidation of Dry Hydrocarbons in a Solid-Oxide Fuel Cell", Advanced Materials, 2000, vol. 12, No. 19, pp. 1465-1469.

Jalem et al., "Effects of Gallium doping in Garnet-Type $Li_7La_3Zr_2O_{12}$ Solid Electrolytes," Chemistry of Materials, 2015, vol. 27, pp. 2821-2831.

Janani et al., "Optimization of Lithium Content and Sintering Aid for Maximized Li+ Conductivity and Density in Ta-Doped $Li_7La_3Zr_2O_{12}$," J. Am. Ceram. Soc., 2015, pp. 1-8; DOI: 10.1111/jace.13578.

Kerman et al., "Complex oxide nanomembranes for energy conversion and storage: A review", Journal of Materials Research, vil. 29, No. 3, Feb. 14, 2014, pp. 320-337.

Kim et al., "Epitaxial growth and lithium ion conductivity of lithium-oxide garnet for an all solid-state battery electrolyte\"", Dalton Transactions, 2013, vol. 42, pp. 13112-13117.

Kim et al., "The Effect of Relative Density on the Mechanical Properties of Hot-Pressed Cubic $Li_7La_3Zr_2O_{12}$," J. Am. Ceram. Soc., 2016, pp. 1-8, DOI: 10.1111/jace.14084.

Klenk et al., "Local structure and dyanmics of lithium garnet ionic conductors: tetragonal and cubic $Li_7La_3Zr_2O_7$," Phys. Chem. Chem. Phys., 2015, vol. 17, pp. 8758-8768.

Lallemant et al., "Transparent polycrystalline alumina obtained by SPS: Green bodies processing effect," Journal of the European Ceramic Society, 2012, vol. 32, pp. 2909-2915.

Lau et al., "Density Functional Investigation of the Thermodynamic Stability of Lithium Oxide Bulk Crystalline Structures as a Function of Oxygen Pressure", J. Phys. Chemistry C, 2011, vol. 115, pp. 23625-23633.

McCloskey et al., "On the Mechanism of Nonaqueous Li—$O_2$ Electrochemistry on C and Its Kinetic Overpotentials: Some Implications for Li-Air Batteries", J. Phys. Chemistry C, 2012, vol. 116, pp. 23897-23905.

Minami et al., "Crystallization Process for Superionic Li7P3S11 Glass-Ceramic Electrolytes", Journal of the American Ceramic Society, 94, 2011, pp. 1779-1783.

Narayanan et al., "Dopant Concentration-Porosity-Li-Ion Conductivity Relationship in Garnet-Type $Li_{5+2x}La_3Ta_{2-x}Y_xO_{12}$ ($0.05 \le x \le 0.75$) and Their Stability in Water and 1 M LiCl," Inorganic Chemistry, 2015, vol. 54, pp. 6968-6977.

Ni et al., "Room temperature elastic moduli and Vickers hardness of hot-pressed LLZO cubic garnet," J. Mater. Sci., 2012, vol. 47, pp. 7978-7985.

Peng et al., "A Reversible and Higher-Rate Li—$O_2$ Battery", Science, Aug. 3, 2012, vol. 337, pp. 563-567.

Quartarone et al., "Electrolytes for solid-state lithium rechargeable batteries: recent advances and perspectives", Chemical Society Reviews, vol. 40, 2011, pp. 2525-2540.

Rao et al.,"In Situ Neutron Diffraction Monitoring of $Li_7La_3Zr_2O_{12}$ Formation: Toward a Rational Synthesis of Garnet Solid Electrolytes," Chemistry of Materials, 2015, vol. 27, pp. 2903-2910.

Rosero-Navarro et al., "Preparation of $Li_7La_3(Zr_2-x,Nbx)O_{12}$ (x=0–1.5) and $Li_3BO_3/LiBO_2$ composites at low temperatures using a sol-gel process," Solid State Ionics, 2016, vol. 285, pp. 6-12.

Sakamoto et al., "Synthesis of nano-scale fast ion conducting cubic $Li_7La_3Zr_2O_{12}$", Nanotechnology, 2013, vol. 24, 424005, 8 pages.

Sakuda et al., "Evaluation of elastic modulus of $Li_2S$—$P_2S_5$ glassy solid electrolyte by ultrasonic sound velocity measurement and compression test", Journal of the Ceramic Society of Japan 121, 2013, pp. 946-949.

Schafbauer et al., "Tape Casting as a Multi Purpose Shaping Technology for Different Applications in Energy Issues", Materials Science Forum vols. 706-709, 2012, pp. 1035-1040.

Suárez et al., "Sintering to Transparency of Polycrystalline Ceramic Materials," 2012, ISBN: 978-953-51-0017-1, 28 pages; InTech, Available from: http://www.intechopen.com/books/sintering-of-ceramics-new-emerging-techniques/sintering-to-transparencyof-polycrystalline-ceramic-materials.

Takada, "Progress and prospective of solid-state lithium batteries", Acta Materialia 61, 2013, pp. 759-770.

Thangadurai et al., "Garnet-type solid-state fast Li ion conductors for Li batteries: critical review", Chemical Society Reviews, 2014, vol. 43, pp. 4714-4727.

Tong et al., "Highly Conductive Li Garnets by a Multielement Doping Strategy", Inorganic Chemistry, 2015, vol. 54, pp. 3600-3607.

Wang et al., "The synergistic effects of al and Te on the structure and Li+-mobility of garnet-type solid electrolytes", J. Mater. Chem. A. 2014, vol. 2, pp. 20271-20279.

Yang et al., "Nanostructured Garnet-Type Solid Electrolytes for Lithium Batteries: Electrospinning Synthesis of $Li_7La_3Zr_2O_{12}$ Nanowires and Particle Size-Dependent Phase Transformation", J.Physical Chemistry C, 2015, vol. 119, pp. 14947-14953.

Schmidt et al., "In-situ, non-destructive acoustic characterization of solid state electrolyte cells", Journal of Power Sources, 2016, vol. 324, pp. 126-133.

(56) References Cited

OTHER PUBLICATIONS

Fu et al., "Stabilizing the Garnet Solid-Electrolyte/Polysulfide Interface in Li-S Batteries", Chemistry of Materials, vol. 29, No. 19, Sep. 26, 2017, pp. 8037-8041.

Fu et al., "Toward Garnet Electrolyte-based Li Metal Batteries: An ultrathin, highly effective, artificial solid-state electrolyte/metallic Li interface", Science Advances, vol. 3, No. 4, Apr. 7, 2017, pp. 1-11.

\* cited by examiner

▨ = sintering plates, porous sintering plates, garnet-based sintering plates, porous garnet-based sintering plates, metallic sintering plates, or sintering plates having a metal between the sintering plate and the film to be sintered Representative rectangular-like form factors (e.g., thin films) for sintering according to the methods set forth in the instant patent application

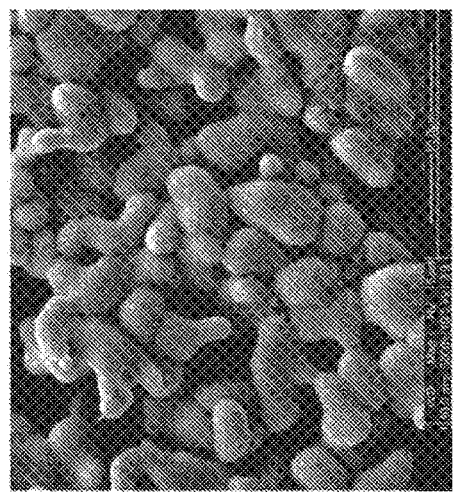
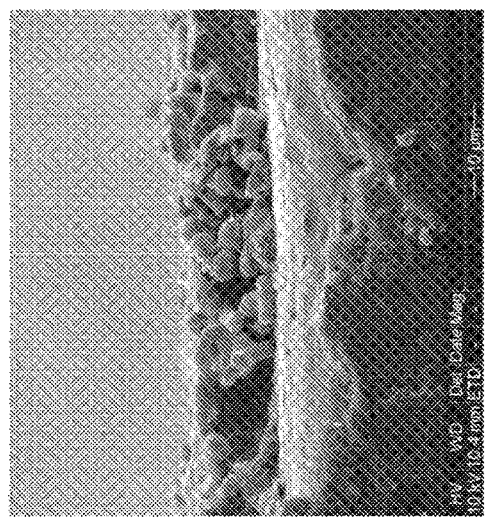
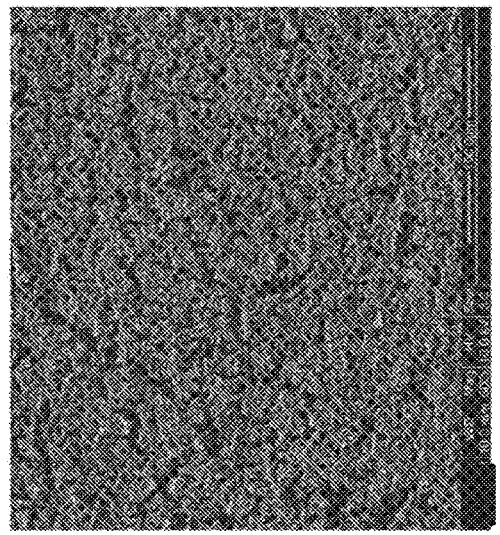
Figure 37

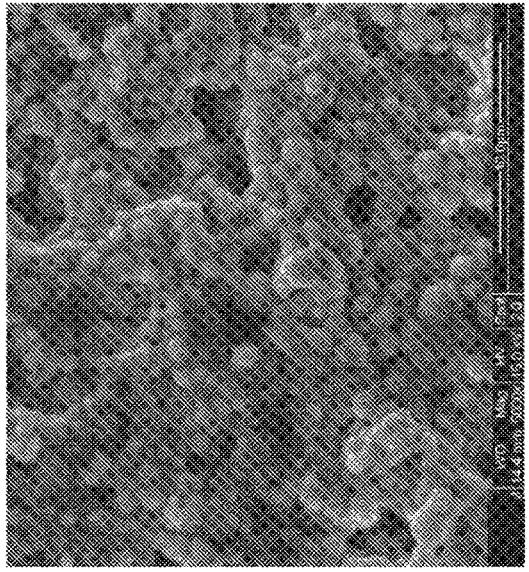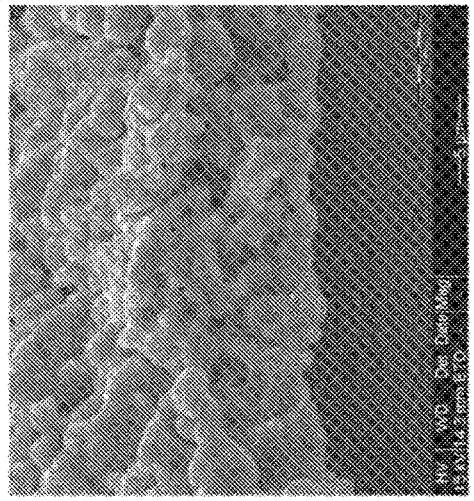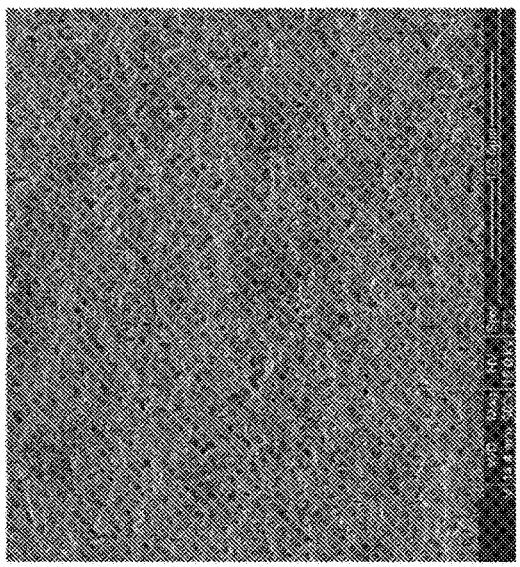
Figure 38

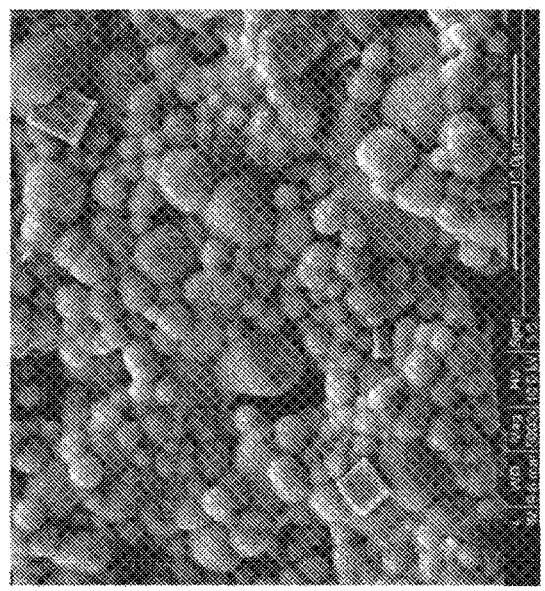
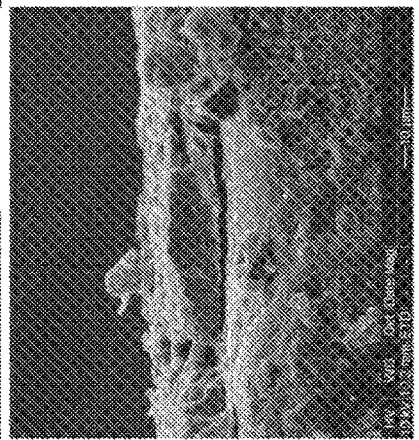
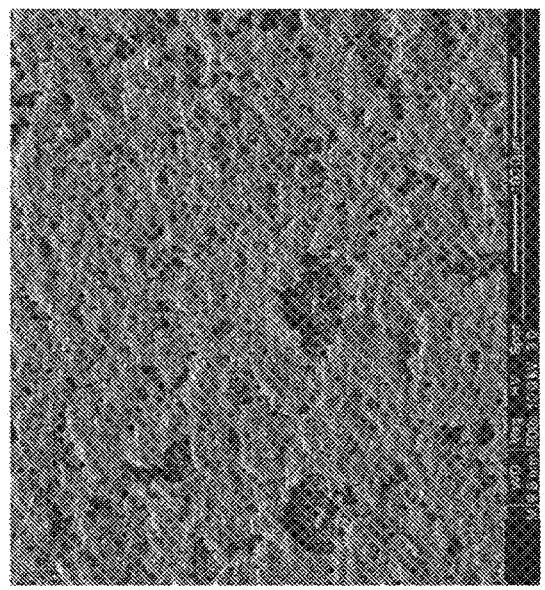
Figure 39

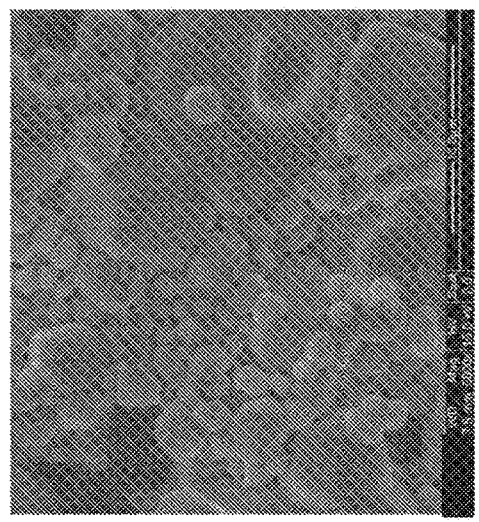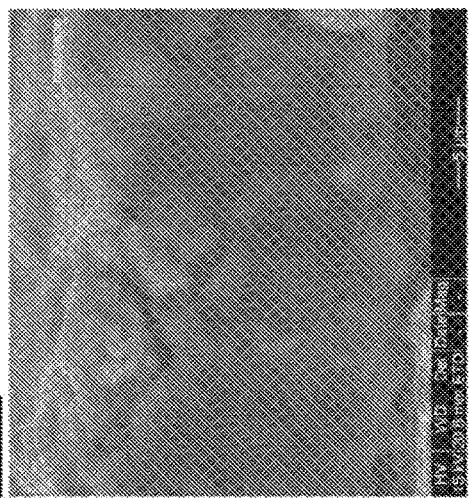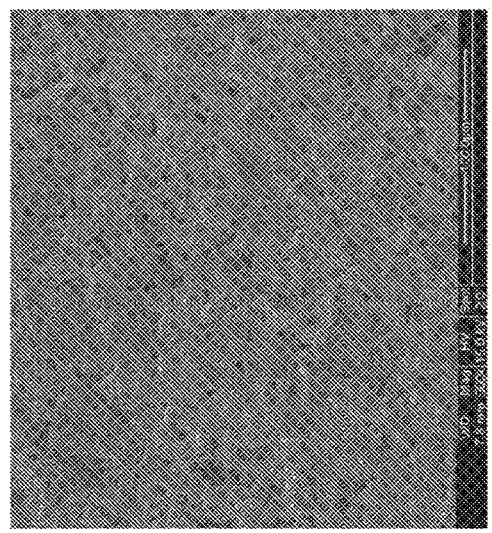
Figure 41

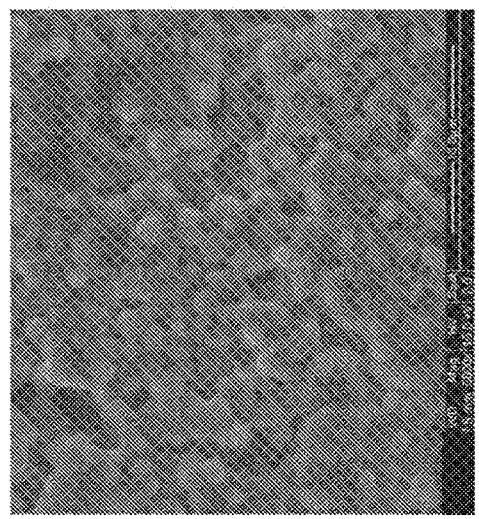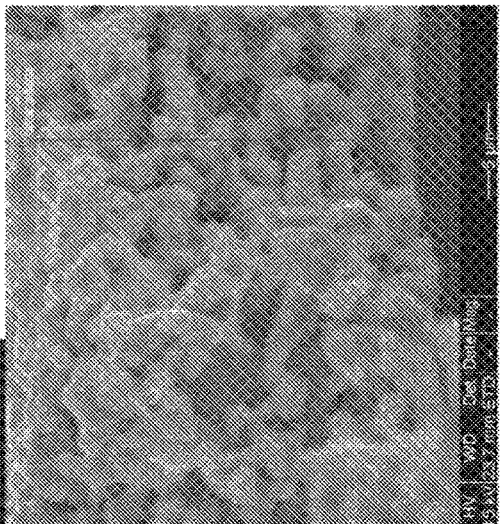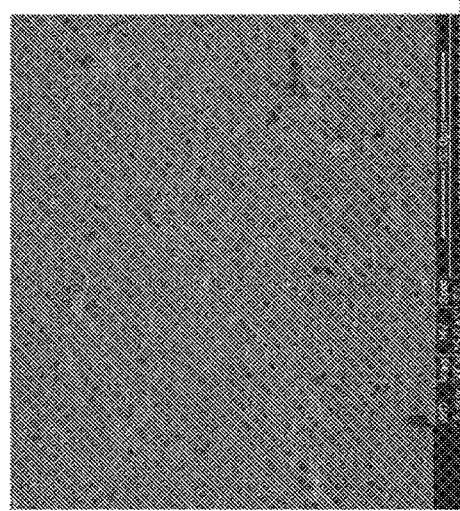
Figure 42

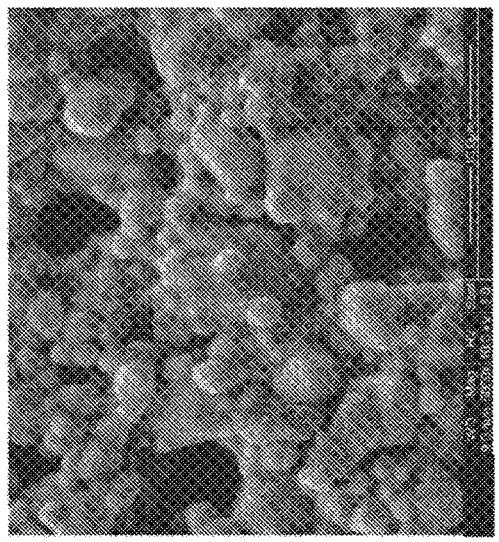
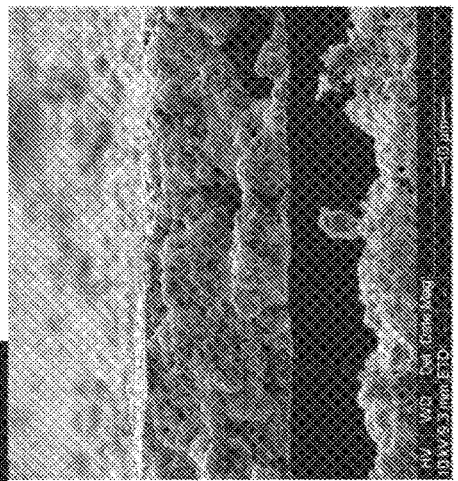
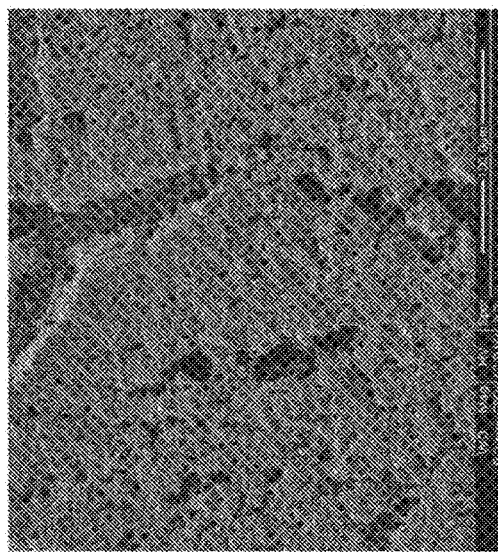
Figure 43

A | Li-stuffed Garnet

B | Li-stuffed Garnet comprising at least one member selected from the group consisting of positive electrode active material, binder, solvent, and, or, carbon.

C | Li-stuffed Garnet
  | Metal (e.g., Ni, Cu, Al, Fe, alloys, combinations thereof) powder, foil or sheet D | Li-stuffed Garnet comprising at least one member selected from the group consisting of positive electrode active material, binder, solvent, and, or, carbon.
  | Metal (e.g., Ni, Cu, Al, Fe, alloys, combinations thereof) powder, foil or sheet E | Li-stuffed Garnet
  | Metal (e.g., Ni, Cu, Al, Fe, alloys, combinations thereof) powder, foil or sheet
  | Li-stuffed Garnet F | Li-stuffed Garnet comprising at least one member selected from the group consisting of positive electrode active material, binder, solvent, and, or, carbon.
  | Metal (e.g., Ni, Cu, Al, Fe, alloys, combinations thereof) powder, foil or sheet
  | Li-stuffed Garnet comprising at least one member selected from the group consisting of positive electrode active material, binder, solvent, and, or, carbon.

Figure 44

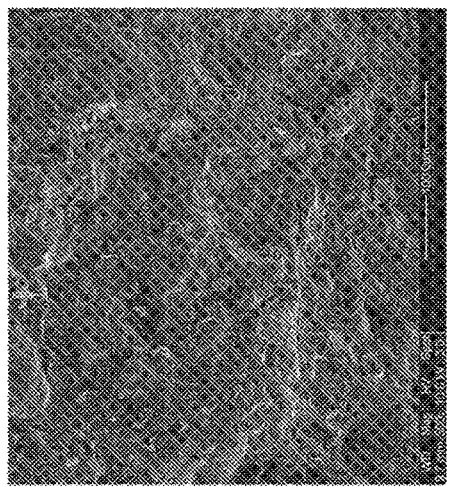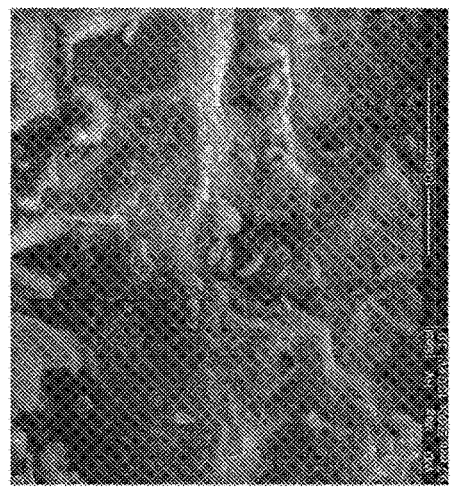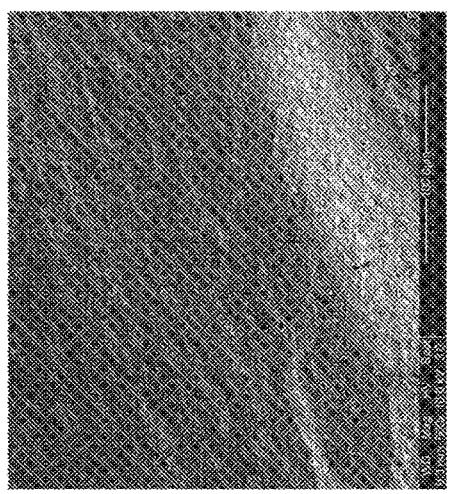
Figure 57

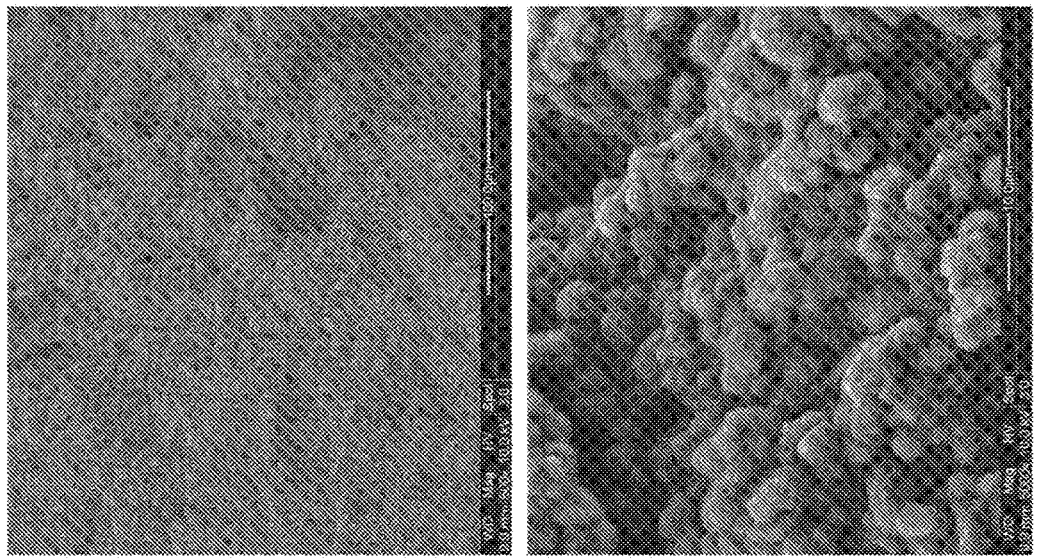
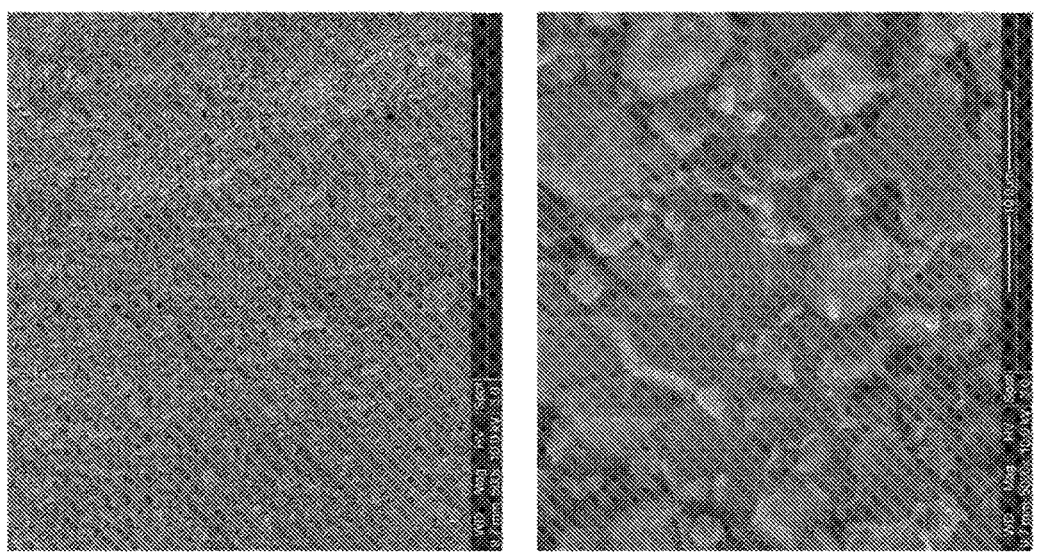
Figure 58

GARNET MATERIALS FOR LI SECONDARY BATTERIES AND METHODS OF MAKING AND USING GARNET MATERIALS

CROSS-REFERENCES TO RELATED APPLICATIONS

This application is a divisional of U.S. Patent Application No. 15/430,375, entitled GARNET MATERIALS FOR LI SECONDARY BATTERIES AND METHODS OF MAKING AND USING GARNET MATERIALS, filed Feb. 10, 2017, which is a continuation of U.S. Patent Application No. 14/509,029, entitled GARNET MATERIALS FOR LI SECONDARY BATTERIES AND METHODS OF MAKING AND USING GARNET MATERIALS, filed Oct. 7, 2014, which claims priority to U.S. Provisional Patent Application No. 61/887,451, filed Oct. 7, 2013, entitled METHOD AND SYSTEM FOR FORMING GARNET MATERIALS WITH SINTERING PROCESS, and U.S. Provisional Patent Application No. 61/926,910, filed Jan. 13, 2014, entitled GARNET THIN FILM ELECTROLYTE, and U.S. Provisional Patent Application No. 62/007,417, filed Jun. 4, 2014, entitled METHODS AND SYSTEMS FOR FORMING GARNET MATERIAL WITH REACTIVE SINTERING, and U.S. Provisional Patent Application No. 62/026,271, filed Jul. 18, 2014, entitled FINE GRAINED LITHIUM-ION CONDUCTING THIN FILM GARNET CERAMICS, and U.S. Provisional Patent Application No. 62/026,440, filed Jul. 18, 2014, entitled GARNET CATHOLYTE AND SINTERING OF SOLID STATE ELECTROCHEMICAL DEVICES AND COMPONENTS, the disclosures of which are incorporated herein by reference in their entirety.

BACKGROUND OF THE INVENTION

Cleaner forms of storing energy are in great demand. Examples of clean energy storage include rechargeable lithium (Li) ion batteries (i.e., Li-secondary batteries), in which $Li^+$ ions moves from the negative electrode to the positive electrode during discharge. In numerous applications (e.g., portable electronics and transportation), it is advantageous to use a solid state Li ion battery which consists of all solid state materials as opposed to one that includes liquid components, (e.g., flammable liquid electrolytes), due to safety as well as energy density considerations. Solid state Li ion batteries which incorporate a Li-metal negative electrode advantageously also have significantly lower electrode volumes and correspondingly increased energy densities.

Critically important components of a solid state battery include the electrolyte, which electrically isolates the positive and negative electrodes, and, often, also a catholyte, which is intimately mixed with a positive electrode active material to improve the ionic conductivity therein. A third important component, in some Li ion batteries, is an anolyte which is laminated to, or in contact with, an anode material (i.e., negative electrode material; e.g., Li-metal). Currently available electrolyte, catholyte, and anolyte materials, however, are not stable within solid state battery operating voltage ranges or when in contact with certain cathode or anode active materials (e.g., metal fluorides).

Garnet (e.g., Li-stuffed garnet) is a class of oxides that has the potential to be suitable for use as a catholyte, electrolyte, and, or, anolyte in an all solid state battery. However, garnet materials have yet to be prepared with the proper morphology (e.g., thin film or nanostructured powder) or with sufficient conductivity and, or, particle connectivity to function sufficiently well. Certain garnet materials and processing techniques are known (e.g., U.S. Pat. Nos. 8,658,317, 8,092,941, and 7,901,658; U.S. Patent Application Publication Nos. 2013/0085055, 2011/0281175, 2014/0093785, and 2014/0170504; also Bonderer, et al. "Free-Standing Ultra-thin Ceramic Foils," Journal of the American Ceramic Society, 2010, 93(11):3624-3631; and Murugan, et al., *Angew Chem. Int. Ed.* 2007, 46, 7778-7781) but these materials and techniques suffer from a variety of deficiencies such as, but not limited to, insufficient conductivity or processing conditions which are incompatible with certain solid state battery components.

Accordingly, there is a need for improved methods of making and processing garnet materials, particularly with regard to the integration of garnet films and powders with cathode active material in all solid state batteries. The following disclosure provides, in part, many solutions to these as well as to other problems in the relevant field to which the instant disclosure relates.

BRIEF SUMMARY OF THE INVENTION

Disclosed herein are novel and inventive methods of making and using thin film and powder morphologies of lithium-stuffed garnets as catholytes, electrolytes, and anolytes, for solid state lithium-secondary batteries. Also disclosed herein are novel garnet catholytes, electrolytes, and anolytes as well as novel electrochemical devices which incorporate these materials. In contrast to known garnets, the methods and materials set forth herein are uniquely designed for electrochemical devices (e.g., solid state batteries) and have morphologies, conductivities, densities, porosities, and surface properties (e.g., roughness, flatness, lack of surface cracks and defects), and chemical, temperature and voltage stabilities suitable for use in lithium batteries.

BRIEF DESCRIPTION OF THE DRAWINGS

FIG. 30 shows a scanning electron microscopy (SEM) image of a free standing film prepared according to a method described herein. Scale bar is 100 μm. Arrows point to end edge boundaries. Film is imaged edge-on.

FIG. 31 (right side) also shows a magnified portion of the image on the left side.

FIG. 37 show reaction sintered $Li_7La_3Zr_2O_{12}$ using 100% lithium stuffed garnet precursors. Scale bar for top left image is 100 μm; Scale bar for top right image is 10 μm; Scale bar for bottom image is 10 μm. Film prepared by doctor-blading with 5 mil slot gap.

FIG. 38 shows reaction sintered $Li_7La_3Zr_2O_{12}$ using 75% w/w lithium stuffed garnet precursors and 25% w/w lithium stuffed garnet powder. Scale bar for top left image is 100 μm; Scale bar for top right image is 10 μm; Scale bar for bottom image is 5 μm. Film prepared by doctor-blading with 5 mil slot gap.

FIG. 39 shows reaction sintered $Li_7La_3Zr_2O_{12}$ using 50% w/w lithium stuffed garnet precursors and 50% w/w lithium stuffed garnet powder. Scale bar for top left image is 100 μm; Scale bar for top right image is 10 μm; Scale bar for bottom image is 10 μm. Film prepared by doctor-blading with 5 mil slot gap.

FIG. 41 shows reaction sintered $Li_7La_3Zr_2O_{12}$ using 75% w/w lithium stuffed garnet precursors and 25% w/w lithium stuffed garnet powder. Scale bar for top left image is 100 μm; Scale bar for top right image is 10 μm; Scale bar for bottom image is 5 μm. Film prepared by doctor-blading with 10 mil slot gap.

FIG. 42 shows reaction 10 mil sintered $Li_7La_3Zr_2O_{12}$ using 50% w/w lithium stuffed garnet precursors and 50% w/w lithium stuffed garnet powder. Scale bar for top left image is 100 μm; Scale bar for top right image is 10 μm; Scale bar for bottom image is 5 μm. Film prepared by doctor-blading with 10 mil slot gap.

FIG. 43 shows reaction sintered $Li_7La_3Zr_2O_{12}$ using 25% w/w lithium stuffed garnet precursors and 75% w/w lithium stuffed garnet powder. Scale bar for top left image is 100 μm; Scale bar for top right image is 10 μm; Scale bar for bottom image is 10 μm. Film prepared by doctor-blading with 10 mil slot gap.

FIG. 44 diagrams various layer architectures that can be sintered according to the sintering methods set forth herein: A) free-standing lithium stuffed garnet material; B) free-standing lithium stuffed garnet material which optionally includes an active material, a binder, a solvent, and, or, carbon; C) a bilayer having one layer of a lithium stuffed garnet and one layer of a metal powder, foil or sheet; D) a bilayer having one layer of a lithium stuffed garnet material which optionally includes an active material, a binder, a solvent, and, or, carbon and one layer of a metal powder, foil, or sheet; E) a trilayer having two layers of a lithium stuffed garnet and one layer of a metal powder, foil or sheet, between and in contact with the garnet layers; and F) a trilayer having two layers of a lithium stuffed garnet material wherein each garnet layer optionally includes an active material, a binder, a solvent, and, or, carbon and one layer of a metal powder, foil, or sheet, between and in contact with the garnet layers.

FIG. 57 shows SEM images of FAST sintered lithium stuffed garnet powder. (Left Top and Bottom—800° C.; 3 Amps preparation) (Right Top and Bottom—800° C.; 2 Amps preparation) (100 μm scale bars in Top left and Top Right) (10 μm scale bars in Bottom left and right)

FIG. 58 shows a SEM images of FAST sintered lithium stuffed garnet powder. (Left Top and Bottom—800° C.; 2 Amps preparation) (Right Top and Bottom—900° C.; 2 Amps preparation) (100 μm scale bars in Top left and Top Right) (10 μm scale bars in Bottom left and right)

DETAILED DESCRIPTION OF THE INVENTION

Figure 1:
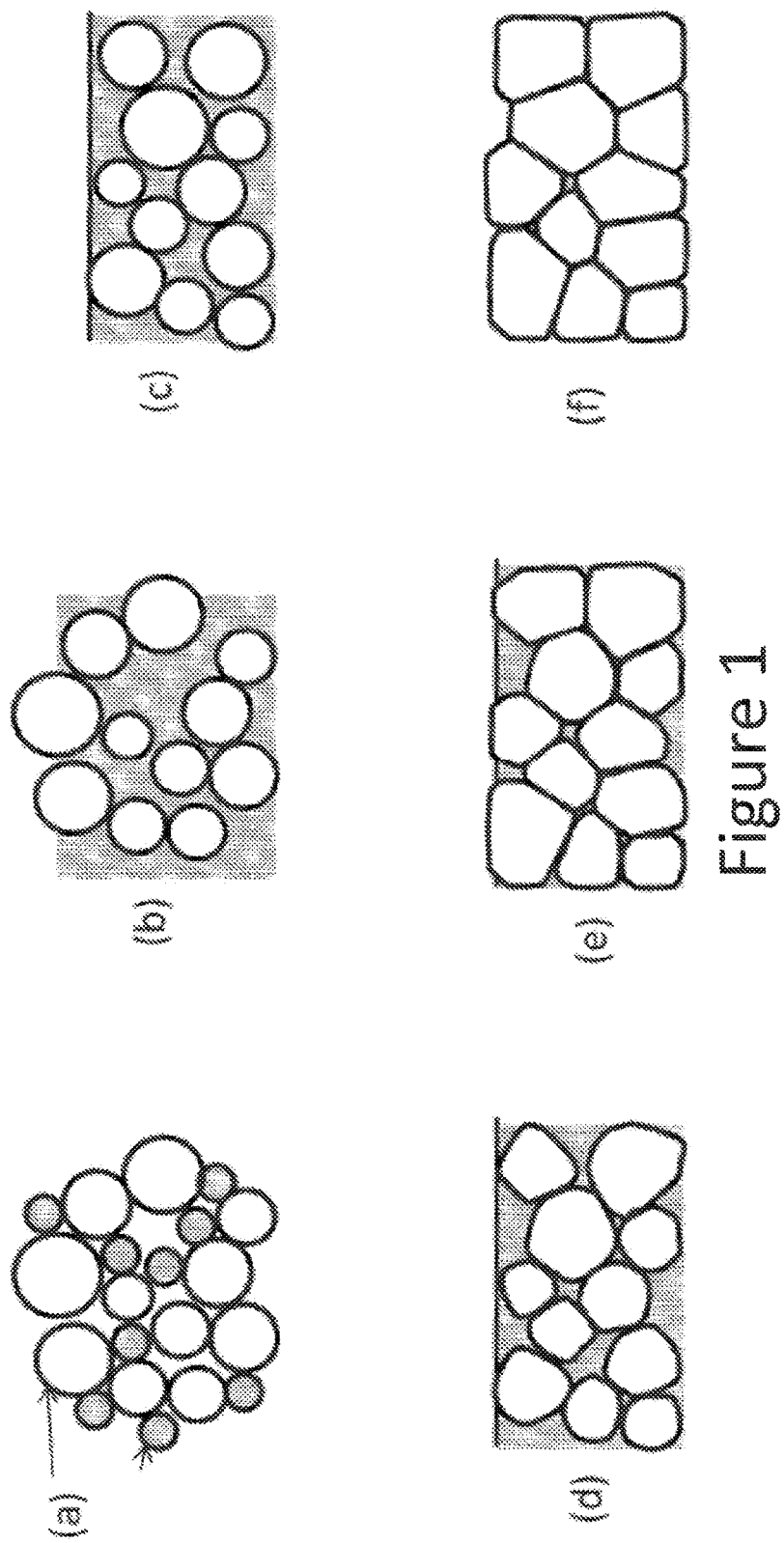
FIG. 1 shows an illustration of liquid phase sintering according to the flux sintering methods set forth herein.
Figure 2:
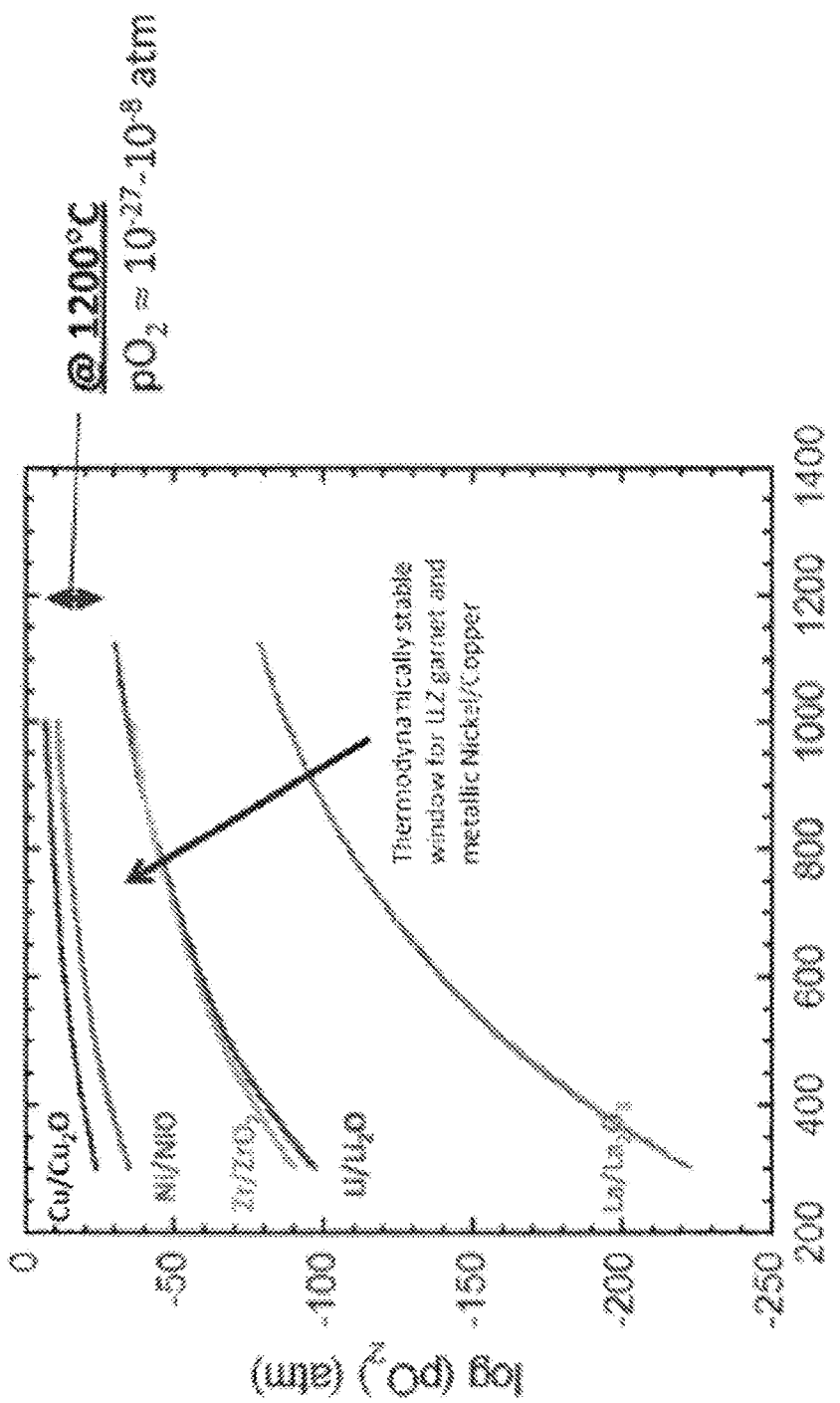
FIG. 2 shows a plot of partial oxygen pressure as a function of calcination temperature for preparing certain calcined oxides.

The following description is presented to enable one of ordinary skill in the art to make and use the inventions set forth herein and to incorporate these inventions in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. Unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Definitions

As used herein, the term "NASICON," unless otherwise specified refers to sodium (Na) super ionic conductors which are often characterized by the chemical formula $Na_{1+x}Zr_2Si_xP_{3-x}O_{12}$, $0<x<3$, optionally wherein Na, Zr and/or Si are replaced by isovalent elements.

As used herein, the term "LISICON," unless otherwise specified refers to lithium (Li) super ionic conductors which are often characterized by the chemical formula $Li_{2+2x}Zn_{1-x}GeO_4$.

As used herein, the phrase "positive electrode" refers to the electrode in a secondary battery towards which positive ions, e.g., $Li^+$, flow or move during discharge of the battery. As used herein, the phrase "negative electrode" refers to the electrode in a secondary battery from where positive ions, e.g., $Li^+$, flow or move during discharge of the battery. In a battery comprised of a Li-metal electrode and a conversion chemistry electrode (i.e., active material; e.g., $NiF_x$), the electrode having the conversion chemistry materials is referred to as the positive electrode. In some common usages, cathode is used in place of positive electrode, and anode is used in place of negative electrode. When a Li-secondary battery is charged, Li ions move from the positive electrode (e.g., $NiF_x$) towards the negative electrode (Li-metal). When a Li-secondary battery is discharged, Li ions move towards the positive electrode (e.g., $NiF_x$; i.e., cathode) and from the negative electrode (e.g., Li-metal; i.e., anode).

As used herein, the phrase "current collector" refers to a component or layer in a secondary battery through which electrons conduct, to or from an electrode in order to complete an external circuit, and which are in direct contact with the electrode to or from which the electrons conduct. In some examples, the current collector is a metal (e.g., Al, Cu, or Ni, steel, alloys thereof, or combinations thereof) layer which is laminated to a positive or negative electrode. During charging and discharging, electrons move in the opposite direction to the flow of Li ions and pass through the current collector when entering or exiting an electrode.

As used herein, the phrase "at least one member selected from the group," includes a single member from the group, more than one member from the group, or a combination of members from the group. At least one member selected from the group consisting of A, B, and C includes, for example, A, only, B, only, or C, only, as well as A and B as well as A and C as well as B and C as well as A, B, and C or any other all combinations of A, B, and C.

As used herein, the phrase "slot casting," refers to a deposition process whereby a substrate is coated, or deposited, with a solution, liquid, slurry, or the like by flowing the solution, liquid, slurry, or the like, through a slot or mold of fixed dimensions that is placed adjacent to, in contact with, or onto the substrate onto which the deposition or coating occurs. In some examples, slot casting includes a slot opening of about 1 to 100 μm.

As used herein, the phrase "dip casting" or "dip coating" refers to a deposition process whereby substrate is coated, or deposited, with a solution, liquid, slurry, or the like, by moving the substrate into and out of the solution, liquid, slurry, or the like, often in a vertical fashion.

As used herein, the term "laminating" refers to the process of sequentially depositing a layer of one precursor specie, e.g., a lithium precursor specie, onto a deposition substrate and then subsequently depositing an additional layer onto an already deposited layer using a second precursor specie, e.g., a transition metal precursor specie. This laminating process can be repeated to build up several layers of deposited vapor phases. As used herein, the term "laminating" also refers to the process whereby a layer comprising an electrode, e.g., positive electrode or cathode active material comprising layer, is contacted to a layer comprising another material, e.g., garnet electrolyte. The laminating process may include a reaction or use of a binder which adheres of physically maintains the contact between the layers which are laminated.

As used herein, the phrase "solid state catholyte," or the term "catholyte" refers to an ion conductor that is intimately mixed with, or surrounded by, a cathode (i.e., positive electrode) active material (e.g., a metal fluoride optionally including lithium).

As used herein, the term "electrolyte," refers to an ionically conductive and electrically insulating material. Electrolytes are useful for electrically insulating the positive and negative electrodes of a secondary battery while allowing for the conduction of ions, e.g., $Li^+$, through the electrolyte.

As used herein, the term "anolyte," refers to an ionically conductive material that is mixed with, or layered upon, or laminated to, an anode material or anode current collector.

As used herein, the phrase "green film" refers to an unsintered film including at least one member selected from garnet materials, precursors to garnet materials, binder, solvent, carbon, dispersant, or combinations thereof.

As used herein, the phrase "evaporating the cathode current collector," refers to a process of providing or delivering a metal, such as, but not limited to, copper, nickel, aluminum, or an combination thereof, in vapor or atomized form such that the metal contacts and forms an adhering layer to the cathode, catholyte, or combinations thereof or to the anode, anolyte, or combinations thereof. This process results in the formation of a metal layer on a cathode or anode such that the metal layer and the cathode or anode are in electrical communication.

As used herein the term "making," refers to the process or method of forming or causing to form the object that is made. For example, making an energy storage electrode includes the process, process steps, or method of causing the electrode of an energy storage device to be formed. The end result of the steps constituting the making of the energy storage electrode is the production of a material that is functional as an electrode.

As used herein the phrase "energy storage electrode," refers to, for example, an electrode that is suitable for use in an energy storage device, e.g., a lithium rechargeable battery or Li-secondary battery. As used herein, such an electrode is capable of conducting electrons and Li ions as necessary for the charging and discharging of a rechargeable battery.

As used herein, the phrase "providing" refers to the provision of, generation or, presentation of, or delivery of that which is provided.

As used herein the phrase "providing an unsintered thin film," refers to the provision of, generation or, presentation of, or delivery of an unsintered thin film. For example, providing an unsintered thin film refers to the process of making an unsintered thin film available, or delivering an unsintered thin film, such that the unsintered thin film can be used as set forth in a method described herein.

As used herein the phrase "unsintered thin film," refers to a thin film, including the components and materials described herein, but which is not sintered by a sintering method set forth herein. Thin refers, for example, to a film that has an average thickness dimensions of about 10 nm to about 100 µm. In some examples, thin refers to a film that is less than about 1 µm, 10 µm or 50 µm in thickness.

As used herein, the phrase "lithium stuffed garnet" refers to oxides that are characterized by a crystal structure related to a garnet crystal structure. Lithium-stuffed garnets include compounds having the formula $Li_A La_B M'_C M''_D Zr_E O_F$, $Li_A La_B M'_C M''_D Ta_E O_F$, or $Li_A La_B M'_C M''_D Nb_E O_F$, wherein $4<A<8.5$, $1.5<B<4$, $0\leq C\leq 2$, $0\leq D\leq 2$; $0\leq E<2$, $10<F<13$, and M' and M" are each, independently in each instance selected from Al, Mo, W, Nb, Sb, Ca, Ba, Sr, Ce, Hf, Rb, or Ta, or $Li_a La_b Zr_c Al_d Me''_e O_f$, wherein $5<a<7.7$; $2<b<4$; $0<c\leq 2.5$; $0\leq d<2$; $0\leq e<2$, $10<f<13$ and Me" is a metal selected from Nb, Ta, V, W, Mo, or Sb and as described herein. Garnets, as used herein, also include those garnets described above that are doped with $Al_2O_3$. Garnets, as used herein, also include those garnets described above that are doped so that $Al^{3+}$ substitutes for $Li^+$. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (t1+t2+t3=subscript 2) so that the La:(Zr/Nb/Ta) ratio is 3:2. Also, garnet used herein includes, but is not limited to, $Li_xLa_3Zr_2O_{12}+yAl_2O_3$, wherein x ranges from 5.5 to 9; and y ranges from 0 to 1. In some examples x is 7 and y is 1.0. In some examples x is 7 and y is 0.35. In some examples x is 7 and y is 0.7. In some examples x is 7 and y is 0.4. Also, garnets as used herein include, but are not limited to, $Li_xLa_3Zr_2O_{12}+yAl_2O_3$.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein, the phrase "garnet precursor chemicals" or "chemical precursor to a Garnet-type electrolyte" refers to chemicals which react to form a lithium stuffed garnet material described herein. These chemical precursors include, but are not limited to lithium hydroxide (e.g., LiOH), lithium oxide (e.g., $Li_2O$), lithium carbonate (e.g., $LiCO_3$), zirconium oxide (e.g., $ZrO_2$), lanthanum oxide (e.g., $La_2O_3$), aluminum oxide (e.g., $Al_2O_3$), aluminum (e.g., Al), aluminum nitrate (e.g., $AlNO_3$), aluminum nitrate nonahydrate, niobium oxide (e.g., $Nb_2O_5$), tantalum oxide (e.g., $Ta_2O_5$).

As used herein the phrase "garnet-type electrolyte," refers to an electrolyte that includes a garnet or lithium stuffed garnet material described herein as the ionic conductor.

As used herein, the phrase "doped with alumina" means that $Al_2O_3$ is used to replace certain components of another material, e.g., a garnet. A lithium stuffed garnet that is doped with $Al_2O_3$ refers to garnet wherein aluminum (Al) substitutes for an element in the lithium stuffed garnet chemical formula, which may be, for example, Li or Zr.

As used herein, the phrase "aluminum reaction vessel" refers to a container or receptacle into which precursor chemicals are placed in order to conduct a chemical reaction to produce a product, e.g., a lithium stuffed garnet material.

As used herein, the phrase "high conductivity," refers to a conductivity, such as ionic conductivity, that is greater than $10^{-5}$ S/cm at room temperature. In some examples, high conductivity includes a conductivity greater than $10^{-5}$ S/cm at room temperature.

As used herein, the phrase "Zr is partially replaced by a higher valence species" refers to the substitution of $Zr^{4+}$ with a species that has, for example, a $5^+$ or $6^+$ charge. For example, if some $Nb^{5+}$ can reside in a lattice position in a garnet crystal structure where a Zr atom resides and in doing so substitute for $Zr^{4+}$, then Zr is partially replaced by Nb. This is also referred to as niobium doping.

As used herein, the phrase "subscripts and molar coefficients in the empirical formulas are based on the quantities of raw materials initially batched to make the described examples" means the subscripts, (e.g., 7, 3, 2, 12 in $Li_7La_3Zr_2O_{12}$ and the coefficient 0.35 in $0.35Al_2O_3$) refer to the respective elemental ratios in the chemical precursors (e.g., LiOH, $La_2O_3$, $ZrO_2$, $Al_2O_3$) used to prepare a given material, (e.g., $Li_7La_3Zr_2O_{12}\cdot 0.35Al_2O_3$).

As used herein, the phrase "electrochemical device" refers to an energy storage device, such as, but not limited to a Li-secondary battery that operates or produces electricity or an electrical current by an electrochemical reaction, e.g., a conversion chemistry reaction such as $3Li+FeF_3 \leftrightarrow 3LiF+Fe$.

As used herein, the phrase "film thickness" refers to the distance, or median measured distance, between the top and bottom faces of a film. As used herein, the top and bottom faces refer to the sides of the film having the largest surface area.

As used herein, the term "grains" refers to domains of material within the bulk of a material that have a physical boundary which distinguishes the grain from the rest of the material. For example, in some materials both crystalline and amorphous components of a material, often having the same chemical composition, are distinguished from each other by the boundary between the crystalline component and the amorphous component. The approximate diameter of the boundaries of a crystalline component, or of an amorphous component, is referred herein as the grain size.

As used herein, the phrase "$d_{50}$ diameter" refers to the median size, in a distribution of sizes, measured by microscopy techniques or other particle size analysis techniques, such as, but not limited to, scanning electron microscopy or dynamic light scattering. $D_{50}$ includes the characteristic dimension at which 50% of the particles are smaller than the recited size.

As used herein the phrase "active electrode material," or "active material," refers to a material that is suitable for use as a Li rechargeable battery and which undergoes a chemical reaction during the charging and discharging cycles. For examples, and "active cathode material," includes a metal fluoride that converts to a metal and lithium fluoride during the discharge cycle of a Li rechargeable battery.

As used herein the phrase "active anode material" refers to an anode material that is suitable for use in a Li rechargeable battery that includes an active cathode material as defined above. In some examples, the active material is Lithium metal. In some of the methods set forth herein, the sintering temperatures are high enough to melt the Lithium metal used as the active anode material.

As used herein the phrase "conductive additive," refers to a material that is mixed with the cathode active material in order to improve the conductivity of the cathode. Examples includes, but are not limited to, carbon and the various forms of carbon, e.g., ketjen black, VGCF, acetylene black, graphite, graphene, nanotubes, nanofibers, the like, and combinations thereof.

As used herein the term "solvent," refers to a liquid that is suitable for dissolving or solvating a component or material described herein. For example, a solvent includes a liquid, e.g., toluene, which is suitable for dissolving a component, e.g., the binder, used in the garnet sintering process.

As used herein the phrase "removing a solvent," refers to the process whereby a solvent is extracted or separated from the components or materials set forth herein. Removing a solvent includes, but is not limited to, evaporating a solvent. Removing a solvent includes, but is not limited to, using a vacuum or a reduced pressure to drive off a solvent from a mixture, e.g., an unsintered thin film. In some examples, a thin film that includes a binder and a solvent is heated or also optionally placed in a vacuum or reduced atmosphere environment in order to evaporate the solvent to leave the binder, which was solvated, in the thin film after the solvent is removed.

As used herein the phrase "sintering the film," refers to a process whereby a thin film, as described herein, is densified (made denser, or made with a reduced porosity) through the use of heat sintering or field assisted sintering. Sintering includes the process of forming a solid mass of material by heat and/or pressure without melting it to the point of complete liquification.

As used herein the term "FAST," refers to the acronym for field assisted sintering. In some examples, FAST also refers to Flash Sintering.

As used herein the phrase "applying a D.C. or A.C. electric field," refers to a process where a power source is electrically connected to a material such that the electric field in the material is altered or effected by the power source and a current passes through the material and originates from the power source as either a direct current (D.C.) or an alternating current (A.C.).

As used herein the term "binder," refers to a material that assists in the adhesion of another material. For example, as used herein, polyvinyl butyral is a binder because it is useful for adhering garnet materials. Other binders include polycarbonates. Other binders may include polymethylmethacrylates. These examples of binders are not limiting as to the entire scope of binders contemplated here but merely serve as examples.

As used herein the phrase "casting a film," refers to the process of delivering or transferring a liquid or a slurry into a mold, or onto a substrate, such that the liquid or the slurry forms, or is formed into, a film. Casting may be done via doctor blade, meyer rod, comma coater, gravure coater, microgravure, reverse comma coater, slot dye, slip and/or tape casting, and other methods known to those skilled in the art.

As used herein the phrase "applying a pressure," refers to a process whereby an external device, e.g., a calender, induces a pressure in another material.

As used herein the term "about," refers to a qualification of a number associated with the word about. About includes, in some examples, a range ±5-10% around the number qualified by the word about. For example, evaporating a solvent at about 80° C. includes evaporating a solvent at 79° C., 80° C., or 81° C.

As used herein the phrase "about 1 to about 600 minutes," refers to the range 0.1 to 1.1 to 540-660 minutes and the minute values therebetween. As used herein the phrase "about 10 µm to about 100 µm" refers to the range 9 µm-11 µm to 90 µm-110 µm and the integer values therebetween.

As used herein the phrase "about 500° C. to about 900° C.," refers to the range 450° C.-550° C. to 810° C.-990° C. and the integer temperature values therebetween.

As used herein the phrase "burning the binder or calcining the unsintered film," refers to the process whereby a film that includes a binder is heated, optionally in an environment that includes an oxidizing specie, e.g., $O_2$, in order to burn the binder or induce a chemical reaction that drives off, or removes, the binder, e.g., combustion, or which causes a film having a binder to sinter, to become more dense or less porous.

As used herein the phrase "composite electrode," refers to an electrode that is composed of more than one material. For example, a composite electrode may include, but is not limited to, an active cathode material and a garnet-type electrolyte in intimate mixture or ordered layers or wherein the active material and the electrolyte are interdigitated.

As used herein the phrase "inert setter plates," refer to plates, which are normally flat, and which are unreactive with a material that is sintered. Inert setter plates can be metallic or ceramic, and, optionally, these setter plates can be porous to provide for the diffusion of gases and vapors therethrough when a sintered material is actually sintered.

As used herein the phrase "operating in a constant voltage amplitude mode," refers to an electrochemical process wherein the amplitude of a DC or RMS amplitude of an AC voltage applied to a material is held at a constant value while allowing the current to vary as a function of the resistance, or impedance, of the material.

As used herein the phrase "operating in a constant current amplitude mode," refers to an electrochemical process wherein a constant DC or RMS amplitude of an AC current flows through a material while allowing the applied voltage to vary as a function of the resistance, or impedance, of the material.

As used herein the phrase "free-standing thin film," refers to a film that is not adhered or supported by an underlying substrate. In some examples, free-standing thin film is a film that is self-supporting, which can be mechanically manipulated or moved without need of substrate adhered or fixed thereto.

As used herein the term "porous," refers to a material that includes pores, e.g., nanopores, mesopores, or micropores.

As used herein the term "pyrolysis," refers to a thermochemical decomposition of organic material at elevated temperatures in the absence of oxygen.

As used herein the term "electroplating," refers to a process whereby a material, e.g., metal, is deposited in conjunction with the use of electricity.

As used herein the phrase "average pore diameter dimensions of about 5 nm to about 1 µm" refers to a material that has pores wherein the inner diameter of the pores therein are physically spaced by about 5 nm, for nanopores for example, or about 1 µm, for micropores for example.

As used herein the phrase "polymer is stable at voltages greater than about 3.8V," refers to a polymer that does not undergo a destructive chemical reaction when a voltage of more than 3.8V relative to a Lithium reference electrode is applied thereto. A destructive chemical reaction as used herein refers to a chemical reaction that degrades the functionality of the polymer for which the polymer is used. For example, if a polymer is ionically conductive and useful as a Li-conductor in a Li battery, then a destructive reaction is a reaction that reduces or degrades the ability of the polymer to conduct Li ions by more than 10% as measured in S/cm units of conductivity over the life of the product in useful operating conditions of temperature and cycling.

As used herein the term "infiltrated," refers to the state wherein one material passes into another material, or when one material is caused to join another material. For example, if a porous Garnet is infiltrated with carbon, this refers to the process whereby carbon is caused to pass into and intimately mix with the porous Garnet.

As used herein the phrase "operating in a ramped voltage," refers to an electrical process wherein the applied voltage is gradually or systematically increased or decreased over a period of time.

As used herein the phrase "operating a ramped power," refers to a process wherein the applied power is gradually or systematically increased or decreased over a period of time.

As used herein the phrase "operating in a ramped current," refers to an electrical process wherein the applied current is gradually or systematically increased or decreased over a period of time.

As used herein, the term "nanostructured," or "nanodimensioned" refers to a composite material wherein the constituent components are separated by nanodimensions. For example, a nanodimensioned composite material may include a Li-containing compound, e.g., LiF, and an Fe-containing compound, e.g., Fe, wherein the domains of Fe and the domains of LiF have median physical dimensions of about 1-100 nm, or 2-50 nm, or 1-10 nm, or 2-5 nm, or 5-15 nm, or 5-20 nm, or the like as measured in a TEM micrograph by identification of regions of visual contrast of different nanodomains.

Garnet Materials

Disclosed herein are nanostructured lithium stuffed garnet-based powder. Also disclosed herein are also lithium stuffed garnet thin films that have grains therein less than 10 μm in physical dimensions, e.g., $d_{50}$ grain sizes less than 10 μm. In some examples, these films are less than 50 μm in film thickness. In some of these examples, the films which are less than 50 μm in film thickness are several meters to several kilometers in length. In some examples, the films have a high conductivity, which in some examples is greater than $10^{-4}$ S/cm. In some examples, the films are strong, have good mechanical integrity, and prevent the ingress of lithium dendrites when used as an electrolyte in lithium secondary batteries. Some of these films are intimately mixed with cathode active materials and optionally binders, dispersants, solvents, and other electron and ionic conductors. Also set forth herein, are methods of making these example films.

In other examples, set forth herein are a number of lithium stuffed garnet compositions that are doped with alumina and which possess the unique combination of high ionic conductivity and fine grain size. In some examples, these compositions are prepared under lower temperatures and shorter reaction time conditions than were previously known possible for lithium stuffed garnets. Also, in some examples, novel sintering methods are employed, some of which employ an environment of Argon gas rather than Air to prepare new lithium stuffed garnets. In addition, in some examples, by using finely milled garnet powder, and, or garnet precursors, and, or, metal powders, unique thin film architectures are prepared as set forth below. The disclosure herein sets forth a number of novel lithium-stuffed garnet ceramics having aluminum therein, e.g., as alumina ($Al_2O_3$), which advantageously and surprisingly have high ionic conductivity and small grain size properties.

A. Lithium Stuffed Garnets i. Electrolytes

In certain examples, the methods set forth herein include a Garnet-type electrolyte material selected from $Li_4La_BM'_CM''_DZr_EO_F$, $Li_4La_BM'_CM''_DTa_EO_F$, $Li_4La_BM'_CM''_DNb_EO_F$, wherein $4<A<8.5$, $1.5<B<4$, $0\leq C\leq 2$, $0\leq D\leq 2$; $0\leq E<2$, $10<F<14$, and M' and M" are each, independently in each instance selected from Al, Mo, W, Nb, Sb, Ca, Ba, Sr, Ce, Hf, Rb, or Ta, or $Li_aLa_bZr_cAl_dMe''_eO_f$, wherein $5<a<7.7$; $2<b<4$; $0<c\leq 2.5$; $0\leq d<2$; $0\leq e<2$, $10<f<14$ and Me" is a metal selected from Nb, Ta, V, W, Mo, or Sb.

In certain examples, the methods set forth herein include a Garnet-type electrolyte material selected from $Li_4La_BM'_CM''_DZr_EO_F$, $Li_4La_BM'_CM''_DTa_EO_F$, $Li_4La_BM'_CM''_DNb_EO_F$, wherein $4<A<8.5$, $1.5<B<4$, $0\leq C\leq 2$, $0\leq D\leq 2$; $0\leq E<2$, $10<F<13$, and M' and M" are each, independently in each instance selected from Al, Mo, W, Nb, Sb, Ca, Ba, Sr, Ce, Hf, Rb, or Ta, or $Li_aLa_bZr_cAl_dMe''_eO_f$, wherein $5<a<7.7$; $2<b<4$; $0<c\leq 2.5$; $0\leq d<2$; $0\leq e<2$, $10<f<13$ and Me" is a metal selected from Nb, Ta, V, W, Mo, or Sb.

In certain examples, the methods set forth herein include a Garnet-type electrolyte selected from $Li_4La_BM'_CM''_DNb_EO_F$, wherein $4<A<8.5$, $1.5<B<4$, $0\leq C\leq 2$, $0\leq D\leq 2$; $0\leq E<2$, $10<F<14$, and M' and M" are each, independently in each instance selected from Al, Mo, W, Nb, Sb, Ca, Ba, Sr, Ce, Hf, Rb, or Ta.

In certain examples, the methods set forth herein include a Garnet-type electrolyte selected from $Li_4La_BM'_CM''_DNb_EO_F$, wherein $4<A<8.5$, $1.5<B<4$, $0\leq C\leq 2$, $0\leq D\leq 2$; $0\leq E<2$, $10<F<13$, and M' and M" are each, independently in each instance selected from Al, Mo, W, Nb, Sb, Ca, Ba, Sr, Ce, Hf, Rb, or Ta.

In certain examples, the methods set forth herein include a Garnet-type electrolyte selected from $Li_aLa_bZr_cAl_dMe''_eO_f$, wherein $5<a<7.7$; $2<b<4$; $0<c\leq 2.5$; $0\leq d<2$; $0\leq e<2$, $10<f<14$ and Me" is a metal selected from Nb, Ta, V, W, Mo, or Sb.

In certain examples, the methods set forth herein include a Garnet-type electrolyte selected from $Li_aLa_bZr_cAl_dMe''_eO_f$, wherein $5<a<7.7$; $2<b<4$; $0<c\leq 2.5$; $0\leq d<2$; $0\leq e<2$, $10<f<13$ and Me" is a metal selected from Nb, Ta, V, W, Mo, or Sb.

In some embodiments, the garnet material described herein is used as an electrolyte. In some of these embodiments, the garnet has the formula $Li_xLa_3Zr_2O_{12} \cdot y\frac{1}{2}Al_2O_3$; wherein $5.0<x<9$ and $0.1<y<1.5$. In some of these examples, the electrolyte is $Li_xLa_3Zr_2O_{12} \cdot 0.35Al_2O_3$. In other of these examples, the electrolyte is $Li_7La_3Zr_2O_{12} \cdot 0.35Al_2O_3$.

In some of the examples wherein the garnet is an electrolyte, the garnet does not include any Nb, Ta, W or Mo, which is used herein to mean that the concentration of those elements (e.g., Nb, Ta, W, or Mo) is 10 parts per million (ppm) or lower. In some examples, the concentration of those elements (e.g., Nb, Ta, W, or Mo) is 1 parts per million (ppm) or lower. In some examples, the concentration of those elements (e.g., Nb, Ta, W, or Mo) is 0.1 parts per million (ppm) or lower.

In some examples, the Lithium stuffed garnet set forth herein can be represented by the general formula $Li_xA_3B_2O_{12}$, wherein $5<x<7$. In some of these examples, A is a large ion occupying an 8-fold coordinated lattice site. In some of these examples, A is La, Sr, Ba, Ca, or a combination thereof. In some examples, B is a smaller more highly charged ion occupying an octahedral site. In some of these examples, B is Zr, Hf, Nb, Ta, Sb, V, or a combination thereof. In certain of these examples, the composition is doped with 0.3 to 1 molar amount of Al per $Li_xA_3B_2O_{12}$. In certain of these examples, the composition is doped with 0.35 molar amount of Al per $Li_xA_3B_2O_{12}$.

In some examples, the lithium stuffed garnet is $Li_7La_3Zr_2O_{12}$ (LLZ) and is doped with alumina. In certain examples, the LLZ is doped by adding $Al_2O_3$ to the reactant precursor mix that is used to make the LLZ. In certain other examples, the LLZ is doped by the aluminum in an aluminum reaction vessel that contacts the LLZ.

In some examples, the alumina doped LLZ has a high conductivity, e.g., greater than $10^{-4}$ S/cm at room temperature.

In some examples, a higher conductivity is observed when some of the Zr is partially replaced by a higher valence species, e.g., Nb, Ta, Sb, or combinations thereof. In some examples, the conductivity reaches as high as $10^{-3}$ S/cm at room temperature.

In some examples, the composition set forth herein is $Li_xA_3B_2O_{12}$ doped with 0.35 molar amount of Al per $Li_xA_3B_2O_{12}$. In certain of these examples, x is 5. In certain other examples, x is 5.5. In yet other examples, x is 6.0. In some other examples, x is 6.5. In still other examples, x is 7.0. In some other examples, x is 7.5

In some examples, the garnet-based composition is doped with 0.3, 0.35, 0.4, 0.45, 0.5, 0.55, 0.6, 0.65, 0.7, 0.75, 0.8, 0.85, 0.9, 0.95, or 1 molar amount of Al per $Li_xA_3B_2O_{12}$.

In some examples, the garnet-based composition is doped with 0.35 molar amount of Al per $Li_xA_3B_2O_{12}$.

In the examples, herein, the subscripts and molar coefficients in the empirical formulas are based on the quantities of raw materials initially batched to make the described examples.

In some examples, the instant disclosure provides a composition including a lithium stuffed garnet and $Al_2O_3$. In certain examples, the lithium stuffed garnet is doped with alumina. In some examples, the lithium-stuffed garnet is characterized by the empirical formula $Li_4La_BM'_CM''_DZr_EO_F$, wherein $4<A<8.5$, $1.5<B<4$, $0\leq C\leq 2$, $0\leq D\leq 2$; $0\leq E\leq 2$, $10<F\leq 13$, and M' and M" are, independently in each instance, either absent or are each independently selected from Al, Mo, W, Nb, Sb, Ca, Ba, Sr, Ce, Hf, Rb, or Ta; and wherein the molar ratio of Garnet:$Al_2O_3$ is between 0.05 and 0.7.

In some examples, the instant disclosure provides a composition including a lithium stuffed garnet and $Al_2O_3$. In certain examples, the lithium stuffed garnet is doped with alumina. In some examples, the lithium-stuffed garnet is characterized by the empirical formula $Li_4La_BM'_CM''_DZr_EO_F$, wherein $4<A<8.5$, $1.5<B<4$, $0\leq C\leq 2$, $0\leq D\leq 2$; $0\leq E\leq 2$, $10<F\leq 13$, and M' and M" are, independently in each instance, either absent or are each independently selected from Al, Mo, W, Nb, Sb, Ca, Ba, Sr, Ce, Hf, Rb, or Ta; and wherein the molar ratio of Li:Al is between 0.05 and 0.7.

In some examples, the instant disclosure provides a composition including a lithium stuffed garnet and $Al_2O_3$. In certain examples, the lithium stuffed garnet is doped with alumina. In some examples, the lithium-stuffed garnet is characterized by the empirical formula $Li_4La_BM'_CM''_DZr_EO_F$, wherein $2<A<10$, $2<B<6$, $0\leq C\leq 2$, $0\leq D\leq 2$; $0\leq E\leq 3$, $8<F\leq 14$, and M' and M" are, independently in each instance, either absent or are each independently selected from Al, Mo, W, Nb, Sb, Ca, Ba, Sr, Ce, Hf, Rb, or Ta; and wherein the molar ratio of Garnet:$Al_2O_3$ is between 0.01 and 2.

In some examples, the instant disclosure provides a composition including a lithium stuffed garnet and $Al_2O_3$. In certain examples, the lithium stuffed garnet is doped with alumina. In some examples, the lithium-stuffed garnet is characterized by the empirical formula $Li_4La_BM'_CM''_DZr_EO_F$, wherein $2<A<10$, $2<B<6$, $0\leq C\leq 2$, $0\leq D\leq 2$; $0\leq E\leq 3$, $8<F\leq 14$, and M' and M" are, independently in each instance, either absent or are each independently selected from Al, Mo, W, Nb, Sb, Ca, Ba, Sr, Ce, Hf, Rb, or Ta; and wherein the molar ratio of Li:Al is between 0.01 and 2.

In some examples, the lithium stuffed garnet is $Li_4La_BZr_CM'_DM''_EO_{12}$ and $5<A<7.7$, $2<B<4$, $0<C<2.5$, M' comprises a metal dopant selected from a material including Al and $0<D<2$, M" comprises a metal dopant selected from a material including Nb, Ta, V, W, Mo, Sb, and wherein $0<e<2$. In some examples, the lithium stuffed garnet is a lithium stuffed garnet set forth in U.S. Provisional Patent Application No. 61/887,451, entitled METHOD AND SYSTEM FOR FORMING GARNET MATERIALS WITH SINTERING PROCESS, filed Oct. 7, 2013, the entire contents of which are herein incorporated by reference in its entirety for all purposes.

In some of the examples above, A is 6. In some other examples, A is 6.5. In other examples, A is 7.0. In certain other examples, A is 7.5. In yet other examples, A is 8.0.

In some of the examples above, B is 2. In some other examples, B is 2.5. In other examples, B is 3.0. In certain other examples, B is 3.5. In yet other examples, B is 3.5. In yet other examples, B is 4.0.

In some of the examples above, C is 0.5. In other examples C is 0.6. In some other examples, C is 0.7. In some other examples C is 0.8. In certain other examples C is 0.9. In other examples C is 1.0. In yet other examples, C is 1.1. In certain examples, C is 1.2. In other examples C is 1.3. In some other examples, C is 1.4. In some other examples C is 1.5. In certain other examples C is 1.6. In other examples C is 1.7. In yet other examples, C is 1.8. In certain examples, C is 1.9. In yet other examples, C is 2.0. In other examples C is 2.1. In some other examples, C is 2.2. In some other examples C is 2.3. In certain other examples C is 2.4. In other examples C is 2.5. In yet other examples, C is 2.6. In certain examples, C is 2.7. In yet other examples, C is 2.8. In other examples C is 2.9. In some other examples, C is 3.0.

In some of the examples above, D is 0.5. In other examples D is 0.6. In some other examples, D is 0.7. In some other examples D is 0.8. In certain other examples D is 0.9. In other examples D is 1.0. In yet other examples, D is 1.1. In certain examples, D is 1.2. In other examples D is 1.3. In some other examples, D is 1.4. In some other examples D is 1.5. In certain other examples D is 1.6. In other examples D is 1.7. In yet other examples, D is 1.8. In certain examples, D is 1.9. In yet other examples, D is 2.0. In other examples D is 2.1. In some other examples, D is 2.2. In some other examples D is 2.3. In certain other examples D is 2.4. In other examples D is 2.5. In yet other examples, D is 2.6. In certain examples, D is 2.7. In yet other examples, D is 2.8. In other examples D is 2.9. In some other examples, D is 3.0.

In some of the examples above, E is 0.5. In other examples E is 0.6. In some other examples, E is 0.7. In some other examples E is 0.8. In certain other examples E is 0.9. In other examples E is 1.0. In yet other examples, E is 1.1. In certain examples, E is 1.2. In other examples E is 1.3. In some other examples, E is 1.4. In some other examples E is 1.5. In certain other examples E is 1.6. In other examples E is 1.7. In yet other examples, E is 1.8. In certain examples, E is 1.9. In yet other examples, E is 2.0. In other examples E is 2.1. In some other examples, E is 2.2. In some other examples E is 2.3. In certain other examples E is 2.4. In other examples E is 2.5. In yet other examples, E is 2.6. In certain examples, E is 2.7. In yet other examples, E is 2.8. In other examples E is 2.9. In some other examples, E is 3.0.

In some of the examples above, F is 11.1. In other examples F is 11.2. In some other examples, F is 11.3. In some other examples F is 11.4. In certain other examples F is 11.5. In other examples F is 11.6. In yet other examples, F is 11.7. In certain examples, F is 11.8. In other examples F is 11.9. In some other examples, F is 12. In some other examples F is 12.1. In certain other examples F is 12.2. In other examples F is 12.3. In yet other examples, F is 12.3. In certain examples, F is 12.4. In yet other examples, F is 12.5. In other examples F is 12.6. In some other examples, F is 12.7. In some other examples F is 12.8. In certain other examples E is 12.9. In other examples F is 13.

In some examples, provided herein is a composition characterized by the empirical formula $Li_xLa_3Zr_2O_{12} \cdot y\frac{1}{2}Al_2O_3$; wherein 5.0<x<9 and 0.1<y<1.5. In some examples, x is 5. In other examples, x is 5.5. In some examples, x is 6. In some examples, x is 6.5. In other examples, x is 7. In some examples, x is 7.5. In other examples x is 8. In some examples, y is 0.3. In some examples, y is 0.35. In other examples, y is 0.4. In some examples, y is 0.45. In some examples, y is 0.5. In other examples, y is 0.55. In some examples, y is 0.6. In other examples y is 0.7. In some examples, y is 0.75. In other examples, y is 0.8. In some examples, y is 0.85. In other examples y is 0.9. In some examples, y is 0.95. In other examples, y is 1.0

In some examples, provided herein is a composition characterized by the empirical formula $Li_{7.0}La_3(Zr_{t1}+Nb_{t2}+Ta_{t3})O_{12}+0.35Al_2O_3$. In this formula, t1+t2+t3=subscript 2 so that the molar ratio of La to the combined amount of (Zr+Nb+Ta) is 3:2.

In some examples, provided herein is a composition is characterized by the empirical formula $Li_7La_3Zr_2O_{12} \cdot 0.35Al_2O_3$.

In some of the above examples, A is 5, 6, 7, or 8. In certain examples, wherein A is 7.

In some of the above examples, M' is Nb and M" is Ta.

In some of the above examples, E is 1, 1.5, or 2. In certain examples, E is 2.

In some of the above examples, C and D are 0.

In some examples, provided herein is a composition wherein the molar ratio of Garnet:$Al_2O_3$ is between 0.1 and 0.65. In some examples, the Li:Al ratio is between 7:0.2 to 7:1.3. In some examples, the Li:Al ratio is between 7:0.3 to 7:1.2. In some examples, the Li:Al ratio is between 7:0.3 to 7:1.1. In some examples, the Li:Al ratio is between 7:0.4 to 7:1.0. In some examples, the Li:Al ratio is between 7:0.5 to 7:0.9. In some examples, the Li:Al ratio is between 7:0.6 to 7:0.8. In some examples, the Li:Al ratio is about 7:0.7. In some examples, the Li:Al ratio is 7:0.7.

In some examples, provided herein is a composition wherein the molar ratio of Garnet:$Al_2O_3$ is between 0.15 and 0.55.

In some examples, provided herein is a composition wherein the molar ratio of Garnet:$Al_2O_3$ is between 0.25 and 0.45.

In some examples, provided herein is a composition wherein the molar ratio of Garnet:$Al_2O_3$ is 0.35.

In some examples, provided herein is a composition wherein the molar ratio of Al to garnet is 0.35.

In some examples, provided herein is a composition wherein the lithium-stuffed garnet is characterized by the empirical formula $Li_7La_3Zr_2O_{12}$ and is doped with aluminum.

In some examples, the lithium stuffed garnet is $Li_7La_3Zr_2O_{12}$ (LLZ) and is doped with alumina. In certain examples, the LLZ is doped by adding $Al_2O_3$ to the reactant precursor mix that is used to make the LLZ. In certain other examples, the LLZ is doped by the aluminum in an aluminum reaction vessel that contacts the LLZ. When the LLZ is doped with alumina, conductive holes are introduced which increases the conductivity of the lithium stuffed garnet. In some examples, this increased conductivity is referred to as increased ionic (e.g., $Li^+$) conductivity.

ii. Catholytes

Catholyte materials suitable for use with the components, devices, and methods set forth herein include, without limitation, a garnet material selected from $Li_ALa_BM'_CM"_DZr_EO_F$, $Li_ALa_BM'_CM"_DTa_EO_F$, $Li_ALa_BM'_CM"_DNb_EO_F$, wherein 4<A<8.5, 1.5<B<4, 0≤C≤2, 0≤D≤2; 0≤E<2, 10<F<14, and M' and M" are each, independently in each instance selected from Al, Mo, W, Nb, Sb, Ca, Ba, Sr, Ce, Hf, Rb, or Ta, or $Li_aLa_bZr_cAl_dMe"_eO_f$, wherein 5<a<7.7; 2<b<4; 0<c≤2.5; 0≤d<2; 0≤e<2, 10<f<14 and Me" is a metal selected from Nb, Ta, V, W, Mo, or Sb. In some embodiments, the garnet material is $Li_ALa_BM'_CM"_DZr_EO_F$. In some other embodiments, the garnet material is $Li_ALa_BM'_CM"_DTa_EO_F$. In other embodiments, the garnet material is $Li_ALa_BM'_CM"_DNb_EO_F$.

In the above examples, the subscript value (4<A<8.5, 1.5<B<4, 0≤C≤2, 0≤D≤2; 0≤E<2, 10<F<14) characterize the ratio of reactants used to make the garnet material. Certain deviations from these reactant ratios may be present in the garnet products. As used herein, precursors to Garnet refers to the reactants used to produce or to synthesize the Garnet.

In the above examples, the subscript value (e.g., 4<A<8.5, 1.5<B<4, 0≤C≤2, 0≤D≤2; 0≤E<2, 10<F≤13) characterize the ratio of reactants used to make the garnet material. Certain deviations from these reactant ratios may be present in the garnet products. As used herein, precursors to Garnet refers to the reactants used to produce Garnet.

In the above examples, the subscript values may also include 4<A<8.5, 1.5<B<4, C<2, 0≤D≤2; 0≤E<2, 10<F<14. In some examples, C is equal to 1.99 or less.

In the above examples, the subscript values may also include 4<A<8.5, 1.5<B<4, C<2, 0≤D≤2; 0≤E<2, 10<F≤13. In some examples, C is equal to 1.99 or less.

In certain embodiments, the garnet is a lithium-stuffed garnet.

In some embodiments, the garnet is characterized $Li_aLa_bZr_cAl_dMe"_eO_f$, wherein the subscripts are characterized by the values noted above.

In some embodiments, the lithium-stuffed garnet is a lithium lanthanum zirconium oxide that is mixed with aluminum oxide. In some of these examples, the lithium lanthanum zirconium oxide is characterized by the formula $Li_{7.0}La_3Zr_2O_{12}+0.35Al_2O_3$, wherein the subscript and coefficients represent molar ratios that are determined based on the reactants used to make the garnet.

In some embodiments, the ratio of La:Zr is 3:2. In some other examples, the garnet is $Li_{7.0}La_3(Zr_{t1}+Nb_{t2}+Ta_{t3})O_{12}+0.35Al_2O_3$; wherein (t1+t2+t3=subscript 2) so that the La:(Zr/Nb/Ta) ratio is 3:2.

In some examples, the garnet is $Li_xLa_3Zr_2O_{12}+yAl_2O_3$, wherein x ranges from 5.5 to 9; and y ranges from 0 to 1. In some examples x is 7 and y is 0.35.

The catholytes set forth herein include, in some embodiments, a hierarchical structure with a lithium conducting garnet scaffold filled with carbon electron conductive additive, lithium conductive polymer binder, and active material. The active material loading can be greater than 50 volume percent to enable high energy density. In some examples, the garnet is sintered and retains >70% porosity to allow for the volume of the other components. The disclosures herein overcomes several problems associated with the assembly of a solid energy storage device, for example, but not limited to, sintering composite electrodes having well developed contact points between particles and reduced particle-particle electrical resistance, which permits higher current flow without a significant voltage drop; also preparing methods for making entire device (electrodes, and electrolyte) in one step; also preparation methods for making solid state energy storage devices which eliminate the need to use a flammable liquid electrolyte, which is a safety hazard in some instances; and methods for FAST sintering films to reduce the process time and expense of making electrochemical devices; and methods for making FAST sintering and densifying components of electrode composites without significant interdiffusion or detrimental chemical reaction.

iii. Composites

Figure 26:
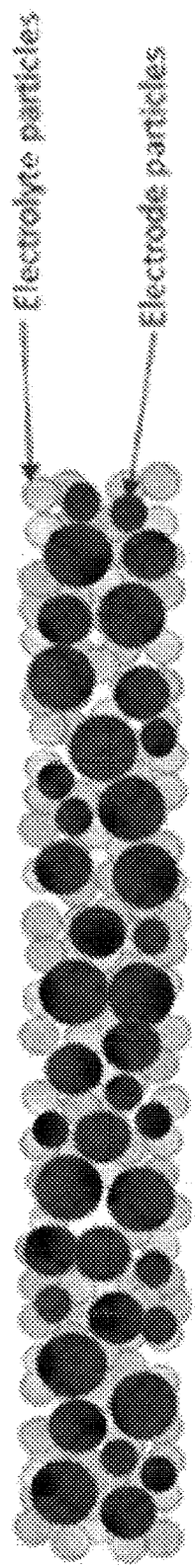
FIG. 26 shows an example composite electrode, prepared according to the methods set forth herein, for a solid state battery composed of active electrode materials with interspersed electrolyte particles prior to any sintering treatment. The layer can also contain an electrically conductive additive (e.g. carbon) (not shown).

In some embodiments, disclosed herein is a composite electrochemical device prepared by a method set forth herein. In some examples, the device includes at least one layer including a member selected from the group consisting of an active electrode material, an electrolyte, a conductive additive, and combinations thereof; and a least one layer comprising a Garnet-type electrolyte. In some examples, the composite has the structure shown in FIG. 26 or in FIG. 27.

In some embodiments, the device further includes at least one layer comprising an active anode material. Active anode materials include, but are not limited to, carbon, silicon, silicon oxide, tin, alloys thereof, and combinations thereof.

Figure 25:
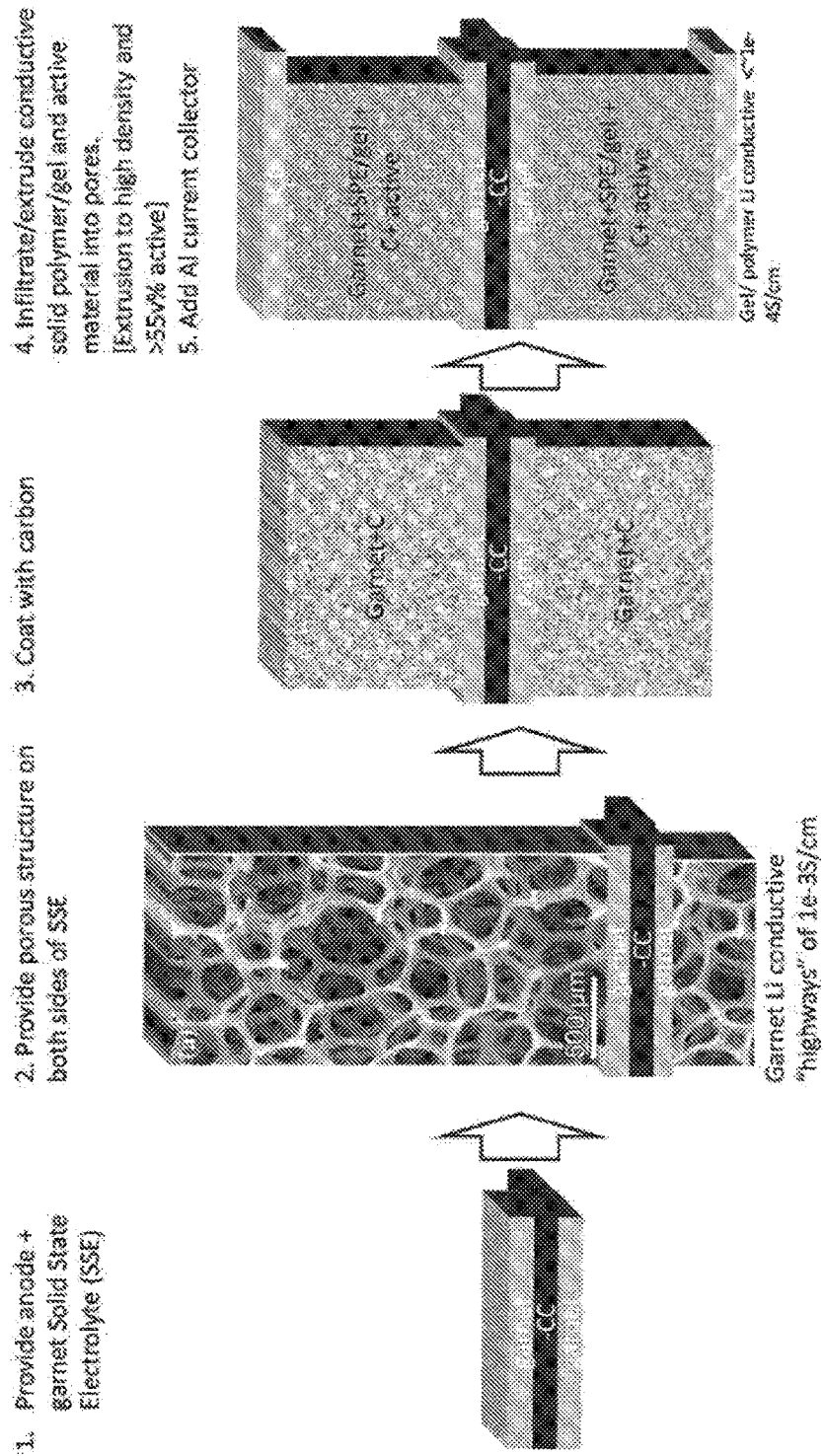
FIG. 25 shows a method of making an embodiment of an invention disclosed herein.

In some embodiments, disclosed herein is a layered material for an electrochemical device, including at least one layer comprising an anode and an anode current collector; at least one layer including a garnet solid state electrolyte (SSE) in contact with the anode; at least one layer including a porous garnet in contact with the garnet SSE; wherein the porous garnet is optionally infiltrated with at least one member selected from the group consisting of carbon, a lithium conducting polymer, an active cathode material, and combinations thereof; and at least one layer comprising an aluminum cathode current collector in contact with the porous Garnet, wherein the porous Garnet layer is at least 70% porous by volume; wherein the Garnet is a material selected from $Li_A La_B M'_C M''_D Zr_E O_F$, $Li_A La_B M'_C M''_D Ta_E O_F$, $Li_A La_B M'_C M''_D Nb_E O_F$, wherein $4<A<8.5$, $1.5<B<4$, $0\leq C\leq 2$, $0\leq D\leq 2$, $0\leq E<2$, $10<F<14$, and M' and M'' are each, in each instance selected from Al, Mo, W, Nb, Sb, Ca, Ba, Sr, Ce, Hf, Rb, or Ta, or $Li_a La_b Zr_c Al_d Me''_e O_f$, wherein $5<a<7.7$; $2<b<4$; $0<c\leq 2.5$; $0\leq d<2$; $0\leq e<2$, $10<f\leq 13$ and Me'' is a metal selected from Nb, Ta, V, W, Mo, or Sb; and wherein the active electrode material is a cathode material selected from NCA (lithium nickel cobalt aluminum oxide), LMNO (lithium manganese nickel oxide), NMC (lithium nickel manganese cobalt oxide), LCO (lithium cobalt oxide, i.e., $LiCoO_2$), nickel fluoride ($NiF_x$, wherein x is from 0 to 2.5), copper fluoride ($CuF_y$, wherein y is from 0 to 2.5), or $FeF_z$ (wherein z is selected from 0 to 3.5). In some examples, the layered structure is substantially as shown in FIG. 25.

In certain embodiments, the two sides of the layer comprising the anode and anode current collector are each independently in contact with a garnet SSE layer and each garnet SSE layer is independently in contact with a porous Garnet layer.

b. Powders i. Nanocrystalline

In some examples, the lithium stuffed garnet powders set forth herein are nanodimensioned or nanostructured. As such, these powders comprise crystalline domains of lithium stuffed garnet wherein the median crystalline domain diameter is about 0.5 nm to about 10 μm in physical dimensions (e.g., diameter). In some examples, the crystalline domains are about 0.5 nm in diameter. In some other examples, the crystalline domains are about 1 nm in diameter. In other examples, the crystalline domains are about 1.5 nm in diameter. In yet other examples, the crystalline domains are about 2 nm in diameter. In still other examples, the crystalline domains are about 2.5 nm in diameter. In some examples, the crystalline domains are about 3.0 nm in diameter. In yet other examples, the crystalline domains are about 3.5 nm in diameter. In other examples, the crystalline domains are about 4.0 nm in diameter. In some examples, the crystalline domains are about 5 nm in diameter. In some other examples, the crystalline domains are about 5.5 nm in diameter. In other examples, the crystalline domains are about 6.0 nm in diameter. In yet other examples, the crystalline domains are about 6.5 nm in diameter. In still other examples, the crystalline domains are about 7.0 nm in diameter. In some examples, the crystalline domains are about 7.5 nm in diameter. In yet other examples, the crystalline domains are about 8.0 nm in diameter. In other examples, the crystalline domains are about 8.5 nm in diameter. In some examples, the crystalline domains are about 8.5 nm in diameter. In some other examples, the crystalline domains are about 9 nm in diameter. In other examples, the crystalline domains are about 9.5 nm in diameter. In yet other examples, the crystalline domains are about 10 nm in diameter. In still other examples, the crystalline domains are about 10.5 nm in diameter. In some examples, the crystalline domains are about 11.0 nm in diameter. In yet other examples, the crystalline domains are about 11.5 nm in diameter. In other examples, the crystalline domains are about 12.0 nm in diameter. In some examples, the crystalline domains are about 12.5 nm in diameter. In some other examples, the crystalline domains are about 13.5 nm in diameter. In other examples, the crystalline domains are about 14.0 nm in diameter. In yet other examples, the crystalline domains are about 14.5 nm in diameter. In still other examples, the crystalline domains are about 15.0 nm in diameter. In some examples, the crystalline domains are about 15.5 nm in diameter. In yet other examples, the crystalline domains are about 16.0 nm in diameter. In other examples, the crystalline domains are about 16.5 nm in diameter. In some examples, the crystalline domains are about 17 nm in diameter. In some other examples, the crystalline domains are about 17.5 nm in diameter. In other examples, the crystalline domains are about 18 nm in diameter. In yet other examples, the crystalline domains are about 18.5 nm in diameter. In still other examples, the crystalline domains are about 19 nm in diameter. In some examples, the crystalline domains are about 19.5 nm in diameter. In yet other examples, the crystalline domains are about 20 nm in diameter. In other examples, the crystalline domains are about 20.5 nm in diameter. In some examples, the crystalline domains are about 21 nm in diameter. In some other examples, the crystalline domains are about 21.5 nm in diameter. In other examples, the crystalline domains are about 22.0 nm in diameter. In yet other examples, the crystalline domains are about 22.5 nm in diameter. In still other examples, the crystalline domains are about 23.0 nm in diameter. In some examples, the crystalline domains are about 23.5 nm in diameter. In yet other examples, the crystalline domains are about 24.0 nm in diameter. In other examples, the crystalline domains are about 24.5 nm in diameter. In some examples, the crystalline domains are about 25.5 nm in diameter. In some other examples, the crystalline domains are about 26 nm in diameter. In other examples, the crystalline domains are about 26.5 nm in diameter. In yet other examples, the crystalline domains are about 27 nm in diameter. In still other examples, the crystalline domains are about 27.5 nm in diameter. In some examples, the crystalline domains are about 28.0 nm in diameter. In yet other examples, the crystalline domains are about 28.5 nm in diameter. In other examples, the crystalline domains are about 29.0 nm in diameter. In some examples, the crystalline domains are about 29.5 nm in diameter. In some other examples, the crystalline domains are about 30 nm in diameter. In other examples, the crystalline domains are about 30.5 nm in diameter. In yet other examples, the crystalline domains are about 31 nm in diameter. In still other examples, the crystalline domains are about 32 nm in diameter. In some examples, the crystalline domains are about 33 nm in diameter. In yet other examples, the crystalline domains are about 34 nm in diameter. In other examples, the crystalline domains are about 35 nm in diameter. In some examples, the crystalline domains are about 40 nm in diameter. In some other examples, the crystalline domains are about 45 nm in diameter. In other examples, the crystalline domains are about 50 nm in diameter. In yet other examples, the crystalline domains are about 55 nm in diameter. In still other examples, the crystalline domains are about 60 nm in diameter. In some examples, the crystalline domains are about 65 nm in diameter. In yet other examples, the crystalline domains are about 70 nm in diameter. In other examples, the crystalline domains are about 80 nm in diameter. In some examples, the crystalline domains are about 85 nm in diameter. In some other examples, the crystalline domains are about 90 nm in diameter. In other examples, the crystalline domains are about 100 nm in diameter. In yet other examples, the crystalline domains are about 125 nm in diameter. In still other examples, the crystalline domains are about 150 nm in diameter. In some examples, the crystalline domains are about 200 nm in diameter. In yet other examples, the crystalline domains are about 250 nm in diameter. In other examples, the crystalline domains are about 300 nm in diameter. In some examples, the crystalline domains are about 350 nm in diameter. In some other examples, the crystalline domains are about 400 nm in diameter. In other examples, the crystalline domains are about 450 nm in diameter. In yet other examples, the crystalline domains are about 500 nm in diameter. In still other examples, the crystalline domains are about 550 nm in diameter. In some examples, the crystalline domains are about 600 nm in diameter. In yet other examples, the crystalline domains are about 650 nm in diameter. In other examples, the crystalline domains are about 700 nm in diameter. In some examples, the crystalline domains are about 750 nm in diameter. In some other examples, the crystalline domains are about 800 nm in diameter. In other examples, the crystalline domains are about 850 nm in diameter. In yet other examples, the crystalline domains are about 900 nm in diameter. In still other examples, the crystalline domains are about 950 nm in diameter. In some examples, the crystalline domains are about 1000 nm in diameter.

ii. Fine Grained

Grain sizes, as used herein and unless otherwise specified, are measured by either microscopy, e.g., transmission electron microscopy or scanning electron microscopy, or by x-ray diffraction methods.

In some examples, provided herein is a film having grains with a $d_{50}$ diameter less than 10 µm. In certain examples, the film has grains having a $d_{50}$ diameter less than 9 µm. In other examples, the grains having a $d_{50}$ diameter less than 8 µm. In some examples, the grains have a $d_{50}$ diameter less than 7 µm. In certain examples, the film has grains having a $d_{50}$ diameter less than 6 µm. In other examples, the film has grains having a $d_{50}$ diameter less than 5 µm. In some examples, the film has grains having a $d_{50}$ diameter less than 4 µm. In other examples, the film has grains having a $d_{50}$ diameter less than 3 µm. In certain examples, the film has grains having a $d_{50}$ diameter less than 2 µm. In other examples, the film has grains having a $d_{50}$ diameter less than 1 µm.

As used herein, the fine grains in the films set forth herein have $d_{50}$ diameters of between 10 nm and 10 µm. In some examples, the fine grains in the films set forth herein have $d_{50}$ diameters of between 100 nm and 10 µm.

In some examples, the films set forth herein have a Young's Modulus of about 130-150 GPa. In some other examples, the films set forth herein have a Vicker's hardness of about 5-7 GPa.

In some examples, the films set forth herein have a porosity less than 20%. In other examples, the films set forth herein have a porosity less than 10%. In yet other examples, the films set forth herein have a porosity less than 5%. In still other examples, the films set forth herein have a porosity less than 3%. Porosity is measured, in some examples, by pycnometry or mercury porosimetry.

c. Films i. Uncalcined

Set forth herein are films and powders that include garnet precursors optionally with calcined garnets. Prior to heating these films and powders, or prior to a sufficient lapse in time for the precursors to react in order to form a lithium stuffed garnet, these films and powders are uncalcined. In some examples, slurries of garnet precursors, set forth below, are layered, deposited, or laminated to calcined films of lithium stuffed garnets in order to build up several layers of lithium stuffed garnets. In some examples, slurries of garnet precursors, set forth below, are layered, deposited, or laminated to calcined films of lithium stuffed garnets in order to infiltrate vacant or porous space within calcined lithium stuffed garnets.

In some examples, set forth herein are thin and free standing garnet films including garnet precursors or optionally calcined garnet. In some examples, these films also include at least one member selected a binder, a solvent, a dispersant, or combinations thereof. In some examples, the garnet solid loading is at least 30% by weight (w/w). In some examples, the film thickness is less than 100 µm.

In certain examples, the dispersant is fish oil, Mehaden Blown Fish Oil, phosphate esters, Rhodaline™, Rhodoline 4160, phospholan-131™, BYK™ 22124, BYK-22146™, Hypermer KD1™, Hypermer KD6™ and Hypermer KD7™.

In some examples, the films include a substrate adhered thereto. In certain examples, the substrate is a polymer, a metal foil, or a metal powder. In some of these examples, the substrate is a metal foil. In some examples, the substrate is a metal powder. In some of these examples, the metal is selected from Ni, Cu, Al, steel, alloys, or combinations thereof.

The film of claim 1, wherein the solid loading is at least 35% w/w.

In some examples, the films have a solid loading of at least 40% w/w. In some examples, the films have a solid loading of at least 45% w/w. In some examples, the films have a solid loading of at least 50% w/w. In others examples, the solid loading is at least 55% w/w. In some other examples, the solid loading is at least 60% w/w. In some examples, the solid loading is at least 65% w/w. In some other examples, the solid loading is at least 70% w/w. In certain other examples, the solid loading is at least 75% w/w. In some examples, the solid loading is at least 80% w/w.

In some examples, the uncalcined films have a film thickness less than 75 μm and greater than 10 nm. In some examples, the uncalcined films have a thickness less than 50 μm and greater than 10 nm. In some examples, the uncalcined films have a particles which are less than 1 μm at the particles maximum physical dimension. In some examples, the uncalcined films have a median grain size of between 0.1 μm to 10 μm. In some examples, the uncalcined films is not adhered to any substrate.

In some examples, set forth herein are thin and free standing garnet films including garnet precursors or optionally calcined garnet. In some examples, these films also include at least one member selected a binder, a solvent, a dispersant, or combinations thereof. In some examples, the garnet solid loading is at least 30% by volume (v/v). In some examples, the film thickness is less than 100 μm.

In some examples, the films have a solid loading of at least 40% v/v. In some examples, the films have a solid loading of at least 45% v/v. In some examples, the films have a solid loading of at least 50% v/v. In others examples, the solid loading is at least 55% v/v. In some other examples, the solid loading is at least 60% v/v. In some examples, the solid loading is at least 65% v/v. In some other examples, the solid loading is at least 70% v/v. In certain other examples, the solid loading is at least 75% v/v. In some examples, the solid loading is at least 80% v/v.

A. Calcined

The uncalcined films set forth herein may be calcined by heating the films to about 200° C. to 1200° C. for about 20 minutes to 10 hours or until crystallization occurs.

ii. UNSINTERED

In some examples, the garnet-based films are unsintered, referred as to "green" films and up to kilometers in length.

In an embodiment, the disclosure sets forth herein a method of making an energy storage electrode, including providing an unsintered thin film; wherein the unsintered thin film comprises at least one member selected from the group consisting of a Garnet-type electrolyte, an active electrode material, a conductive additive, a solvent, a binder, and combinations thereof; removing the solvent, if present in the unsintered thin film; optionally laminating the film to a surface; removing the binder, if present in the film; sintering the film, wherein sintering comprises heat sintering or field assisted sintering (FAST); wherein heat sintering includes heating the film in the range from about 700° C. to about 1200° C. for about 1 to about 600 minutes and in atmosphere having an oxygen partial pressure between 1e-1 atm to 1e-15 atm; and wherein FAST sintering includes heating the film in the range from about 500.0 to about 900.0 and applying a D.C. or A.C. electric field to the thin film.

In some of the methods disclosed herein, the unsintered thin film has a thickness from about 10 μm to about 100 μm. In some other of the methods disclosed herein, the unsintered thin film has a thickness from about 20 μm to about 100 μm. In certain of the methods disclosed herein, the unsintered thin film has a thickness from about 30 μm to about 100 μm. In certain other of the methods disclosed herein, the unsintered thin film has a thickness from about 40 μm to about 100 μm. In yet other methods disclosed herein, the unsintered thin film has a thickness from about 50 μm to about 100 μm. In still other methods disclosed herein, the unsintered thin film has a thickness from about 60 μm to about 100 μm. In yet some other methods disclosed herein, the unsintered thin film has a thickness from about 70 μm to about 100 μm. In some of the methods disclosed herein, the unsintered thin film has a thickness from about 80 μm to about 100 μm. In some other of the methods disclosed herein, the unsintered thin film has a thickness from about 90 μm to about 100 μm.

In some of the methods disclosed herein, the unsintered thin film has a thickness from about 10 μm to about 90 μm. In some other of the methods disclosed herein, the unsintered thin film has a thickness from about 20 μm to about 80 μm. In certain of the methods disclosed herein, the unsintered thin film has a thickness from about 30 μm to about 70 μm. In certain other of the methods disclosed herein, the unsintered thin film has a thickness from about 40 μm to about 60 μm. In yet other methods disclosed herein, the unsintered thin film has a thickness from about 50 μm to about 90 μm. In still other methods disclosed herein, the unsintered thin film has a thickness from about 60 μm to about 90 μm. In yet some other methods disclosed herein, the unsintered thin film has a thickness from about 70 μm to about 90 μm. In some of the methods disclosed herein, the unsintered thin film has a thickness from about 80 μm to about 90 μm. In some other of the methods disclosed herein, the unsintered thin film has a thickness from about 30 μm to about 60 μm.

In some examples, the unsintered films are about 50 percent larger by volume than the sintered films. In some examples, the sintered films have a thickness of about 1-150 μm. In some of these examples the sintered films has a thickness of about 1 μm. In some other examples the sintered films has a thickness of about 2 μm. In certain examples the sintered films has a thickness of about 3 μm. In certain other examples the sintered films has a thickness of about 4 μm. In some other examples the sintered films has a thickness of about 5 μm. In some examples the sintered films has a thickness of about 6 μm. In some of these examples the sintered films has a thickness of about 7 μm. In some examples the sintered films has a thickness of about 8 μm. In some other examples the sintered films has a thickness of about 9 μm. In certain examples the sintered films has a thickness of about 10 μm.

Figure 23:
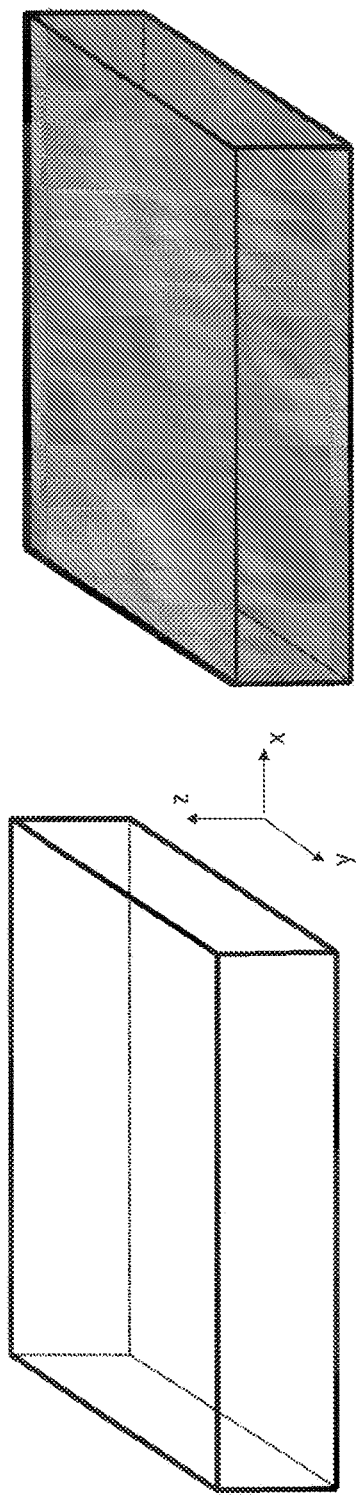
FIG. 23 shows examples of films and rectangular form factors (e.g., thin films) that can be sintered according to the methods set forth herein.

In some examples, the sintering reduces the thickness of the film by about 50, about 40, about 30, about 20, about 10, or about 5% without reducing the length of the film by more than about 1, 2, 3, 4, 5, 6, 7, 8, 9, 10, 11, 12, 13, 14, 15, 16, 17, 18, 19, 20, 21, 22, 23, 24, or 25%. As used herein, the thickness refers to the average thickness in the z-direction (as shown in FIG. 23. As used herein, the length refers to the average length in the x-direction or in the y-direction (as shown in FIG. 23). In some examples, the sintering described herein reduces the thickness of the film in the z-direction (as shown in FIG. 23) proportionally more than in the x or y directions. In some examples, the sintering primarily reduces the film thickness in the z-direction proportionally more so than in either the x- or in the y-direction. In some examples, the sintering reduces the thickness of the film in the z-direction (as shown in FIG. 23) proportionally substantially more than the sintering reduces the length of the film in the x- or in the y-direction. As used in this paragraph, substantially more includes, but is not limited to, at least 50%, at least 60%, at least 70%, at least 80%, at least 90%, or at least 100%.

iii. SINTERED

In some of these examples the sintered films has a thickness of about 10 nm. In some other examples the sintered films has a thickness of about 11 nm. In certain examples the sintered films has a thickness of about 12 nm. In certain other examples the sintered films has a thickness of about 13 nm. In some other examples the sintered films has a thickness of about 14 nm. In some examples the sintered films has a thickness of about 15 nm. In some of these examples the sintered films has a thickness of about 16 nm. In some examples the sintered films has a thickness of about 17 nm. In some other examples the sintered films has a thickness of about 18 nm. In certain examples the sintered films has a thickness of about 19 nm. In some of these examples the sintered films has a thickness of about 20 nm. In some other examples the sintered films has a thickness of about 21 nm. In certain examples the sintered films has a thickness of about 22 nm. In certain other examples the sintered films has a thickness of about 23 nm. In some other examples the sintered films has a thickness of about 24 nm. In some examples, the sintered film has a thickness of about 25 nm. In some examples the sintered films has a thickness of about 26 nm. In some of these examples the sintered films has a thickness of about 27 nm. In some examples the sintered films has a thickness of about 28 nm. In some other examples the sintered films has a thickness of about 29 nm. In certain examples the sintered films has a thickness of about 30 nm. In some of these examples the sintered films has a thickness of about 31 nm. In some other examples the sintered films has a thickness of about 32 nm. In certain examples the sintered films has a thickness of about 33 nm. In certain other examples the sintered films has a thickness of about 34 nm. In some other examples the sintered films has a thickness of about 35 nm. In some examples the sintered films has a thickness of about 36 nm. In some of these examples the sintered films has a thickness of about 37 nm. In some examples the sintered films has a thickness of about 38 nm. In some other examples the sintered films has a thickness of about 39 nm. In certain examples the sintered films has a thickness of about 40 nm. In some of these examples the sintered films has a thickness of about 41 nm. In some other examples the sintered films has a thickness of about 42 nm. In certain examples the sintered films has a thickness of about 43 nm. In certain other examples the sintered films has a thickness of about 44 nm. In some other examples the sintered films has a thickness of about 45 nm. In some examples the sintered films has a thickness of about 46 nm. In some of these examples the sintered films has a thickness of about 47 nm. In some examples the sintered films has a thickness of about 48 nm. In some other examples the sintered films has a thickness of about 49 nm. In certain examples the sintered films has a thickness of about 50 nm. In some of these examples the sintered films has a thickness of about 51 nm. In some other examples the sintered films has a thickness of about 52 nm. In certain examples the sintered films has a thickness of about 53 nm. In certain other examples the sintered films has a thickness of about 54 nm. In some other examples the sintered films has a thickness of about 55 nm. In some examples the sintered films has a thickness of about 56 nm. In some of these examples the sintered films has a thickness of about 57 nm. In some examples the sintered films has a thickness of about 58 nm. In some other examples the sintered films has a thickness of about 59 nm. In certain examples the sintered films has a thickness of about 60 nm.

In some of these examples the sintered films has a thickness of about 11 μm. In some other examples the sintered films has a thickness of about 12 μm. In certain examples the sintered films has a thickness of about 13 μm. In certain other examples the sintered films has a thickness of about 14 μm. In some other examples the sintered films has a thickness of about 15 μm. In some examples the sintered films has a thickness of about 16 μm. In some of these examples the sintered films has a thickness of about 17 μm. In some examples the sintered films has a thickness of about 18 μm. In some other examples the sintered films has a thickness of about 19 μm. In certain examples the sintered films has a thickness of about 20 μm. In some of these examples the sintered films has a thickness of about 21 μm. In some other examples the sintered films has a thickness of about 22 μm. In certain examples the sintered films has a thickness of about 23 μm. In certain other examples the sintered films has a thickness of about 24 μm. In some other examples the sintered films has a thickness of about 25 μm. In some examples the sintered films has a thickness of about 26 μm. In some of these examples the sintered films has a thickness of about 27 μm. In some examples the sintered films has a thickness of about 28 μm. In some other examples the sintered films has a thickness of about 29 μm. In certain examples the sintered films has a thickness of about 30 μm. In some of these examples the sintered films has a thickness of about 31 μm. In some other examples the sintered films has a thickness of about 32 μm. In certain examples the sintered films has a thickness of about 33 μm. In certain other examples the sintered films has a thickness of about 34 μm. In some other examples the sintered films has a thickness of about 35 μm. In some examples the sintered films has a thickness of about 36 μm. In some of these examples the sintered films has a thickness of about 37 μm. In some examples the sintered films has a thickness of about 38 μm. In some other examples the sintered films has a thickness of about 39 μm. In certain examples the sintered films has a thickness of about 40 μm. In some of these examples the sintered films has a thickness of about 41 μm. In some other examples the sintered films has a thickness of about 42 μm. In certain examples the sintered films has a thickness of about 43 μm. In certain other examples the sintered films has a thickness of about 44 μm. In some other examples the sintered films has a thickness of about 45 μm. In some examples the sintered films has a thickness of about 46 μm. In some of these examples the sintered films has a thickness of about 47 μm. In some examples the sintered films has a thickness of about 48 μm. In some other examples the sintered films has a thickness of about 49 μm. In certain examples the sintered films has a thickness of about 50 μm. In some of these examples the sintered films has a thickness of about 51 μm. In some other examples the sintered films has a thickness of about 52 μm. In certain examples the sintered films has a thickness of about 53 μm. In certain other examples the sintered films has a thickness of about 54 μm. In some other examples the sintered films has a thickness of about 55 μm. In some examples the sintered films has a thickness of about 56 μm. In some of these examples the sintered films has a thickness of about 57 μm. In some examples the sintered films has a thickness of about 58 μm. In some other examples the sintered films has a thickness of about 59 μm. In certain examples the sintered films has a thickness of about 60 μm.

In some of these examples the sintered films has a thickness of about 61 μm. In some other examples the sintered films has a thickness of about 62 μm. In certain examples the sintered films has a thickness of about 63 μm. In certain other examples the sintered films has a thickness of about 64 μm. In some other examples the sintered films has a thickness of about 65 μm. In some examples the sintered films has a thickness of about 66 μm. In some of these examples the sintered films has a thickness of about 67

μm. In some examples the sintered films has a thickness of about 68 μm. In some other examples the sintered films has a thickness of about 69 μm. In certain examples the sintered films has a thickness of about 70 μm. In some of these examples the sintered films has a thickness of about 71 μm. In some other examples the sintered films has a thickness of about 72 μm. In certain examples the sintered films has a thickness of about 73 μm. In certain other examples the sintered films has a thickness of about 74 μm. In some other examples the sintered films has a thickness of about 75 μm. In some examples the sintered films has a thickness of about 76 μm. In some of these examples the sintered films has a thickness of about 77 μm. In some examples the sintered films has a thickness of about 78 μm. In some other examples the sintered films has a thickness of about 79 μm. In certain examples the sintered films has a thickness of about 80 μm. In some of these examples the sintered films has a thickness of about 81 μm. In some other examples the sintered films has a thickness of about 82 μm. In certain examples the sintered films has a thickness of about 83 μm. In certain other examples the sintered films has a thickness of about 84 μm. In some other examples the sintered films has a thickness of about 85 μm. In some examples the sintered films has a thickness of about 86 μm. In some of these examples the sintered films has a thickness of about 87 μm. In some examples the sintered films has a thickness of about 88 μm. In some other examples the sintered films has a thickness of about 89 μm. In certain examples the sintered films has a thickness of about 90 μm. In some of these examples the sintered films has a thickness of about 91 μm. In some other examples the sintered films has a thickness of about 92 μm. In certain examples the sintered films has a thickness of about 93 μm. In certain other examples the sintered films has a thickness of about 94 μm. In some other examples the sintered films has a thickness of about 95 μm. In some examples the sintered films has a thickness of about 96 μm. In some of these examples the sintered films has a thickness of about 97 μm. In some examples the sintered films has a thickness of about 98 μm. In some other examples the sintered films has a thickness of about 99 μm. In certain examples the sintered films has a thickness of about 100 μm.

In certain other examples, the sintered film has a thickness of about 100 nm. In other examples, the sintered film has a thickness of about 500 nm. In certain other examples, the sintered film has a thickness of about 1 μm. In other examples, the sintered film has a thickness of about 2 μm. In some examples, the sintered film has a thickness of about 250 nm. In some other examples, the sintered film has a thickness of about 2 μm. In some examples, the sintered film has a thickness of about 5 μm. In some examples, the sintered film has a thickness of about 3 μm. In other examples, the sintered film has a thickness of about 4 μm. In some examples, the sintered film has a thickness of about 300 nm. In some examples, the sintered film has a thickness of about 400 nm. In some examples, the sintered film has a thickness of about 200 nm.

In some of these examples the sintered films has a thickness of about 101 μm. In some other examples the sintered films has a thickness of about 102 μm. In certain examples the sintered films has a thickness of about 103 μm. In certain other examples the sintered films has a thickness of about 104 μm. In some other examples the sintered films has a thickness of about 105 μm. In some examples the sintered films has a thickness of about 106 μm. In some of these examples the sintered films has a thickness of about 107 μm. In some examples the sintered films has a thickness of about 108 μm. In some other examples the sintered films has a thickness of about 109 μm. In certain examples the sintered films has a thickness of about 110 μm. In some of these examples the sintered films has a thickness of about 111 μm. In some other examples the sintered films has a thickness of about 112 μm. In certain examples the sintered films has a thickness of about 113 μm. In certain other examples the sintered films has a thickness of about 114 μm. In some other examples the sintered films has a thickness of about 115 μm. In some examples the sintered films has a thickness of about 116 μm. In some of these examples the sintered films has a thickness of about 117 μm. In some examples the sintered films has a thickness of about 118 μm. In some other examples the sintered films has a thickness of about 119 μm. In certain examples the sintered films has a thickness of about 120 μm. In some of these examples the sintered films has a thickness of about 121 μm. In some other examples the sintered films has a thickness of about 122 μm. In certain examples the sintered films has a thickness of about 123 μm. In certain other examples the sintered films has a thickness of about 124 μm. In some other examples the sintered films has a thickness of about 125 μm. In some examples the sintered films has a thickness of about 126 μm. In some of these examples the sintered films has a thickness of about 127 μm. In some examples the sintered films has a thickness of about 128 μm. In some other examples the sintered films has a thickness of about 129 μm. In certain examples the sintered films has a thickness of about 130 μm. In some of these examples the sintered films has a thickness of about 131 μm. In some other examples the sintered films has a thickness of about 132 μm. In certain examples the sintered films has a thickness of about 133 μm. In certain other examples the sintered films has a thickness of about 134 μm. In some other examples the sintered films has a thickness of about 135 μm. In some examples the sintered films has a thickness of about 136 μm. In some of these examples the sintered films has a thickness of about 137 μm. In some examples the sintered films has a thickness of about 138 μm. In some other examples the sintered films has a thickness of about 139 μm. In certain examples the sintered films has a thickness of about 140 μm.

In some of these examples the sintered films has a thickness of about 141 μm. In some other examples the sintered films has a thickness of about 142 μm. In certain examples the sintered films has a thickness of about 143 μm. In certain other examples the sintered films has a thickness of about 144 μm. In some other examples the sintered films has a thickness of about 145 μm. In some examples the sintered films has a thickness of about 146 μm. In some of these examples the sintered films has a thickness of about 147 μm. In some examples the sintered films has a thickness of about 148 μm. In some other examples the sintered films has a thickness of about 149 μm. In certain examples the sintered films has a thickness of about 150 μm.

iv. Nanocrystalline and Fine Grained

In some examples, provided herein is a film having grains with a $d_{50}$ diameter less than 10 nm. In certain examples, the film has grains having a $d_{50}$ diameter less than 9 nm. In other examples, the grains having a $d_{50}$ diameter less than 8 nm. In some examples, the grains have a $d_{50}$ diameter less than 7 nm. In certain examples, the film has grains having a $d_{50}$ diameter less than 6 nm. In other examples, the film has grains having a $d_{50}$ diameter less than 5 nm. In some examples, the film has grains having a $d_{50}$ diameter less than 4 nm. In other examples, the film has grains having a $d_{50}$ diameter less than 3 nm. In certain examples, the film has grains having a $d_{50}$ diameter less than 2 nm. In other examples, the film has grains having a $d_{50}$ diameter less than 1 nm.

In some examples, provided herein is a film having grains with a $d_{50}$ diameter less than 10 µm. In certain examples, the film has grains having a $d_{50}$ diameter less than 9 µm. In other examples, the grains having a $d_{50}$ diameter less than 8 µm. In some examples, the grains have a $d_{50}$ diameter less than 7 µm. In certain examples, the film has grains having a $d_{50}$ diameter less than 6 µm. In other examples, the film has grains having a $d_{50}$ diameter less than 5 µm. In some examples, the film has grains having a $d_{50}$ diameter less than 4 µm. In other examples, the film has grains having a $d_{50}$ diameter less than 3 µm. In certain examples, the film has grains having a $d_{50}$ diameter less than 2 µm. In other examples, the film has grains having a $d_{50}$ diameter less than 1 µm.

As used herein, the fine grains in the films set forth herein have $d_{50}$ diameters of between 10 nm and 10 µm. In some examples, the fine grains in the films set forth herein have $d_{50}$ diameters of between 100 nm and 10 µm.

v. Free Standing

In some examples, the disclosure sets forth herein a free-standing thin film Garnet-type electrolyte prepared by the method set forth herein.

In some embodiments, disclosed herein is a free-standing thin film Garnet-type electrolyte prepared by a method set forth herein.

In some embodiments, the thickness of the free-standing film is less than 50 µm. In certain embodiments, the thickness of the film is less than 40 µm. In some embodiments, the thickness of the film is less than 30 µm. In some other embodiments, the thickness of the film is less than 20 µm. In other embodiments, the thickness of the film is less than 10 µm. In yet other embodiments, the thickness of the film is less than 5 µm.

In some embodiments, the thickness of the film is less than 45 µm. In certain embodiments, the thickness of the film is less than 35 µm. In some embodiments, the thickness of the film is less than 25 µm. In some other embodiments, the thickness of the film is less than 15 µm. In other embodiments, the thickness of the film is less than 5 µm. In yet other embodiments, the thickness of the film is less than 1 µm.

In some embodiments, the thickness of the film is about 1 µm to about 50 µm. In certain embodiments, the thickness of the film about 10 µm to about 50 µm. In some embodiments, the thickness of the film is about 20 µm to about 50 µm. In some other embodiments, the thickness of the film is about 30 µm to about 50 µm. In other embodiments, the thickness of the film is about 40 µm to about 50 µm.

In some embodiments, the thickness of the film is about 1 µm to about 40 µm. In certain embodiments, the thickness of the film about 10 µm to about 40 µm. In some embodiments, the thickness of the film is about 20 µm to about 40 µm. In some other embodiments, the thickness of the film is about 30 µm to about 40 µm. In other embodiments, the thickness of the film is about 20 µm to about 30 µm.

In some examples, set forth herein is a thin and free standing sintered garnet film, wherein the film thickness is less than 50 µm and greater than 10 nm, and wherein the film is substantially flat; and wherein the garnet is optionally bonded to a current collector (CC) film comprising a metal or metal powder on at least one side of the film.

In some examples, the thin and free standing sintered garnet film has thickness is less than 20 µm or less than 10 µm. In some examples, the thin and free standing sintered garnet film has a surface roughness of less than 5 µm. In some examples, the thin and free standing sintered garnet film has a surface roughness of less than 4 µm. In some examples, the thin and free standing sintered garnet film has a surface roughness of less than 2 µm. In some examples, the thin and free standing sintered garnet film has a surface roughness of less than 1 µm. In certain examples, the garnet has a median grain size of between 0.1 µm to 10 µm. In certain examples, the garnet has a median grain size of between 2.0 µm to 5.0 µm.

vi. Substrate Bound

In some of the films set forth herein, the film is bound to a substrate that is selected from a polymer, a glass, or a metal. In some of these examples, the substrate adhered to or bound to the film is a current collector (CC). In some of these examples, the CC film includes a metal selected from the group consisting of Nickel (Ni), Copper (Cu), steel, stainless steel, combinations thereof, and alloys thereof. In some of these examples, the film is bonded to a metal current collector (CC) on one side of the film. In some other examples, the film is bonded to a metal current collector (CC) on two sides of the film. In yet other examples, the CC is positioned between, and in contact with, two garnet films.

vii. Bi-Layers & Tri-Layers

Figure 3:
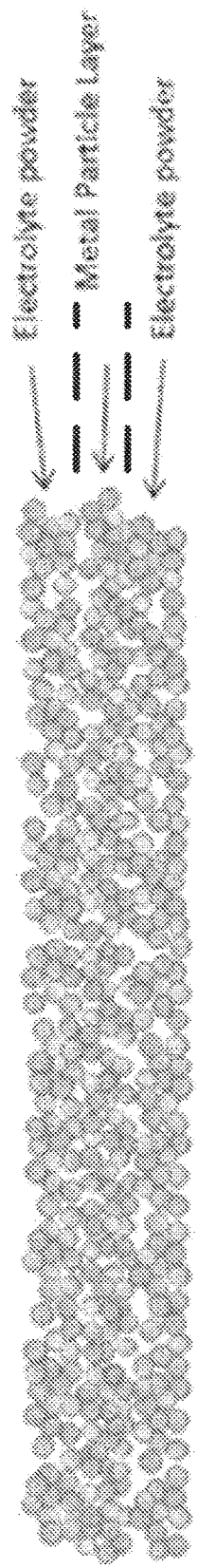
FIG. 3 shows a trilayer battery component wherein a metal layer (e.g., metal powder or foil) is positioned between and in contact with two electrolyte (e.g., Li-stuffed garnet) layers.
Figure 4:
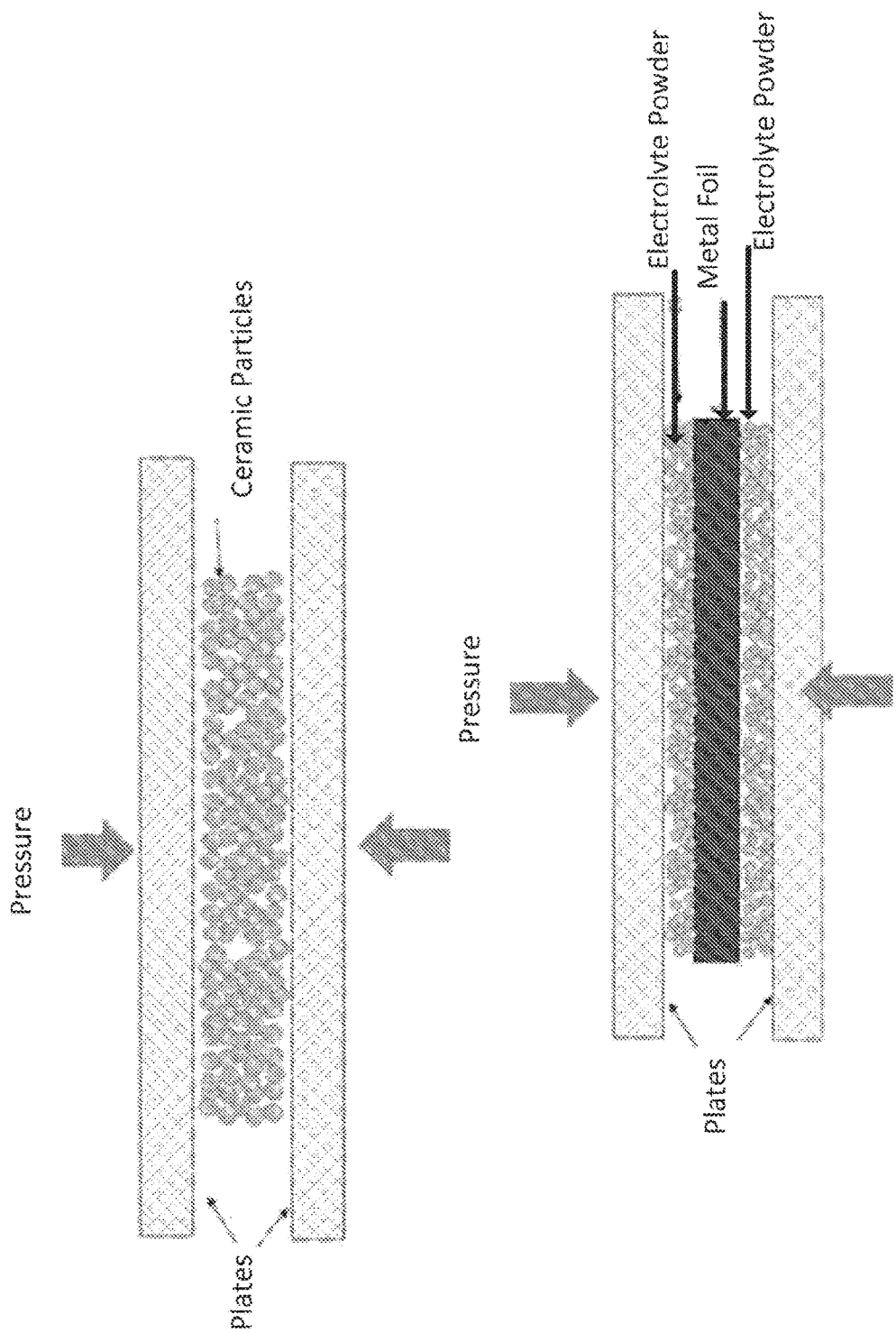
FIG. 4 shows a method of calcining or sintering garnet particles, or garnet-metal-garnet trilayers set forth herein, including applying pressure to the layer(s) during the calcining or sintering step using plates, which can be dye or setter plates.
Figure 29:
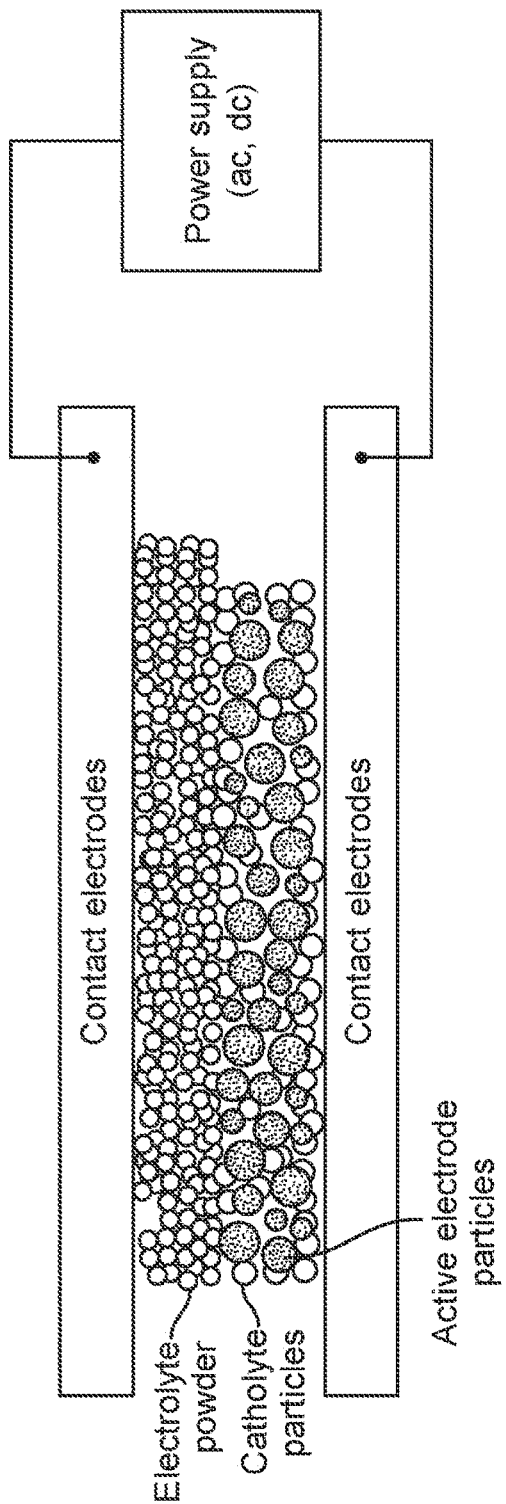
FIG. 29 shows an arrangement for FAST sintering of an electrolyte-cathode combination which would operate as a solid state battery.

In some examples, set forth herein is a trilayer including a metal foil or metal powder positioned between, and in contact with, two distinct lithium stuffed garnet thin films. In some examples, the middle layer is metal foil. In some other examples, the middle layer is a metal powder. In some examples, the metal is Ni. In other examples, the metal is Al. In still other examples, the metal is Fe. In some examples, the metal is steel or stainless steel. In some examples, the metal is an alloy or combination of Ni, Cu, Al, or Fe. In some examples, the trilayer has a structure as shown in FIG. 3. In some examples, the trilayer has a structure as shown in the bottom of FIG. 4. In some examples, the trilayer has a structure as shown in the bottom of FIG. 29. In some examples, the trilayer has a structure as shown FIG. 44(E)(F).

In some examples, set forth herein is a bilayer including a metal foil or metal powder positioned in contact with a lithium stuffed garnet thin film. In some examples, one layer of the bilayer is a metal foil. In other examples, one layer of the bilayer is a metal powder. In some examples, the metal is Ni. In other examples, the metal is Al. In still other examples, the metal is Fe. In some examples, the metal is steel or stainless steel. In some examples, the metal is an alloy or combination of Ni, Cu, Al, or Fe. In some examples, the bilayer has a structure as shown FIG. 44(C)(D). In some examples, the bilayer has the structure shown between the sintering plates in FIG. 20 or FIG. 21.

In some of the bilayers and trilayers described herein, the garnet is characterized by one of the following formula: $Li_A La_B M'_C M''_D Zr_E O_F$, $Li_A La_B M'_C M''_D Ta_E O_F$, $Li_A La_B M'_C M''_D Nb_E O_F$, wherein $4<A<8.5$, $1.5<B<4$, $0 \leq C \leq 2$, $0 \leq D \leq 2$; $0 \leq E < 2$, $10 < F \leq 13$, and M' and M'' are each, independently in each instance selected from Al, Mo, W, Nb, Sb, Ca, Ba, Sr, Ce, Hf, Rb, or Ta, or $Li_a La_b Zr_c Al_d Me''_e O_f$, wherein $5<a<7.7$; $2<b<4$; $0<c \leq 2.5$; $0 \leq d<2$; $0 \leq e<2$, $10<f \leq 13$ and Me'' is a metal selected from Nb, Ta, V, W, Mo, or Sb; $Li_A La_B M'_C M''_D Zr_E O_F$, wherein the molar ratio of Garnet:$Al_2O_3$ is between 0.05 and 0.7; or $Li_g La_3 Zr_2 O_{12}$—$Al_2O_3$, wherein $5.5<g<8.5$ and the molar ratio of Garnet:$Al_2O_3$ is between 0.05 and 1.0.

viii. Multi-Layers

In some examples, set forth herein are multiple stacks or combinations of the aforementioned layers, bilayers, and, or, trilayers. In some examples, two or more bilayers are stacked in serial combination. In some other examples, two or more trilayers are stacked in serial combination. In some examples, interposed between these serial combination stacks are cathode active materials, anode active materials, and, or, current collectors.

ix. Film Dimensions

In some examples, the thin films set forth herein are less than 50 µm in thickness. In some other examples, the thin films set forth herein are less than 45 µm in thickness. In certain examples, the thin films set forth herein are less than 40 µm in thickness. In still other examples, the thin films set forth herein are less than 35 µm in thickness. In some examples, the thin films set forth herein are less than 30 µm in thickness. In some other examples, the thin films set forth herein are less than 25 µm in thickness. In certain examples, the thin films set forth herein are less than 20 µm in thickness. In still other examples, the thin films set forth herein are less than 15 µm in thickness. In some examples, the thin films set forth herein are less than 10 µm in thickness. In some other examples, the thin films set forth herein are less than 5 µm in thickness. In certain examples, the thin films set forth herein are less than 0.5 µm in thickness. In still other examples, the thin films set forth herein are less than 0.1 µm in thickness.

In some examples, provided herein is a composition formulated as a thin film having a film thickness of about 100 nm to about 100 µm. In certain examples, the thickness is 50 µm. In other examples, the thickness is 40 µm. In some examples, the thickness is 30 µm. In other examples, the thickness is 20 µm. In certain examples, the thickness is 10 µm. In other examples, the thickness is 5 µm. In some examples, the thickness is 1 µm. In yet other examples, the thickness is 0.5 µm.

In some of these examples, the films are 1 mm in length. In some other of these examples, the films are 5 mm in length. In yet other examples, the films are 10 mm in length. In still other examples, the films are 15 mm in length. In certain examples, the films are 25 mm in length. In other examples, the films are 30 mm in length. In some examples, the films are 35 mm in length. In some other examples, the films are 40 mm in length. In still other examples, the films are 45 mm in length. In certain examples, the films are 50 mm in length. In other examples, the films are 30 mm in length. In some examples, the films are 55 mm in length. In some other examples, the films are 60 mm in length. In yet other examples, the films are 65 mm in length. In still other examples, the films are 70 mm in length. In certain examples, the films are 75 mm in length. In other examples, the films are 80 mm in length. In some examples, the films are 85 mm in length. In some other examples, the films are 90 mm in length. In still other examples, the films are 95 mm in length. In certain examples, the films are 100 mm in length. In other examples, the films are 30 mm in length.

In some examples, the films are 1 cm in length. In some other examples, the films are 2 cm in length. In other examples, the films are 3 cm in length. In yet other examples, the films are 4 cm in length. In some examples, the films are 5 cm in length. In other examples, the films are 6 cm in length. In yet other examples, the films are 7 cm in length. In some other examples, the films are 8 cm in length. In yet other examples, the films are 9 cm in length. In still other examples, the films are 10 cm in length. In some examples, the films are 11 cm in length. In some other examples, the films are 12 cm in length. In other examples, the films are 13 cm in length. In yet other examples, the films are 14 cm in length. In some examples, the films are 15 cm in length. In other examples, the films are 16 cm in length. In yet other examples, the films are 17 cm in length. In some other examples, the films are 18 cm in length. In yet other examples, the films are 19 cm in length. In still other examples, the films are 20 cm in length. In some examples, the films are 21 cm in length. In some other examples, the films are 22 cm in length. In other examples, the films are 23 cm in length. In yet other examples, the films are 24 cm in length. In some examples, the films are 25 cm in length. In other examples, the films are 26 cm in length. In yet other examples, the films are 27 cm in length. In some other examples, the films are 28 cm in length. In yet other examples, the films are 29 cm in length. In still other examples, the films are 30 cm in length. In some examples, the films are 31 cm in length. In some other examples, the films are 32 cm in length. In other examples, the films are 33 cm in length. In yet other examples, the films are 34 cm in length. In some examples, the films are 35 cm in length. In other examples, the films are 36 cm in length. In yet other examples, the films are 37 cm in length. In some other examples, the films are 38 cm in length. In yet other examples, the films are 39 cm in length. In still other examples, the films are 40 cm in length. In some examples, the films are 41 cm in length. In some other examples, the films are 42 cm in length. In other examples, the films are 43 cm in length. In yet other examples, the films are 44 cm in length. In some examples, the films are 45 cm in length. In other examples, the films are 46 cm in length. In yet other examples, the films are 47 cm in length. In some other examples, the films are 48 cm in length. In yet other examples, the films are 49 cm in length. In still other examples, the films are 50 cm in length. In some examples, the films are 51 cm in length. In some other examples, the films are 52 cm in length. In other examples, the films are 53 cm in length. In yet other examples, the films are 54 cm in length. In some examples, the films are 55 cm in length. In other examples, the films are 56 cm in length. In yet other examples, the films are 57 cm in length. In some other examples, the films are 58 cm in length. In yet other examples, the films are 59 cm in length. In still other examples, the films are 60 cm in length. In some examples, the films are 61 cm in length. In some other examples, the films are 62 cm in length. In other examples, the films are 63 cm in length. In yet other examples, the films are 64 cm in length. In some examples, the films are 65 cm in length. In other examples, the films are 66 cm in length. In yet other examples, the films are 67 cm in length. In some other examples, the films are 68 cm in length. In yet other examples, the films are 69 cm in length. In still other examples, the films are 70 cm in length. In some examples, the films are 71 cm in length. In some other examples, the films are 72 cm in length. In other examples, the films are 73 cm in length. In yet other examples, the films are 74 cm in length. In some examples, the films are 75 cm in length. In other examples, the films are 76 cm in length. In yet other examples, the films are 77 cm in length. In some other examples, the films are 78 cm in length. In yet other examples, the films are 79 cm in length. In still other examples, the films are 80 cm in length. In some examples, the films are 81 cm in length. In some other examples, the films are 82 cm in length. In other examples, the films are 83 cm in length. In yet other examples, the films are 84 cm in length. In some examples, the films are 85 cm in length. In other examples, the films are 86 cm in length. In yet other examples, the films are 87 cm in length. In some other examples, the films are 88 cm in length. In yet other examples, the films are 89 cm in length. In still other examples, the films are 90 cm in length. In some examples, the films are 91 cm in length. In some other examples, the films are 92 cm in length. In other examples, the films are 93 cm in length. In yet other examples, the films are 94 cm in length. In some examples, the films are 95 cm in length. In other examples, the films are 96 cm in length. In yet other examples, the films are 97 cm in length. In some other examples, the films are 98 cm in length. In yet other examples, the films are 99 cm in length. In still other examples, the films are 100 cm in length. In some examples, the films are 101 cm in length. In some other examples, the films are 102 cm in length. In other examples, the films are 103 cm in length. In yet other examples, the films are 104 cm in length. In some examples, the films are 105 cm in length. In other examples, the films are 106 cm in length. In yet other examples, the films are 107 cm in length. In some other examples, the films are 108 cm in length. In yet other examples, the films are 109 cm in length. In still other examples, the films are 110 cm in length. In some examples, the films are 111 cm in length. In some other examples, the films are 112 cm in length. In other examples, the films are 113 cm in length. In yet other examples, the films are 114 cm in length. In some examples, the films are 115 cm in length. In other examples, the films are 116 cm in length. In yet other examples, the films are 117 cm in length. In some other examples, the films are 118 cm in length. In yet other examples, the films are 119 cm in length. In still other examples, the films are 120 cm in length.

In some examples, the garnet-based films are prepared as a monolith useful for a lithium secondary battery cell. In some of these cells, the form factor for the garnet-based film is a film with a top surface area of about 10 cm². In certain cells, the form factor for the garnet-based film with a top surface area of about 100 cm².

In some examples, the films set forth herein have a Young's Modulus of about 130-150 GPa. In some other examples, the films set forth herein have a Vicker's hardness of about 5-7 GPa.

In some examples, the films set forth herein have a porosity less than 20%. In other examples, the films set forth herein have a porosity less than 10%. In yet other examples, the films set forth herein have a porosity less than 5%. In still other examples, the films set forth herein have a porosity less than 3%.

x. Composites

For Li secondary battery applications, energy density is, in part, inversely related to the amount of electrolyte, catholyte, and anolytes that may be present. As less electrolyte, catholyte, or anolyte materials are used in a given battery architecture volume, more positive electrode active materials (e.g., $FeF_3$, $CoF_2$, $NiF_2$, $CoF_2$) and more negative electrode materials (e.g., Li-metal) can be incorporated into the same volume and thereby increase the battery's energy density, e.g., energy per volume. It is therefore advantageous to use the methods set forth herein which, in some examples, result in film thicknesses less than 500 μm but greater than 1 nm, or less than 450 μm but greater than 1 nm, or less than 400 μm but greater than 1 nm, or less than 350 μm but greater than 1 nm, or less than 300 μm but greater than 1 nm, or less than 250 μm but greater than 1 nm, or less than 200 μm but greater than 1 nm, or less than 150 μm but greater than 1 nm, or less than 100 μm but greater than 1 nm, or less than 50 μm but greater than 1 nm, or less than 45 μm but greater than 1 nm, or less than 40 μm but greater than 1 nm, or less than 30 μm but greater than 1 nm, or less than 35 μm but greater than 1 nm, or less than 25 μm but greater than 1 nm, or less than 20 μm but greater than 1 nm, or less than 15 μm but greater than 1 nm, or less than 10 μm but greater than 1 nm, or less than 9 μm but greater than 1 nm, or less than 8 μm but greater than 1 nm, or less than 7 μm but greater than 1 nm, or less than 6 μm but greater than 1 nm, or less than 5 μm but greater than 1 nm, or less than 4 μm but greater than 1 nm, or less than 3 μm but greater than 1 nm, or less than 2 μm but greater than 1 nm, or less than 1 μm but greater than 1 nm, or less than 90 nm but greater than 1 nm, or less than 85 nm but greater than 1 nm, or less than 80 nm but greater than 1 nm, or less than 75 nm μm but greater than 1 nm, or less than 70 nm but greater than 1 nm, or less than 60 nm but greater than 1 nm, or less than 55 nm but greater than 1 nm, or less than 50 nm but greater than 1 nm, or less than 45 nm but greater than 1 nm, or less than 40 nm but greater than 1 nm, or less than 35 nm but greater than 1 nm, or less than 30 nm but greater than 1 nm, or less than 25 nm μm but greater than 1 nm, or less than 20 nm but greater than 1 nm, or less than 15 nm but greater than 1 nm, or less than 10 nm but greater than 1 nm, or less than 5 nm but greater than 1 nm, or less than 4 nm but greater than 1 nm, or less than 3 nm but greater than 1 nm, or less than 2 nm but greater than 1 nm.

In certain examples, the garnet materials set forth herein are combined with polymers. In these examples, the polymers include, but are not limited to, polyethylene oxide (PEO), polypropylene oxide (PPO), PEO-PPO block co-polymers, styrene-butadiene, polystyrene (PS), acrylates, diacrylates, methyl methacrylates, silicones, acrylamides, t-butyl acrylamide, styrenics, t-alpha methyl styrene, acrylonitriles, and vinyl acetates.

In the examples herein, wherein a binder is recited (e.g., in a slurry, or in an unsintered thin film) the binder may be selected from the group consisting of polypropylene (PP), polyvinyl butyral (PVB), polyvinyl pyrrolidone (PVP), atactic polypropylene (aPP), isotactive polypropylene ethylene propylene rubber (EPR), ethylene pentene copolymer (EPC), polyisobutylene (PIB), ZEON™, styrene butadiene rubber (SBR), polyolefins, polyethylene-co-poly-1-octene (PE-co-PO); PE-co-poly(methylene cyclopentane) (PE-co-PMCP); stereoblock polypropylenes, polypropylene polymethylpentene copolymer and silicone.

II. Lithium Secondary Batteries

In some examples, the disclosure herein sets forth batteries that have a catholyte, an electrolyte, and, or, an anolyte comprised of a lithium stuffed garnet set forth herein.

A. Battery Architectures

In some examples, the batteries described herein include a positive electrode (e.g., cathode) active material coated on two sides of a current collector substrate. In these examples, a garnet electrolyte can also be coated onto, or within, the cathode active material.

In some examples, the disclosure herein sets forth a composite electrochemical device prepared by a method set forth herein; wherein the device includes: at least one layer including a member selected from the group consisting of an active electrode material, a lithium stuffed garnet electrolyte or catholyte, a conductive additive, and combinations thereof. In some examples, the device also includes least one layer including a Garnet-type electrolyte.

In another embodiment, the disclosure sets forth herein a layered material for an electrochemical device, including at least one layer including an anode and an anode current collector; at least one layer including a garnet solid state electrolyte (SSE); at least one layer including a porous garnet in contact with the garnet SSE; wherein the porous garnet is optionally infiltrated with at least one member selected from the group consisting of carbon, a lithium conducting polymer, an active cathode material, and combinations thereof; and at least one layer including an Aluminum cathode current collector in contact with the porous Garnet, wherein the porous Garnet layer is at least 70% porous by volume; wherein the Garnet is a material selected from $Li_4La_BM'_CM''_DZr_EO_F$, $Li_4La_BM'_CM''_DTa_EO_F$, $Li_4La_B$-$M'_CM''_DNb_EO_F$, wherein $4<A<8.5$, $1.5<B<4$, $0\leq C\leq 2$, $0\leq D\leq 2$; $0\leq E<2$, $10<F<14$, and M' and M'' are each, independently in each instance selected from Al, Mo, W, Nb, Sb, Ca, Ba, Sr, Ce, Hf, Rb, or Ta, or $Li_aLa_bZr_cAl_dMe''_eO_f$, wherein $5<a<7.7$; $2<b<4$; $0<c\leq 2.5$; $0\leq d<2$; $0\leq e<2$, $10<f<14$ and Me'' is a metal selected from Nb, Ta, V, W, Mo, or Sb; and wherein the active electrode material is a cathode material selected from NCA (lithium nickel cobalt aluminum oxide), LMNO (lithium manganese nickel oxide), NMC (lithium nickel manganese cobalt oxide), LCO (lithium cobalt oxide, i.e., $LiCoO_2$), nickel fluoride ($NiF_x$, wherein x is from 0 to 2.5), copper fluoride ($CuF_y$, wherein y is from 0 to 2.5), or $FeF_z$ (wherein z is selected from 0 to 3.5). In some examples, $10<F<13$. In some examples, $0<c\leq 2$.

b. Battery Components Suitable for Use with Garnet Catholytes, Electrolytes, and Catholytes.

Current collectors which are suitable for use with the garnet materials set forth herein include metal foils, metal sheets, metal wires, and metal powders wherein the metal is a member selected from the group consisting of aluminum, copper, gold, nickel, cobalt, steel, stainless steel, lithium metal, alloys, mixtures, or combinations thereof. In some examples, provided herein is an electrochemical device having an electrolyte composed of a lithium stuffed garnet doped with alumina, as described in this application. In some examples, provided herein is an electrochemical device having a catholyte composed of a lithium stuffed garnet doped with alumina, as described in this application.

In some embodiments disclosed herein, the electrode includes conductive additive that is carbon. In certain embodiments, the carbon is a member selected from the group consisting of ketjen black, VGCF, acetylene black, graphite, graphene, nanotubes, nanofibers, the like, and combinations thereof. In certain embodiments, the carbon is ketjen black. In certain other embodiments, the carbon is VGCF. In yet other embodiments, the carbon is acetylene black. In other embodiments, the carbon is graphite. In some embodiments, the carbon is graphene. In other embodiments, the carbon is nanotube. In other embodiments, the carbon is nanofibers.

c. Cathode Materials Suitable for Use with the Garnet Materials Set Forth Herein The garnet materials described herein are suitable for use with a variety of cathode or positive electrode active materials. In particular, garnets are useful as catholytes and electrolytes because they are chemically compatible with conversion chemistry cathode active materials such as, but not limited to, those active materials set forth in U.S. Nonprovisional patent application Ser. No. 13/922,214, entitled NANOSTRUCTURED MATERIALS FOR ELECTROCHEMICAL CONVERSION REACTIONS, filed Jun. 19, 2013; also U.S. Nonprovisional patent application Ser. No. 14/272,518, entitled PROTECTIVE COATINGS FOR CONVERSION MATERIAL CATHODES, filed May 8, 2014; also U.S. Provisional Patent Application No. 62/027,908, entitled HYBRID ELECTRODES WITH BOTH INTERCALATION AND CONVERSION MATERIALS, filed Jul. 23, 2014; and also U.S. Nonprovisional patent application Ser. No. 14/090,990, entitled Iron Oxyfluoride Electrodes for Energy Storage, filed Nov. 26, 2013; also U.S. Nonprovisional patent application Ser. No. 14/063,966, entitled METAL FLUORIDE COMPOSITIONS FOR SELF-FORMED BATTERIES, filed Oct. 25, 2013. The content of these patent applications is herein incorporated by reference in their entirety for all purposes.

The garnet materials described herein are also suitable for use with other catholyte and electrolyte materials such as, but not limited to, those catholyte and electrolyte materials set forth in International PCT Patent Application No. PCT/US14/38283, entitled SOLID STATE CATHOLYTE OR ELECTROLYTE FOR BATTERY USING $Li_AMP_B S_C$ (M=Si, Ge, and/or Sn), filed May 15, 2014.

Active electrode material suitable for use with the components, devices, and methods set forth herein include, without limitation, NCA (lithium nickel cobalt aluminum oxide), NMC (lithium nickel manganese cobalt oxide), LMNO (lithium manganese nickel oxide), LCO (lithium cobalt oxide, i.e., $LiCoO_2$), nickel fluoride (NiFx, wherein x is from 0 to 2.5), copper fluoride ($CuF_y$, wherein y is from 0 to 2.5), or $FeF_z$ (wherein z is selected from 0 to 3.5). In certain embodiments, the active electrode material is a material for a cathode. In certain embodiments, the active cathode electrode material is NCA (lithium nickel cobalt aluminum oxide). In certain other embodiments, the active cathode electrode material is LMNO (lithium manganese nickel oxide). In yet other embodiments, the active cathode electrode material is LCO (lithium cobalt oxide, i.e., $LiCoO_2$). In yet other embodiments, the active cathode electrode material is NMC. In still certain other embodiments, the active cathode electrode material is nickel fluoride ($NiF_x$, wherein x is from 0 to 2.5). In some other embodiments, the active cathode electrode material is copper fluoride ($CuF_y$, wherein y is from 0 to 2.5). In certain other embodiments, the active cathode electrode material is or $FeF_z$ (wherein z is selected from 0 to 3.5).

III. Methods of Making the Materials Described Herein

A. Thin Film Lithium Conducting Powder Material from Deposition Flux

In some examples, set forth herein is a process for making a battery component that includes a ceramic electrolyte material (e.g., lithium stuffed garnet powder or film) wherein one or more flux materials, having a melting point lower than 400° C. is used to mixture, dissolve, and, or, density the ceramic onto or around a substrate.

In some examples, a ceramic electrolyte powder material, or component thereof, is mixed with two or more flux materials at a temperature of less than 400° C. to form a fluxed powder material. This fluxed powder material is shaped and heated again at a temperature less than 400° C. to form a dense lithium conducting material.

The deposition methods set forth herein are suitable for depositing materials, such as but not limited to, garnets, lithium stuffed garnets, perovskites, NASICON and LISICON structures.

In some examples, the deposition methods includes providing a lithium conducting ceramic powder material at a specified quantity and density. In certain examples, the powder is characterized by, or milled to, a mean particle size of about 100 nm to 10 μm. In some examples, the mean particle size is 800 nm to 2 μm. In some of these examples, a flux material is provided at a second specified quantity and density. In certain examples, the secondly provided flux material is less than 51% (w/w) of the first powder material. This flux material is typically a lithium-containing material which melts between about 500° C. to 800° C. Additional flux materials may also be provided in the reaction mixture. In some examples, the powders and flux materials, in various combinations, are mixed to form eutectic mixtures. In some of these examples, the eutectic mixtures have a melting point less than 500° C. In some further examples, the eutectic mixtures are heated to temperature of about 100 to 500° C. In some examples, the heated mixtures are mixed. In still other examples, the mixtures are then heated and formed into shapes, such as but not limited to, sheets, thick films (greater than 100 μm thick), thin films (less than 100 μm thick) rolls, spheres, discs, sheets, pellets, and cylinders. Following a reaction time and, or, additional heating, the powders and flux materials are optionally cooled. In some examples, the flux is separated or removed from the products formed therein using a solvent such as, but not limited to, water, acetone, ethanol, or combinations thereof. In some examples, the additional heating is to temperatures less than 500° C. This methods, and variants thereof, result in dense lithium conducting ceramic powders, which are often 20% more dense than the starting density of the reactants and, or, fluxes. In certain examples, the powders and flux materials include, but are not limited to, formed garnets, such as $Li_7La_3Zr_2O_{12}$, and oxides, such as LiOH, $La_2O_3$, $ZrO_2$. In certain examples, the garnet powders are formed by mixing garnet precursors such as, but not limited to, LiOH, $L_2CO_3$, $La_2O_3$, $ZrO_2$, $Nb_2O_5$, $Ta_2O_5$, Al-nitrate, Al-nitrate hydrate, or combinations thereof.

In some examples, the garnet materials set forth herein are prepared by mixing garnet precursors such as, but not limited to, LiOH, $La_2O_3$, $ZrO_2$, $Nb_2O_5$, $Ta_2O_5$, Al-nitrate, or combinations thereof, to form a mixture. Next, the mixture is calcined at temperatures of 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., or 1450° C. In some examples, the mixture is calcined at 800° C., 850° C., 900° C., 950° C., 1000° C., 1050° C., or 1100° C. In some examples, the mixture is calcined at 800° C. In some examples, the mixture is calcined at 850° C. In some examples, the mixture is calcined at 900° C. In some examples, the mixture is calcined at 950° C. In some examples, the mixture is calcined at 1000° C. In some examples, the mixture is calcined at 1050° C. In some examples, the mixture is calcined at 1100° C. In some of these examples the mixture is calcined for 1, 2, 3, 4, 5, 6, 7, 8, 9, or 10 hours. In some examples, the mixture is calcined for 4, 5, 6, 7, or 8 hours. In some examples, the mixture is calcined for 4 hours. In some examples, the mixture is calcined for 5 hours. In some examples, the mixture is calcined for 6 hours. In some examples, the mixture is calcined for 7 hours. In these examples, the calcination temperature is achieved by a heating ramp rate of about 1 C/min or about 5 C/min or about 10 C/min. In some of these examples, the calcined mixture is then milled to break-up any mixture agglomerates. In some of these examples, the calcined mixture is then milled to reduce the mean primary particle size. In certain examples, the milled calcined mixture is then sintered at temperatures of 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., or 1450° C. In some examples, the sintering is at temperatures of 1000° C., 1050° C., 1100° C., 1150° C., 1200° C., 1250° C., 1300° C., 1350° C., 1400° C., or 1450° C. In some examples, the sintering is at temperatures of 1000° C., 1200° C., or 1400° C. In these examples, the sintering is for 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 minutes.

In some examples, the flux includes inorganic salts, such as lithium, sodium, potassium, and rubidium salts. For example, LiF, LiCl, LiBr, and, or, LiI. In some examples, the flux includes inorganic oxides, such as LiOH, $Li_2CO_3$. Flux may also include alkali metal hydroxides, chlorides, nitrates, sulphates, and combinations thereof. Certain combinations that are useful include mixtures of any one or more members selected from the group consisting of LiOH, LiCl, LiBr, LiI, $LiNO_3$, $LiSO_4$, $Li_2O$—$SiO_2$, $Li_2O$—$B_2O_3$, $Li_2O$—PbO, $Li_2O$—$Bi_2O_3$, NaOH, NaCl, $NaNO_3$, $NaSO_4$, NaBr, $Na_2CO_3$, KOH, KCl, $KNO_3$, $KSO_4$, KBr, and $K_2CO_3$.

Flux include eutectic mixtures of materials, wherein the eutectic mixture has a lower melting point than the melting point any of the constituent components of the mixture. For example, a mixture having 0.3LiOH and 0.7NaOH melts around 250° C., which is lower than the melting point for either LiOH or NaOH.

In some examples, the powders, fluxes, and reaction mixtures are deposited onto current collectors, positive electrodes, negative electrodes, or electrolytes.

In some examples, powders synthesized herein are mixed with flux components in order to dissolve the powders in the flux components. These fluxes having dissolved powders are cast onto a substrate to form a film having a thickness between about 10 nm and about 250 μm. In some examples, the casting onto a substrate is accomplished through slot casting, doctor blade casting, or by dip coating a substrate into the flux.

In some other examples, powders synthesized herein are mixed with flux components and also a liquid or solvent in order to prepare a slurry of these components. The slurry is then cast onto a substrate to form a film having a thickness between about 10 nm and about 250 μm. In some examples, the casting onto a substrate is accomplished through slot casting, doctor blade casting, or by dip coating a substrate into the flux. The slurry is then dried to remove the solvent and, optionally, melt and mix the flux components and the powders. In some examples, the heating is accomplished at 1° C./min and to a temperature of about 200° C., or about 250° C., or about 300° C., or about 350° C., or about 350° C., or about 400° C., or about 450° C., or about 500° C. In some examples, more flux than synthesized powders are used so as to completely dissolve the powders in the flux. In other examples, more synthesized powders than flux is used to as not to dissolve all of the powders in the flux.

In some examples, positive electrode active materials are mixed with garnet powders and also flux components to form a mixture. This mixture can be deposited onto one, two, or more sides of a current collector. Once the flux is processed, as set forth herein, and optionally removed, an intimate mixture of garnet materials and active materials remain in direct contact with a current collector.

In any of these examples, the substrate, e.g., current collector, can be coated with a garnet material optionally including a positive electrode active material by dip coating the substrate into a flux having the garnet, garnet precursors, active material, or combinations thereof. In any of these examples, the substrate, e.g., current collector, can be coated with a garnet material optionally including a positive electrode active material by casting the flux having the garnet, garnet precursors, active material, or combinations thereof onto the substrate. In these examples, casting can be doctor blade casting. In these examples, casting can be slot casting. In these examples, casting can be dip coating.

In some examples, the methods herein include providing a lithium conducting ceramic powder material in a eutectic mixture of one or more flux materials; heating the mixture to a temperature of about 400° C. to about 800° C.; optionally casting the flux material; and forming a dense lithium conducting garnet material. In some examples, the formed material is 20% or more dense than the precursors thereto. In some examples two flux materials are used, in which the first flux is one or more materials selected from LiOH, LiCl, LiBr, LiNO$_3$, LiSO$_4$, or combinations thereof, and in which the second flux is one or more materials selected from NaOH, NaCl, NaNO$_3$, NaSO$_3$, NaSO$_4$, NaBr, Na$_2$CO$_3$, or combinations thereof. In some examples, the powder material is a lithium stuffed garnet. In some examples, the powder material optionally includes a perovskite material. In some examples, the powder material includes NASICON, LISICON, or a Tungsten/Bronze material. In some examples a third flux is provided in this method and is one or more materials selected from KOH, KCl, KNO$_3$, KSO$_4$, KBr, and, or, K$_2$CO$_3$.

Additional details, examples, and embodiments of these methods of making garnet materials is found, for example, in U.S. Provisional Patent Application No. 61/887,451, filed Oct. 7, 2013, entitled METHOD AND SYSTEM FOR FORMING GARNET MATERIALS WITH SINTERING PROCESS, the contents of which are herein incorporated by reference in their entirety for all purposes.

As shown in FIG. 1, in some examples precursors are, optionally milled and, mixed with a flux (step a) and heated to dissolve the precursors in the flux (step b). The flux with dissolved precursors is cast (step c) and calcined (step d) to react the precursors and for larger and more crystalline particles (step e) which are densified by the flux. In some examples, the flux is removed (step f).

b. Solutions and Slurries

In some examples, the methods herein include the use of solutions and slurries which are cast or deposited onto substrates. In certain examples, garnet precursors are milled according to the milling methods set forth herein. In some examples, these precursors are formulated into a slurry. In some examples, these milled precursors are formulated into a slurry. After milling, in some examples, the precursors are formulated into coating formulations, e.g., slurries with binders and solvents. These slurries and formulations solvents, binders, dispersants, and surfactants. In some examples, the binder polyvinyl butyral (PVB) and the solvent is toluene and/or ethanol and/or diacetone alcohol. In some examples, PVB is both a binder and a dispersant. In some examples, the binders also include PVB, PVP, Ethyl Cellulose, Celluloses, PVA, and PVDF. In some examples, the dispersants include surfactants, fish oil, fluorosurfactants, Triton, PVB, and PVP. In some slurries, 10% to 60% by weight (w/w) of the slurry is solid precursors. Binders and dispersants can each, in some slurries, make up 50% w/w of the slurry, with solvents comprising the remainder weight percentages.

In some examples disclosed herein, slurries include a conductive additive that is carbon. In certain embodiments, the carbon is a member selected from the group consisting of ketjen black, VGCF, acetylene black, graphite, graphene, nanotubes, nanofibers, the like, and combinations thereof. In certain embodiments, the carbon is ketjen black. In certain other embodiments, the carbon is VGCF. In yet other embodiments, the carbon is acetylene black. In other embodiments, the carbon is graphite. In some embodiments, the carbon is graphene. In other embodiments, the carbon is nanotube. In other embodiments, the carbon is nanofibers.

In some examples, the solvent is selected from toluene, ethanol, toluene:ethanol, or combinations thereof. In certain embodiments disclosed herein, the binder is polyvinyl butyral (PVB). In certain embodiments disclosed herein, the binder is polypropylene carbonate. In certain embodiments disclosed herein, the binder is a polymethylmethacrylate.

In some examples, the solvent is toluene, ethanol, toluene:ethanol, or combinations thereof. In some examples, the binder is polyvinyl butyral (PVB). In other examples, the binder is polypropylene carbonate. In yet other examples, the binder is a polymethylmethacrylate.

In some embodiments disclosed herein, the removing the solvent includes evaporating the solvent. In some of these embodiments, the removing the solvent includes heating the film. In some embodiments, the removing includes using a reduced atmosphere. In still other embodiments, the removing includes using a vacuum to drive off the solvent. In yet other embodiments, the removing includes heating the film and using a vacuum to drive off the solvent.

c. Catholytes

As shown in FIG. 25, one method of making an embodiment of an invention disclosed herein includes depositing a dense, solid state separator electrolyte for the anode and optionally sintering the electrolyte. In some embodiments, the method also includes depositing a porous garnet catholyte and sintering the catholyte to achieve greater than 70% porosity. In some embodiments, the method also includes filling the porous catholyte with less than 10 volume % carbon by a method selected from chemical vapor deposition (CVD), pyrolysis, or a related technique. In some embodiments, the method also includes filling the porous catholyte with an ion conductive flowable material such as liquid, gel, or polymer. In some embodiments, the method also includes filling with the active material. In certain embodiments, the methods achieves an active material loading greater than 40 volume %. In some embodiments, the methods also include laminating or evaporating the cathode current collector.

In some embodiments, disclosed herein is a method for making a composite electrochemical device, including the following steps in any order: providing an anode layer comprising an anode current collector; providing a Garnet-type solid state electrolyte (SSE) layer in contact with at least one side of the anode layer and optionally sintering the SSE; providing a porous Garnet layer in contact with the SSE layer and optionally sintering the porous Garnet layer; optionally infiltrating the porous Garnet layer with at least one member selected from the group consisting of carbon, a lithium conducting polymer, an active cathode material, and combinations thereof; and providing a cathode current collector layer in contact with the porous Garnet layer. In some examples, these steps are performed sequentially in the order in which they are recited.

In some examples, the methods set forth herein further include providing a layer of a Garnet-type solid state electrolyte (SSE) on two independent sides of the anode current collector layer.

In some examples, the sintering includes heat sintering or field assisted sintering (FAST); wherein heat sintering comprises heating the Garnet in the range from about 800° C. to about 1200° C. for about 1 to about 600 minutes; and wherein FAST sintering comprises heating the Garnet in the range from about 600° C. to about 800° C. and applying a D.C. or A.C. electric field to the Garnet.

In some examples, the infiltrating the porous Garnet layer with carbon includes using chemical vapor deposition (CVD) or pyrolysis.

In some examples, the infiltrating the porous Garnet layer with an active material includes using vapor/liquid deposition or electrophoretic deposition.

In some examples, the providing a cathode current collector in contact with the porous Garnet layer includes laminating, electroplating or evaporating the current collector onto the porous Garnet layer.

In some examples, the porous Garnet layer is at least 70% porous by volume after it is sintered.

In some examples, the porous Garnet layer is characterized by a Li conductivity of 1e-3 S/cm or greater at 60° C. In some examples, the lithium conductive polymer is characterized by a Li conductivity of 1e-4 S/cm or greater at 60° C. In those examples wherein a material set forth herein is characterized by a Li conductivity of 1e-4 S/cm or greater at 60° C., the conductivity is a measurement of the bulk conductivity. In some of these examples, the conductivity is measured so that the conduction occurs through the material but unaffected by the porosity of the material.

In some examples, the porous Garnet layer has pores with average pore diameter dimensions of about 5 nm to about 1 μm.

In some examples, the polymer is stable at voltages greater than about 3.8V.

In some examples, the porous Garnet layer is characterized by a conductivity of about $\sigma_i$>1e-3 S/cm at 60° C.

In some examples, the porous Garnet layer is infiltrated with the active cathode material in an amount greater than 40% by volume. In some examples, the porous Garnet layer is infiltrated with the active cathode material in an amount greater than 55% by volume.

In some examples, the Garnet is stable at voltages of about 1.3V to about 4.5V.

In some examples, the Garnet is a material selected from $Li_4La_BM'_CM''_DZr_EO_F$, $Li_4La_BM'_CM''_DTa_EO_F$, $Li_4La_BM'_CM''_DNb_EO_F$, wherein 4<A<8.5, 1.5<B<4, 0≤C≤2, 0≤D≤2; 0≤E<2, 10<F<13, and M' and M" are each, independently in each instance selected from Al, Mo, W, Nb, Sb, Ca, Ba, Sr, Ce, Hf, Rb, or Ta, or $Li_aLa_bZr_cAl_dMe''_eO_f$, wherein 5<a<7.7; 2<b<4; 0<c≤2.5; 0≤d<2; 0≤e<2, 10<f<13 and Me" is a metal selected from Nb, Ta, V, W, Mo, or Sb.

In some examples, the active electrode material is a cathode material selected from NCA (lithium nickel cobalt aluminum oxide), LMNO (lithium manganese nickel oxide), LCO (lithium cobalt oxide, i.e., $LiCoO_2$), NMC, nickel fluoride ($NiF_x$, wherein x is from 0 to 2.5), copper fluoride ($CuF_y$, wherein y is from 0 to 2.5), or $FeF_z$ (wherein z is selected from 0 to 3.5).

In some examples, disclosed herein is an electrochemical device prepared by a methods set forth herein.

Figure 27:
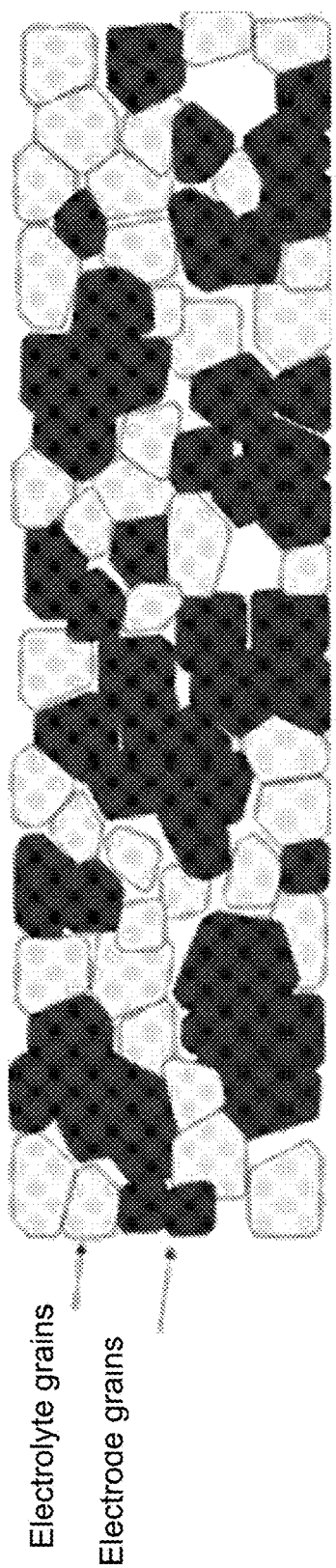
FIG. 27 shows a schematic of an example fully sintered solid state composite electrode.
Figure 28:
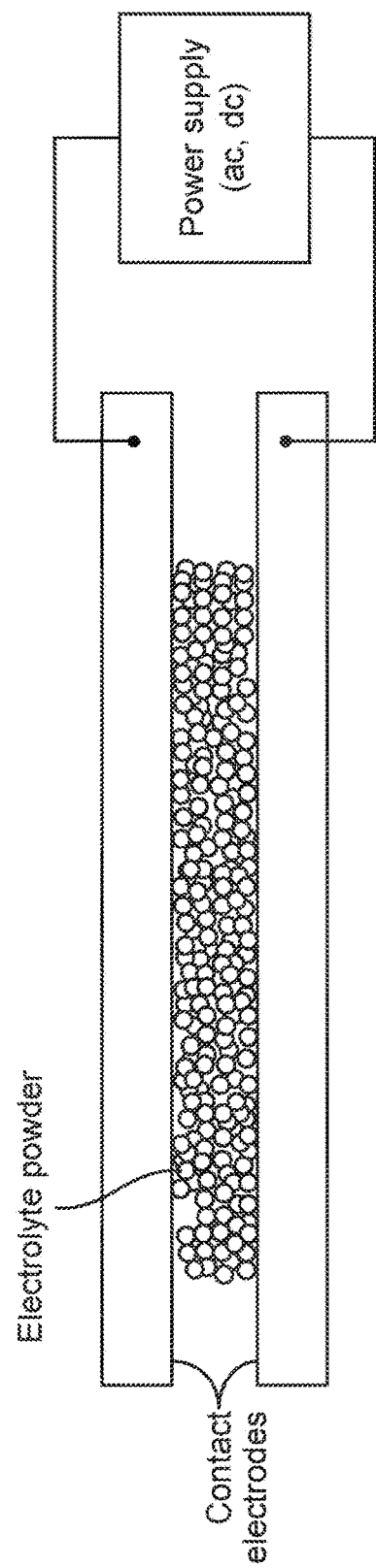
FIG. 28 shows an arrangement for FAST sintering of an electrolyte membrane for use in a Li-ion solid state battery

As shown in FIG. 27 and FIG. 29, the methods set forth herein processes for preparing a composite electrode for a solid state battery composed of active electrode materials with interspersed electrolyte particles prior to any sintering treatment. In some embodiments, the layer can also contain an electrically conductive additive (e.g. carbon).

Figure 31:
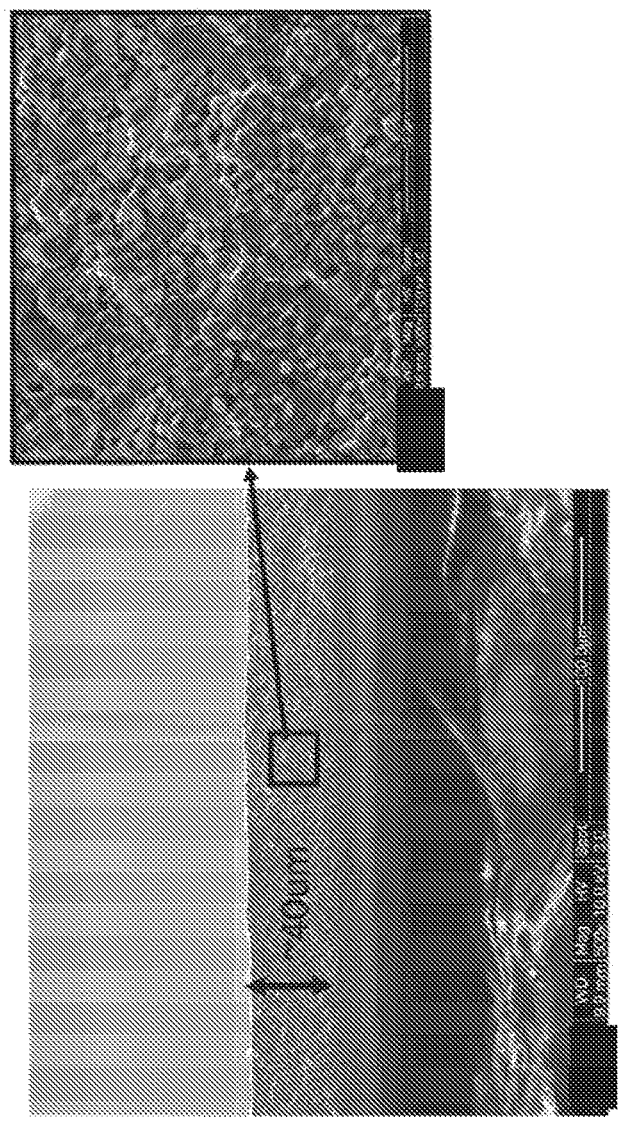
FIG. 31 shows a SEM image of a 40 micron thick free standing (i.e., no substrate) garnet membrane (left side) prepared by sintering the unsintered film between supporting setter plates also composed of garnet material.
Figure 32:
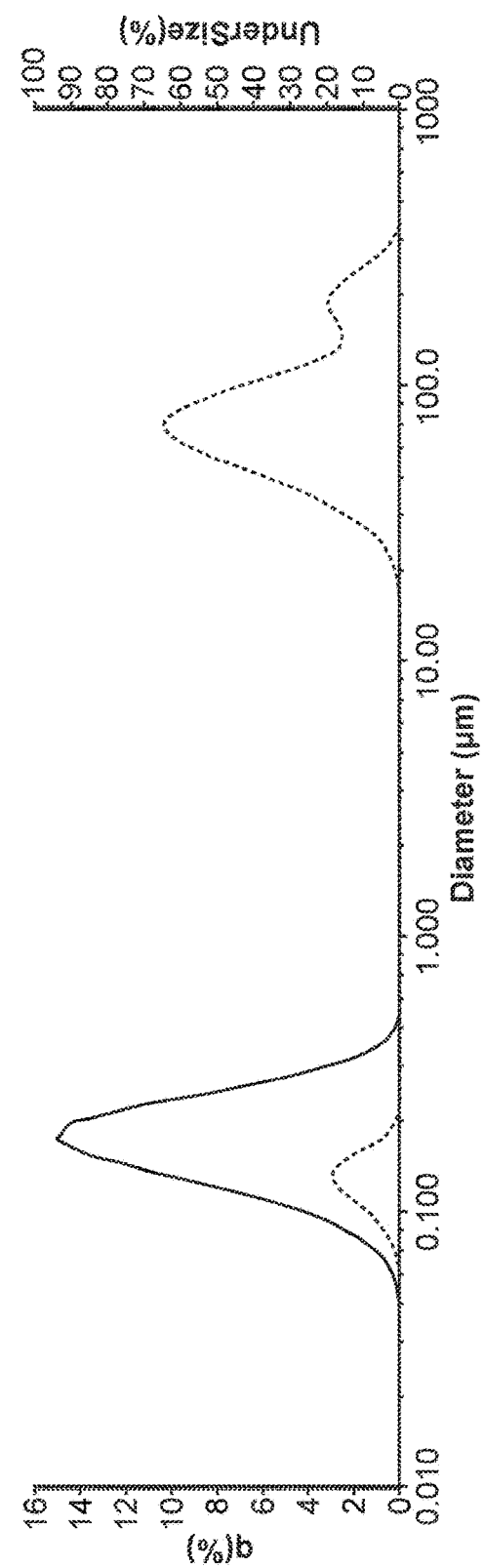
FIG. 32 shows the particle size distribution of garnet precursor powders before and after milling.
Figure 33:
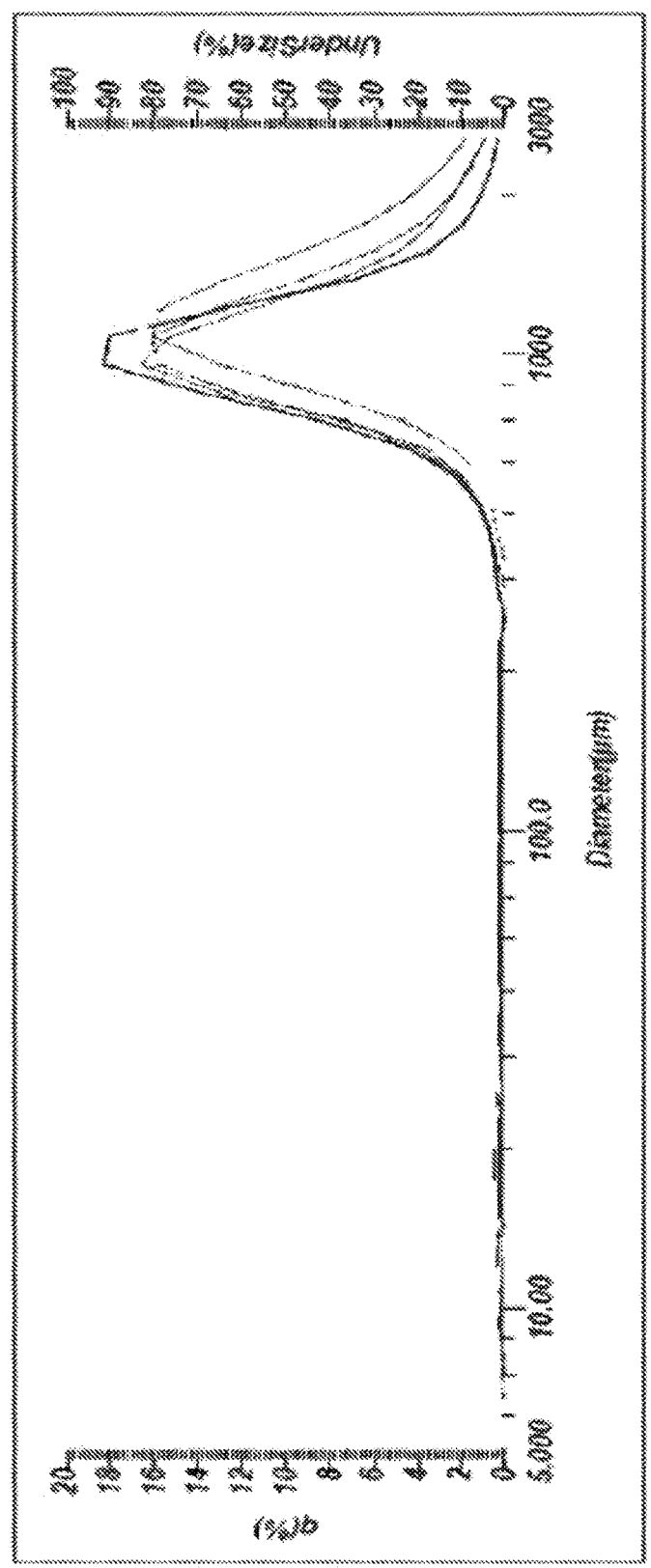
FIG. 33 shows the particle size distribution of Lithium Hydroxide and Lanthanum Oxide powders before milling.
Figure 34:
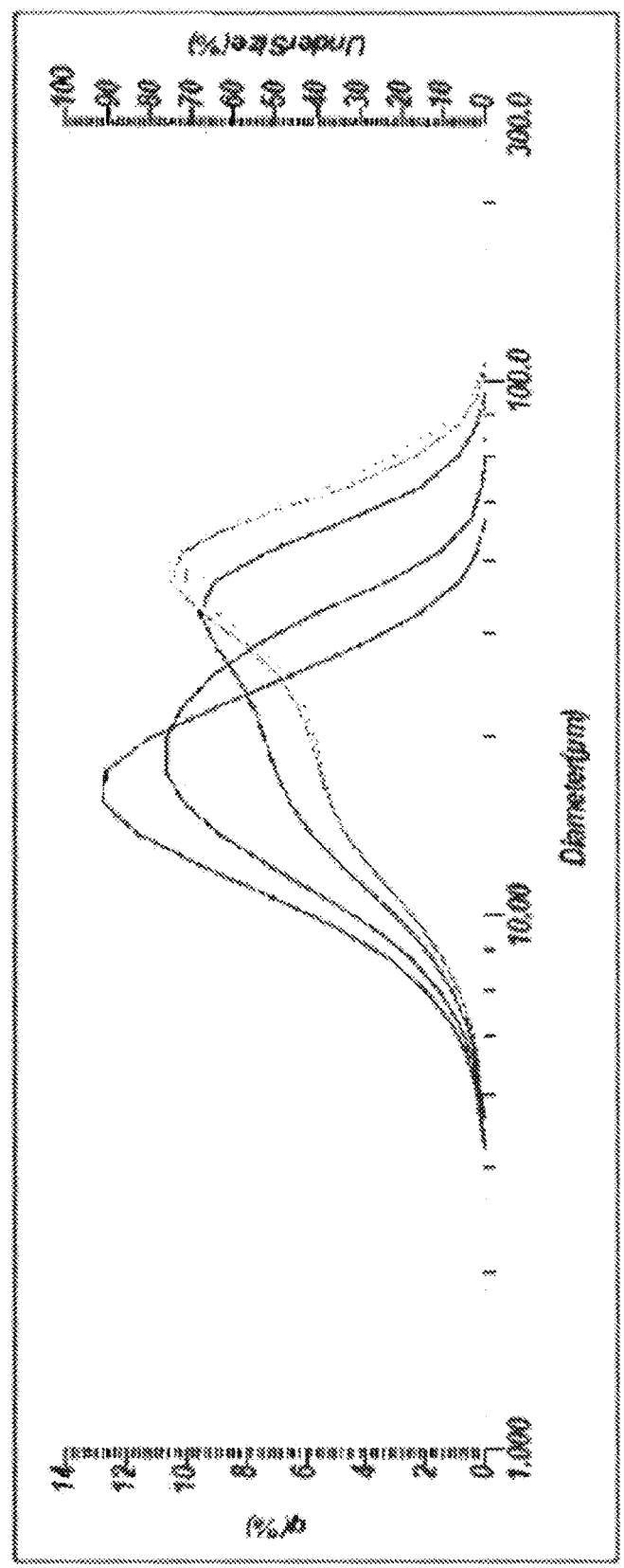
FIG. 34 shows the particle size distribution of Lithium Hydroxide and Lanthanum Oxide after milling.
Figure 35:
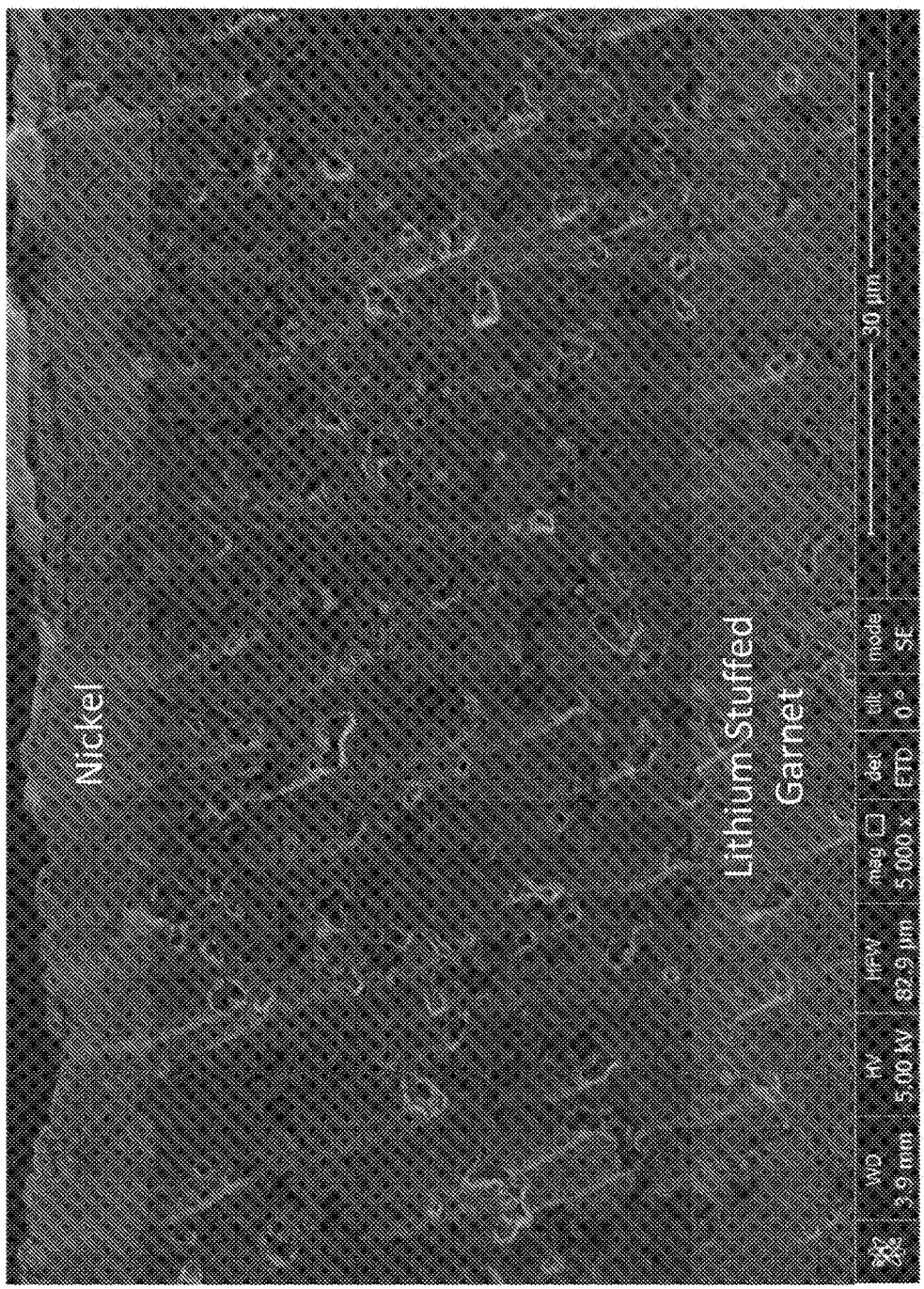
FIG. 35 shows cross sectional SEM of a garnet film bilayer formed by sintering garnet powder. The top layer is Ni (nickel) and the bottom layer is a lithium stuffed garnet. Scale bar is 30 μm.
Figure 36:
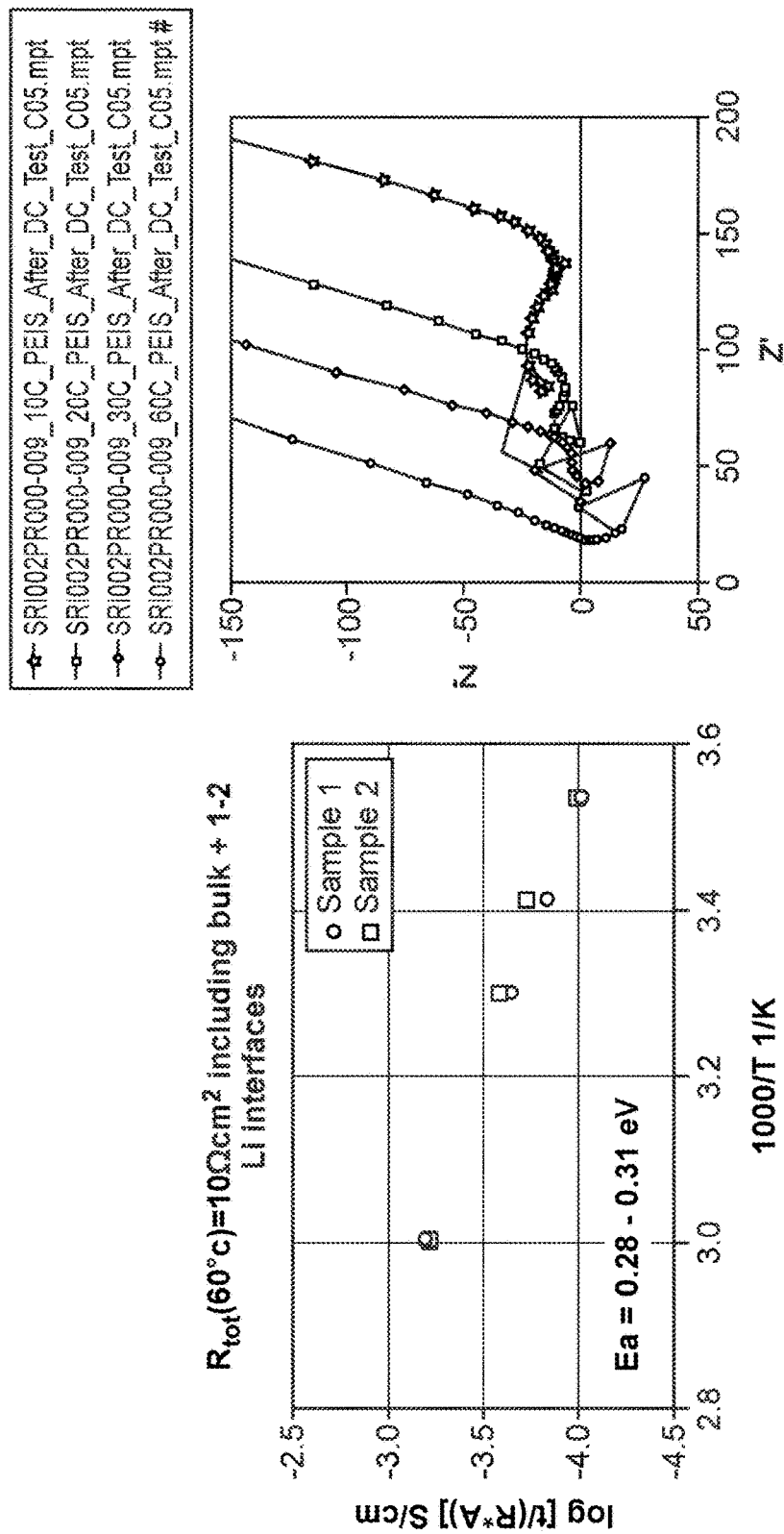
FIG. 36 shows conductivity plots for the bilayer of FIG. 35.
Figure 40:
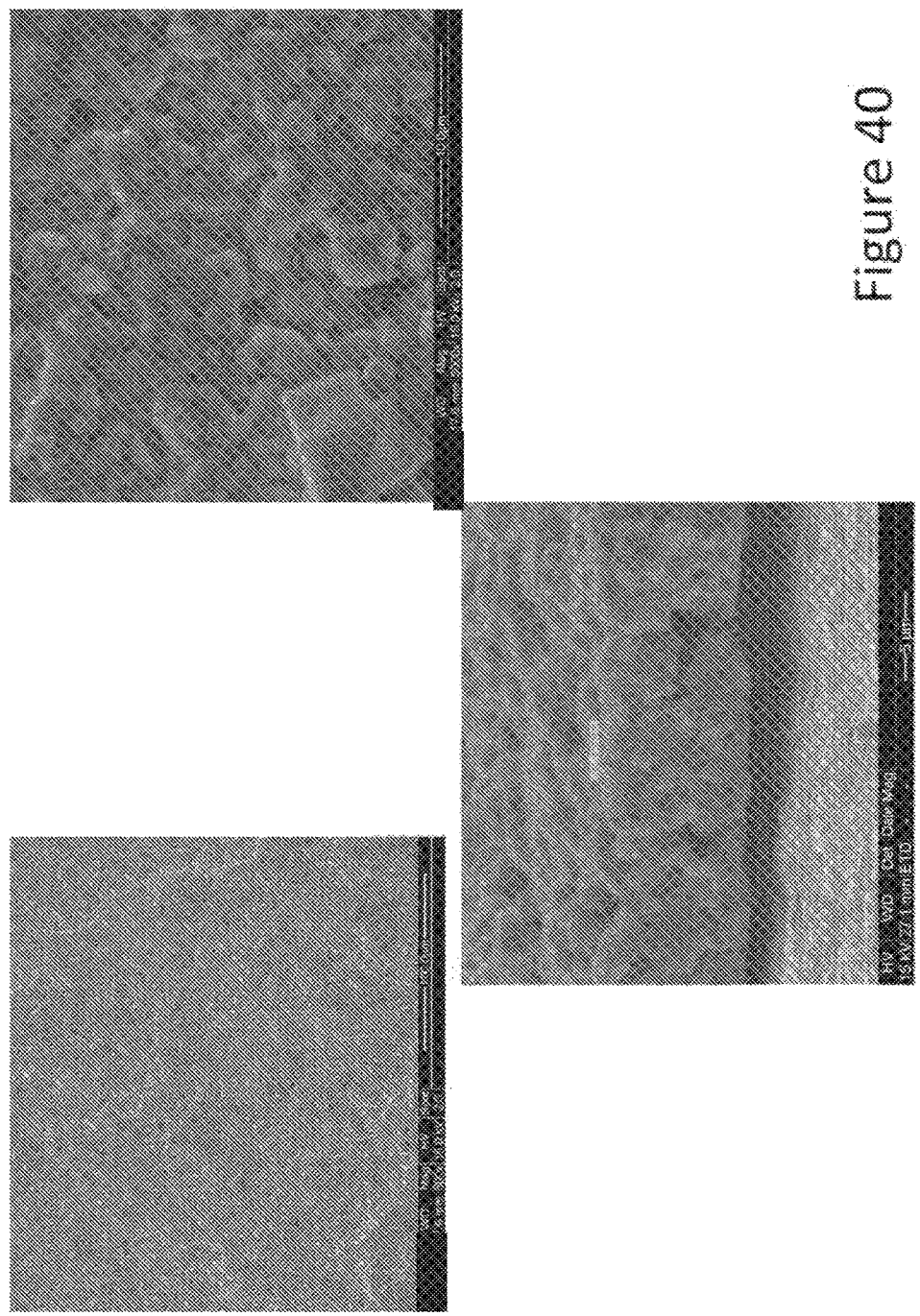
FIG. 40 shows reaction sintered $Li_7La_3Zr_2O_{12}$ using 25% w/w lithium stuffed garnet precursors and 75% w/w lithium stuffed garnet powder. Scale bar for top left image is 100 μm; Scale bar for top right image is 10 μm; Scale bar for bottom image is 5 μm. Film prepared by doctor-blading with 5 mil slot gap.

As shown in FIG. 31, the electrolyte and electrode materials have improved interfacial contact after sintering occurs. In some embodiments, a free-standing, bilayer, or trilayer garnet film, set forth herein, is bonded to Lithium. The Li-garnet interface in these examples has an unexpectedly low area specific resistance (ASR). In some examples, the ASR is less than 5 Ohm cm² at 80° C. In some examples, the ASR is less than 100 Ohm cm² at 80° C. In some examples, the ASR is about 1 Ohm cm² at 80° C. In some examples, the ASR is less than 6 Ohm cm² at 80° C.

In some embodiments, Li is evaporated or laminated to a sintered garnet film (free standing, bilayer, or trilayer) and has a low ASR. In some examples, the ASR is less than 5 Ohm cm² at 80° C. In some examples, the ASR is less than 100 Ohm cm² at 80° C. In some examples, the ASR is about 1 Ohm cm² at 80° C. In some examples, the ASR is less than 6 Ohm cm² at 80° C.

As shown in FIG. 15, FIG. 16, FIG. 17, FIG. 20, FIG. 21, and FIG. 28 setter plates can be used to sinter particles with the use of a power supply that can apply in some examples, an A.C. current, and in some other examples, a D.C. current.

As shown in FIG. 4, electrochemical devices can be prepared by the sintering methods set forth herein. In FIG. 4, for example, an electrolyte powder, catholyte particles (e.g., Garnet catholyte), and active electrode particles (e.g., cathode active particles) can be layered and mixed and then sintered according to the novel methods set forth herein.

In some examples, the films set forth herein can be initially formed in the "green" (unsintered) state by preparing a slurry of the powdered ceramic component(s) (e.g. electrolyte: Lithium stuffed garnet, Lithium Lanthanum, Zirconium Oxide; electrode: Lithium-Nickel-Manganese-Cobalt oxide) with an organic binder-solvent system (e.g. polyvinyl butyral in toluene:ethanol). In some examples of the composite electrode, in addition to the electrolyte and active electrode material, a conductive additive such as carbon black can also be added to increase electrical conductivity in the final product. The slurry can be cast as a thin layer typically of thickness 10-100 μm. The solvent is evaporated to leave behind a flexible membrane which is easily handled and can be laminated to other such layers by applying a small pressure (<1000 psi) at modest temperature (80° C.). For example, a green composite thin film of a Li-conducting garnet electrolyte and a high voltage cathode material (NMC) is shown, for examples in FIG. 27.

Some of the example methods set forth herein include heat sintering.

Figure 30:
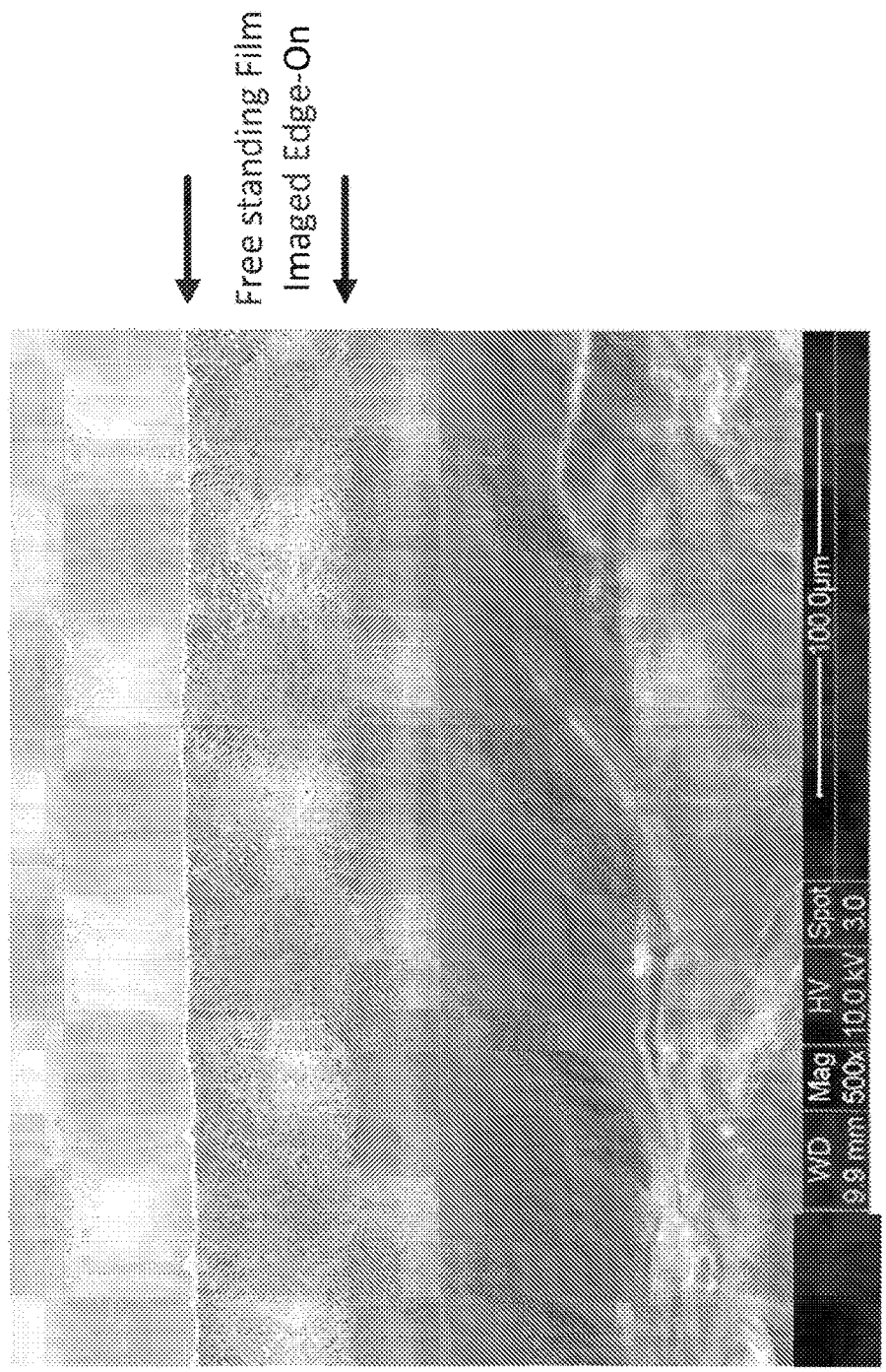

In some examples, after a binder burnout step to remove the binder (e.g., PVB) a composite electrode such as that shown in FIG. 27 can be heated to an elevated temperature (e.g. 800-1200 C) and held for a period of time (1-600 mins) to induce sintering of the particles to form a much denser matrix. In some of these examples, the grains of the individual components will fuse together to significantly increase their contact area, for example as shown in FIG. 27. In some examples, it is advantageous to use finely milled powder, especially for the electrolyte component, as this increases sintering kinetics and permits densification at lower temperatures. To maintain the flatness of a thin membrane under this process the films can be sandwiched between inert setter plates such as porous zirconia. This not only keeps the films laminar, but provides a pathway for release of the binder decomposition products. The resulting microstructure of the sintered electrode composite is shown in FIG. 30, FIG. 31, for example.

Some of the example methods set forth herein include field assisted sintering (i.e., FAST) sintering One drawback of the conventional sintering process is that it requires extended dwell times at elevated temperatures where several detrimental phenomena can occur. For example, Lithium is a highly volatile species and can evaporate from the solid state electrolyte material thereby reducing its ionic conductivity, inducing surface depleted layers of high resistance or even causing decomposition of the material. In the case of the composite layers, the electrolyte and electrode components will continue to interact once the grains have fused together and they may interdiffuse to such an extent that the electrochemical properties of the individual components are lost i.e. the electrolyte may lose its ionic conductivity, or the electrode may lose it propensity to store the active ion (e.g. Lithium). Therefore, to overcome all these problems, it is advantageous to make the sintering process as fast as possible. In some examples, this is achieved using field assisted sintering.

FIG. 16, FIG. 17, FIG. 18, FIG. 19, FIG. 20, FIG. 21, FIG. 22 show schematic representations of the arrangement to FAST sinter an electrolyte membrane at lower temperatures (e.g., 600-800° C., or less) or (400-1000° C.) than the conventional sintering process (~1100° C.) is disclosed herein. The membrane is sandwiched between two conductive metal plates, while held in an oven at a modest temperature (800 C) where Lithium evaporation is not significant. An electric field is then applied to the sample to induce FAST sintering. The field can be a D.C. field or an A.C. field. In some examples, the A.C. field is advantageous as a sufficiently high frequency can be selected so that the ionic species do not segregate significantly under the stimulus. Power delivery to the sample must be controlled to avoid excessive joule heating of the material. In some examples, this can be accomplished by initially operating in a constant voltage amplitude mode and switching to constant current once the sintering begins and the impedance of the sample falls. The electrolyte membrane can be sintered to full density in a much shorter time and at a lower temperature than the conventional process.

In some examples, FAST sintering also overcomes the problem of interdiffusion in the composite electrode layers. FIG. 29 shows a schematic illustration of the arrangement of a full solid state battery configuration under FAST sintering. The electrolyte layer is laminated to the composite electrode layer prior to sintering. The benefit of the FAST sintering process is that the voltage drop (i.e., the electric field) is distributed preferentially over the high impedance regions, which will always be the areas of poor contact (i.e., non-sintered regions). Therefore, once two particles sinter together, the contact between the constituent particles improves and the resistance drops. Consequently, the E-field distribution shifts to a neighboring unsintered particles. In this way the driving force for sintering is shifted away from grains that are already fused together and further interdiffusion is limited.

These sintering methods are advantageous for solid state batteries and components thereof, which do not include liquid electrolytes, on account of fast sintering times, limited interdiffusion between the components in a composite electrode, and also the ability to prepare a full solid state battery arrangement.

d. Doped Compositions

In some examples, provided herein are methods for making a lithium stuffed garnet doped with aluminum, the methods comprising providing garnet precursors at predetermined combination. In some examples, the methods further include milling the combination for 5 to 10 hours. In other examples, the methods further comprising calcining the combination in vessels at about 500° C. to about 1200° C. for about 4 to about 10 hours to form a garnet. In other examples, the methods further include milling the formed garnet until the $d_{50}$ particle size is between 200 and 400 nm. In still other examples, the methods further include mixing the milled forming garnet with a binder to form a slurry. In some of these examples, before the slurry is sintered, the methods include providing a green film by casting the slurry as a film. In other examples, the methods further include filtering the slurry. In still other examples, the methods further include optionally providing pellets of filtered slurry. In some of these examples, before the slurry is sintered, the methods include providing a green film by casting the slurry. In still other examples, the methods further include sintering the filtered slurry. In the examples wherein the slurry is sintered, sintering includes applying pressure to the slurry with setting plates, heating the slurry under flowing inert gas between 140° C. and 400° C. for about 1 to about 6 hours, and either heat sintering or field assisted sintering for about 10 minutes to about 10 hours.

In certain examples, the garnet precursor are selected from LiOH, $La_2O_3$, $ZrO_2$ and $Al(NO_3)_3.9H_2O$.

In some examples, the garnet precursors are calcined in vessels is at 900° for 6 hours. In certain examples, the vessels are Alumina (i.e., $Al_2O_3$) vessels.

In certain examples, the milling the formed garnet is conducted until the $d_{50}$ particle size of the formed garnet is about 300 nm. In certain other examples, the milling the formed garnet is conducted until the $d_{50}$ particle size of the formed garnet is about 100 nm. In some examples, the milling the formed garnet is conducted until the $d_{50}$ particle size of the formed garnet is about 200 nm. In certain examples, the milling the formed garnet is conducted until the $d_{50}$ particle size of the formed garnet is about 250 nm. In certain examples, the milling the formed garnet is conducted until the $d_{50}$ particle size of the formed garnet is about 350 nm. In certain examples, the milling the formed garnet is conducted until the $d_{50}$ particle size of the formed garnet is about 400 nm.

In some examples, the mixing the milled forming garnet with a binder to form a slurry includes about 4% w/w binder. In some examples, the binder is polyvinyl butyral.

In some examples, the filtering the slurry includes filtering with an 80 mesh sieve.

In some examples, the providing pellets of filtered slurry includes providing pellets having a 13 mm diameter. In some examples, the pellets have a 10 mm, 11 mm, 12 mm, 13 mm, 14 mm, 15 mm, 16 mm, 17 mm, 18 mm, 19 mm, or 20 mm diameter.

In some examples, the applying pressure to the slurry with setting plates includes applying a pressure of 3 metric tons. In some other examples, the applying pressure to the slurry with setting plates includes applying a pressure of 2 metric tons. In some examples, the applying pressure to the slurry with setting plates includes applying a pressure of 1 metric tons. In some examples, the applying pressure to the slurry with setting plates includes applying a pressure of 3.5 metric tons.

In some examples, the setter plates are Pt setter plates. In other examples, the setter plates are garnet setter plates. In certain examples, the setter plates are porous setter plates. In yet other examples, the setter plates are porous garnet setter plates. In yet other examples, the setter plates are porous zirconia setter plates.

In some examples, the methods include flowing inert gas as an Argon gas flowing at a flow rate or 315 sccm.

In some examples, the methods set forth herein include heating the slurry under flowing inert gas including separate dwells at 160° C. and 330° C. for 2 hours (hrs) each under a humidified Argon flow.

e. Fine Grain Lithium Stuffed Garnets

In some examples, provided herein are methods of making thin films with fine grains of lithium stuffed garnets doped with alumina. In some examples, in order to make these fine grains, the films described herein are heat sintered at a maximum temperature of 1150° C. In some examples, in order to make these fine grains, the films described herein are heat sintered at a maximum temperature of 1150° C. for no more than 6 hours. In some examples, in order to make these fine grains, the films described herein are heat sintered at a maximum temperature of 1075° C. In some examples, in order to make these fine grains, the films described herein are heat sintered at a maximum temperature of 1075° C. for no more than 6 hours. In certain examples, when the films are only sintered for 15 minutes, heat sintering temperatures of 1200° C., at a maximum, are used.

Grains grow larger as temperature is increased. Also, grains grow larger at a given temperature while the dwell time at that temperature is increased. For this reason, the methods set forth herein include heat sintering at temperatures less than 1200° C., or less than 1150° C., or less than 1075° C. In some of these examples, the methods set forth herein include heat sintering at these temperatures for no more than 6 hours. In some examples, the methods set forth herein include heating sintering for no more than 15 minutes. In some other examples, the methods set forth herein include heat sintering at 1050° C. In some other examples, the methods set forth herein include heat sintering at 1000° C. In some other examples, the methods set forth herein include heat sintering at 950° C. In some other examples, the methods set forth herein include heat sintering at 900° C. In some other examples, the methods set forth herein include heat sintering at 850° C. In some other examples, the methods set forth herein include heat sintering at 800° C. In some other examples, the methods set forth herein include heat sintering at 750° C. In some other examples, the methods set forth herein include heat sintering at 700° C. In some other examples, the methods set forth herein include heat sintering at 650° C. In some other examples, the methods set forth herein include heat sintering at 600° C. In some other examples, the methods set forth herein include heat sintering at 550° C. In some other examples, the methods set forth herein include heat sintering at 500° C. In some other examples, the methods set forth herein include heat sintering at 450° C. In some other examples, the methods set forth herein include heat sintering at 400° C. In some other examples, the methods set forth herein include heat sintering at 350° C. In some other examples, the methods set forth herein include heat sintering at 300° C. In some other examples, the methods set forth herein include heat sintering at 250° C. In some other examples, the methods set forth herein include heat sintering at 200° C. In some other examples, the methods set forth herein include heat sintering at 150° C.

In some examples, smaller amounts of Li in the lithium stuffed garnet lead to smaller grains in the films set forth herein f. Casting In some examples, the slurries set forth herein are deposited onto substrates using casting techniques including slot dye coating, slot casting, doctor blade casting, mold casting, roll coating, gravure, microgravure, screen printing, flexoprinting, and/or other related methods.

Other casting methods are set forth in U.S. Provisional Patent Application No. 61/887,451, filed Oct. 7, 2013, entitled METHOD AND SYSTEM FOR FORMING GARNET MATERIALS WITH SINTERING PROCESS, and U.S. Provisional Patent Application No. 61/926,910, filed Jan. 13, 2014, entitled GARNET THIN FILM ELECTROLYTE, and U.S. Provisional Patent Application No. 62/007,417, filed Jun. 4, 2014, entitled METHODS AND SYSTEMS FOR FORMING GARNET MATERIAL WITH REACTIVE SINTERING, and U.S. Provisional Patent Application No. 62/026,271, filed Jul. 18, 2014, entitled FINE GRAINED LITHIUM-ION CONDUCTING THIN FILM GARNET CERAMICS, and U.S. Provisional Patent Application No. 62/026,440, filed Jul. 18, 2014, entitled GARNET CATHOLYTE AND SINTERING OF SOLID STATE ELECTROCHEMICAL DEVICES AND COMPONENTS. Each of these provisional patent applications is incorporated by reference herein for all purposes in their entirety.

g. Sintering Methods

While certain solid state ionic conductors can be sintered in a conventional process by pressing small pellets, which are approximately 10 mm in diameter and 2 mm thick in thickness, known methods for making thin films of garnet based materials are insufficient for battery applications, which require film lateral dimensions of approximately 10 cm and between 100 nm to 50 μm in thickness.

Sintering thin films, particularly films that include garnet (e.g., lithium-stuffed garnet), using applied electrical currents and voltages is inherently challenging. In part, this is related to the resistive heating that occurs in the garnet material when current flows there-through and thereby causes a sintering effect. For example, when electricity is used to sinter garnet, as is done with FAST sintering, the electricity resistively heats and sinters the garnet material primarily where the impedance is the greatest. As the garnet is sintered and the impedance decreases, the resistive heat associated with an electrical current passing through the garnet also decreases. As the impedance decreases in certain portions of the garnet material, the passed electrical current primarily takes the path of least resistance (i.e., the path where the impedance is lowest) and does not resistively heat the unsintered portions of the garnet where the impedance is significantly higher. As more garnet sinters, and the impedance decreases, it becomes more difficult to sinter the remaining unsintered portions of the garnet and particularly so where the impedance is greatest due to the garnet portions where the impedance is smallest.

Figure 15:
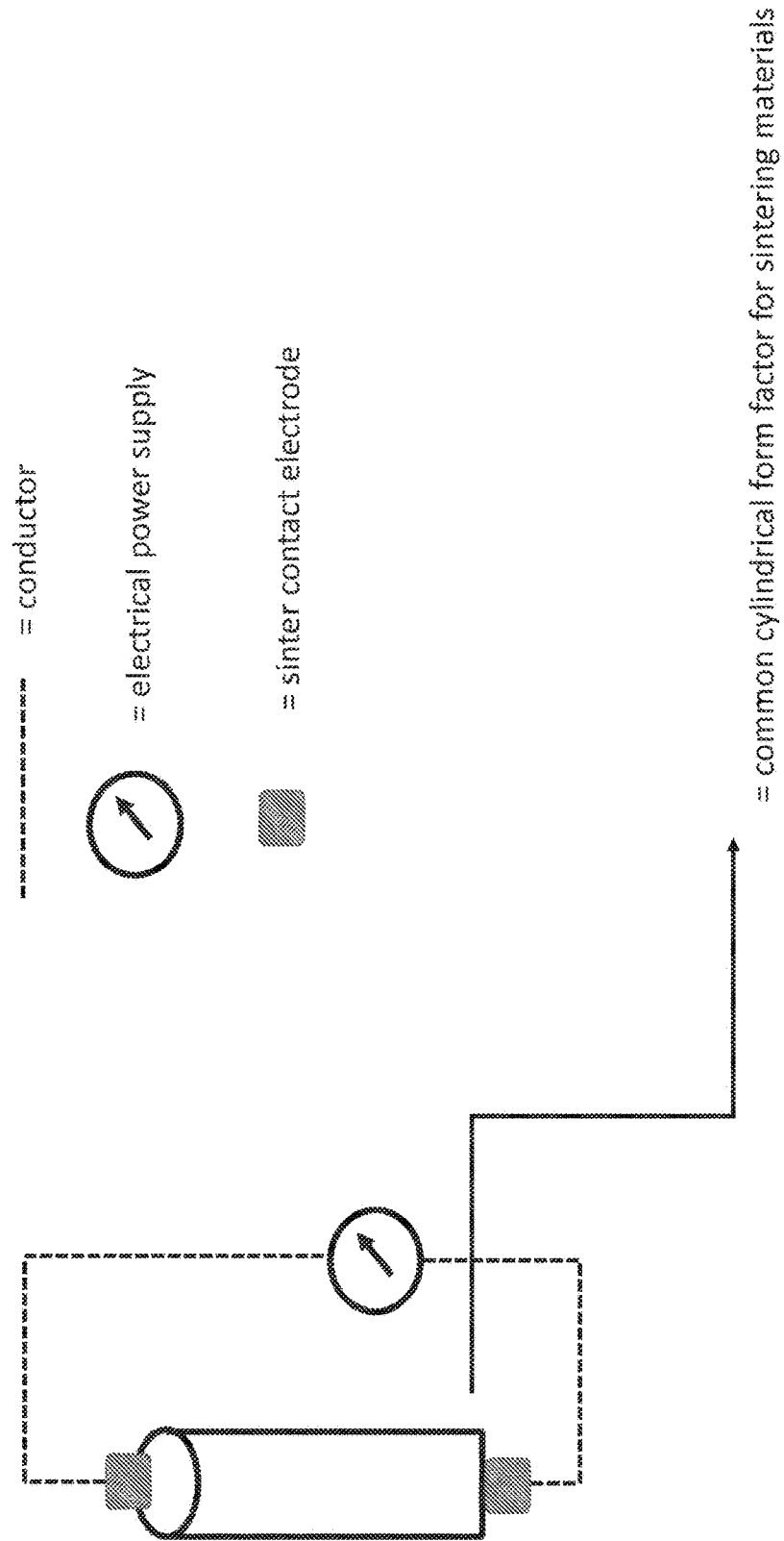
FIG. 15 shows an example of sintering a cylindrical form factor material.

In order to overcome this challenge, some persons use a cylindrical form factor such as that shown in FIG. 15. By directing an applied electrical current between electrodes spaced at the extreme longitudinal ends of a cylinder, these persons overcome the aforementioned challenges since the electrical current passes through the longest portion of the sintering material. However, for several of the applications considered herein and with the instant patent application, a form factors that is a thin film is required. In some examples, this form factor is rectangular with respect to its shape. In some other examples, this form factor is rectangular-like with respect to its shape. These films, thin films, and rectangular-like form factors are difficult to sinter in part because the electrodes, through which an electrical current is applied, do not transmit electricity through the longest portion of the film sample. For thin films, the applied electrical current passes through the z-direction of the film, which is one of the shorter paths through the bulk of the material.

In addition to the aforementioned challenges, for many applications it is preferable that the thin film densify primarily in the z-direction and not in the x- or y-directions (as shown in FIG. 23). This means that the shrinkage of the film is primarily in the z-direction and more so than in either the x- or the y-direction. Accomplishing this type of densification and shrinkage is also a challenge met by the instant application. The present application sets forth several sintering methods for overcoming these and other sintering challenges.

Figure 24:
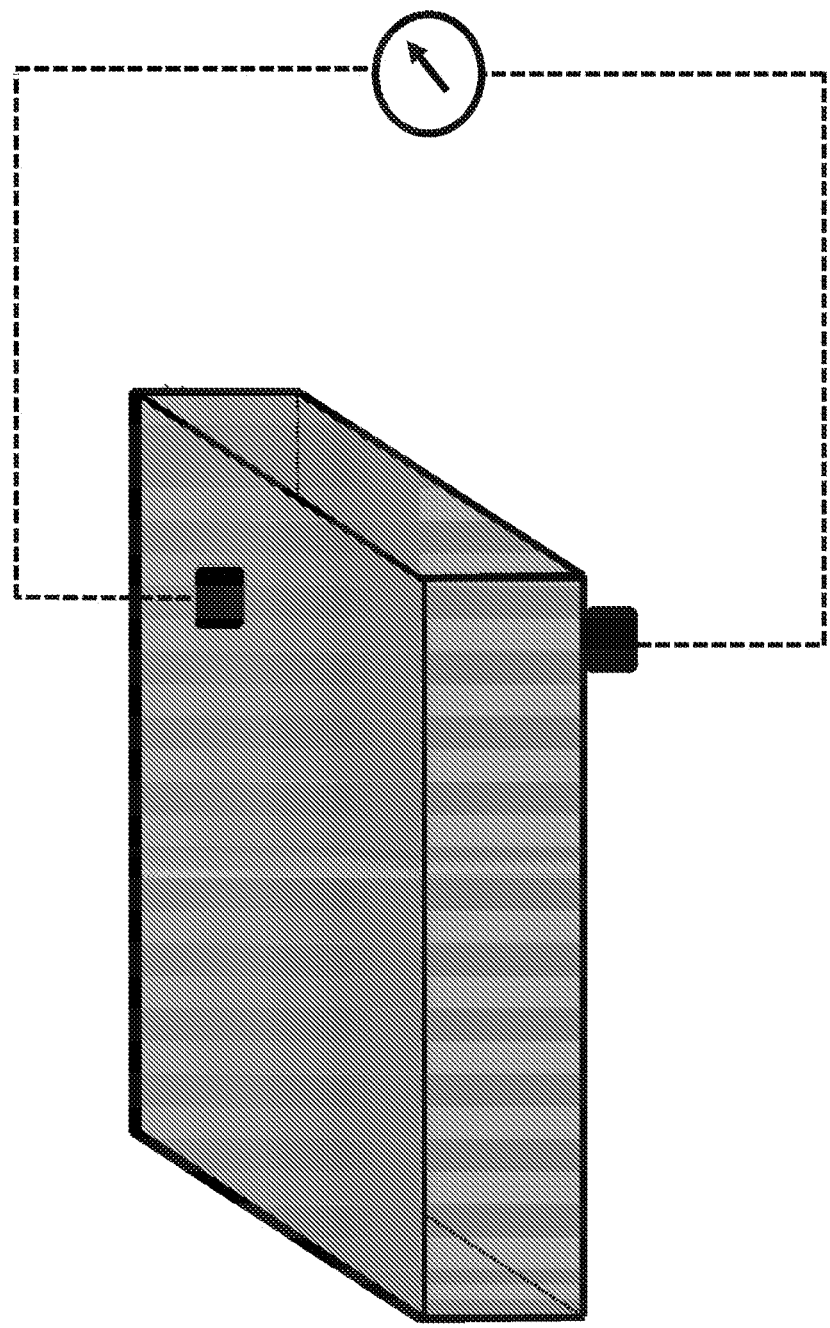
FIG. 24 illustrates sintering wherein a current is conducted through a sintering film.
Figure 45:
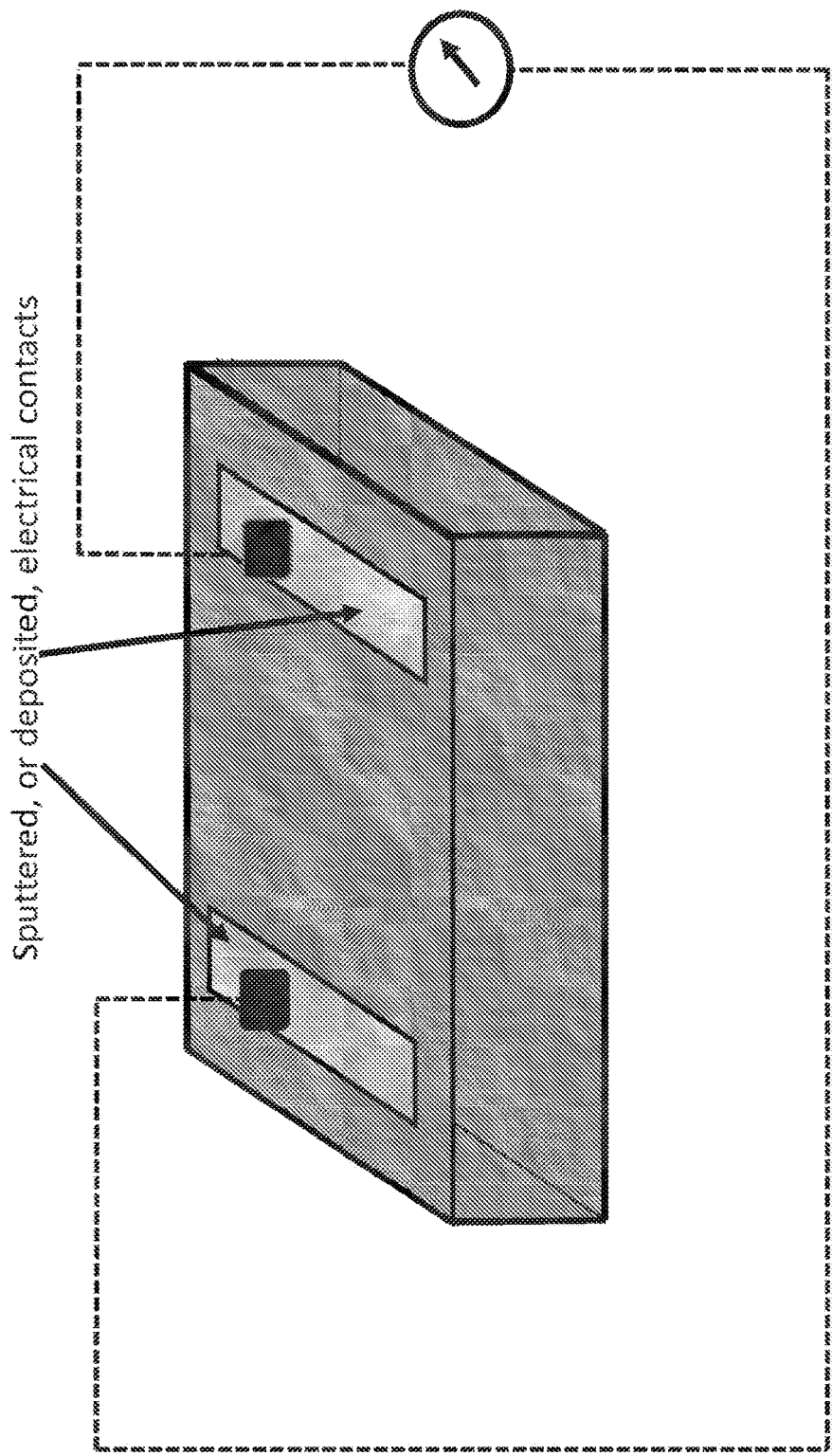
FIG. 45 shows a sintering method wherein sintering electrodes electrically contacting the film are deposited or sputtered at two positions on the film surface to pass a current therebetween.
Figure 46:
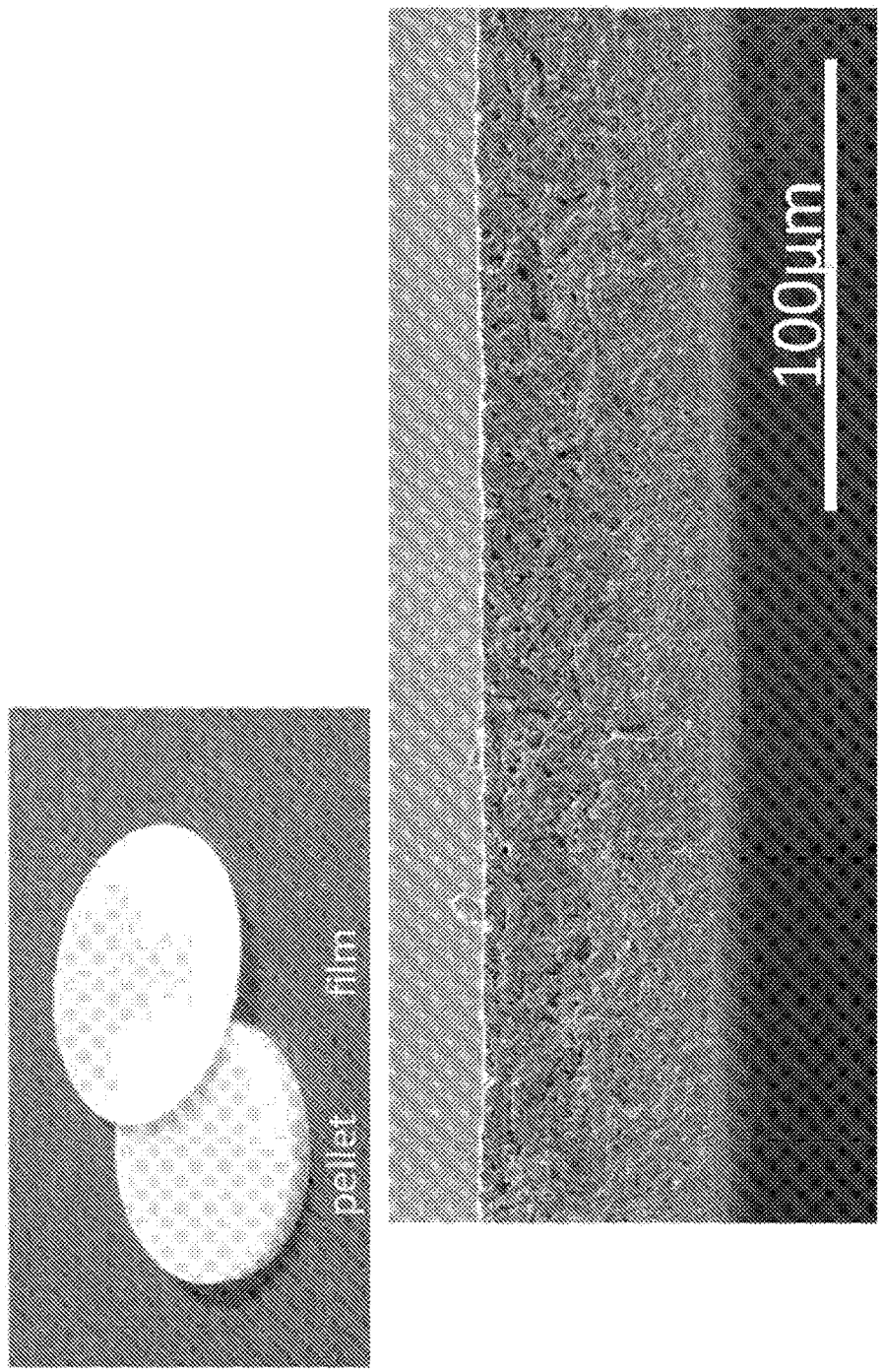
FIG. 46 shows an optical picture of a dense and free-standing garnet film pellet and also a SEM image of the free standing film.
Figure 47:
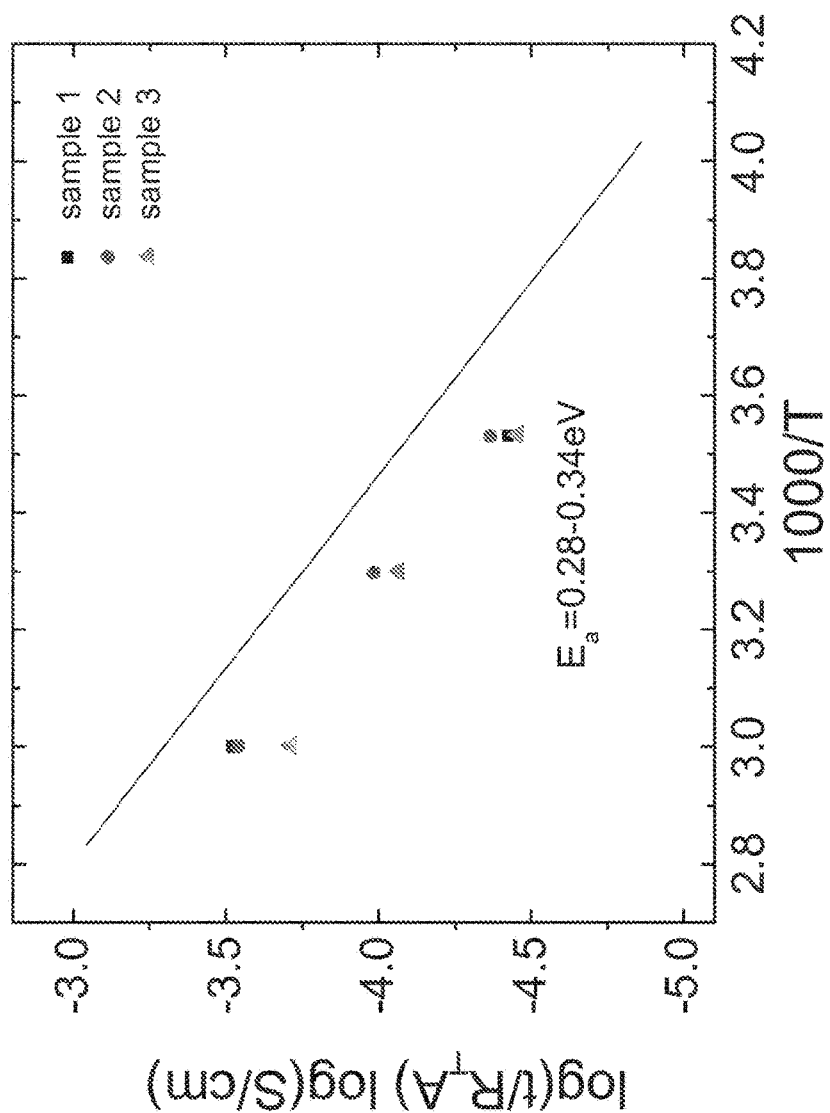
FIG. 47 shows the conductivity plot for the film in the SEM of FIG. 46 having a Ni backing.

As shown in FIG. 24 of FIG. 45, an example sintering methods includes placing electrodes on a thin film form factor so that an applied electrical current passes through the z-direction of the film. In this orientation, FAST sintering is employed according to a sintering methods set forth herein.

Figure 16:
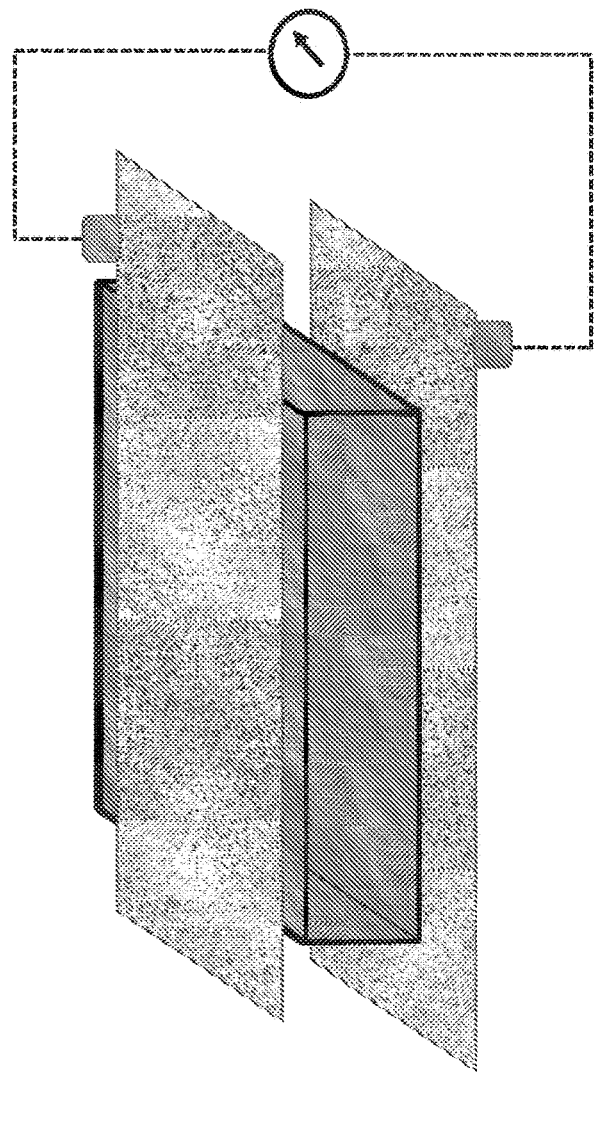
FIG. 16 shows a film sintered by a sintering system wherein sintering electrodes electrically contacts the film at two positions on the film surface.
Figure 20:
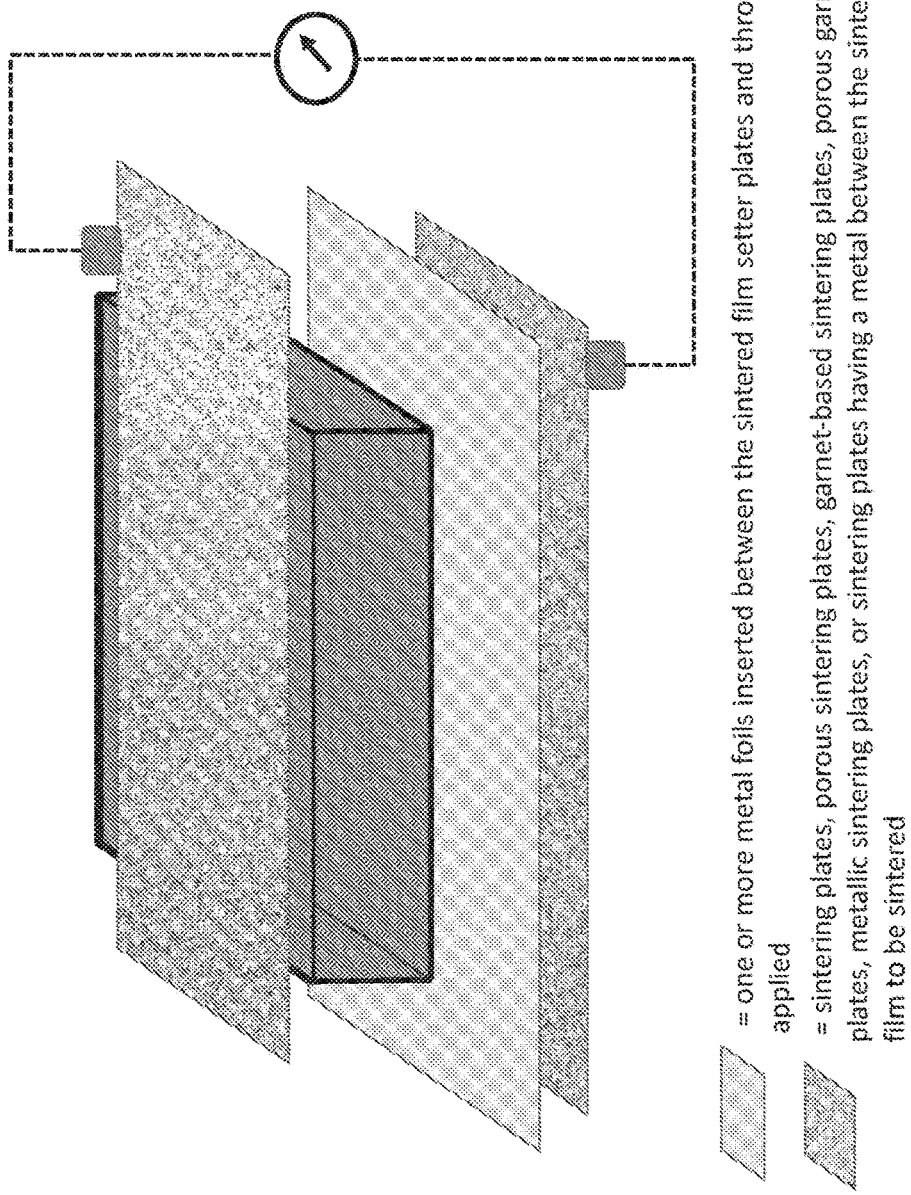
FIG. 20 shows a film sintered with sintering plates wherein one or more metal foils are inserted between the sintered film and the setter plates.

As shown in FIG. 16, another example sintering method includes using sintering plates. In some examples, the applied electrical current passes through the sintering plates. In some other examples, the applied electrical current passes through the sintering plates while a pressure is applied according to the pressure values recited in this application herein and above. In certain other examples, the applied electrical current is applied directly to the thin film while the setter plates independently apply a pressure according to a pressure value recited in this application, herein and above. In yet certain other examples, one or more metal foil layers are inserted between a setter plate and the thin film and the applied electrical current is applied to the inserted metal foil. FIG. 20 shows an example where a metal foil is places between a sintered film and setter plates.

Figure 21:
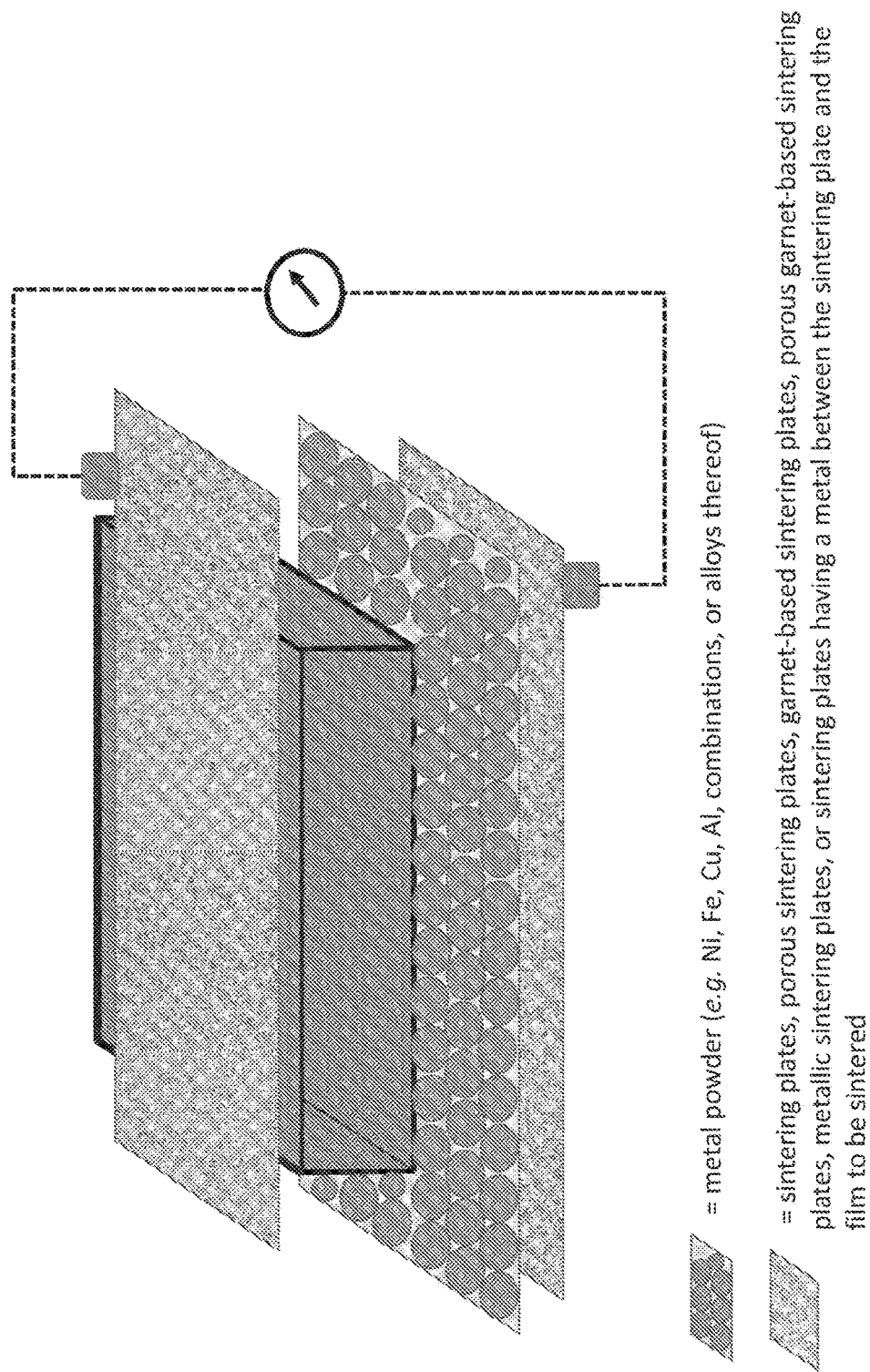
FIG. 21 shows a film sintered with sintering plates wherein one or more metal powders are inserted between the sintered film and the setter plates.

In some examples, a metal powder is inserted between the setter plates and the garnet film to be sintered. In some of these examples, as the garnet film is sintered, the metal powder also sinters and adheres to the sintering film. FIG. 21 shows an example where a metal powder is places between a sintered film and setter plates.

In some of these examples, the setter plate is a porous setter plate. In some of these examples, the setter plate is a garnet-based setter plate. In some of these examples, the setter plate is a porous garnet-based setter plate. In some of these examples, the setter plate is a metallic setter plate. As used herein, garnet-based setter plates includes a setter plate that comprises a garnet material described herein.

Figure 17:
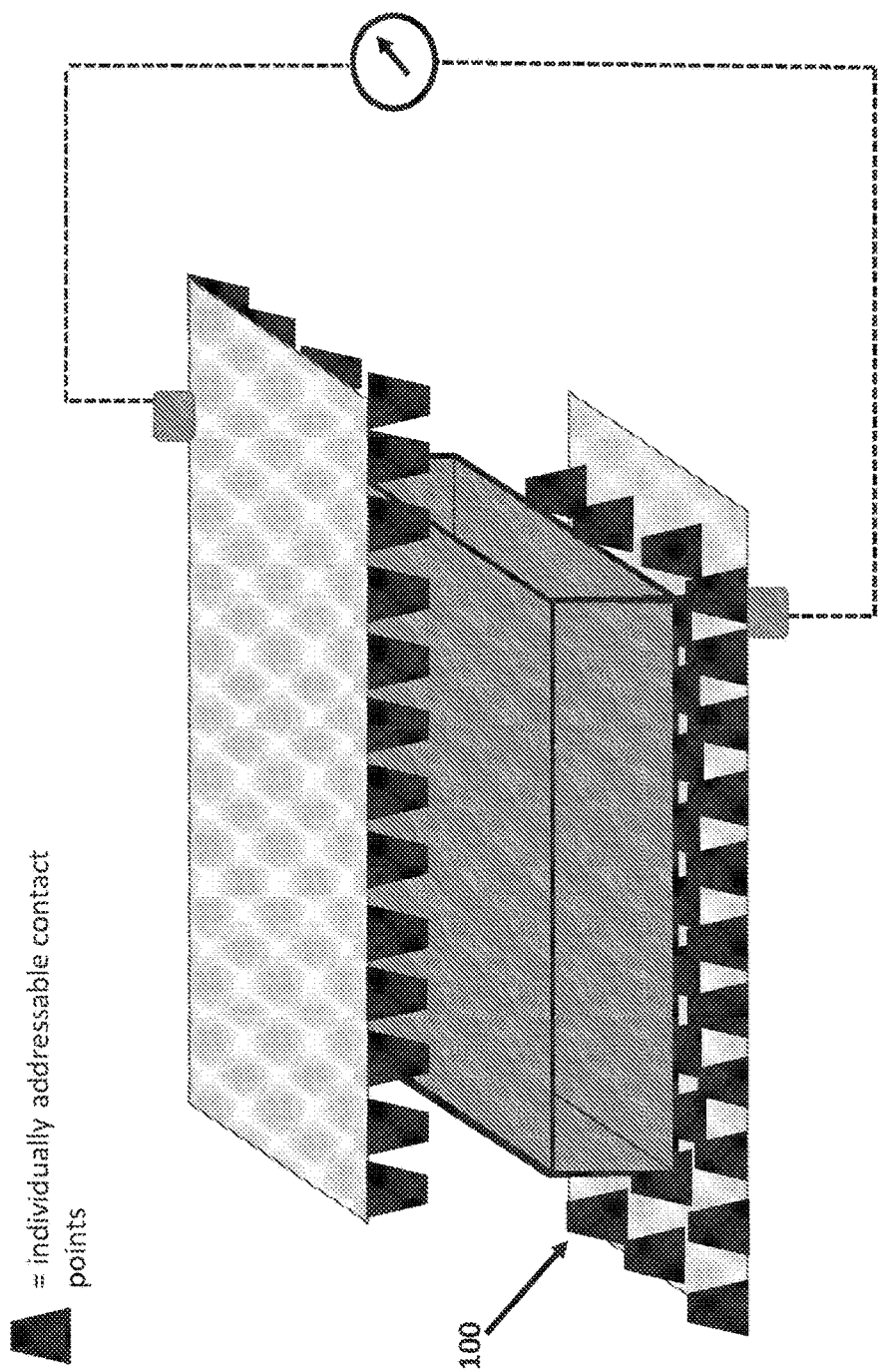
FIG. 17 shows a film sintered with setter plates that have individually addressable electrical contact points.

As shown in FIG. 17, in some examples the plates used for sintering and optionally for applying pressure can have individually addressable contact points so that the applied electrical current is directed to specific positions on the sintering film. As shown in FIG. 17, the tapered ended of the plurality of trapezoid-like shapes (100) indicates these individually addressable contacts points. As used herein, individually addressable refers to the ability to controllable and individually apply a current or a voltage to one contact point that may be different from the controllably applied current or voltage applied to another contact point.

In some examples the plates used for sintering and optionally for applying pressure can have grid structure. In some examples, this grid structure is movable so that it can be placed on the sintering film at different positions during the sintering process.

Figure 18:
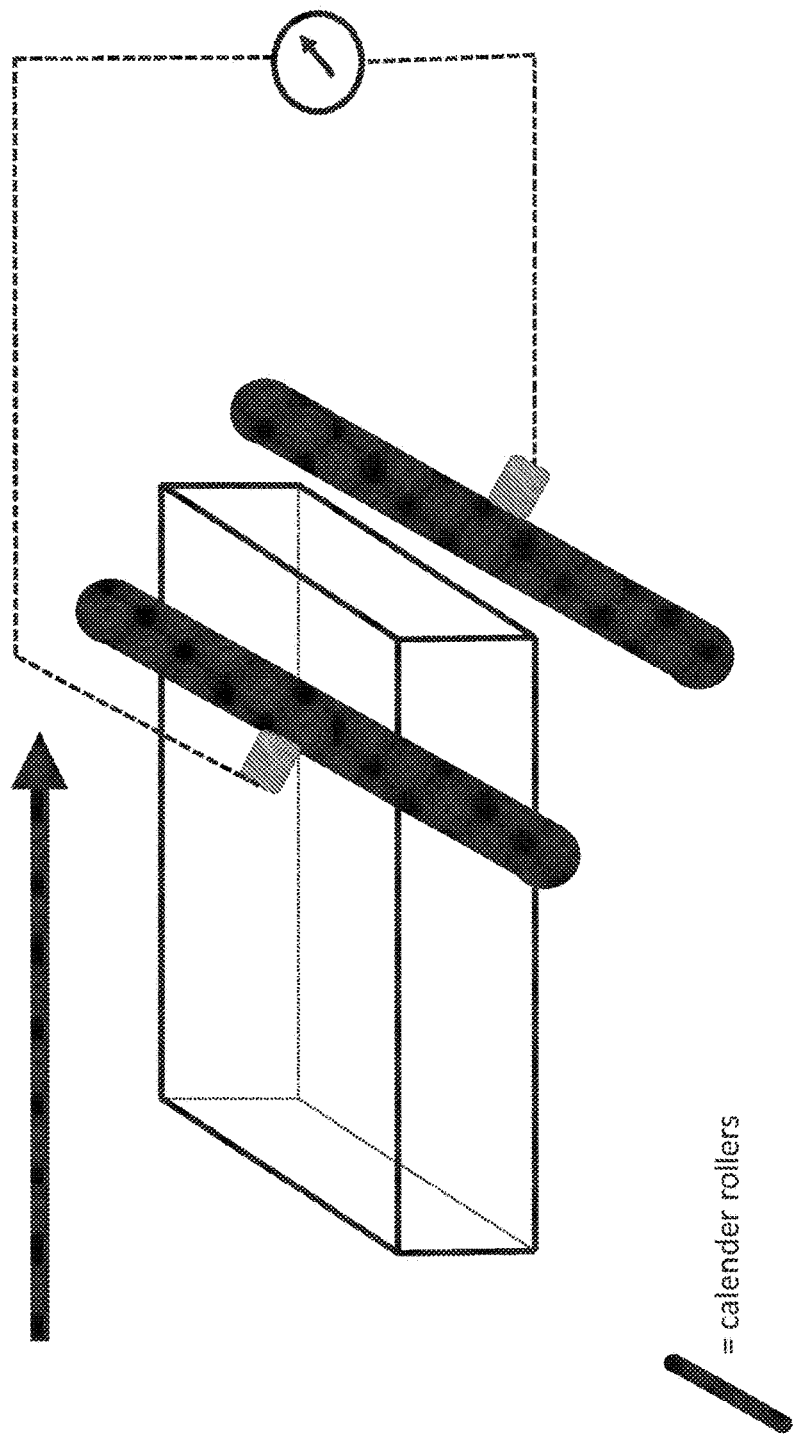
FIG. 18 shows an example of sintering a film using calender rollers that conduct an electrical current.

As shown in FIG. 18, in some examples the thin film form factor is sintered while it moves through calender rollers. In these examples, the calender rollers apply a pressure according to a pressure value set forth herein and also provide a conduit for an applied electrical current or voltage as necessary for sintering, e.g., FAST sintering. In FIG. 18, the larger arrow, which is not surrounded by a circle and is parallel to the x-direction of the film, indicates the direction of movement of the sintering film as it moves through the calender rollers.

Figure 19:
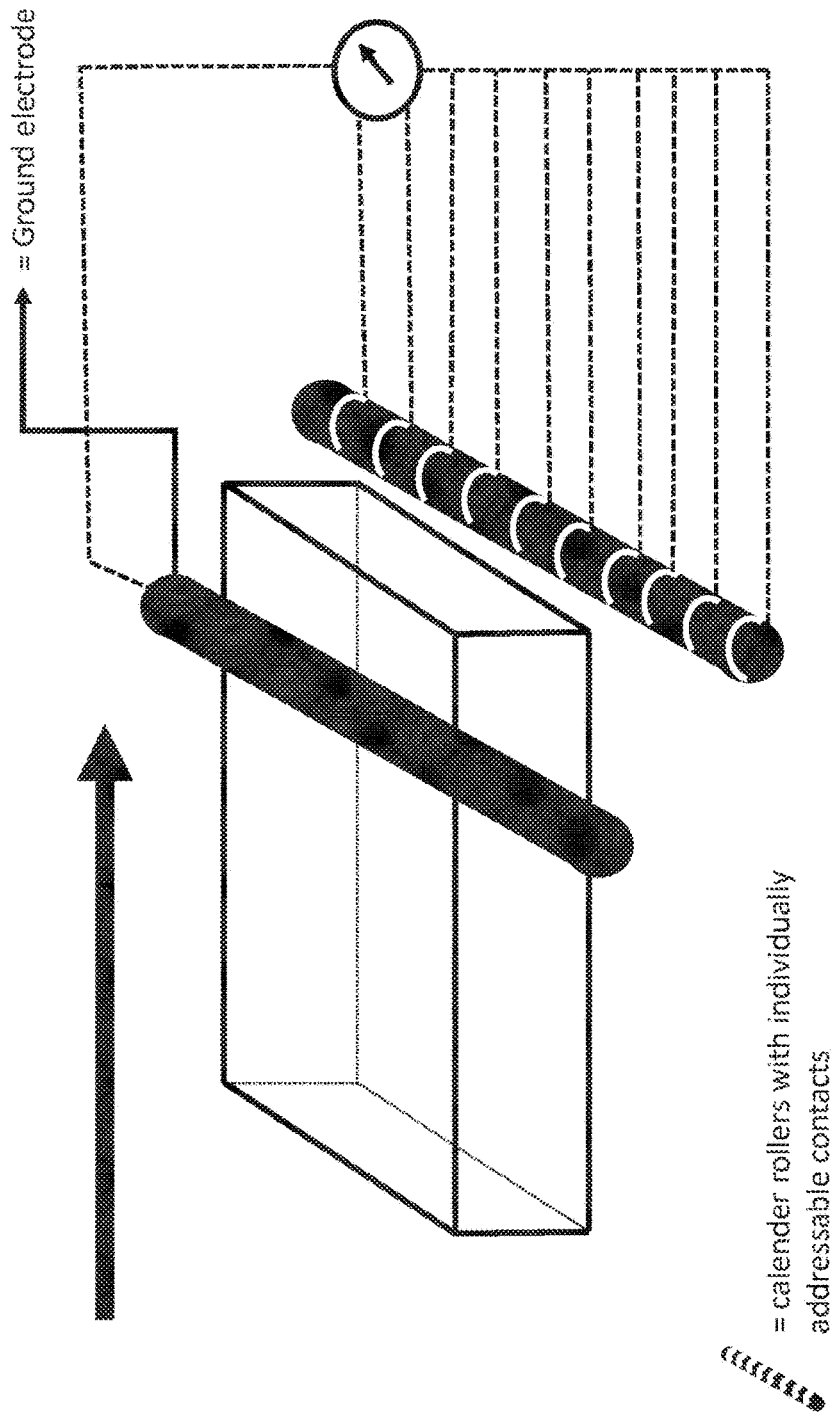
FIG. 19 shows an example of sintering a film using calender rollers wherein one roller has individually addressable electrical contact points and the other roller is a ground electrode.

As shown in FIG. 19, in some of the examples where a thin film form factor is sintered while it moves through calender rollers, the calender rollers have individually addressable contact points (200) so that an electrical current or voltage can be applied controllably and individually to the sintering film at different positions.

As shown in FIG. 19, in some of the examples where a thin film form factor is sintered while it moves through calender rollers, one of the calender rollers is a ground electrode.

Figure 22:
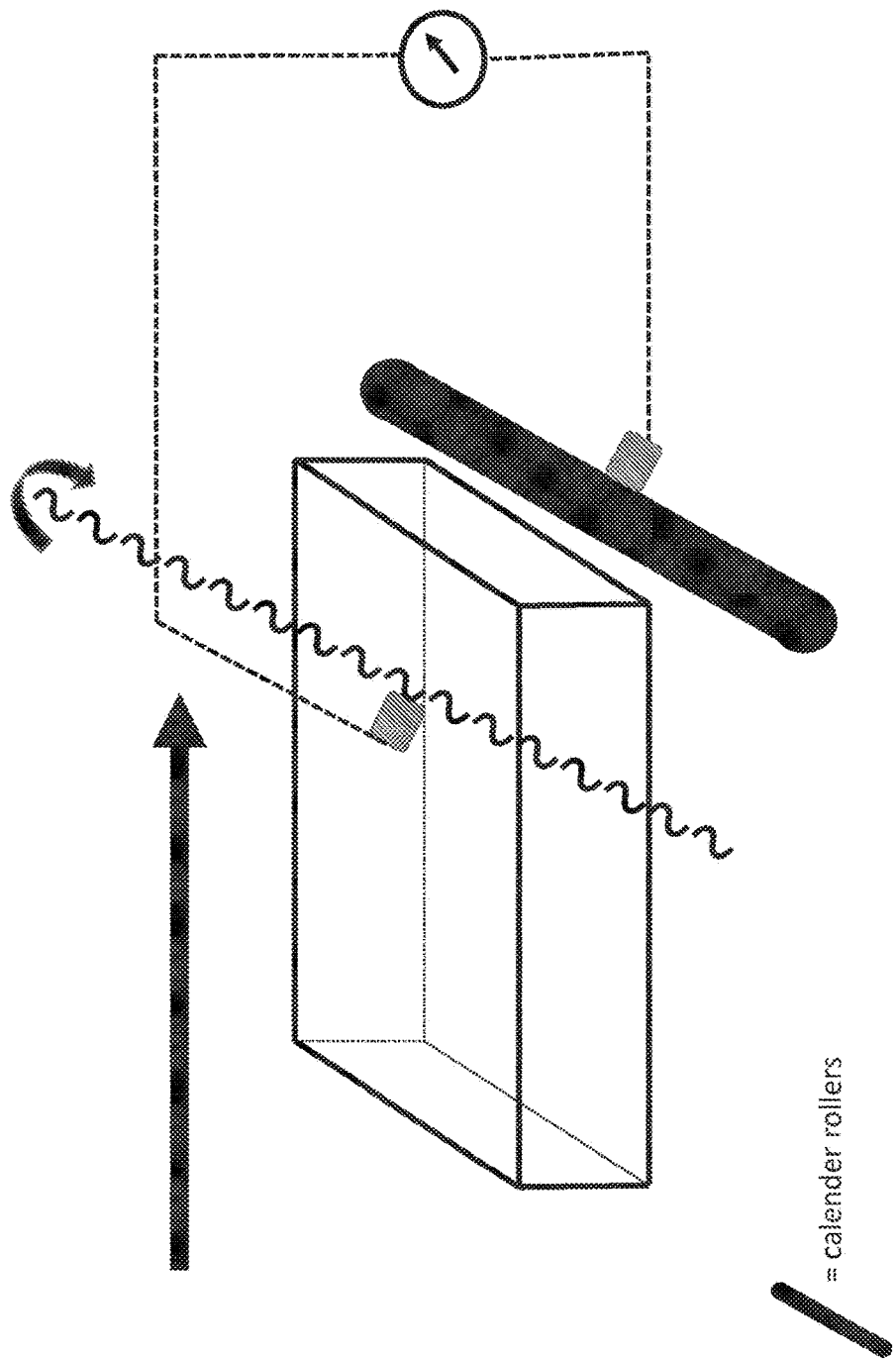
FIG. 22 shows a film sintered with calender rollers wherein one roller is a spiral design that is movable so that the points of contact between the spiral roller and the thin film can controllably be moved during the sintering process.

As shown in FIG. 22, in some of the examples wherein a thin film form factor is sintered while it moves through calender rollers, one of the calender rollers is a spiral design that can rotate about its longitudinal axis and also move parallel to its longitudinal axis. This spiral design allows for the applied electrical current or voltage to be directed to the sintering film.

i. Reactive Sintering

In some examples, the set forth herein are reactive sintering methods. In these examples, garnet precursors are mixed to form a mixture. In these examples, the precursors include the garnet precursors set forth in the instant patent application. In some examples, the mixture is milled according to the milling methods set forth in the instant patent application. In some examples, the mixture is formulated as a slurry of milled precursor materials to form a slurry. In some examples, the slurry is then coated onto a substrate by methods such as, but not limited to, doctor blade casting, slot casting, or dip coating. In some other examples, the slurry is cast onto a substrate according to a casting method set forth in the instant patent application. In some of these examples, the slurry is then dried to remove the solvent or liquid therein. In some examples, the dried slurry is calendered. In some additional examples, the dried slurry is laminated to other layers of battery components. In some of these examples, pressure is applied to adhere or bond the laminated layers together. In certain examples, the dried slurry layers to which pressure is applied are sintered according to the methods set forth herein. In those examples, wherein sintering occurs with garnet precursors in a slurry or dried slurry format, the sintering occurs simultaneous with a chemical reaction of the garnet precursors to form sintered garnet.

In some examples, reactive sintering includes mixing garnet precursors with preformed garnet powder and sintering the mixture using temperature and, or, an applied current. In some examples, the ratio of garnet precursors to garnet powder is 10:90. In some examples, the ratio of garnet precursors to garnet powder is 20:80. In some examples, the ratio of garnet precursors to garnet powder is 25:75. In some examples, the ratio of garnet precursors to garnet powder is 50:50. In some examples, the ratio of garnet precursors to garnet powder is 60:40. In some examples, the ratio of garnet precursors to garnet powder is 70:30. In some examples, the ratio of garnet precursors to garnet powder is 75:25. In some examples, the ratio of garnet precursors to garnet powder is 80:20. In some examples, the ratio of garnet precursors to garnet powder is 90:10.

ii. Tapecasting

In some examples, set forth herein are tapecasting methods for making thin films. In these methods, the ceramic powder is first dispersed in a liquid or solvent that contains a dissolved binder and optionally dispersing agents to from a homogeneous mixture. This homogeneous mixture or "slip" is then cast using the doctor blade casting method onto a substrate. In some examples, the substrate is a non-stick substrate such as, but not limited to, silicone coated MYLAR. Then the liquid or solvent is evaporated to form a dried "green film." In some examples, the green film is peeled off the MYLAR and cut into a specific shape, e.g., square, rectangular, circular, or oval. In this methods, films having a thickness of 0.1 to 200 μm are prepared. Metal powders can optionally be incorporated into the film or adhered to one side of the film. In these examples, the metal powders are selected from Ni, Cu, a mixture of Ni-garnet, a mixture of Cu-garnet, or combinations thereof. In some examples, tape casting includes using an opening of about 1-100 μm through which the tape casting occurs during deposition.

iii. Hot Pressing

In some examples, set forth herein are hot pressing methods of making thin garnet films. In these examples, green tapes, as described above, are sintered under an applied uniaxial pressure as shown in FIG. 4. In certain examples, the binder is first removed before the sintering is conducted. In these particular examples, the binder can be removed by burning the binder at a temperature of about 200, 300, 400, 500, or 600° C. In some examples, the sintering is conducted by heating the film to sintering temperature of about 800° C. to about 1200° C. under an uniaxial load pressure of about 10 to about 100 MPa. In these examples, the applied pressure prevents the film from deforming or warping during sintering and provides an additional driving force for sintering in the direction perpendicular to the film surface and for preparing a dense film.

In some examples, the green film can be sintered by first casting the film onto a metal foil. In some examples, the binder is burned out before the sintering is conducted. In some of these examples, the sintering includes heating the film under an applied pressure to a temperature lower than the melting point of the metal or metals comprising the metal foil substrate. As such, higher sintering temperatures can be used when Ni-substrates are used as compared to when Cu-substrates are used.

iv. Constrained Sintering

Figure 5:
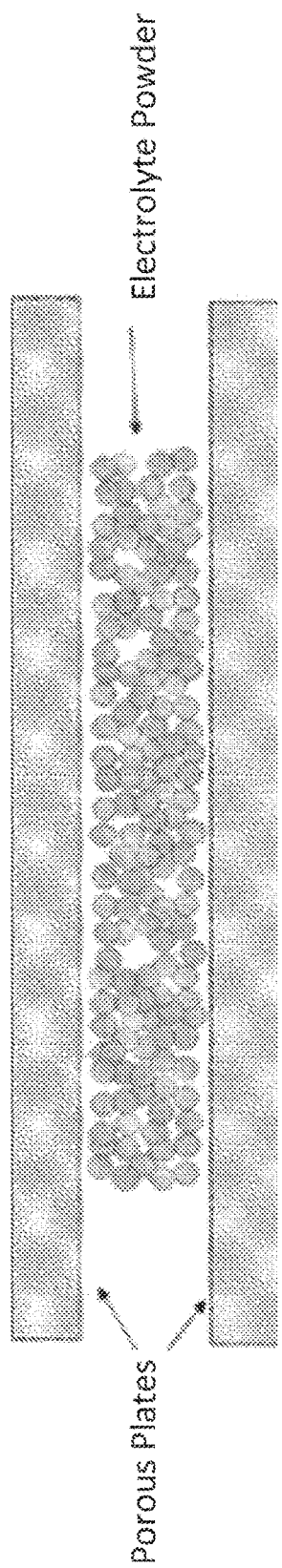
FIG. 5 shows an example method of calcining or sintering a garnet layer (e.g., garnet bi-layer, tri-layer, garnet-active-material composite layer), wherein the weight of the Dye (or setter) plates provides the only external pressure applied to the calcining or sintering layer.
Figure 6:
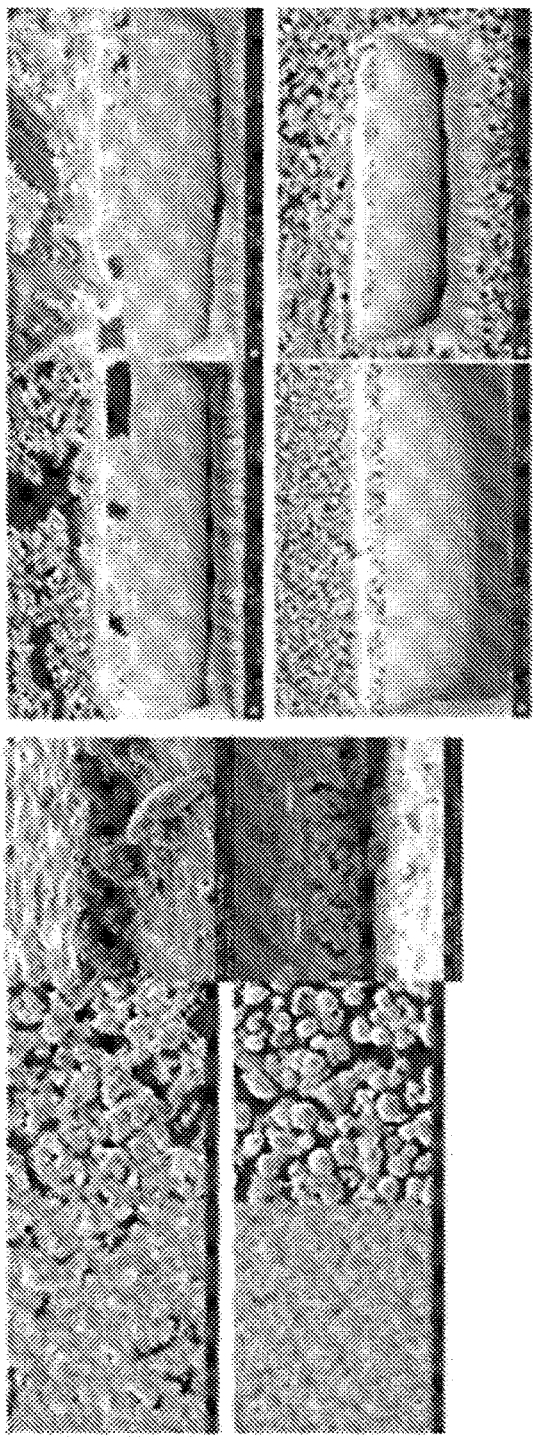
FIG. 6 shows scanning electron microscopy (SEM) and focused ion-beam (FIB) microscopy of thin film garnet films made by the reactive sintering methods set forth herein using applied pressure but without using additional lithium source powders.

In some examples, the green film may be sintered by placing it between setter plates but only applied a small amount of pressure to constrain the film and prevent inhomogeneities that stress and warp the film during the sintering process. In some of these examples, it is beneficial to make the setter plates that are porous, e.g., porous yttria-stabalized zirconia. These porous plates in these examples allow the binder to diffuse away from the film during the burning out or the sintering step. In some of these examples, the burning out and sintering step can be accomplished simultaneously in part because of these porous setter plates. In some examples, the small amount of pressure is just the pressure applied by the weight of the setter plate resting on top of the green film during the sintering process with no additional pressure applied externally. In some examples, the constrained sintering is done substantially as shown in FIG. 4 and, or, FIG. 5.

v. Vacuum Sintering

In some examples, the sintering is conducted as described above but with the sintering film in a vacuum chamber. In this example, a vacuum is provided to withdraw gases trapped within the ceramic that is sintering. In some of these examples, gases trapped within the ceramic prevent the ceramic from further sintering by applying a pressure within pore spaces which can be prevent the sintering ceramic from densifying beyond a certain point. By removing trapped gases using a vacuum system, pores that did contain gas can be sintered and densified more so than they could if the vacuum system did not withdraw the trapped gases.

vi. Field Assisted, Flash, and Fast Sintering

The field assisted sintering technique (FAST) sintering is capable of enhancing sintering kinetics. The application of a field will move electrons, holes, and/or ions in the sintering material, which then heat the material via Joule heating. The heating is focused at spots where resistance is highest ($P=I^2R$, wherein I is current, and R is resistance) which tend to be at the particle-particle necks. These spots are precisely where sintering is desired, so FAST sintering can be especially effective. A standard garnet sintering procedure can, in some examples, take 6-36 hours at 1050-1200° C. In contrast, FAST sintering of garnets can occur at 600° C. and less than 5 minutes. The advantages are lower cost processing (higher throughput), lower reactivity (at lower temperature, the garnet is less likely to react with other components), and lower lithium loss (lithium evaporation is a dominant failure mode preventing effective sintering). FAST sintering of garnets is most effective at low current and for short time [insert data]. Since garnet material has high ion conductivity, low current is preferable, as is AC current, so that bulk transport of ions does not occur. Parameters may span: 1 min<time<1 hr, 500<temp<1050° C., 1 Hz<frequency<1 MHz, 1V<VAC rms<20V. In some examples, FAST sintering is used in conjunction with hot pressing, which includes applying a uniaxial pressure to the film during sintering. In some examples, FAST sintering is used in conjunction with hot pressing onto a permanent substrate, such as a metal, e.g., a current collector. In some examples, FAST sintering is used in conjunction with constrained sintering, in which the film is pinned, or constrained physically, but without a significant amount of pressure. In some examples, FAST sintering is used in conjunction with bilayer sintering (and tri-layer sintering, e.g., electrolyte-metal-electrolyte), to both provide mechanical support and to simultaneously form a current collector in one step. In some examples, FAST sintering is used in conjunction with vacuum sintering, in which sintering occurs in a low absolute pressure to promote pore removal.

In some embodiments, disclosed herein is a method of making thin films, including providing an unsintered thin film; wherein the unsintered thin film includes at least one member selected from the group consisting of a Garnet-type electrolyte, an active electrode material, a conductive additive, a solvent, a binder, and combinations thereof. In some examples, the methods further include removing the solvent, if present in the unsintered thin film. In some examples, the method optionally includes laminating the film to a surface. In some examples, the method includes removing the binder, if present in the film. In some examples, the method includes sintering the film, wherein sintering comprises heat sintering or field assisted sintering (FAST). In some of these examples, heat sintering includes heating the film in the range from about 700° C. to about 1200° C. for about 1 to about 600 minutes and in atmosphere having an oxygen partial pressure in the range $1*10^{-1}$ to $1*10^{-15}$ atm. In other examples, FAST sintering includes heating the film in the range from about 500° C. to about 900° C. and applying a D.C. or A.C. electric field to the thin film.

In some embodiments, disclosed herein is a method of making a film, including providing an unsintered thin film; wherein the unsintered thin film includes at least one member selected from the group consisting of a Garnet-type electrolyte, an active electrode (e.g., cathode) material, a conductive additive, a solvent, a binder, and combinations thereof. In some examples, the methods further include removing the solvent, if present in the unsintered thin film. In some examples, the method optionally includes laminating the film to a surface. In some examples, the method includes removing the binder, if present in the film. In some examples, the method includes sintering the film, wherein sintering comprises heat sintering. In some of these examples, heat sintering includes heating the film in the range from about 700° C. to about 1200° C. for about 1 to about 600 minutes and in atmosphere having an oxygen partial pressure in the range of $1*10^1$ atm to $1*10^{-15}$ atm.

In some embodiments, disclosed herein is a method of making a film, including providing an unsintered thin film; wherein the unsintered thin film includes at least one member selected from the group consisting of a Garnet-type electrolyte, an active electrode material, a conductive additive, a solvent, a binder, and combinations thereof. In some examples, the methods further include removing the solvent, if present in the unsintered thin film. In some examples, the method optionally includes laminating the film to a surface. In some examples, the method includes removing the binder, if present in the film. In some examples, the method includes sintering the film, wherein sintering includes field assisted sintering (FAST). In some of these examples, FAST sintering includes heating the film in the range from about 500° C. to about 900° C. and applying a D.C. or A.C. electric field to the thin film.

In any of the methods set forth herein, the unsintered thin film may include a lithium stuffed garnet electrolyte or precursors thereto. In any of the methods set forth herein, the unsintered thin film may include a lithium stuffed garnet electrolyte doped with alumina.

In any of the methods set forth herein, heat sintering may include heating the film in the range from about 400° C. to about 1200° C.; or about 500° C. to about 1200° C.; or about 900° C. to about 1200° C.; or about 1000° C. to about 1200° C.; or about 1100° C. to about 1200° C.

In any of the methods set forth herein, the methods may include heating the film for about 1 to about 600 minutes. In any of the methods set forth herein, the methods may include heating the film for about 20 to about 600 minutes. In any of the methods set forth herein, the methods may include heating the film for about 30 to about 600 minutes. In any of the methods set forth herein, the methods may include heating the film for about 40 to about 600 minutes. In any of the methods set forth herein, the methods may include heating the film for about 50 to about 600 minutes. In any of the methods set forth herein, the methods may include heating the film for about 60 to about 600 minutes. In any of the methods set forth herein, the methods may include heating the film for about 70 to about 600 minutes. In any of the methods set forth herein, the methods may include heating the film for about 80 to about 600 minutes. In any of the methods set forth herein, the methods may include heating the film for about 90 to about 600 minutes. In any of the methods set forth herein, the methods may include heating the film for about 100 to about 600 minutes. In any of the methods set forth herein, the methods may include heating the film for about 120 to about 600 minutes. In any of the methods set forth herein, the methods may include heating the film for about 140 to about 600 minutes. In any of the methods set forth herein, the methods may include heating the film for about 160 to about 600 minutes. In any of the methods set forth herein, the methods may include heating the film for about 180 to about 600 minutes. In any of the methods set forth herein, the methods may include heating the film for about 200 to about 600 minutes. In any of the methods set forth herein, the methods may include heating the film for about 300 to about 600 minutes. In any of the methods set forth herein, the methods may include heating the film for about 350 to about 600 minutes. In any of the methods set forth herein, the methods may include heating the film for about 400 to about 600 minutes. In any of the methods set forth herein, the methods may include heating the film for about 450 to about 600 minutes. In any of the methods set forth herein, the methods may include heating the film for about 500 to about 600 minutes. In any of the methods set forth herein, the methods may include heating the film for about 1 to about 500 minutes. In any of the methods set forth herein, the methods may include heating the film for about 1 to about 400 minutes. In any of the methods set forth herein, the methods may include heating the film for about 1 to about 300 minutes. In any of the methods set forth herein, the methods may include heating the film for about 1 to about 200 minutes. In any of the methods set forth herein, the methods may include heating the film for about 1 to about 100 minutes. In any of the methods set forth herein, the methods may include heating the film for about 1 to about 50 minutes.

In any of the methods set forth herein, the FAST sintering may include heating the film in the range from about 400° C. to about 1200° C. and applying a D.C. or A.C. electric field to the thin film. In some examples, FAST sintering includes heating the film in the range from about 400° C. to about 900° C. and applying a D.C. or A.C. electric field to the thin film. In some examples, FAST sintering includes heating the film in the range from about 600° C. to about 1150° C. and applying a D.C. or A.C. electric field to the thin film. In some examples, FAST sintering includes heating the film in the range from about 700° C. to about 900° C. and applying a D.C. or A.C. electric field to the thin film. In some examples, FAST sintering includes heating the film in the range from about 800° C. to about 900° C. and applying a D.C. or A.C. electric field to the thin film. In some examples, FAST sintering includes heating the film in the range from about 500° C. to about 800° C. and applying a D.C. or A.C. electric field to the thin film. In some examples, FAST sintering includes heating the film in the range from about 500° C. to about 700° C. and applying a D.C. or A.C. electric field to the thin film. In some examples, FAST sintering includes heating the film in the range from about 500° C. to about 600° C. and applying a D.C. or A.C. electric field to the thin film.

In any of the methods set forth herein, the FAST sintering may include heating the film in the range from about 400° C. to about 1000° C. and applying a D.C. electric field to the thin film. In some examples, FAST sintering includes heating the film in the range from about 600° C. to about 900° C. and applying a D.C. electric field to the thin film. In some examples, FAST sintering includes heating the film in the range from about 600° C. to about 900° C. and applying a D.C. electric field to the thin film. In some examples, FAST sintering includes heating the film in the range from about 700° C. to about 900° C. and applying a D.C. electric field to the thin film. In some examples, FAST sintering includes heating the film in the range from about 800° C. to about 900° C. and applying a D.C. electric field to the thin film. In some examples, FAST sintering includes heating the film in the range from about 500° C. to about 800° C. and applying a D.C. electric field to the thin film. In some examples, FAST sintering includes heating the film in the range from about 500° C. to about 700° C. and applying a D.C. electric field to the thin film. In some examples, FAST sintering includes heating the film in the range from about 500° C. to about 600° C. and applying a D.C. electric field to the thin film.

In any of the methods set forth herein, the FAST sintering may include heating the film in the range from about 400° C. to about 1000° C. and applying an A.C. electric field to the thin film. In any of the methods set forth herein, the FAST sintering may include heating the film in the range from about 500° C. to about 900° C. and applying an A.C. electric field to the thin film. In some examples, FAST sintering includes heating the film in the range from about 600° C. to about 900° C. and applying an A.C. electric field to the thin film. In some examples, FAST sintering includes heating the film in the range from about 700° C. to about 900° C. and applying an A.C. electric field to the thin film. In some examples, FAST sintering includes heating the film in the range from about 800° C. to about 900° C. and applying an A.C. electric field to the thin film. In some examples, FAST sintering includes heating the film in the range from about 500° C. to about 800° C. and applying an A.C. electric field to the thin film. In some examples, FAST sintering includes heating the film in the range from about 500° C. to about 700° C. and applying an A.C. electric field to the thin film. In some examples, FAST sintering includes heating the film in the range from about 500° C. to about 600° C. and applying an A.C. electric field to the thin film.

In certain examples, the methods set forth herein include providing an unsintered thin film by casting a film according to a casting methods set forth in the instant disclosure.

In some of the methods disclosed herein, the sintering occurs between inert setter plates. In some examples, when the sintering occurs between inert setter plates, a pressure is applied by the setter plates onto the sintering film. In certain examples, the pressure is between 1 and 1000 pounds per square inch (PSI). In some examples, the pressure is 1 PSI. In other examples, the pressure is 10 PSI. In still others, the pressure is 20 PSI. In some other examples, the pressure is 30 PSI. In certain examples, the pressure is 40 PSI. In yet other examples, the pressure is 50 PSI. In some examples, the pressure is 60 PSI. In yet other examples, the pressure is 70 PSI. In certain examples, the pressure is 80 PSI. In other examples, the pressure is 90 PSI. In yet other examples, the pressure is 100 PSI. In some examples, the pressure is 110 PSI. In other examples, the pressure is 120 PSI. In still others, the pressure is 130 PSI. In some other examples, the pressure is 140 PSI. In certain examples, the pressure is 150 PSI. In yet other examples, the pressure is 160 PSI. In some examples, the pressure is 170 PSI. In yet other examples, the pressure is 180 PSI. In certain examples, the pressure is 190 PSI. In other examples, the pressure is 200 PSI. In yet other examples, the pressure is 210 PSI.

In some of the above examples, the pressure is 220 PSI. In other examples, the pressure is 230 PSI. In still others, the pressure is 240 PSI. In some other examples, the pressure is 250 PSI. In certain examples, the pressure is 260 PSI. In yet other examples, the pressure is 270 PSI. In some examples, the pressure is 280 PSI. In yet other examples, the pressure is 290 PSI. In certain examples, the pressure is 300 PSI. In other examples, the pressure is 310 PSI. In yet other examples, the pressure is 320 PSI. In some examples, the pressure is 330 PSI. In other examples, the pressure is 340 PSI. In still others, the pressure is 350 PSI. In some other examples, the pressure is 360 PSI. In certain examples, the pressure is 370 PSI. In yet other examples, the pressure is 380 PSI. In some examples, the pressure is 390 PSI. In yet other examples, the pressure is 400 PSI. In certain examples, the pressure is 410 PSI. In other examples, the pressure is 420 PSI. In yet other examples, the pressure is 430 PSI. In some other examples, the pressure is 440 PSI. In certain examples, the pressure is 450 PSI. In yet other examples, the pressure is 460 PSI. In some examples, the pressure is 470 PSI. In yet other examples, the pressure is 480 PSI. In certain examples, the pressure is 490 PSI. In other examples, the pressure is 500 PSI. In yet other examples, the pressure is 510 PSI.

In some of the above examples, the pressure is 520 PSI. In other examples, the pressure is 530 PSI. In still others, the pressure is 540 PSI. In some other examples, the pressure is 550 PSI. In certain examples, the pressure is 560 PSI. In yet other examples, the pressure is 570 PSI. In some examples, the pressure is 580 PSI. In yet other examples, the pressure is 590 PSI. In certain examples, the pressure is 600 PSI. In other examples, the pressure is 610 PSI. In yet other examples, the pressure is 620 PSI. In some examples, the pressure is 630 PSI. In other examples, the pressure is 640 PSI. In still others, the pressure is 650 PSI. In some other examples, the pressure is 660 PSI. In certain examples, the pressure is 670 PSI. In yet other examples, the pressure is 680 PSI. In some examples, the pressure is 690 PSI. In yet other examples, the pressure is 700 PSI. In certain examples, the pressure is 710 PSI. In other examples, the pressure is 720 PSI. In yet other examples, the pressure is 730 PSI. In some other examples, the pressure is 740 PSI. In certain examples, the pressure is 750 PSI. In yet other examples, the pressure is 760 PSI. In some examples, the pressure is 770 PSI. In yet other examples, the pressure is 780 PSI. In certain examples, the pressure is 790 PSI. In other examples, the pressure is 800 PSI. In yet other examples, the pressure is 810 PSI.

In other examples, the pressure is 820 PSI. In certain aforementioned examples, the pressure is 830 PSI. In still others, the pressure is 840 PSI. In some other examples, the pressure is 850 PSI. In certain examples, the pressure is 860 PSI. In yet other examples, the pressure is 870 PSI. In some examples, the pressure is 880 PSI. In yet other examples, the pressure is 890 PSI. In certain examples, the pressure is 900 PSI. In other examples, the pressure is 910 PSI. In yet other examples, the pressure is 920 PSI. In some examples, the pressure is 930 PSI. In other examples, the pressure is 940 PSI. In still others, the pressure is 950 PSI. In some other examples, the pressure is 960 PSI. In certain examples, the pressure is 970 PSI. In yet other examples, the pressure is 980 PSI. In some examples, the pressure is 990 PSI. In yet other examples, the pressure is 1000 PSI.

In some examples, the setter plates can be porous. In some other examples, the setter plates are not porous. In some examples, the lithium activity in the setter plates is relatively high, that is, the lithium concentration is at least 10 atomic percent of the setter. In other instance, the setter plates may be made of a garnet material described herein. In some examples, the setter plates can be porous garnet setter plates. In other instance, the setter plates may be made of zirconia. In some examples, the setter plates can be porous zirconia setter plates. In other instance, the setter plates may be made of a metal material described herein. In some examples, the setter plates can be porous metal setter plates.

In some examples, the garnet-based setter plates are useful for imparting beneficial surface properties to the sintered film. These beneficial surface properties include flatness and conductivity useful for battery applications. These beneficial properties also include preventing Li evaporation during sintering. These beneficial properties may also include preferencing a particular garnet crystal structure. In certain methods disclosed herein, the inert setter plates are selected from porous zirconia, graphite or conductive metal plates. In some other of these methods, the inert setter plates are graphite. In yet other methods, the inert setter plates are conductive metal plates.

In some of the methods disclosed herein, FAST sintering includes operating in a constant voltage amplitude mode and thereafter operating in a constant current amplitude mode once the impedance of the film decreases by at least an order of magnitude.

In some of the methods disclosed herein, FAST sintering includes operating in a constant voltage amplitude mode and thereafter operating in a constant current amplitude mode once the impedance of the sintered films decreases by an order of magnitude.

In some of the methods disclosed herein, FAST sintering includes operating in a constant voltage amplitude mode and thereafter operating in a constant current amplitude mode once the impedance of the sintered films decreases by two orders of magnitude.

In some of the methods disclosed herein, FAST sintering includes operating in a constant voltage amplitude mode and thereafter operating in a constant current amplitude mode once the impedance of the sintered films decreases by three orders of magnitude.

In some of the methods disclosed herein, FAST sintering includes operating in a constant voltage amplitude mode and thereafter operating in a constant current amplitude mode once the impedance of the sintered films decreases by four orders of magnitude.

In some of the methods disclosed herein, FAST sintering includes operating in a constant voltage amplitude mode and thereafter operating in a constant current amplitude mode once the impedance of the sintered films decreases from 1-100 MegaOhm-cm to about 1-10,000 Ohm-cm.

In some of the methods disclosed herein, FAST sintering includes operating in a constant voltage until the Garnet-particles have a median dimension that is double compared to the Garnet-particles before sintering occurs.

In some of the methods disclosed herein, FAST sintering includes operating a constant power until the Garnet-particles have a median dimension that is double compared to the Garnet-particles before sintering occurs.

In some of the methods disclosed herein, FAST sintering includes operating in a constant current until the Garnet-particles have a median dimension that is double compared to the Garnet-particles before sintering occurs.

In some of the methods disclosed herein, FAST sintering includes operating in a constant voltage until the film has a density of this is at least 20, 30, 40, or 50% greater than the film before sintering occurs. In some of the methods disclosed herein, FAST sintering includes operating a constant power until the film has a density at least 20, 30, 40, or 50% greater than the film before sintering occurs. In some of the methods disclosed herein, FAST sintering includes operating in a constant current until the film has a density at least 20, 30, 40, or 50% greater than the film before sintering occurs.

In some of the methods disclosed herein, FAST sintering includes operating in a constant voltage until the film has an impedance that is at least 1, 2, 3, or 4 orders of magnitude lower than the film has before sintering occurs. In some of the methods disclosed herein, FAST sintering includes operating a constant power until the film has an impedance that is at least 1, 2, 3, or 4 orders of magnitude lower than the film has before sintering occurs. In some of the methods disclosed herein, FAST sintering includes operating in a constant current until the film has an impedance of that is at least 1, 2, 3, or 4 orders of magnitude lower than the film has before sintering occurs.

In some of the methods disclosed herein, FAST sintering includes operating in a constant voltage until the film has an impedance that is at least 1 or at most 10 orders of magnitude lower than the film has before sintering occurs. In some of the methods disclosed herein, FAST sintering includes operating a constant power until the film has an impedance that is at least 1 or at most 10 orders of magnitude lower than the film has before sintering occurs. In some of the methods disclosed herein, FAST sintering includes operating in a constant current until the film has an impedance that is at least 1 or at most 10 orders of magnitude lower than the film has before sintering occurs.

In some of the methods disclosed herein, FAST sintering includes operating in a constant voltage until the film has an impedance that is about 2 orders of magnitude lower than the film has before sintering occurs. In some of the methods disclosed herein, FAST sintering includes operating a constant power until the film has an impedance that is about 2 orders of magnitude lower than the film has before sintering occurs. In some of the methods disclosed herein, FAST sintering includes operating in a constant current until the film has an impedance that is at about 2 orders of magnitude lower than the film has before sintering occurs.

In some of the methods disclosed herein, FAST sintering includes operating in a constant voltage until the film has an impedance that is about 6 orders of magnitude lower than the film has before sintering occurs. In some of the methods disclosed herein, FAST sintering includes operating a constant power until the film has an impedance that is about 6 orders of magnitude lower than the film has before sintering occurs. In some of the methods disclosed herein, FAST sintering includes operating in a constant current until the film has an impedance that is at about 6 orders of magnitude lower than the film has before sintering occurs.

In some of the methods disclosed herein, FAST sintering includes operating in a constant voltage. In some of the methods disclosed herein, FAST sintering includes operating a constant power. In some of the methods disclosed herein, FAST sintering includes operating in a constant current.

In some of the methods disclosed herein, FAST sintering includes operating in a constant voltage amplitude mode and thereafter operating in a constant current amplitude mode once the impedance of the film decreases by at least an order of magnitude.

In some of the methods disclosed herein, FAST sintering includes operating in a ramped voltage until the Garnet-particles have a median dimension that is at least two times that of the Garnet-particles before sintering occurs. In some of the methods disclosed herein, FAST sintering includes operating a ramped power until the Garnet-particles have a median dimension that is at least two times that of the Garnet-particles before sintering occurs. In some of the methods disclosed herein, FAST sintering includes operating in a ramped current until the Garnet-particles have a median dimension that is at least two times that of the Garnet-particles before sintering occurs.

In some embodiments, FAST sintering is operated with feedback control wherein the applied voltage, power, or current are adjusted during sintering to meet certain predetermined values. In some examples, these values include the thickness of the film. For example, in some examples sintering is applied until the film is 50 µm thick. In other examples, the sintering is applied until the film is 40 µm thick. In other examples, the sintering is applied until the film is 30 µm thick. In other examples, the sintering is applied until the film is 20 µm thick. In other examples, the sintering is applied until the film is 10 µm thick. In other examples, the sintering is applied until the film is 5 µm thick. In other examples, the sintering is applied until the film is 1 µm thick. In other examples, the sintering is applied until the film is 0.5 µm thick. As used in this paragraph, thickness refers to the average dimensions of the film in the z-direction (as shown in FIG. 23.

In some embodiments, FAST sintering is operated with feedback control wherein the applied voltage, power, or current are adjusted during sintering to meet certain predetermined values. In some examples, these values include the conductivity of the film. For example, the sintering can be applied until the film has a conductivity of 1e-4 S/cm. In other examples, the sintering can be applied until the film has a conductivity of 1e-5 S/cm. In other examples, the sintering can be applied until the film has a conductivity of 1e-6 S/cm. In other examples, the sintering can be applied until the film has a conductivity of 1e-7 S/cm. In other examples, the sintering can be applied until the film has a conductivity of 1e-8 S/cm.

In some embodiments, FAST sintering is operated with feedback control wherein the applied voltage, power, or current are adjusted during sintering to meet certain predetermined values. In some examples, these values include the impedance of the film. For example, sintering can be applied until the impedance of the film is 500 Ohm-cm.

In some embodiments, FAST sintering is operated with feedback control wherein the applied voltage, power, or current are adjusted during sintering to meet certain predetermined values. In some examples, these values include the particle size in the film.

In some embodiments, FAST sintering is operated with feedback control wherein the applied voltage, power, or current are adjusted during sintering to meet certain predetermined values. In some examples, these values include the density of the film.

In some embodiments, FAST sintering is operated with feedback control wherein the applied voltage, power, or current are adjusted during sintering to meet certain predetermined values. In some examples, these values include the optical density of the film.

In some embodiments, FAST sintering is operated with feedback control wherein the applied voltage, power, or current are adjusted during sintering to meet certain predetermined values. In some examples, these values include the temperature of the film. For example, the sintering can be applied until the film has a temperature of 50° C. In other examples, the sintering can be applied until the film has a temperature of 100° C. In other examples, the sintering can be applied until the film has a temperature of 150° C. In other examples, the sintering can be applied until the film has a temperature of 200° C. In other examples, the sintering can be applied until the film has a temperature of 250° C. In other examples, the sintering can be applied until the film has a temperature of 300° C. In other examples, the sintering can be applied until the film has a temperature of 350° C. In other examples, the sintering can be applied until the film has a temperature of 400° C. In other examples, the sintering can be applied until the film has a temperature of 450° C. In other examples, the sintering can be applied until the film has a temperature of 500° C. In other examples, the sintering can be applied until the film has a temperature of 550° C. In other examples, the sintering can be applied until the film has a temperature of 600° C. In other examples, the sintering can be applied until the film has a temperature of 650° C. In other examples, the sintering can be applied until the film has a temperature of 700° C. In other examples, the sintering can be applied until the film has a temperature of 750° C. In other examples, the sintering can be applied until the film has a temperature of 800° C. In other examples, the sintering can be applied until the film has a temperature of 850° C. In other examples, the sintering can be applied until the film has a temperature of 900° C. In other examples, the sintering can be applied until the film has a temperature of 950° C. In other examples, the sintering can be applied until the film has a temperature of 1000° C. In other examples, the sintering can be applied until the film has a temperature of 1150° C. In other examples, the sintering can be applied until the film has a temperature of 1200° C. In other examples, the sintering can be applied until the film has a temperature of 1250° C. In other examples, the sintering can be applied until the film has a temperature of 1300° C. In other examples, the sintering can be applied until the film has a temperature of 1350° C.

In some of the methods disclosed herein, FAST sintering includes operating in a ramped voltage until the film has a density at least 20, 30, 40, or 50% greater than the film before sintering occurs. In some of the methods disclosed herein, FAST sintering includes operating a ramped power until the film has a density at least 20, 30, 40, or 50% greater than the film before sintering occurs. In some of the methods disclosed herein, FAST sintering includes operating in a ramped current until the film has a density of at least 20, 30, 40, or 50% greater than the film before sintering occurs. In some of the methods disclosed herein, FAST sintering includes operating in a ramped voltage until the film has an impedance that is 1, 2, 3, 4, 5, 6, 7, 8, 9, or 10 orders of magnitude lower than the film has before sintering occurs. In some of the methods disclosed herein, FAST sintering includes operating a ramped power until the film has an impedance that is 1, 2, 3, 4, 5, 6, 7, 8, 9, or 10 orders of magnitude lower than the film has before sintering occurs. In some of the methods disclosed herein, FAST sintering includes operating in a ramped current until the film has an impedance that is 1, 2, 3, 4, 5, 6, 7, 8, 9, or 10 orders of magnitude lower than the film has before sintering occurs.

In some of the methods disclosed herein, FAST sintering includes operating in a ramped voltage. In some of the methods disclosed herein, FAST sintering includes operating a ramped power. In some of the methods disclosed herein, FAST sintering includes operating in a ramped current.

In some of the methods disclosed herein, FAST sintering includes operating in a constant voltage amplitude mode and thereafter operating in a constant current amplitude mode once the impedance of the film decreases by at least an order of magnitude. In some of the methods disclosed herein, FAST sintering includes operating in a constant voltage amplitude mode and thereafter operating in a constant current amplitude mode once the impedance of the sintered films decreases by an order of magnitude. In some of the methods disclosed herein, FAST sintering includes operating in a constant voltage amplitude mode and thereafter operating in a constant current amplitude mode once the impedance of the sintered films decreases by two orders of magnitude. In some of the methods disclosed herein, FAST sintering includes operating in a constant voltage amplitude mode and thereafter operating in a constant current amplitude mode once the impedance of the sintered films decreases by three orders of magnitude. In some of the methods disclosed herein, FAST sintering includes operating in a constant voltage amplitude mode and thereafter operating in a constant current amplitude mode once the impedance of the sintered films decreases by four orders of magnitude.

In some of the methods disclosed herein, FAST sintering includes operating in a constant voltage amplitude mode and thereafter operating in a constant current amplitude mode once the impedance of the sintered films decreases from 1-100 MegaOhm-cm to about 1-10,000 Ohm-cm.

In some of the methods disclosed herein, FAST sintering includes operating in a constant voltage until the Garnet-particles have a median dimension that is double compared to the Garnet-particles before sintering occurs.

In some of the methods disclosed herein, FAST sintering includes operating a constant power until the Garnet-particles have a median dimension that is double compared to the Garnet-particles before sintering occurs.

In some of the methods disclosed herein, FAST sintering includes operating in a constant current until the Garnet-particles have a median dimension that is double compared to the Garnet-particles before sintering occurs.

In some of the methods disclosed herein, FAST sintering includes operating in a constant voltage until the film has a density of this is at least 20, 30, 40, or 50% greater than the film before sintering occurs. In some of the methods disclosed herein, FAST sintering includes operating a constant power until the film has a density at least 20, 30, 40, or 50% greater than the film before sintering occurs. In some of the methods disclosed herein, FAST sintering includes operating in a constant current until the film has a density at least 20, 30, 40, or 50% greater than the film before sintering occurs.

In some of the methods disclosed herein, FAST sintering includes operating in a constant voltage until the film has an impedance that is at least 1, 2, 3, or 4 orders of magnitude lower than the film has before sintering occurs. In some of the methods disclosed herein, FAST sintering includes operating a constant power until the film has an impedance that is at least 1, 2, 3, or 4 orders of magnitude lower than the film has before sintering occurs. In some of the methods disclosed herein, FAST sintering includes operating in a constant current until the film has an impedance of that is at least 1, 2, 3, or 4 orders of magnitude lower than the film has before sintering occurs.

In some of the methods disclosed herein, FAST sintering includes operating in a constant voltage until the film has an impedance that is at least 1 or at most 10 orders of magnitude lower than the film has before sintering occurs. In some of the methods disclosed herein, FAST sintering includes operating a constant power until the film has an impedance that is at least 1 or at most 10 orders of magnitude lower than the film has before sintering occurs. In some of the methods disclosed herein, FAST sintering includes operating in a constant current until the film has an impedance that is at least 1 or at most 10 orders of magnitude lower than the film has before sintering occurs.

In some of the methods disclosed herein, FAST sintering includes operating in a constant voltage until the film has an impedance that is about 2 orders of magnitude lower than the film has before sintering occurs. In some of the methods disclosed herein, FAST sintering includes operating a constant power until the film has an impedance that is about 2 orders of magnitude lower than the film has before sintering occurs. In some of the methods disclosed herein, FAST sintering includes operating in a constant current until the film has an impedance that is at about 2 orders of magnitude lower than the film has before sintering occurs.

In some of the methods disclosed herein, FAST sintering includes operating in a constant voltage until the film has an impedance that is about 6 orders of magnitude lower than the film has before sintering occurs. In some of the methods disclosed herein, FAST sintering includes operating a constant power until the film has an impedance that is about 6 orders of magnitude lower than the film has before sintering occurs. In some of the methods disclosed herein, FAST sintering includes operating in a constant current until the film has an impedance that is at about 6 orders of magnitude lower than the film has before sintering occurs.

In some of the methods disclosed herein, FAST sintering includes operating in a constant voltage. In some of the methods disclosed herein, FAST sintering includes operating a constant power. In some of the methods disclosed herein, FAST sintering includes operating in a constant current.

In some of the methods disclosed herein, FAST sintering includes operating in a constant voltage amplitude mode and thereafter operating in a constant current amplitude mode once the impedance of the film decreases by at least an order of magnitude.

In some of the methods disclosed herein, FAST sintering includes operating in a ramped voltage until the Garnet-particles have a median dimension that is at least two times that of the Garnet-particles before sintering occurs. In some of the methods disclosed herein, FAST sintering includes operating a ramped power until the Garnet-particles have a median dimension that is at least two times that of the Garnet-particles before sintering occurs. In some of the methods disclosed herein, FAST sintering includes operating in a ramped current until the Garnet-particles have a median dimension that is at least two times that of the Garnet-particles before sintering occurs.

In some embodiments, FAST sintering is operated with feedback control wherein the applied voltage, power, or current are adjusted during sintering to meet certain predetermined values. In some examples, these values include the thickness of the film. For example, in some examples sintering is applied until the film is 50 μm thick. In other examples, the sintering is applied until the film is 40 μm thick. In other examples, the sintering is applied until the film is 30 μm thick. In other examples, the sintering is applied until the film is 20 μm thick. In other examples, the sintering is applied until the film is 10 μm thick. In other examples, the sintering is applied until the film is 5 μm thick. In other examples, the sintering is applied until the film is 1 μm thick. In other examples, the sintering is applied until the film is 0.5 μm thick. As used in this paragraph, thickness refers to the average dimensions of the film in the z-direction (as shown in FIG. 23.

In some embodiments, FAST sintering is operated with feedback control wherein the applied voltage, power, or current are adjusted during sintering to meet certain predetermined values. In some examples, these values include the conductivity of the film. For example, the sintering can be applied until the film has a conductivity of 1e-4 S/cm. In other examples, the sintering can be applied until the film has a conductivity of 1e-5 S/cm. In other examples, the sintering can be applied until the film has a conductivity of 1e-6 S/cm. In other examples, the sintering can be applied until the film has a conductivity of 1e-7 S/cm. In other examples, the sintering can be applied until the film has a conductivity of 1e-8 S/cm.

In some embodiments, FAST sintering is operated with feedback control wherein the applied voltage, power, or current are adjusted during sintering to meet certain predetermined values. In some examples, these values include the impedance of the film. For example, sintering can be applied until the impedance of the film is 500 Ohm-cm.

In some embodiments, FAST sintering is operated with feedback control wherein the applied voltage, power, or current are adjusted during sintering to meet certain predetermined values. In some examples, these values include the particle size in the film.

In some embodiments, FAST sintering is operated with feedback control wherein the applied voltage, power, or current are adjusted during sintering to meet certain predetermined values. In some examples, these values include the density of the film.

In some embodiments, FAST sintering is operated with feedback control wherein the applied voltage, power, or current are adjusted during sintering to meet certain predetermined values. In some examples, these values include the optical density of the film.

In some embodiments, FAST sintering is operated with feedback control wherein the applied voltage, power, or current are adjusted during sintering to meet certain predetermined values. In some examples, these values include the temperature of the film. For example, the sintering can be applied until the film has a temperature of 50° C. In other examples, the sintering can be applied until the film has a temperature of 100° C. In other examples, the sintering can be applied until the film has a temperature of 150° C. In other examples, the sintering can be applied until the film has a temperature of 200° C. In other examples, the sintering can be applied until the film has a temperature of 250° C. In other examples, the sintering can be applied until the film has a temperature of 300° C. In other examples, the sintering can be applied until the film has a temperature of 350° C. In other examples, the sintering can be applied until the film has a temperature of 400° C. In other examples, the sintering can be applied until the film has a temperature of 450° C. In other examples, the sintering can be applied until the film has a temperature of 500° C. In other examples, the sintering can be applied until the film has a temperature of 550° C. In other examples, the sintering can be applied until the film has a temperature of 600° C. In other examples, the sintering can be applied until the film has a temperature of 650° C. In other examples, the sintering can be applied until the film has a temperature of 700° C. In other examples, the sintering can be applied until the film has a temperature of 750° C. In other examples, the sintering can be applied until the film has a temperature of 800° C. In other examples, the sintering can be applied until the film has a temperature of 850° C. In other examples, the sintering can be applied until the film has a temperature of 900° C. In other examples, the sintering can be applied until the film has a temperature of 950° C. In other examples, the sintering can be applied until the film has a temperature of 1000° C. In other examples, the sintering can be applied until the film has a temperature of 1150° C. In other examples, the sintering can be applied until the film has a temperature of 1200° C. In other examples, the sintering can be applied until the film has a temperature of 1250° C. In other examples, the sintering can be applied until the film has a temperature of 1300° C. In other examples, the sintering can be applied until the film has a temperature of 1350° C.

In some of the methods disclosed herein, FAST sintering includes operating in a ramped voltage until the film has a density at least 20, 30, 40, or 50% greater than the film before sintering occurs. In some of the methods disclosed herein, FAST sintering includes operating a ramped power until the film has a density at least 20, 30, 40, or 50% greater than the film before sintering occurs. In some of the methods disclosed herein, FAST sintering includes operating in a ramped current until the film has a density of at least 20, 30, 40, or 50% greater than the film before sintering occurs.

In some of the methods disclosed herein, FAST sintering includes operating in a ramped voltage until the film has an impedance that is 1, 2, 3, 4, 5, 6, 7, 8, 9, or 10 orders of magnitude lower than the film has before sintering occurs. In some of the methods disclosed herein, FAST sintering includes operating a ramped power until the film has an impedance that is 1, 2, 3, 4, 5, 6, 7, 8, 9, or 10 orders of magnitude lower than the film has before sintering occurs.

In some of the methods disclosed herein, FAST sintering includes operating in a ramped current until the film has an impedance that is 1, 2, 3, 4, 5, 6, 7, 8, 9, or 10 orders of magnitude lower than the film has before sintering occurs.

In some of the methods disclosed herein, FAST sintering includes operating in a ramped voltage. In some of the methods disclosed herein, FAST sintering includes operating a ramped power. In some of the methods disclosed herein, FAST sintering includes operating in a ramped current.

In any of the methods set forth herein, the FAST sintering may include heating the film in the range from about 400° C. to about 1000° C. and applying a D.C. or A.C. electric field to the thin film. In some examples, FAST sintering includes heating the film in the range from about 500° C. to about 900° C. and applying a D.C. or A.C. electric field to the thin film. In some examples, FAST sintering includes heating the film in the range from about 600° C. to about 900° C. and applying a D.C. or A.C. electric field to the thin film. In some examples, FAST sintering includes heating the film in the range from about 700° C. to about 900° C. and applying a D.C. or A.C. electric field to the thin film. In some examples, FAST sintering includes heating the film in the range from about 800° C. to about 900° C. and applying a D.C. or A.C. electric field to the thin film. In some examples, FAST sintering includes heating the film in the range from about 500° C. to about 800° C. and applying a D.C. or A.C. electric field to the thin film. In some examples, FAST sintering includes heating the film in the range from about 500° C. to about 700° C. and applying a D.C. or A.C. electric field to the thin film. In some examples, FAST sintering includes heating the film in the range from about 500° C. to about 600° C. and applying a D.C. or A.C. electric field to the thin film.

In any of the methods set forth herein, the FAST sintering may include heating the film in the range from about 400° C. to about 1000° C. and applying a D.C. electric field to the thin film.

In some examples, FAST sintering includes heating the film in the range from about 600° C. to about 900° C. and applying a D.C. electric field to the thin film. In some examples, FAST sintering includes heating the film in the range from about 600° C. to about 900° C. and applying a D.C. electric field to the thin film. In some examples, FAST sintering includes heating the film in the range from about 700° C. to about 900° C. and applying a D.C. electric field to the thin film. In some examples, FAST sintering includes heating the film in the range from about 800° C. to about 900° C. and applying a D.C. electric field to the thin film. In some examples, FAST sintering includes heating the film in the range from about 500° C. to about 800° C. and applying a D.C. electric field to the thin film. In some examples, FAST sintering includes heating the film in the range from about 500° C. to about 700° C. and applying a D.C. electric field to the thin film. In some examples, FAST sintering includes heating the film in the range from about 500° C. to about 600° C. and applying a D.C. electric field to the thin film.

In any of the methods set forth herein, the FAST sintering may include heating the film in the range from about 400° C. to about 1000° C. and applying an A.C. electric field to the thin film. In any of the methods set forth herein, the FAST sintering may include heating the film in the range from about 500° C. to about 900° C. and applying an A.C. electric field to the thin film. In some examples, FAST sintering includes heating the film in the range from about 600° C. to about 900° C. and applying an A.C. electric field to the thin film. In some examples, FAST sintering includes heating the film in the range from about 700° C. to about 900° C. and applying an A.C. electric field to the thin film. In some examples, FAST sintering includes heating the film in the range from about 800° C. to about 900° C. and applying an A.C. electric field to the thin film. In some examples, FAST sintering includes heating the film in the range from about 500° C. to about 800° C. and applying an A.C. electric field to the thin film. In some examples, FAST sintering includes heating the film in the range from about 500° C. to about 700° C. and applying an A.C. electric field to the thin film. In some examples, FAST sintering includes heating the film in the range from about 500° C. to about 600° C. and applying an A.C. electric field to the thin film.

In certain examples, the methods set forth herein include providing an unsintered thin film by casting a film.

vii. Composites

In another embodiment, the disclosure sets forth herein a method for making a composite electrochemical device, including the following steps in any order: providing an anode layer including an anode current collector; providing a Garnet-type solid state electrolyte (SSE) layer in contact with at least one side of the anode layer and optionally sintering the SSE; providing a porous Garnet layer in contact with the SSE layer and optionally sintering the porous Garnet layer; optionally infiltrating the porous Garnet layer with at least one member selected from the group consisting of carbon, a lithium conducting polymer, an active cathode material, and combinations thereof; and providing a cathode current collector layer in contact with the porous Garnet layer.

In some examples, set forth herein is a method for sintering a thin and free standing garnet film, including the following steps, in any order: providing a green tape by casting a garnet slurry; wherein the slurry comprises at least one member selected from the group consisting of garnet precursors, garnet, a binder, a solvent, a plasticizer, a dispersant, and combinations thereof; sintering the green tape between setter plates; wherein the sintering is heat, spark plasma, or field assisted sintering; and wherein sintering optionally includes applying pressure to the film with the setter plates.

In some of these aforementioned examples, the slurry includes milled and calcined garnet. In some examples, the solid loading of the green tape is at least 30% w/w. In some examples, the solid loading of the green tape is at least 40% w/w. In some examples, the solid loading of the green tape is at least 50% w/w. In some examples, the solid loading of the green tape is at least 60% w/w. In some examples, the solid loading of the green tape is at least 70% w/w. In some of these examples, the film is sintered directly onto a metal. In certain examples, the metal is a metal powder or a metal foil. In some examples, the metal powder is between and in contact with one side of the green tape and one setter plate. In other examples, the metal powder layer is positioned between and in contact with two green tapes, and wherein the green tapes are between and in contact with the setter plates. In certain examples, the metal powder is Ni or Cu powder. In some of these examples, a source of Li is placed in proximity of the sintered film during sintering. In some specific examples, the setter plates are selected from YSZ, graphite, YSZ, Mg—SZ, zirconia, porous zirconia, $SiO_2$, $SiO_2$ sand, $Al_2O_3$, $Al_2O_3$ powder, $Al_2O_3$ paper, nickel, nickel powder, garnet, garnet powder, a sacrificial garnet film, $LiAlO_2$, $LiLaO_2$, $Li_2ZrO_3$. In some examples, two different setter plates are used. In some of these examples, a zirconia setter plate contacts the metal powder. In some examples, a pressure applied is between 0.001 MPa to 200 MPa.

viii. Bilayer and Trilayer Sintering

In some examples, the films which are sintered are provided as layers of a garnet-electrolyte in contact with a metal layer which is then in contact with a garnet-electrolyte layer. A non-limiting example is shown in FIG. 4 or FIG. 29.

ix. Heat Sintering

In some embodiments, disclosed herein is a method of making an energy storage electrode, including providing an unsintered thin film; wherein the unsintered thin film includes at least one member selected from the group consisting of a Garnet-type electrolyte, an active electrode material, a conductive additive, a solvent, a binder, and combinations thereof. In some examples, the methods further include removing the solvent, if present in the unsintered thin film. In some examples, the method optionally includes laminating the film to a surface. In some examples, the method includes removing the binder, if present in the film. In some examples, the method includes sintering the film, wherein sintering comprises heat sintering. In some of these examples, heat sintering includes heating the film in the range from about 700.0 to about 1200.0 for about 1 to about 600 minutes and in atmosphere having an oxygen partial pressure in the range of 1e-1 atm to 1e-15 atm.

In some embodiments, disclosed herein is a method of making an energy storage electrode, including providing an unsintered thin film; wherein the unsintered thin film includes at least one member selected from the group consisting of a Garnet-type electrolyte, an active electrode material, a conductive additive, a solvent, a binder, and combinations thereof. In some examples, the methods further include removing the solvent, if present in the unsintered thin film. In some examples, the method optionally includes laminating the film to a surface. In some examples, the method includes removing the binder, if present in the film. In some examples, the method includes sintering the film, wherein sintering includes field assisted sintering (FAST). In some of these examples, FAST sintering includes heating the film in the range from about 500° C. to about 900° C. and applying a D.C. or A.C. electric field to the thin film.

In any of the methods set forth herein, the unsintered thin film may include a Garnet-type electrolyte. In other methods, the unsintered thin film may include an active electrode material. In still other methods, the unsintered thin film may include a conductive additive. In certain methods, the unsintered thin film may include a solvent. In certain methods, the unsintered thin film may include a binder.

In any of the methods set forth herein, heat sintering may include heating the film in the range from about 700° C. to about 1200° C.; or about 800° C. to about 1200° C.; or about 900° C. to about 1200° C.; or about 1000° C. to about 1200° C.; or about 1100° C. to about 1200° C. In any of the methods set forth herein, heat sintering can include heating the film in the range from about 700° C. to about 1100° C.; or about 700° C. to about 1000° C.; or about 700° C. to about 900° C.; or about 700° C. to about 800° C. In any of the methods set forth herein, heat sintering can include heating the film to about 700° C., about 750° C., about 850° C., about 800° C., about 900° C., about 950° C., about 1000° C., about 1050° C., about 1100° C., about 1150° C., or about 1200° C. In any of the methods set forth herein, heat sintering can include heating the film to 700° C., 750° C., 850° C., 800° C., 900° C., 950° C., 1000° C., 1050° C., 1100° C., 1150° C., or 1200° C. In any of the methods set forth herein, heat sintering can include heating the film to 700° C. In any of the methods set forth herein, heat sintering can include heating the film to 750° C. In any of the methods set forth herein, heat sintering can include heating the film to 850° C. In any of the methods set forth herein, heat sintering can include heating the film to 900° C. In any of the methods set forth herein, heat sintering can include heating the film to 950° C. In any of the methods set forth herein, heat sintering can include heating the film to 1000° C. In any of the methods set forth herein, heat sintering can include heating the film to 1050° C. In any of the methods set forth herein, heat sintering can include heating the film to 1100° C. In any of the methods set forth herein, heat sintering can include heating the film to 1150° C. In any of the methods set forth herein, heat sintering can include heating the film to 1200° C.

In any of the methods set forth herein, the methods may include heating the film for about 1 to about 600 minutes. In any of the methods set forth herein, the methods may include heating the film for about 20 to about 600 minutes. In any of the methods set forth herein, the methods may include heating the film for about 30 to about 600 minutes. In any of the methods set forth herein, the methods may include heating the film for about 40 to about 600 minutes. In any of the methods set forth herein, the methods may include heating the film for about 50 to about 600 minutes. In any of the methods set forth herein, the methods may include heating the film for about 60 to about 600 minutes. In any of the methods set forth herein, the methods may include heating the film for about 70 to about 600 minutes. In any of the methods set forth herein, the methods may include heating the film for about 80 to about 600 minutes. In any of the methods set forth herein, the methods may include heating the film for about 90 to about 600 minutes. In any of the methods set forth herein, the methods may include heating the film for about 100 to about 600 minutes. In any of the methods set forth herein, the methods may include heating the film for about 120 to about 600 minutes. In any of the methods set forth herein, the methods may include heating the film for about 140 to about 600 minutes. In any of the methods set forth herein, the methods may include heating the film for about 160 to about 600 minutes. In any of the methods set forth herein, the methods may include heating the film for about 180 to about 600 minutes. In any of the methods set forth herein, the methods may include heating the film for about 200 to about 600 minutes. In any of the methods set forth herein, the methods may include heating the film for about 300 to about 600 minutes. In any of the methods set forth herein, the methods may include heating the film for about 350 to about 600 minutes. In any of the methods set forth herein, the methods may include heating the film for about 400 to about 600 minutes. In any of the methods set forth herein, the methods may include heating the film for about 450 to about 600 minutes. In any of the methods set forth herein, the methods may include heating the film for about 500 to about 600 minutes. In any of the methods set forth herein, the methods may include heating the film for about 1 to about 500 minutes. In any of the methods set forth herein, the methods may include heating the film for about 1 to about 400 minutes. In any of the methods set forth herein, the methods may include heating the film for about 1 to about 300 minutes. In any of the methods set forth herein, the methods may include heating the film for about 1 to about 200 minutes. In any of the methods set forth herein, the methods may include heating the film for about 1 to about 100 minutes. In any of the methods set forth herein, the methods may include heating the film for about 1 to about 50 minutes.

x. LAMINATING

In some of the methods set forth herein the laminating includes applying a pressure less than 1000 pounds per square inch (PSI) and heating the film. In other embodiments, the laminating includes applying a pressure less than 750 pounds per square inch (PSI) and heating the film. In some other embodiments, laminating includes applying a pressure less than 700 pounds per square inch (PSI) and heating the film. In other embodiments, the laminating includes applying a pressure less than 650 pounds per square inch (PSI) and heating the film. In some other embodiments, laminating includes applying a pressure less than 600 pounds per square inch (PSI) and heating the film. In other embodiments, the laminating includes applying a pressure less than 550 pounds per square inch (PSI) and heating the film. In some other embodiments, laminating includes applying a pressure less than 500 pounds per square inch (PSI) and heating the film. In other embodiments, the laminating includes applying a pressure less than 450 pounds per square inch (PSI) and heating the film. In some other embodiments, laminating includes applying a pressure less than 400 pounds per square inch (PSI) and heating the film. In other embodiments, the laminating includes applying a pressure less than 350 pounds per square inch (PSI) and heating the film. In some other embodiments, laminating includes applying a pressure less than 300 pounds per square inch (PSI) and heating the film. In other embodiments, the laminating includes applying a pressure less than 250 pounds per square inch (PSI) and heating the film. In some other embodiments, laminating includes applying a pressure less than 200 pounds per square inch (PSI) and heating the film. In other embodiments, the laminating includes applying a pressure less than 150 pounds per square inch (PSI) and heating the film.

In some other embodiments, laminating includes applying a pressure less than 100 pounds per square inch (PSI) and heating the film. In other embodiments, the laminating includes applying a pressure less than 50 pounds per square inch (PSI) and heating the film. In some other embodiments, laminating includes applying a pressure less than 10 pounds per square inch (PSI) and heating the film. Some of the laminating methods set forth herein include heating the film is heated to about 80° C. Some of the laminating methods set forth herein include heating the film is heated to about 25° C. to about 180° C.

In some of the methods disclosed herein, the laminating step includes laminating an unsintered thin film electrolyte to a composite electrode; wherein the composite electrode includes at least one member selected from the group consisting of an electrolyte, an active electrode material, a conductive additive, and combinations thereof. In certain of these embodiments, the composite electrode includes an electrolyte. In certain other of these embodiments, the composite electrode includes an active electrode material. In some other of these embodiments, the composite electrode includes a conductive additive.

xi. Setter Plates

In some of the methods disclosed herein, the sintering occurs between inert setter plates. In some examples, when the sintering occurs between inert setter plates, a pressure is applied by the setter plates onto the sintering film. In certain examples, the pressure is between 1 and 1000 pounds per square inch (PSI). In some examples, the pressure is 1 PSI. In other examples, the pressure is 10 PSI. In still others, the pressure is 20 PSI. In some other examples, the pressure is 30 PSI. In certain examples, the pressure is 40 PSI. In yet other examples, the pressure is 50 PSI. In some examples, the pressure is 60 PSI. In yet other examples, the pressure is 70 PSI. In certain examples, the pressure is 80 PSI. In other examples, the pressure is 90 PSI. In yet other examples, the pressure is 100 PSI. In some examples, the pressure is 110 PSI. In other examples, the pressure is 120 PSI. In still others, the pressure is 130 PSI. In some other examples, the pressure is 140 PSI. In certain examples, the pressure is 150 PSI. In yet other examples, the pressure is 160 PSI. In some examples, the pressure is 170 PSI. In yet other examples, the pressure is 180 PSI. In certain examples, the pressure is 190 PSI. In other examples, the pressure is 200 PSI. In yet other examples, the pressure is 210 PSI.

In some of the above examples, the pressure is 220 PSI. In other examples, the pressure is 230 PSI. In still others, the pressure is 240 PSI. In some other examples, the pressure is 250 PSI. In certain examples, the pressure is 260 PSI. In yet other examples, the pressure is 270 PSI. In some examples, the pressure is 280 PSI. In yet other examples, the pressure is 290 PSI. In certain examples, the pressure is 300 PSI. In other examples, the pressure is 310 PSI. In yet other examples, the pressure is 320 PSI. In some examples, the pressure is 330 PSI. In other examples, the pressure is 340 PSI. In still others, the pressure is 350 PSI. In some other examples, the pressure is 360 PSI. In certain examples, the pressure is 370 PSI. In yet other examples, the pressure is 380 PSI. In some examples, the pressure is 390 PSI. In yet other examples, the pressure is 400 PSI. In certain examples, the pressure is 410 PSI. In other examples, the pressure is 420 PSI. In yet other examples, the pressure is 430 PSI. In some other examples, the pressure is 440 PSI. In certain examples, the pressure is 450 PSI. In yet other examples, the pressure is 460 PSI. In some examples, the pressure is 470 PSI. In yet other examples, the pressure is 480 PSI. In certain examples, the pressure is 490 PSI. In other examples, the pressure is 500 PSI. In yet other examples, the pressure is 510 PSI.

In some of the above examples, the pressure is 520 PSI. In other examples, the pressure is 530 PSI. In still others, the pressure is 540 PSI. In some other examples, the pressure is 550 PSI. In certain examples, the pressure is 560 PSI. In yet other examples, the pressure is 570 PSI. In some examples, the pressure is 580 PSI. In yet other examples, the pressure is 590 PSI. In certain examples, the pressure is 600 PSI. In other examples, the pressure is 610 PSI. In yet other examples, the pressure is 620 PSI. In some examples, the pressure is 630 PSI. In other examples, the pressure is 640 PSI. In still others, the pressure is 650 PSI. In some other examples, the pressure is 660 PSI. In certain examples, the pressure is 670 PSI. In yet other examples, the pressure is 680 PSI. In some examples, the pressure is 690 PSI. In yet other examples, the pressure is 700 PSI. In certain examples, the pressure is 710 PSI. In other examples, the pressure is 720 PSI. In yet other examples, the pressure is 730 PSI. In some other examples, the pressure is 740 PSI. In certain examples, the pressure is 750 PSI. In yet other examples, the pressure is 760 PSI. In some examples, the pressure is 770 PSI. In yet other examples, the pressure is 780 PSI. In certain examples, the pressure is 790 PSI. In other examples, the pressure is 800 PSI. In yet other examples, the pressure is 810 PSI.

In other examples, the pressure is 820 PSI. In certain aforementioned examples, the pressure is 830 PSI. In still others, the pressure is 840 PSI. In some other examples, the pressure is 850 PSI. In certain examples, the pressure is 860 PSI. In yet other examples, the pressure is 870 PSI. In some examples, the pressure is 880 PSI. In yet other examples, the pressure is 890 PSI. In certain examples, the pressure is 900 PSI. In other examples, the pressure is 910 PSI. In yet other examples, the pressure is 920 PSI. In some examples, the pressure is 930 PSI. In other examples, the pressure is 940 PSI. In still others, the pressure is 950 PSI. In some other examples, the pressure is 960 PSI. In certain examples, the pressure is 970 PSI. In yet other examples, the pressure is 980 PSI. In some examples, the pressure is 990 PSI. In yet other examples, the pressure is 1000 PSI.

In some examples, the garnet-based setter plates are useful for imparting beneficial surface properties to the sintered film. These beneficial surface properties include flatness and conductivity useful for battery applications. These beneficial properties also include preventing Li evaporation during sintering. These beneficial properties may also include preferencing a particular garnet crystal structure.

In certain methods disclosed herein, the inert setter plates are selected from porous zirconia, graphite or conductive metal plates. In some of these methods, the inert setter plates are porous zirconia. In some other of these methods, the inert setter plates are graphite. In yet other methods, the inert setter plates are conductive metal plates.

h. Partial Pressure of Oxygen

In some examples, the sintering methods additionally comprises controlling the oxygen concentration in the atmosphere in contact with the sintering garnet material. In some examples, the partial pressure of oxygen is controlled by flowing a mixture of Argon, Hydrogen, and Water (i.e., $H_2O$) in contact with the sintering garnet material. In some examples, the partial pressure of oxygen is controlled by adjusting the flow rates of either the Argon, Hydrogen, or water, or the flow rates of all three gases or any combinations of these gases. In some examples, the partial pressure of oxygen is 2E-1 (i.e., 20% $O_2$). In some other examples, the partial pressure of oxygen is 1E-2. In some examples, the partial pressure of oxygen is 1E-3. In other examples, the partial pressure of oxygen is 1E-4. In some other examples, the partial pressure of oxygen is 1E-5. In some examples, the partial pressure of oxygen is 1E-6. In other examples, the partial pressure of oxygen is 1E-7. In some other examples, the partial pressure of oxygen is 1E-8. In some examples, the partial pressure of oxygen is 1E-9. In other examples, the partial pressure of oxygen is 1E-10. In some other examples, the partial pressure of oxygen is 1E-11. In some examples, the partial pressure of oxygen is 1E-3. In other examples, the partial pressure of oxygen is 1E-12. In some other examples, the partial pressure of oxygen is 1E-13. In other examples, the partial pressure of oxygen is 1E-14. In some other examples, the partial pressure of oxygen is 1E-15. In some examples, the partial pressure of oxygen is 1E-16. In other examples, the partial pressure of oxygen is 1E-17. In some other examples, the partial pressure of oxygen is 1E-18. In some examples, the partial pressure of oxygen is 1E-19. In other examples, the partial pressure of oxygen is 1E-20. In some other examples, the partial pressure of oxygen is 1E-21. In some examples, the partial pressure of oxygen is 1E-22. In other examples, the partial pressure of oxygen is 1E-23. In some other examples, the partial pressure of oxygen is 1E-24. In some examples, the partial pressure of oxygen is 1E-25.

i. Milling Methods

As described herein, several recited methods include methods steps related to mixing and, or, method steps related to milling. Milling includes ball milling. Milling also includes milling methods that use inert solvents such as, but not limited to, ethanol, isopropanol, toluene, ethyl acetate, methyl acetate, acetone, acetonitrile, or combinations thereof. Depending on the material milled, the solvents may not be inert. In some of these examples, milling includes milling with solvents such as, but not limited to, ethanol, isopropanol, toluene, ethyl acetate, methyl acetate, acetone, acetonitrile, or combinations thereof.

In some examples, the milling is ball milling. In some examples, the milling is horizontal milling. In some examples, the milling is attritor milling. In some examples, the milling is immersion milling. In some examples, the milling is high energy milling. In some examples, the high energy milling process results in a milled particle size distribution with $d_{50}$ 100 nm. In some examples, the milling is immersion milling.

In some examples, high energy milling process is used to achieve a particle size distribution with $d_{50}$ of about 100 nm. In some examples, the solvent is toluene. In some examples, the solvent is isopropyl alcohol (IPA). In some examples, the solvent is ethanol. In some examples, the solvent is diacetone alcohol. In some examples, the solvent is a polar solvents suitable for achieving the recited $d_{50}$ size.

In some examples, the milling includes high energy wet milling process with 0.3 mm yttria stabilized zirconium oxide grinding media beads. In some examples, ball milling, horizontal milling, attritor milling, or immersion milling can be used. In some examples, using a high energy milling process produces a particle size distribution of about $d_{50}$~100 nm.

IV. Examples

In the examples described herein, the subscript values in the product lithium stuffed garnets formed by the methods herein represent elemental molar ratios of the precursor chemicals used to make the claimed composition.

a. Example 1—Flux Deposition of Li Conducting Ceramic

In some example, a preformed garnet material, i.e., seed crystal, is used to prepare other garnet materials. In this Example, 100 grams (g) of $Li_7La_3Zr_2O_{12}$ is mixed with 31.03 g of $Li_2CO_3$, 58.65 g of $La_2O_3$, and 29.57 g $ZrO_2$. The resulting mixture was ball milled in isopropanol for twenty four hours. The mixture was then dried and subsequently calcined at 900° C. for twelve hours and then sintered at 1100° C. for twelve hours. The product resulting was milled again in isopropanol to reduce the average particle size to 1 μm.

b. Example 2—Flux Deposition of Li Conducting Ceramic

In this example, thin film garnet electrolytes that are 3 μm to 50 μm are prepared. In this example, the garnet precursors were $LiOH/Li_2CO_3/LiO_2/La_2O_3/ZrO_2$. The precursors were milled using 0.3 mm yttria stabilized zirconium oxide grinding media beads. The milled precursors were dispersed in a slurry formulation, and the slurry was deposited onto a metal foil. The slurry was then dried, pressure was applied to the film with plates, and heated to sinter the components therein. Doped compositions were prepared using $AlNO_3$ and $Al_2O_3$ as sources of Al. $Nb_2O_5$ was a source of Nb, and $Ta_2O_5$ was used as a source of Ta.

The garnet precursor slurry was deposited onto a metal foil substrate. A piece of nickel of about 0.5 mil thickness was used as a base substrate. A cleaning method was used to prepare the substrate. In one case, an IPA solvent was used to remove residual organics on the surface of the metal foil. Other surface cleaning methods such as UV Ozone treatment, corona discharge treatment, atmospheric plasma treatment, and chemical treatments (light acid/base solutions like ammonium hydroxide or citric/acetic acid) may also be used to prep the surface for slurry coating. Using a doctor blade, film thickness between 3 um and 100 um were achieved with adjustment of the doctor blade gap.

Next, the deposited film was dried. Once the film was dried, the deposited film was calendered to achieve a dense film prior to any thermal steps. Depending on the starting thickness, up to 50% thickness reduction was achieved after the calender step. The next step involved the application of pressure on the films. Pressures up to 20 MPa were applied.

Next, a sintering process was performed. The size of the sintered grain depended on the degree of sintering performed. Sintering was performed at a temperature range of about 900° C. to 1200° C. with only 15-90 minutes of dwell time.

Figure 7:
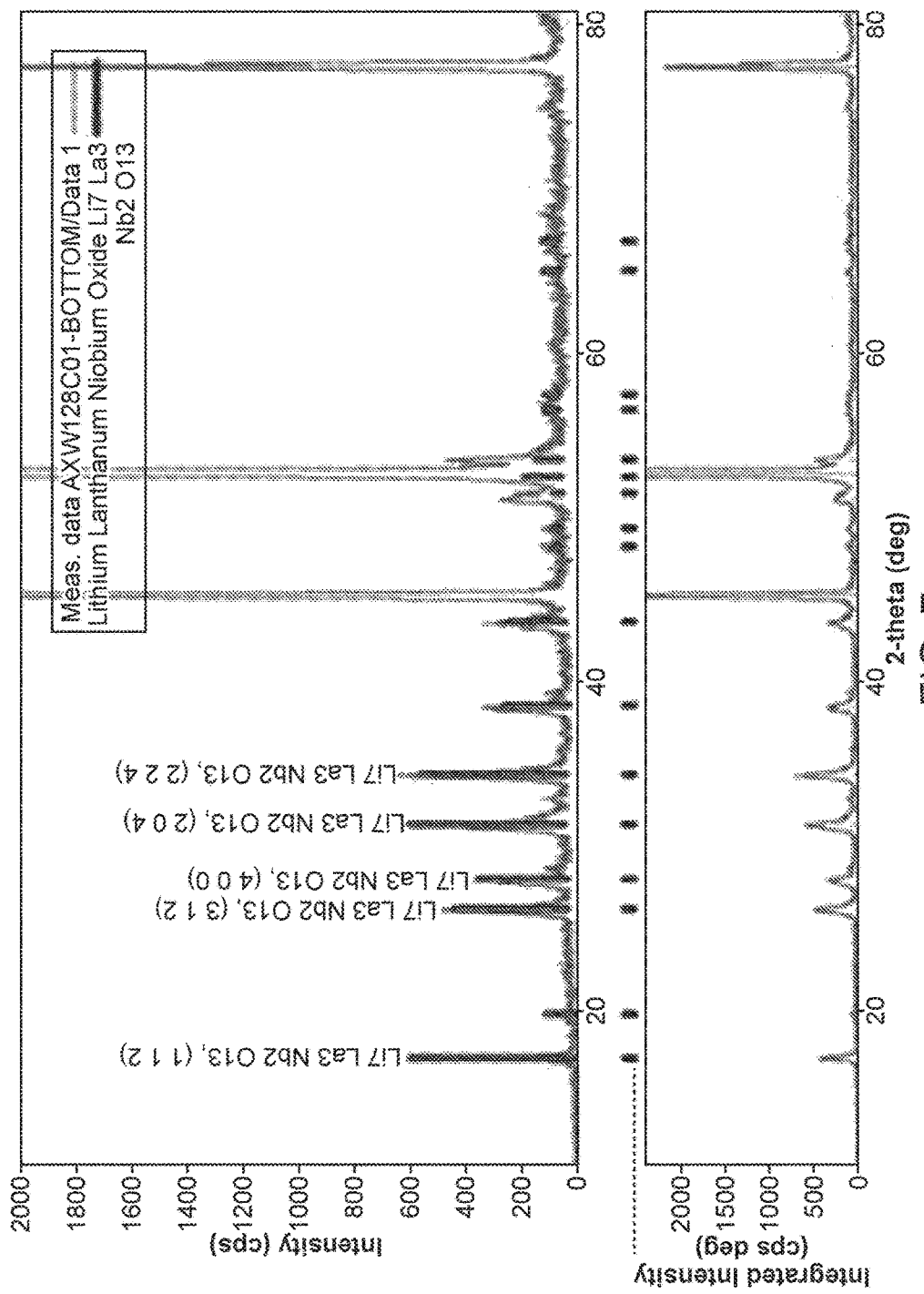
FIG. 7 shows an x-ray diffraction (XRD) pattern (Intensity on y-axis, 2-theta on x-axis) for thin film garnet film made by reactive sintering at about 1150° C. and without the use of additional lithium source powder. Labeled peaks [(112), (312), (400), (204), (224)] correspond to crystal phase for $Li_7La_3Nb_2O_{13}$.
Figure 8:
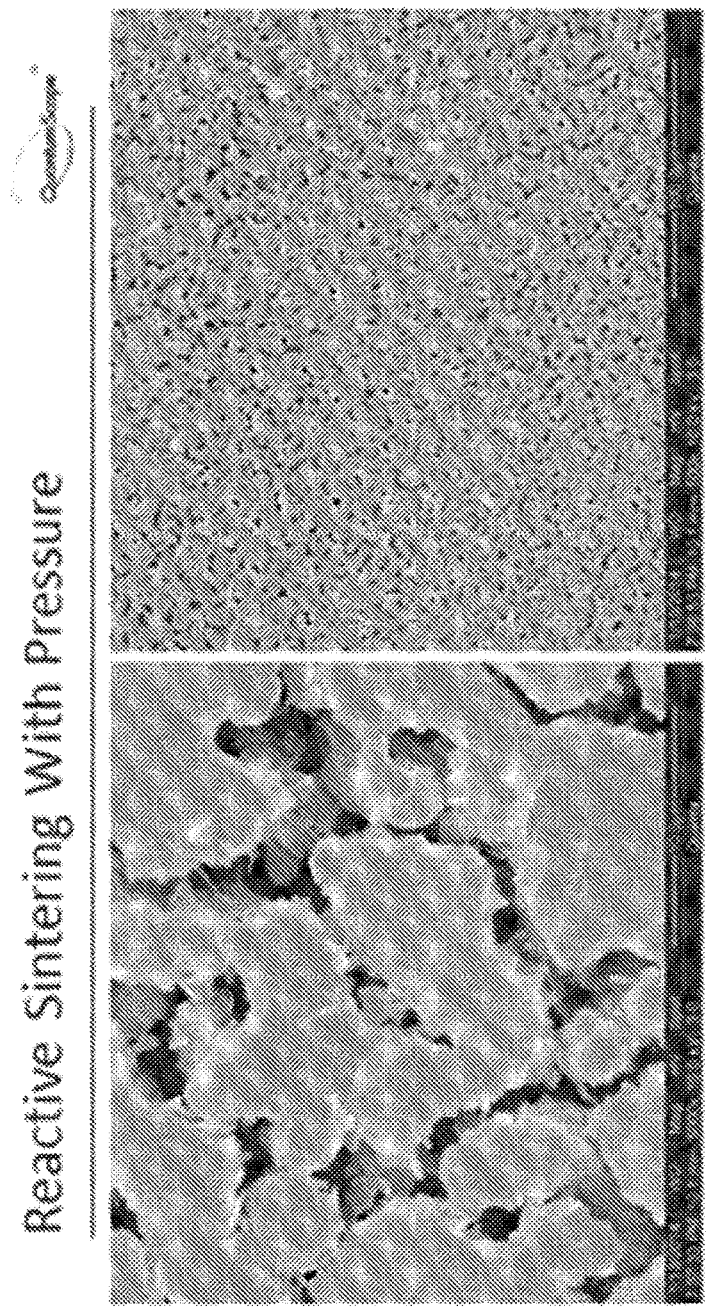
FIG. 8 shows a dense garnet thin film prepared by reactive sintering with applied pressure. Scale bar for left image is 10 μm. Scale bar for right image is 100 μm.

The sintering process increases the density and uniformity of the garnet thin film. FIG. 7 is an XRD graph of a thin garnet film processed as such. Confirmation of the garnet phase is demonstrated through XRD in FIG. 7.

c. Example 3—Densification with Bismuth Flux

Lithium stuffed garnet powder was densified in this example using a flux composed of 1:1 mixture of $Li_2CO_3$ and $B_2O_3$.

Figure 52:
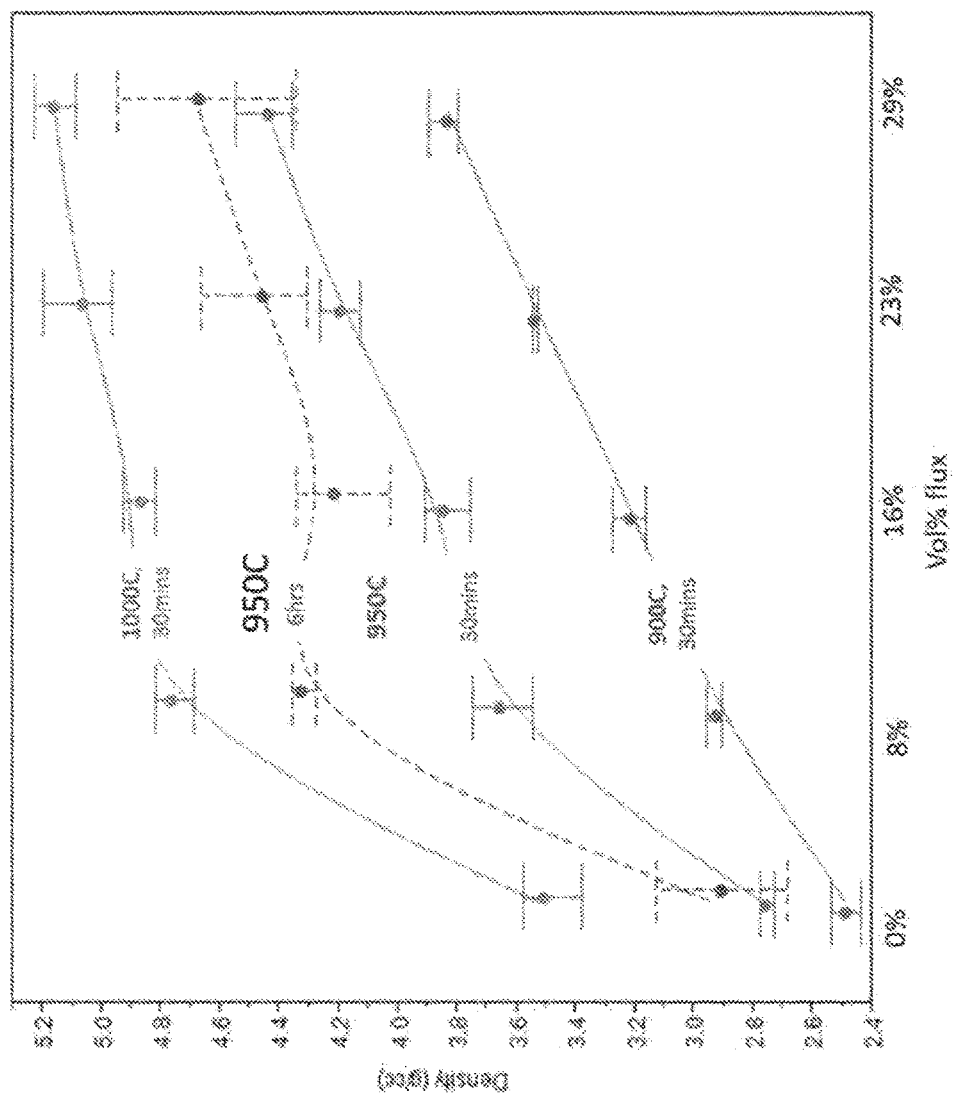
FIG. 52 shows a plot of Density (g/cm³) as a function of flux volume percent for a 1:1 molar mixture of $Li_2CO_3$ and $B_2O_3$.

FIG. 52 shows the resultant density of lithium stuffed garnet films as a function of the heating conditions of the flux: 900° C., 30 minutes, (bottom curve); 950° C., 30 minutes, (second from bottom curve); 950° C., 6 hours, (third from bottom curve); 100° C., 30 minutes, (top curve).

d. Example 4—Making Fine Grained Li Ion Conducting Garnet Ceramics

In this example, LiOH, $La_2O_3$, $ZrO_2$ and $Al(NO_3)_3 \cdot 9H_2O$ were combined in various ratios and mixed by dry ball milling for 8 hours. The mixture was then calcined at 800-1000° C. in alumina crucibles in air for 4 to 8 hours.

As noted above, to prepare a $Li_7La_3Zr_2O_{12} \cdot 0.35Al_2O_3$ phase, the above reactants were mixed so that the molar ratios of Li:La:Zr:$Al_2$ was 7:3:2:0.35.

Figure 49:
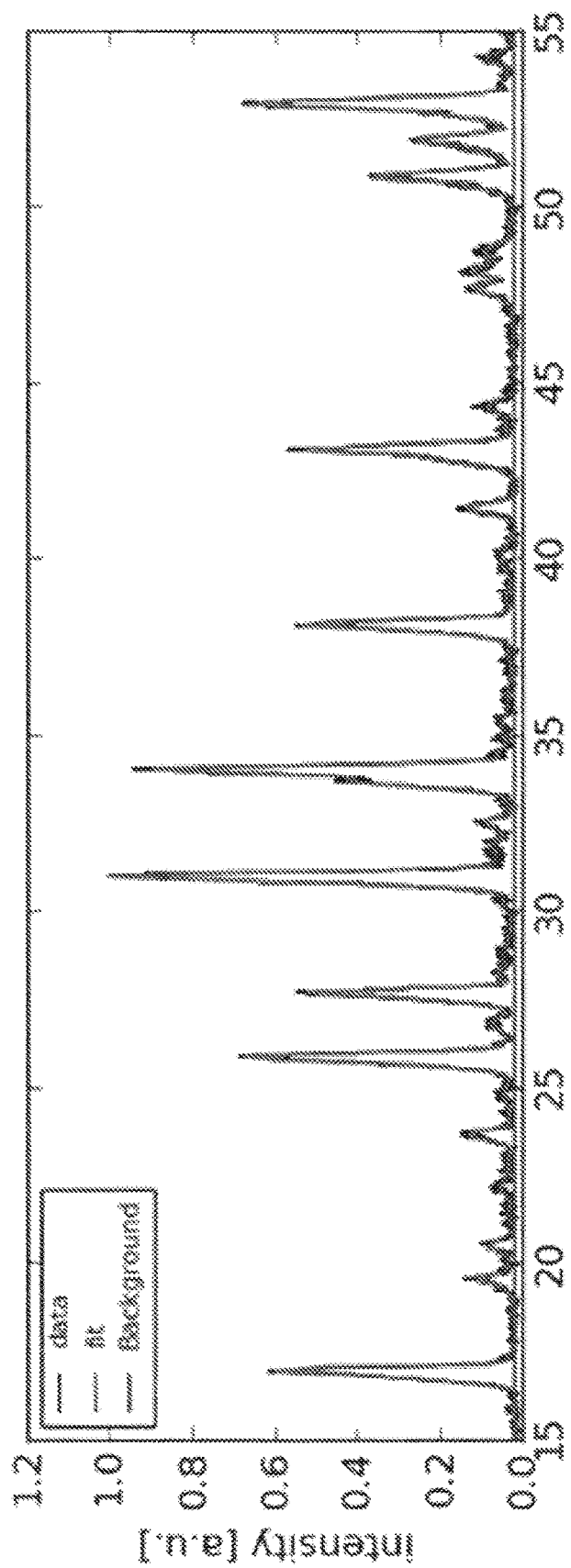
FIG. 49 shows and x-ray diffraction pattern (XRD) for composition C.

Composition C, the XRD of which is shown in FIG. 49, was prepared by reacting dry milled (Yttria-stabilized Zirconia milling media for about 2-10 hours and 80 mesh sieve) 64.6 grams (g) LiOH with 184.5 g $La_2O_3$, 93.9 g $ZrO_2$, and 96.3 g $Al(NO_3)_3 \cdot 9H_2O$. The reactant powders were dried at 120° C. for about an hour. The powders were calcined in alumina crucibles between 800-1000° C. in alumina crucibles in air for 4 to 8 hours.

The product was attrition milled with solvent until the $d_{50}$ particle size was ~300 nm (as determined by light scattering) and dried to yield dry powder. Pellets were formed by mixing the dry powder with 4% w/w poly vinyl butyral, in isopropanol, removing the isopropanol, and 80 mesh sieving.

13 mm diameter, approximately 1.2 to 1.4 mm thick, pellets were pressed from this binder-coated powder under about 3 metric tons. Pellets were placed between setter places and sintered in a tube furnace with dry flowing Argon (Ar; 315 sccm flow rate). The sintering included heat sintering between 150-180° C. for 1-4 hours, then 300-350° C. for 1-4 hours, and then 1000-1200° C. for 3-9 hours, then cooled.

Mass and dimensions of sintered pellets were measured to determine geometrical density and scanning electron microscopy was used to determine grain size on fractured cross sections.

Figure 9:
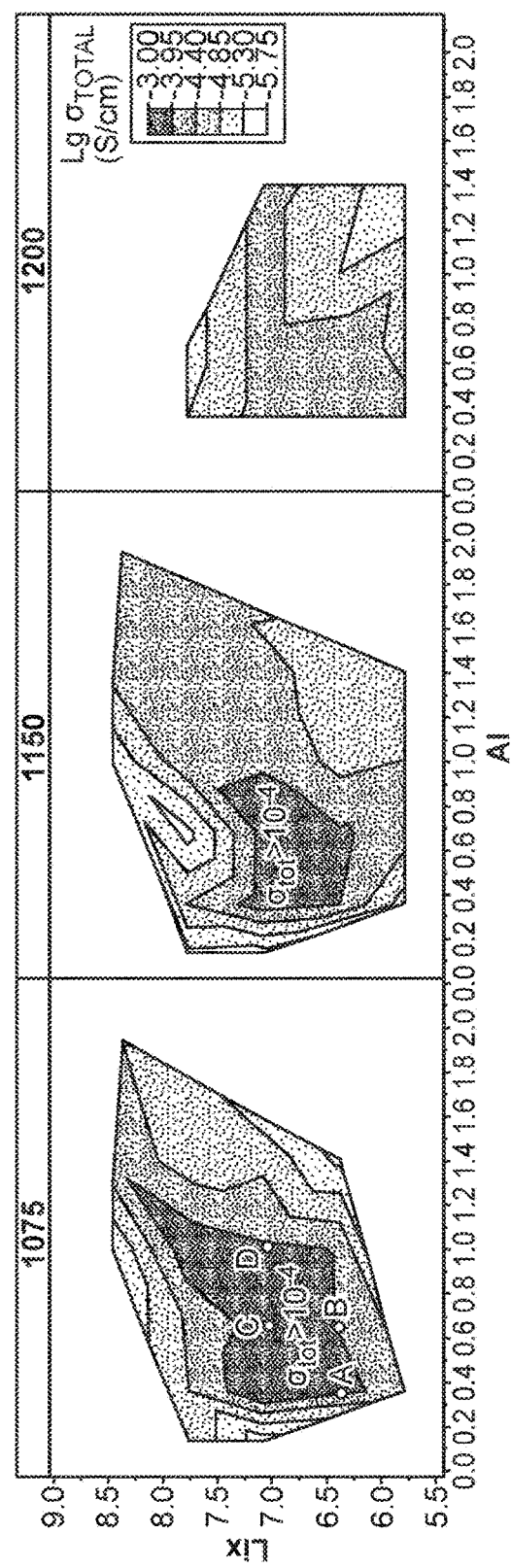
FIG. 9 shows a conductivity phase space map of Lithium-Lanthanum-Zirconia-Alumina, prepared according to the methods set forth herein, and showing the total conductivity (at 20° C.) for several different processing temperature/time combinations as a function of Li and Al in $Li_xLa_3Zr_2O_{12} \cdot yAl_2O_3$, wherein x ranges from 5.5 to 9 (plot x-axis is from 5.5 to 9.0); and y ranges from 0 to 1 (plot y-axis is from 0 to 2). Left image is for materials processed at 1075° C.; Middle image is for materials processed at 1150° C.; Right image is for materials processed at 1200° C.

FIG. 9 shows a map of the compositional space studied. The compositional variables included Lithium and Aluminum content. The Lanthanum and Zirconium ratios were maintained at 3:2 for the entire study. FIG. 9 shows that there exists a zone of high conductivity ($>10^{-4}$ S/cm) in the studied phase space. The zone is larger for the lower sintering temperature, (1075° C. compared to 1150° C.). The high temperature, short dwell condition (1200° C., 15 mins) does not yield as good conductivity as the samples prepared at lower temperatures. Several compositions disclosed in the present work result in high conductivity, e.g., compositions A, B, C, D (as shown in FIG. 9).

Composition A is characterized by $Li_{6.3}La_3Zr_2O_{12} \cdot 0.35Al_2O_3$.

Composition B is characterized by $Li_{6.3}La_3Zr_2O_{12} \cdot 0.67Al_2O_3$.

Composition C is characterized by $Li_7La_3Zr_2O_{12} \cdot 0.67Al_2O_3$.

Composition D is characterized by $Li_7La_3Zr_2O_{12} \cdot Al_2O_3$.

Figure 10:
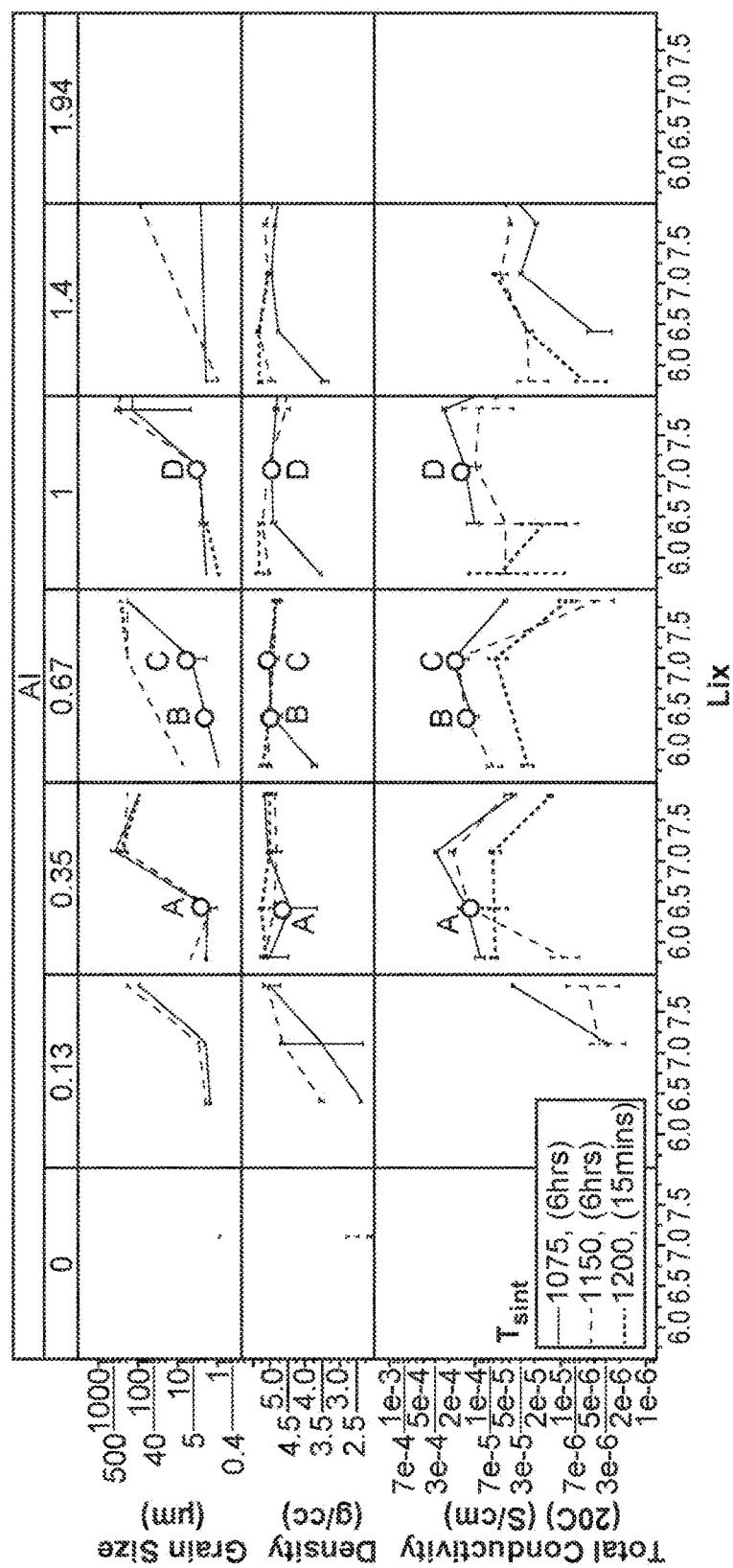
FIG. 10 shows grain sizes (top plots), density (middle plots), and conductivity (bottom plots) and as a function of Li content in $Li_xLa_3Zr_2O_{12} \cdot yAl_2O_3$, wherein x ranges from 5.5 to 9; and y ranges from 0 to 1, and processing temperature/time. Compositions marked A, B, C, and D were sintered at 1075° C. for 6 hours and possesses both small grain size and conductivity $>10^{-4}$ S/cm. Composition A is characterized by $Li_{6.3}La_3Zr_2O_{12} \cdot 0.35Al_2O_3$; Composition B is characterized by $Li_{6.3}La_3Zr_2O_{12} \cdot 0.67Al_2O_3$; Composition C is characterized by $Li_7La_3Zr_2O_{12} \cdot 0.67Al_2O_3$; Composition D is characterized by $Li_7La_3Zr_2O_{12} \cdot Al_2O_3$. These composition subscripts and molar coefficients describe the respective amount of raw materials used to prepare these compositions.

FIG. 10 shows cross sections through the phase space map (FIG. 9) and also the associated density and grain size.

Figure 12:
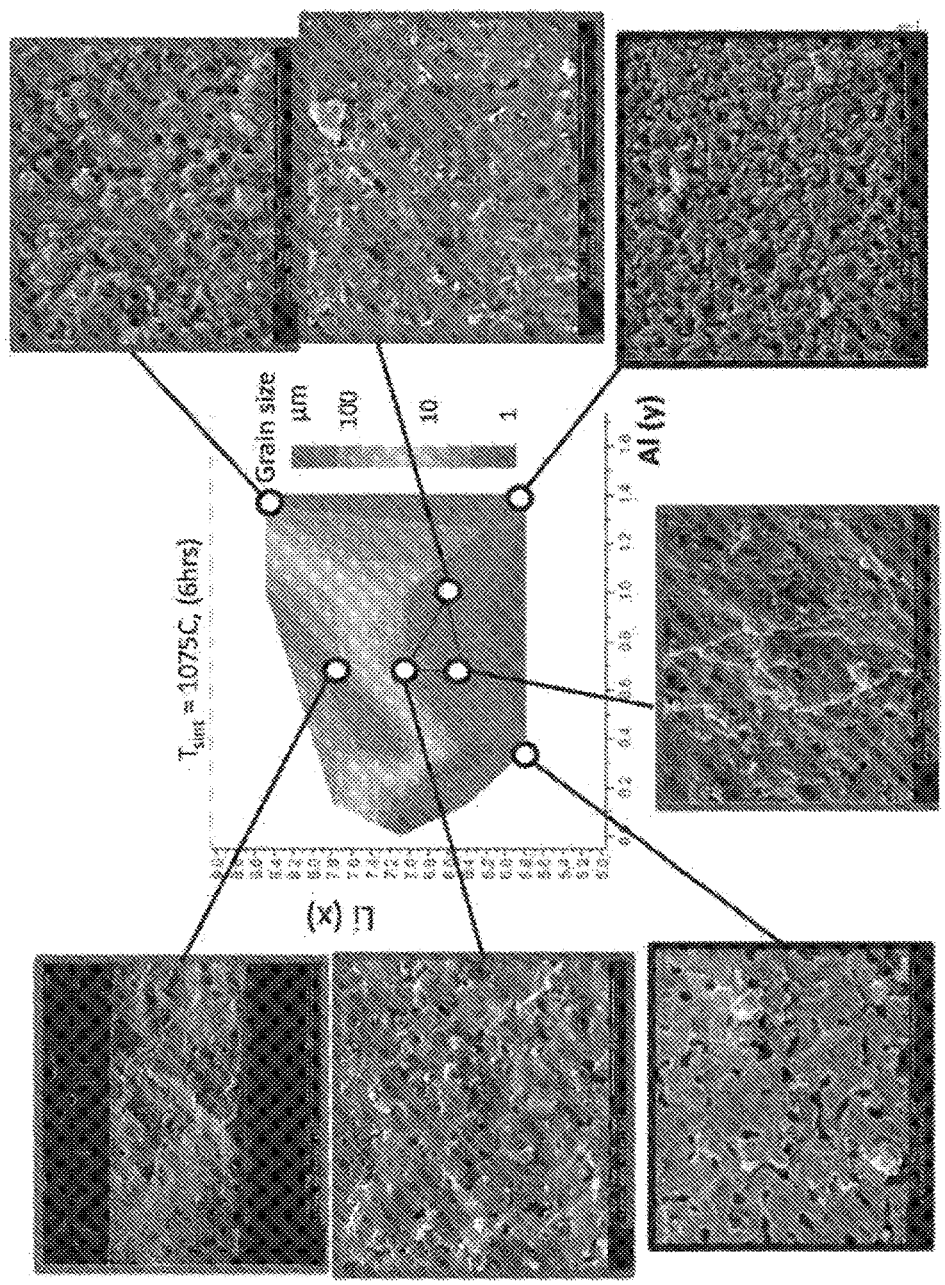
FIG. 12 shows scanning electron microscopy images of lithium stuffed garnet films, $Li_xLa_3Zr_2O_{12} \cdot yAl_2O_3$, wherein x ranges from 5.5 to 9; and y ranges from 0 to 1, prepared by heat sintering at 1075° C. and having variable Li:Al amounts.

The processing and sintering of garnet ceramics, set forth herein, employed relatively short reaction times and modest temperatures as compared to other known techniques. FIG. 12 shows that for a given Al doping level, there exists a Lithium level below which the garnet grain size remains relatively low (i.e., <10 um) and beyond which grain size becomes too high i.e., >100 um).

Figure 11:
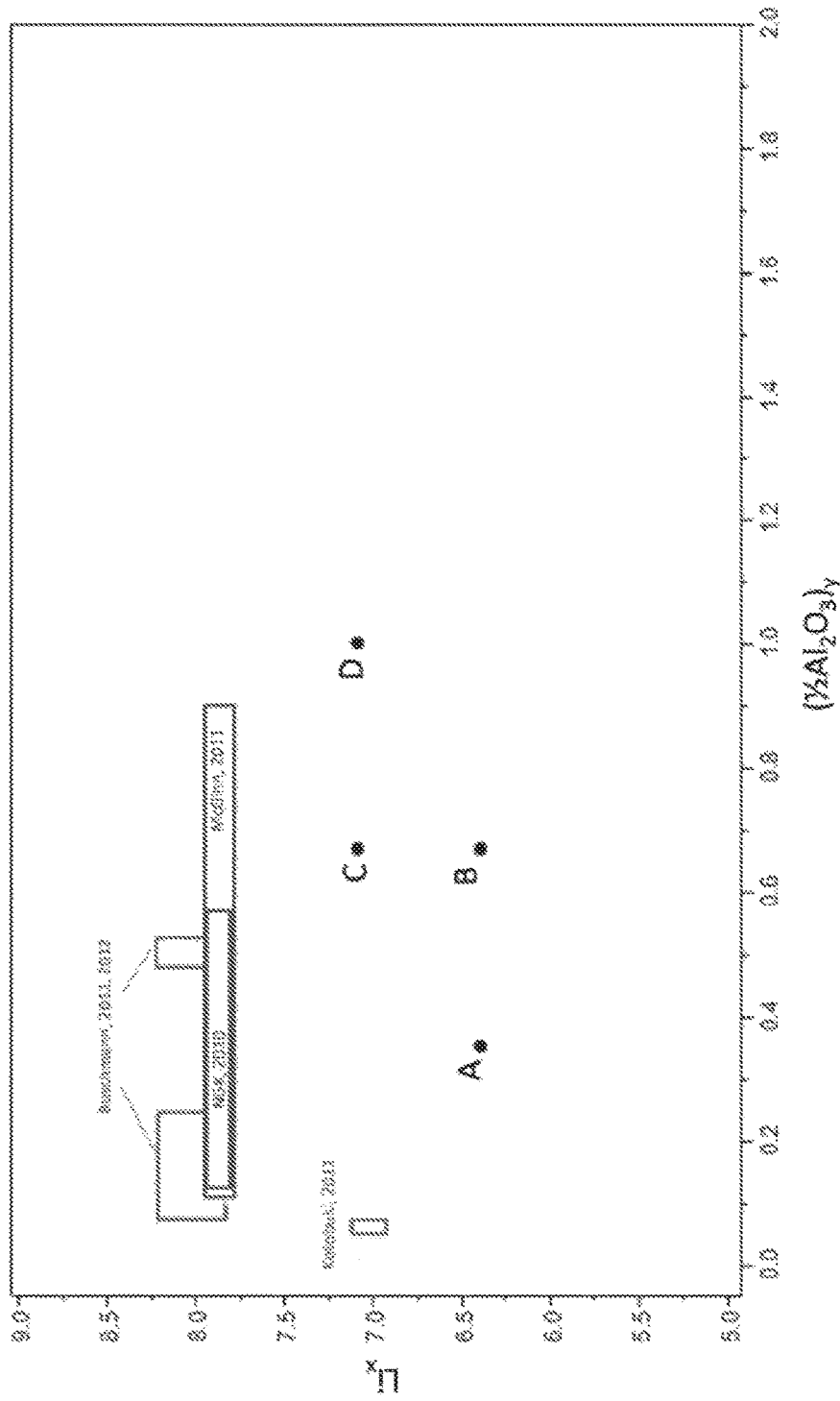
FIG. 11 shows Lithium-Lanthanum-Zirconia-Alumina comparative examples with comparison to the inventive compositions A, B, C, and D set forth herein. Composition A is characterized by $Li_{6.3}La_3Zr_2O_{12} \cdot 0.35Al_2O_3$; Composition B is characterized by $Li_{6.3}La_3Zr_2O_{12} \cdot 0.67Al_2O_3$; Composition C is characterized by $Li_7La_3Zr_2O_{12} \cdot 0.67Al_2O_3$; Composition D is characterized by $Li_7La_3Zr_2O_{12} \cdot Al_2O_3$. These composition subscripts and molar coefficients describe the respective amount of raw materials used to prepare these compositions.

FIG. 11 shows a comparative analysis of known garnet compositions with those described herein. It is clear that these other studies operate in a "high Lithium" region for all studied Aluminum contents. Moreover, the majority of known garnet sintering temperatures were 1200° C. or greater and had long processing times (e.g., greater than 10 hours) which results large grain growth, and which are not compatible with the powders, films, and devices set forth in the instant application. The instant application shows unexpected short processing dwell times and unexpected low temperature processing conditions which result in garnet films having conductivity values suitable for use in secondary battery applications.

The examples set forth herein demonstrate that small grain size can be achieved in the lithium-lanthanum-zirconia-alumina system by limiting the Li content and the sintering temperature. The particular composition of Li, Al=6.3, 0.67 (composition B) is exemplary, since it is found to be small grained after 1075° C. sintering but becomes large grained after 1150° C. This indicates how specific the chosen processing conditions are the methods described herein are. It is noted that if the 1075° C. processing temperature is used, compositions A, B, C, and D in the current work result in the rather unique combination of low grain size and high conductivity (>$10^{-4}$ S/cm).

FIG. 12 shows certain example scanning electron microscopy images of certain lithium stuffed garnets having fine grains as described herein and sintered at lower temperatures, e.g., 1075° C.

Figure 13:
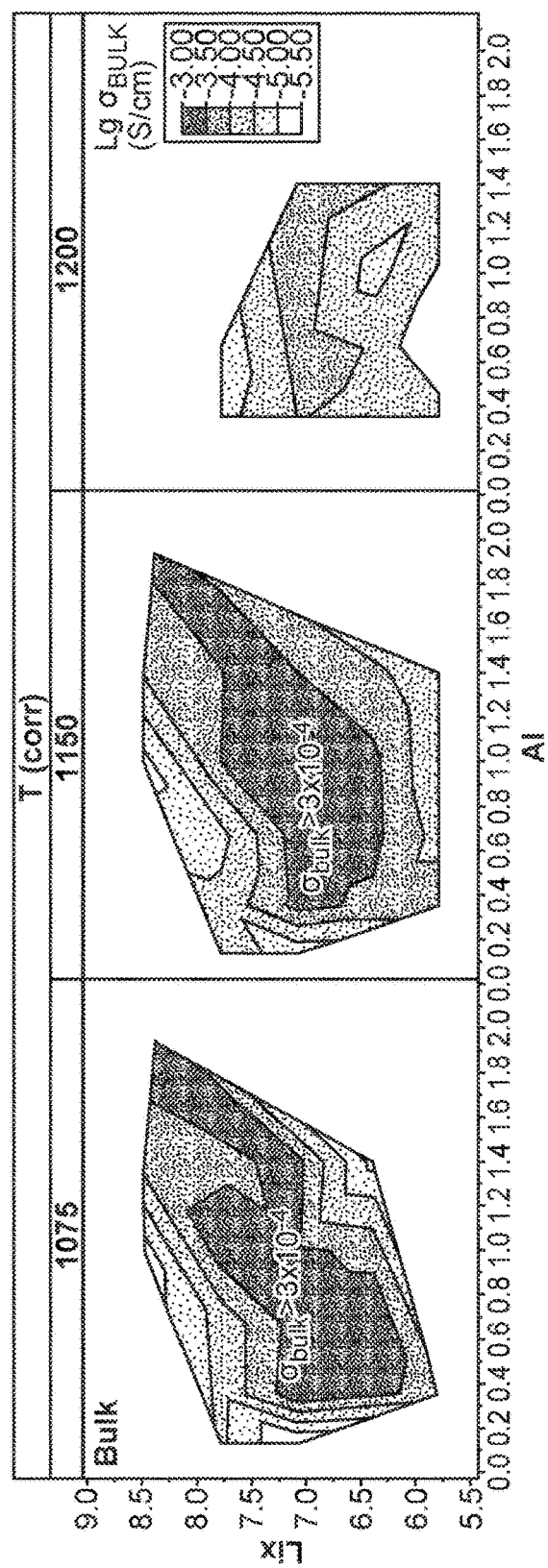
FIG. 13 shows conductivity plots as a function of Li:Al amounts in the lithium stuffed garnets films set forth herein, $Li_xLa_3Zr_2O_{12} \cdot yAl_2O_3$, wherein x ranges from 5.5 to 9; and y ranges from 0 to 1.

FIG. 13 shows certain x:y ratios of Li:Al in $Li_xLa_3Zr_2O_{12} \cdot yAl_2O_3$ wherein the bulk conductivity is greater than $3*10^{-4}$ S/cm.

Figure 14:
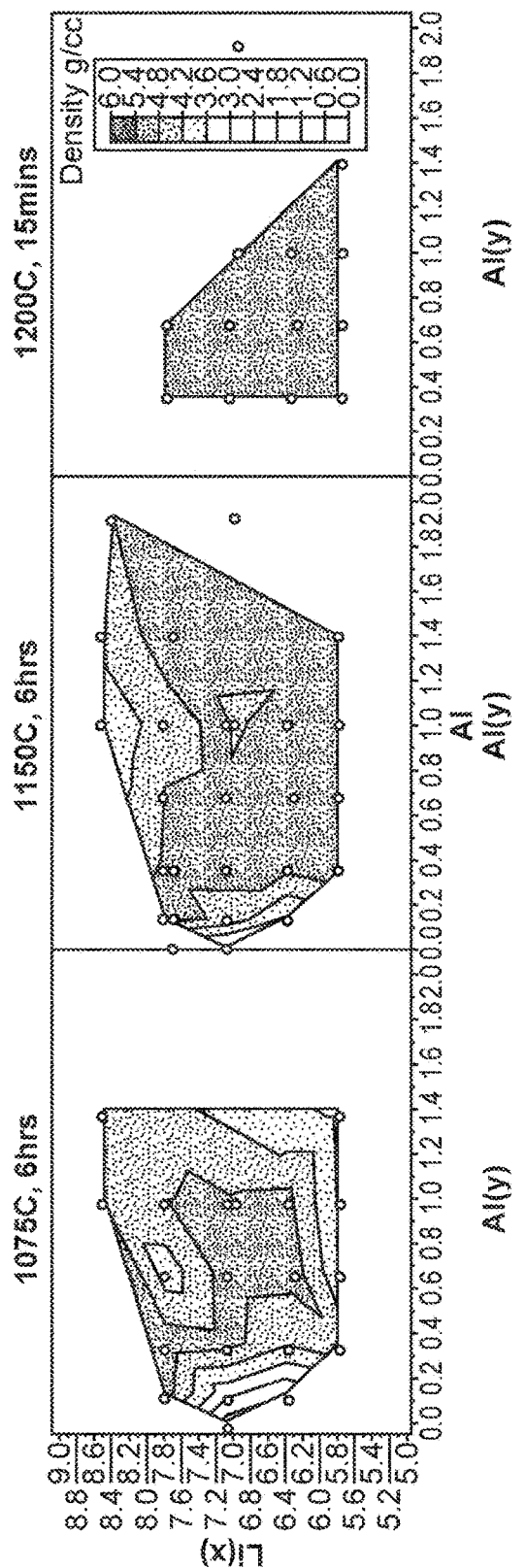
FIG. 14 shows density plots as a function of Li:Al amounts in the lithium stuffed garnets films set forth herein, $Li_xLa_3Zr_2O_{12} \cdot yAl_2O_3$, wherein x ranges from 5.5 to 9; and y ranges from 0 to 1, and wherein the films are heat sintered at 1075° C., 6 hours, (left plot), 1150° C., 6 hours, (middle plot), or 1200° C., 15 minutes (right plot). (x-axis ranges from 5.0 to 9.0; y-axis, in each plot, ranges from 0 to 2.0)

FIG. 14 shows a range of compositions that can be made using the methods set forth herein and the densities associated with these compositions.

FIG. 49 shows the XRD for Composition C.

e. Example 5—Impedance Measurement for Pellet of Composition C

Electrical transport properties were determined by polishing pellets to roughly 1 mm thickness and then sputtering Platinum (Pt) electrodes on either side. Impedance spectra of electrode pellets were measured at several temperatures.

Figure 50:
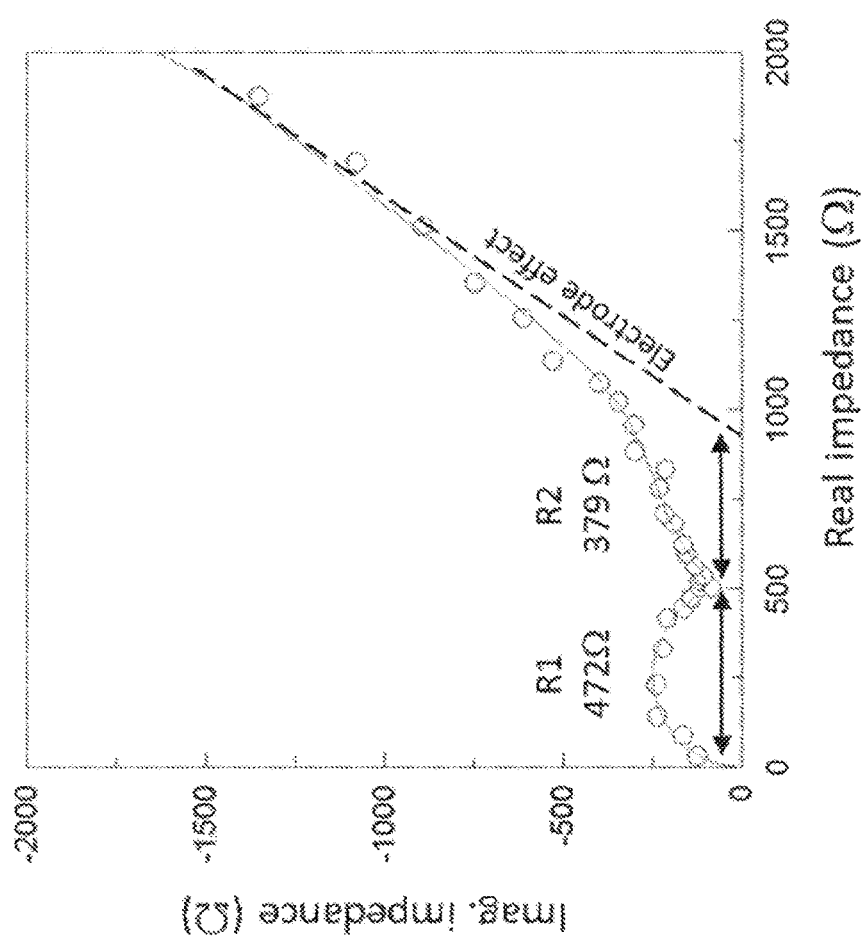
FIG. 50 shows an impedance spectrum for a pellet of composition C measured at 30° C.

FIG. 50 shows the impedance of a polished pellet of Composition C. R1 is attributed to bulk conduction. R2 is attributed to interfacial impedance. Electrode effect is attributed to blocking of Li ions at the Pt electrode. Total resistance equals R1+R2. Conductivity is calculated from $$\bullet R = \frac{l}{\sigma A}$$

wherein R is resistance in Ohms (Ω), L is pellet thickness in cm, A is electrode area in $cm^2$, and σ is conductivity in S/cm. For FIG. 51, L is 0.094 cm; A is 0.385 $cm^2$; Total conductivity is $2.9 \times 10^{-4}$ S/cm; bulk conductivity is $5.1 \times 10^{-4}$ S/cm.

The reported conductivity include all resistances observed in the impedance spectra.

f. Example 6—Full Cell Charge-Discharge

An electrochemical cell was assembled having a pellet of Garnet with composition C, 2 μm Li evaporated negative electrode on one side of the pellet, and a positive electrode on the other side of the pellet comprising NCA with conductive additives including carbon and a sulfur containing catholyte.

Figure 51:
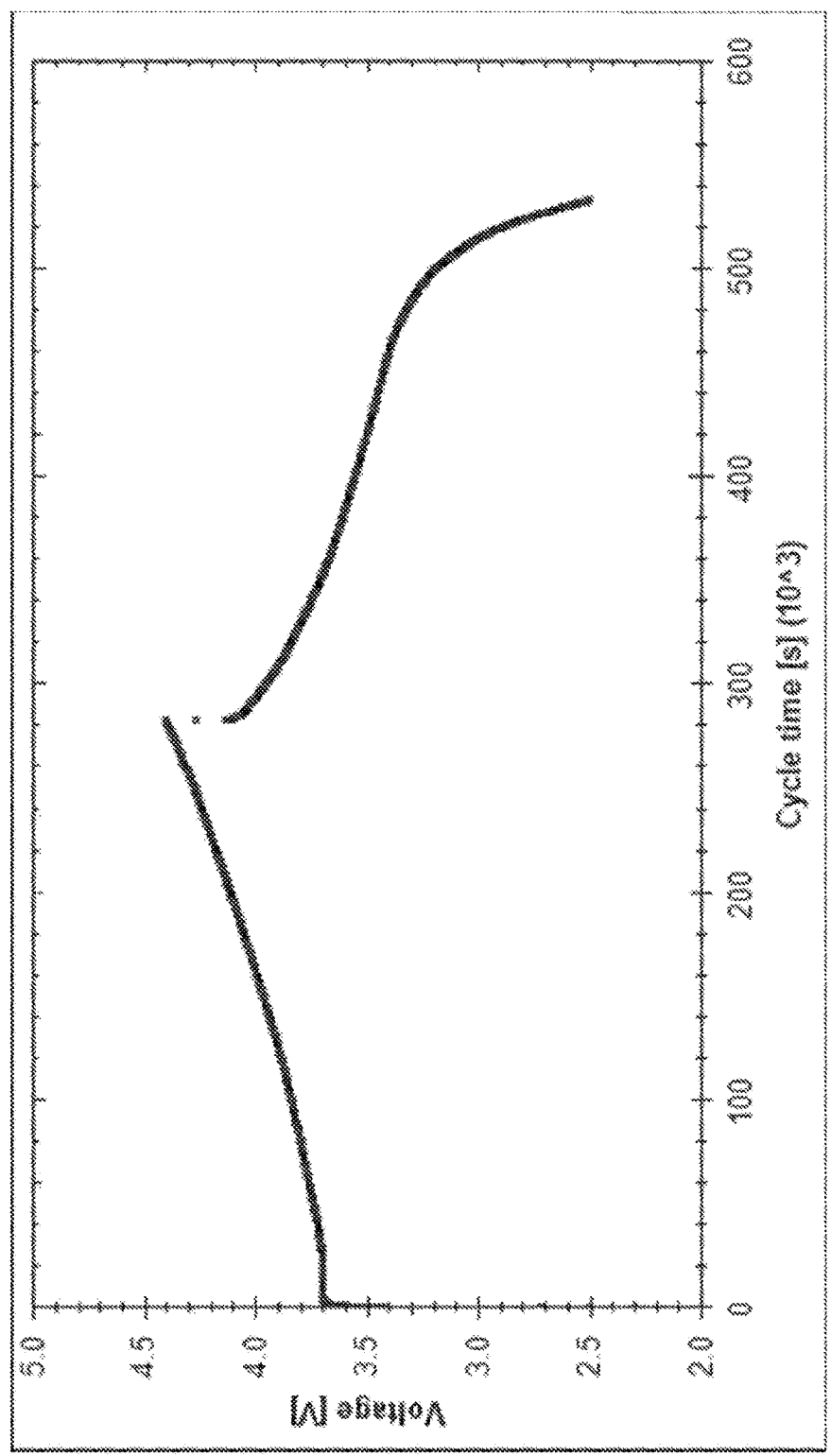
FIG. 51 shows a charge discharge curve for an electrochemical cell having a pellet of composition C as an electrolyte which was cycled at 20 μA/cm².

A charge discharge curve is shown in FIG. 51.

g. Example 7—Plating and Stripping

A Lithium plating and striping protocol for plating and stripping Li on a Garnet Bi-layer thin film: Ni|G|eLi. Initial open circuit voltage is ~2.5V. Initially a current is passed at a rate of 1 mA/$cm^2$ to gradually drop the cell voltage towards zero. When voltage falls below zero (t=500 sec) Li begins to plate on the Nickel interface. At t=800 secs, current is stopped. Voltage rests at 0V indicating a symmetric cell (i.e., Li on both sides). At t=900 secs, a 4 step cycle is initialed and repeated several times. 1 mA/$cm^2$ current is again passed to continue plating for 2 mins. Sample is allowed to rest for 1 min. Then 1 mA/$cm^2$ is passed in opposite direction to strip Li for 2 mins. Sample is allowed to rest for 1 min for again. After 10 iterations of this sequence. Li is completely removed from the Ni side by a final stripping current and consequently the voltage rises rapidly once the Lithium is depleted (t=2800 secs)

Figure 48:
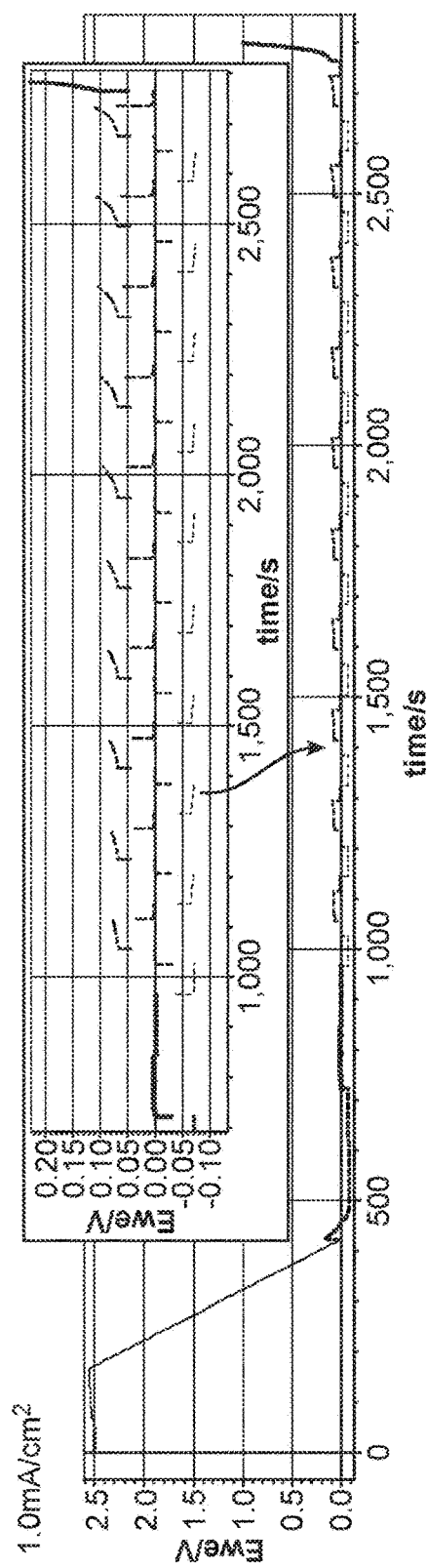
FIG. 48 shows plating/stripping at high current density for the film of FIG. 46.

Results are shown in FIG. 48.

h. Example 8—Powders, Slurries, Tapes, and Bilayer Films

Powder lithium stuffed garnet were prepared according to Example 4: Making Fine Grained Li Ion Conducting Garnet Ceramics.

Powders were into formulated as a slurry by milling the powder. 20 g of dried milled powder was milled with YSZ milling media and toluene, ethanol, and a dispersant phosphate ester. Then, 8 g of the powder was mixed with of a 33% w/w solution of polyvinyl butyral in toluene and 4 g of plasticizer di-butyl Phthalate).

The slurry was tape casted onto a silicone coated substrate using a doctor blade (blade height is set to ~250 μm) and had a dried tape thickness of around 70 μm.

Electrodes were screen printed using an electrode ink having 12.74 g of Ni powder and 3.64 g of a 7% w/w solution of ethyl cellulose in a solvent and using a 400 mesh screen. Ink was dried in air and also in an oven at 120° C.

Bilayer films were sintered using setter plates in a tube furnace with a flowing Argon, $H_2$ and $H_2O$. Oxygen partial pressure in the tube is controlled by adjusting the relative flow of these three species. Binder removed at 500° C. Films sintered at about 1000-1200° C.

Figure 54:
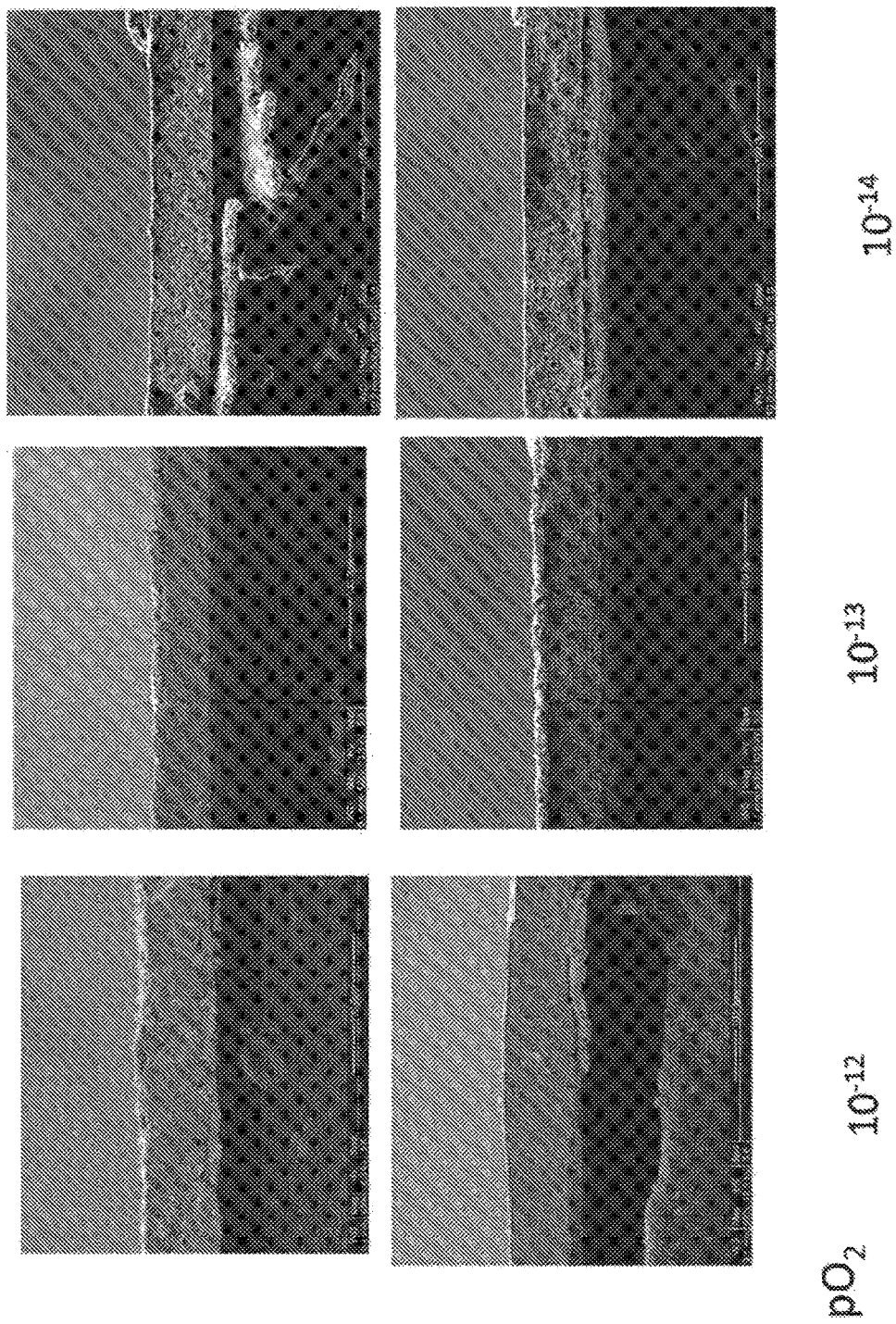
FIG. 54 shows a low magnification SEM images of bilayers prepared under varying partial pressure oxygen conditions (scale bar in each image is 100 μm).
Figure 55:
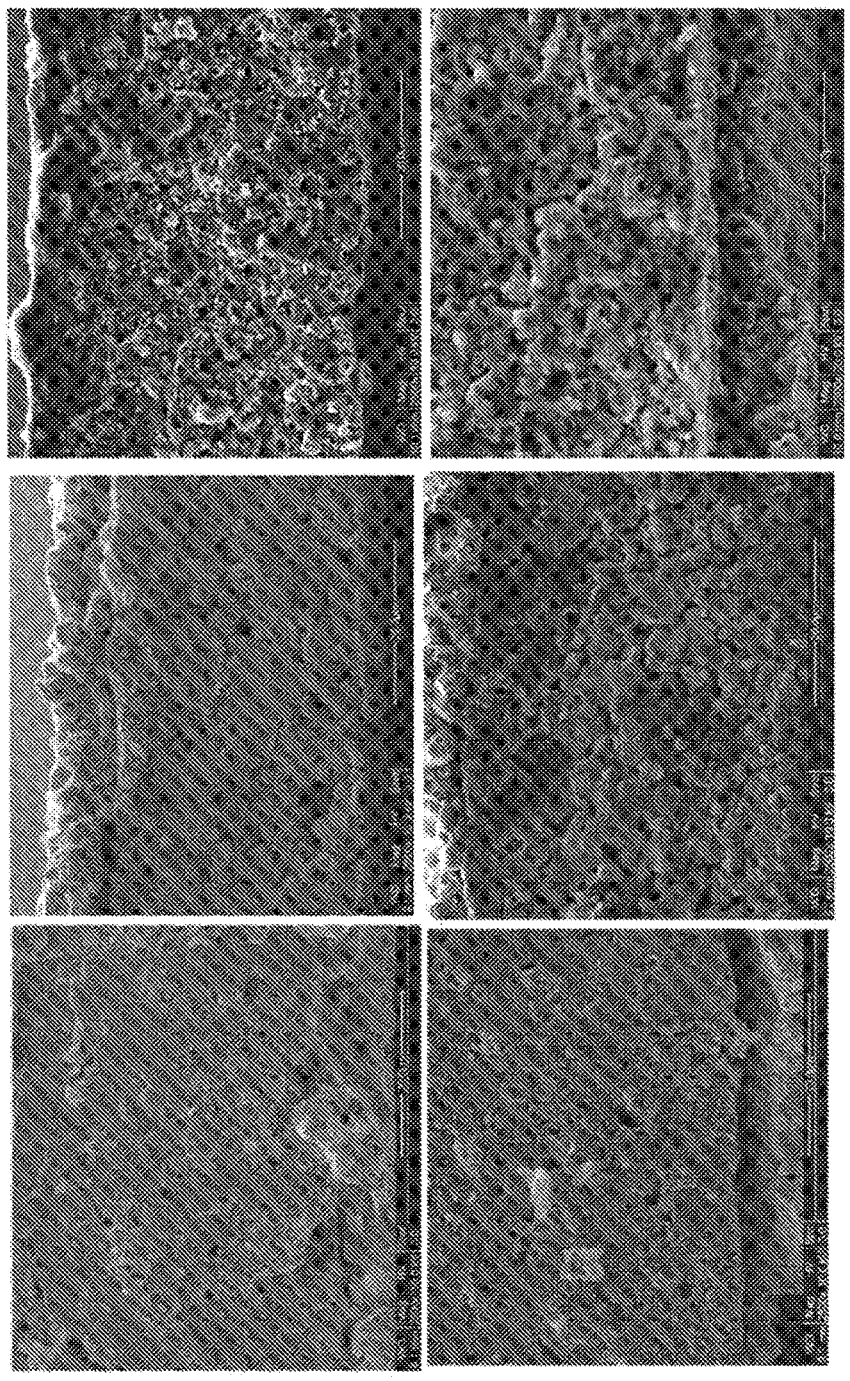
FIG. 55 shows a high magnification SEM images of garnet-nickel bilayers prepared under varying partial pressure oxygen conditions (scale bar in each image is 20 μm).
Figure 56:
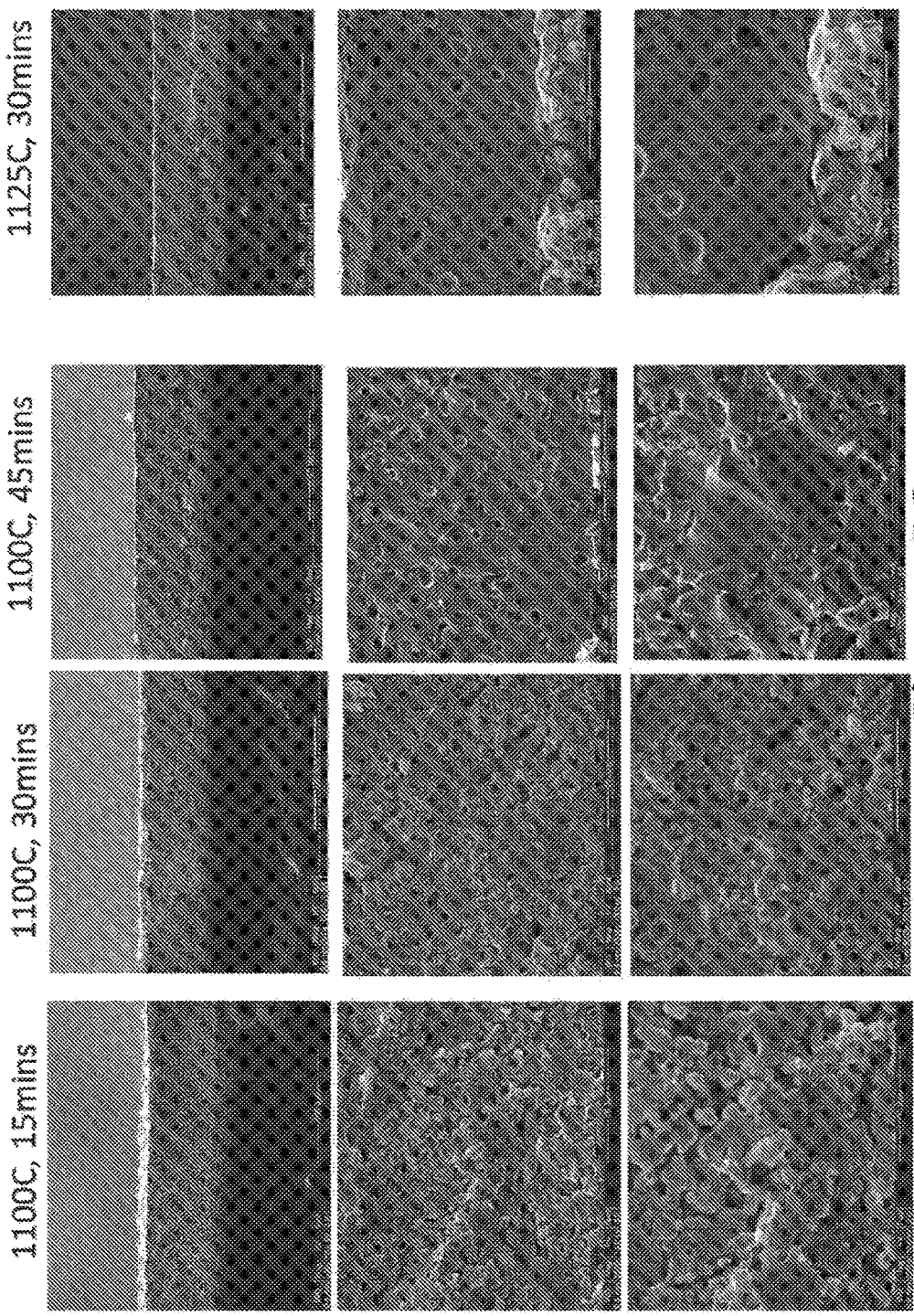
FIG. 56 shows SEM images of garnet-nickel bilayers prepared under varying partial pressure oxygen conditions (scale bar in each image in top and bottom row is 100 μm; scale bar in each image in middle row is 20 μm).

Bilayer films prepared are shown in FIG. 54, FIG. 55, and FIG. 56.

i. Example 9—Powders, Slurries, Tapes, and Bilayer Films

Powders comprising $Li_7Li_3Zr_2O_{12}$ (LLZ) and alumina were prepared by mixing 1 molar equivalent of $Al_2O_3$ and the requisite molar ratios of Lithium Hydroxide, Zirconium Oxide, Lanthanum Oxide and Aluminum Nitrate.

Powders was dried in an oven for 45 minutes to 1 hour and then dry milled for 8 hours using a ball milling technique with 25% media by volume. The media was separated using sieves and then calcined in air at 900° C. for 6 hours to produce garnet powder.

A slurry was then prepared using 300 g of this calcined garnet powder which was then attrition milled in 300 g of isopropanol or toluene:ethanol (4:1) in the presence of 30 g of a dispersant until the particle size ($d_{50}$) was 300-400 nm.

35 g of this slurry was added to 2.65 g of dispersant (e.g., Rhodoline 4160) and milled with zirconia media (¼ by volume of bottle) for 8 hours. 1.75 g of the plasticizer dibutyl phthalate and 1.75 g of a binder was added to the slurry and milled for another 12 hours. 1.5 g of toluene was added and mixed for another 2 hours.

A green tape was prepared by casting tape onto mylar tape using a doctor blade set-up and a 20 mil blade height setting. The film was dried, and then separate film from Mylar. Ni was screen-printed as Ni ink onto the dried film. Discs of the film were cut for sintering.

Samples were sintered by placing the cut films with Ni thereupon between ceramic setter places and sintered inside a tube furnace. The furnace was heated 5° C./min to 200° C. in wet Ar wet and held at 200° C. for 4 hours, then heated to 600° C. at 5° C./min and held for 4 hours, then heated to 1100° C. at 10° C./min and held for 1 hour in 315 sccm Ar and 10 sccm Ar/$H_2$. Furnace was then cooled.

j. Example 10—Bilayer Films

Figure 59:
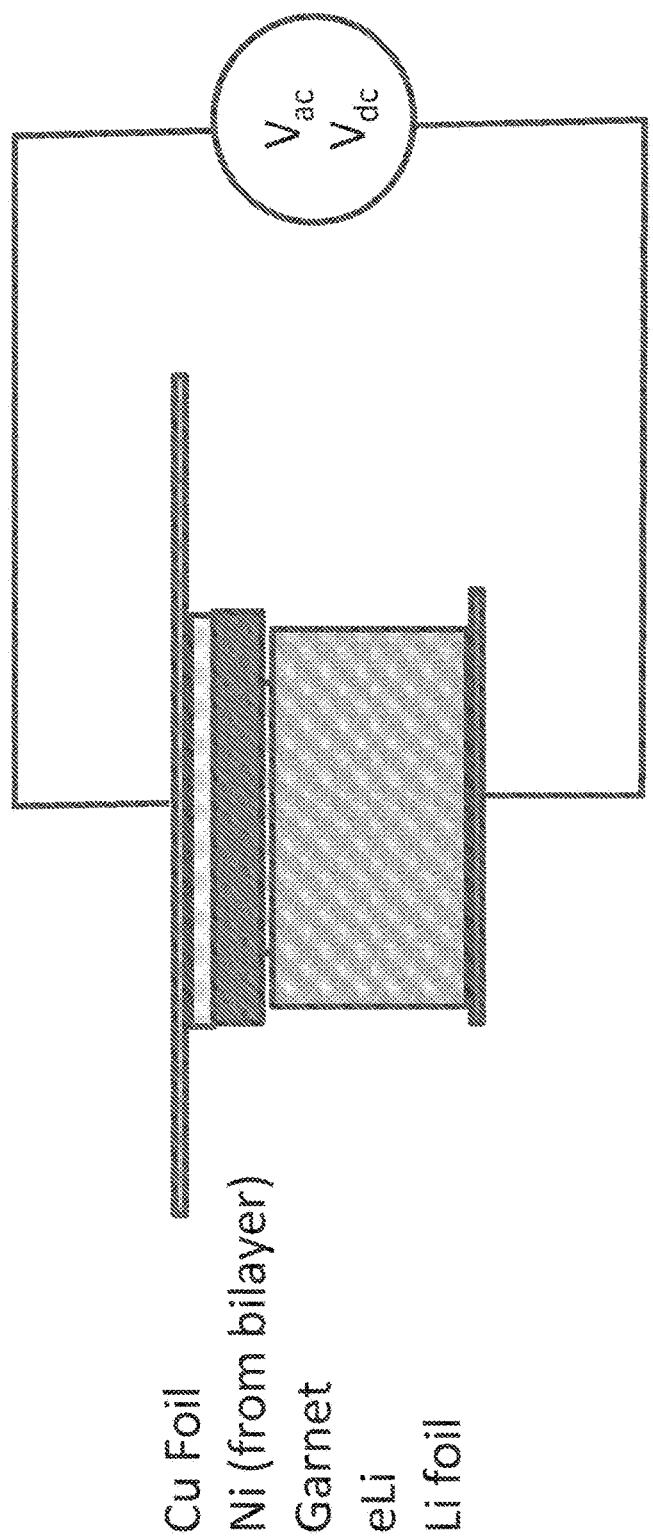
FIG. 59 shows a half-cell experimental set-up with a garnet-Nickel bilayer electrolyte.
Figure 60:
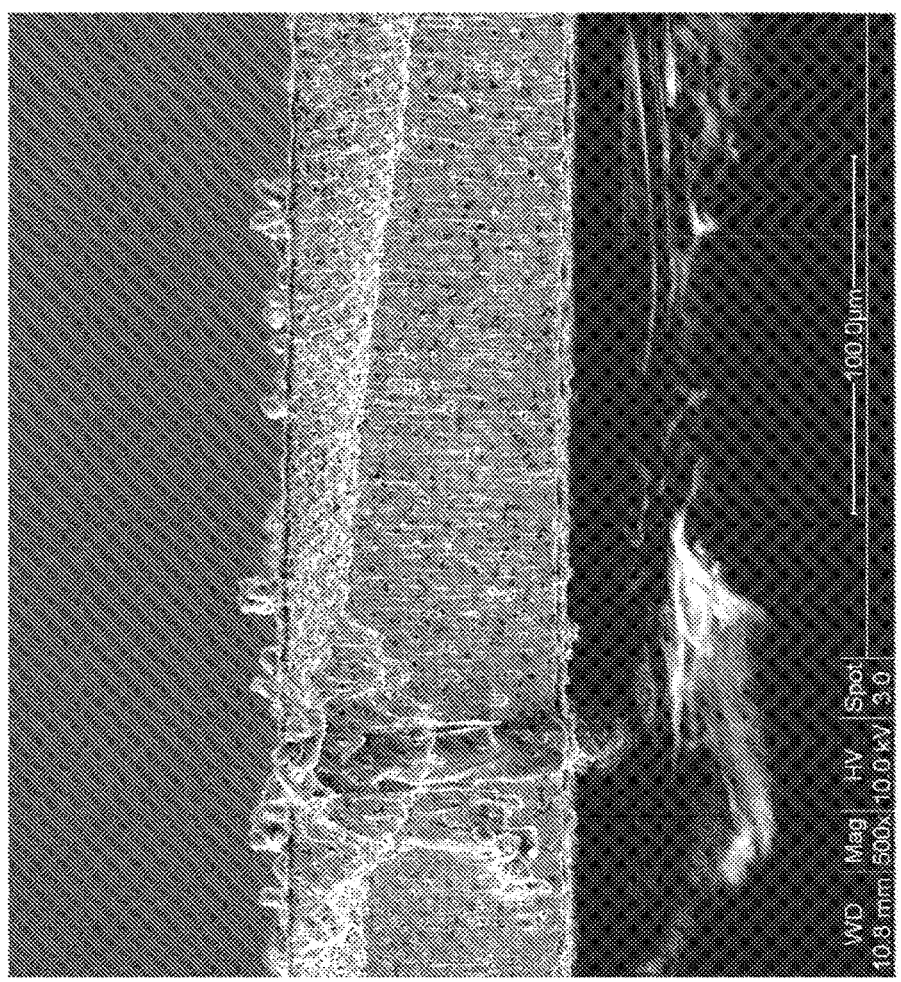
FIG. 60 shows a free standing lithium stuffed garnet film.

A bilayer half cell was prepared by evaporating ~2 um Li on one side of the garnet side, as shown in FIG. 59.

Figure 53:
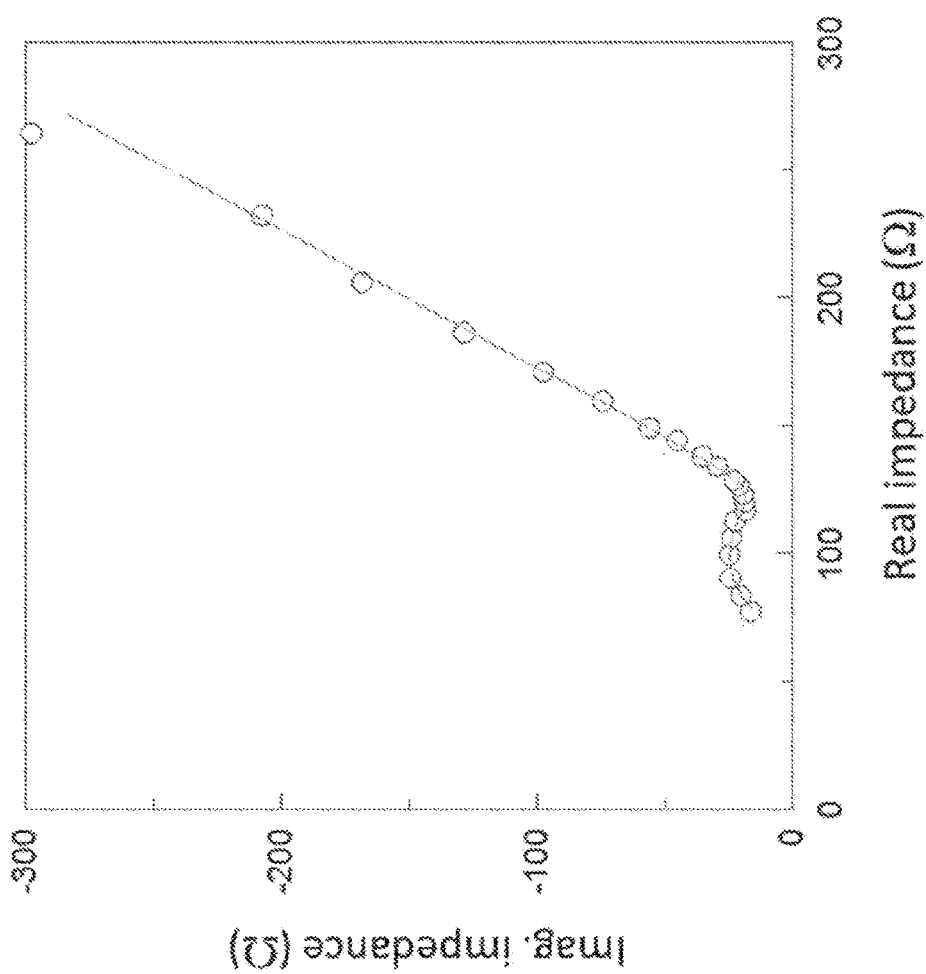
FIG. 53 shows an impedance spectrum for a lithium stuffed garnet bilayer (garnet-Ni).

Impedance (EIS) and plating were tested. Plating test commenced with EIS using a linear voltage sweep to get the voltage to 0V (vs. OCV). After rest, initial plating was at 200 uA. Plating and Stripping was at 100 uA with rest periods in-between. A final strip at 200 uA was then performed. Results shown in FIGS. 53 and 61.

k. Example 11—Free Standing Films

Free standing film were formed from powders, prepared by batching the requisite molar ratios of Lithium Hydroxide, Zirconium Oxide, Lanthanum Oxide and Aluminum Nitrate to form LLZ w/1 molar amount of $Al_2O_3$. Powder was dried in an oven for 45 minutes to 1 hour, then dry milled for 8 hours using a ball milling technique with 25% media by volume, the media was separated then the powder was calcined in air at 900° C. for 6 hours to produce the garnet powder.

A slurry was prepared using 300 g of this calcined garnet powder, attrition milled in 200 g isopropanol and 30 g of a dispersant until the particle size ($d_{50}$) was 300-400 nm. 60 g of the slurry was added to 5.35 g of dispersant (e.g., Rhodoline 4160) and milled with zirconia media for 8 hours. 3.57 g of plasticizer dibutyl phthalate was added to 3.57 g binders and milled for another 12 hours at low rpm, then 6.5 g of toluene was added and mixed for 2 hours.

A green tape was cast tape manually on mylar tape using a doctor blade set-up and a 20 mil blade height setting. The film was dried and separate film from the Mylar. The films were cut to form discs for sintering.

Sintering of the discs occurred between ceramic setters in a tube furnace.

Samples were sintered by placing the cut films between ceramic setter places and sintered inside a tube furnace. The furnace was heated 5° C./min to 200° C. in wet Ar wet and held at 200° C. for 4 hours, then heated to 600° C. at 5° C./min and held for 4 hours, then heated to 1100° C. at 10° C./min and held for 1 hour in 315 sccm Ar and 10 sccm Ar/$H_2$. Furnace was then cooled.

l. Example 12—Reactive Sintering

Powders were prepared comprising LLZ w/1 molar equivalent of $Al_2O_3$ by batching the requisite molar ratios of Lithium Hydroxide, Zirconium Oxide, Lanthanum Oxide and Aluminum Nitrate. Powder was dried in an oven for 45 minutes to 1 hr, then dry milled for 8 hours using a ball milling technique with 25% media by volume, separating from media using sieves, and then reactive sintering this mixture. Powder was calcined in air at 900° C. for 6 hours to produce garnet powder.

A slurry was prepared using 300 g of calcined garnet powder with reactive sintering precursors, attrition milled in 300 g Toluene ethanol (4:1) or Diacetone, with 30 g of a disperant until the particle size ($d_{50}$) was 300-400 nm.

10 g of this slurry was mixed in a flactek mixer for 15 minutes, then 0.2 g binder was added to the slurry and mixed for another 15 minutes.

A green Tape was prepared by casting the slurry onto Ni foil using a doctor blade set-up and a 5 or 10 mil blade height setting. The film was dried and cut into discs.

Sintering occurred by placing the film between ceramic setters in tube furnace.

Samples were sintered by placing the cut films between ceramic setter places and sintered inside a tube furnace. The furnace was heated 5° C./min to 200° C. in wet Ar wet and held at 200° C. for 4 hours, then heated to 600° C. at 5° C./min and held for 4 hours, then heated to 1100° C. at 10° C./min and held for 1 hour in 315 sccm Ar and 10 sccm Ar/$H_2$. Furnace was then cooled.

m. Example 13—Low Area Specific Resistance (ASR)

In this example, ceramic setters were compared to metallic setters. The ceramic setters resulted in garnet film that had lower ASR. Films were sintered according to Example 12, in one case with Pt setter plates and in another case with ceramic setter plates.

Figure 61:
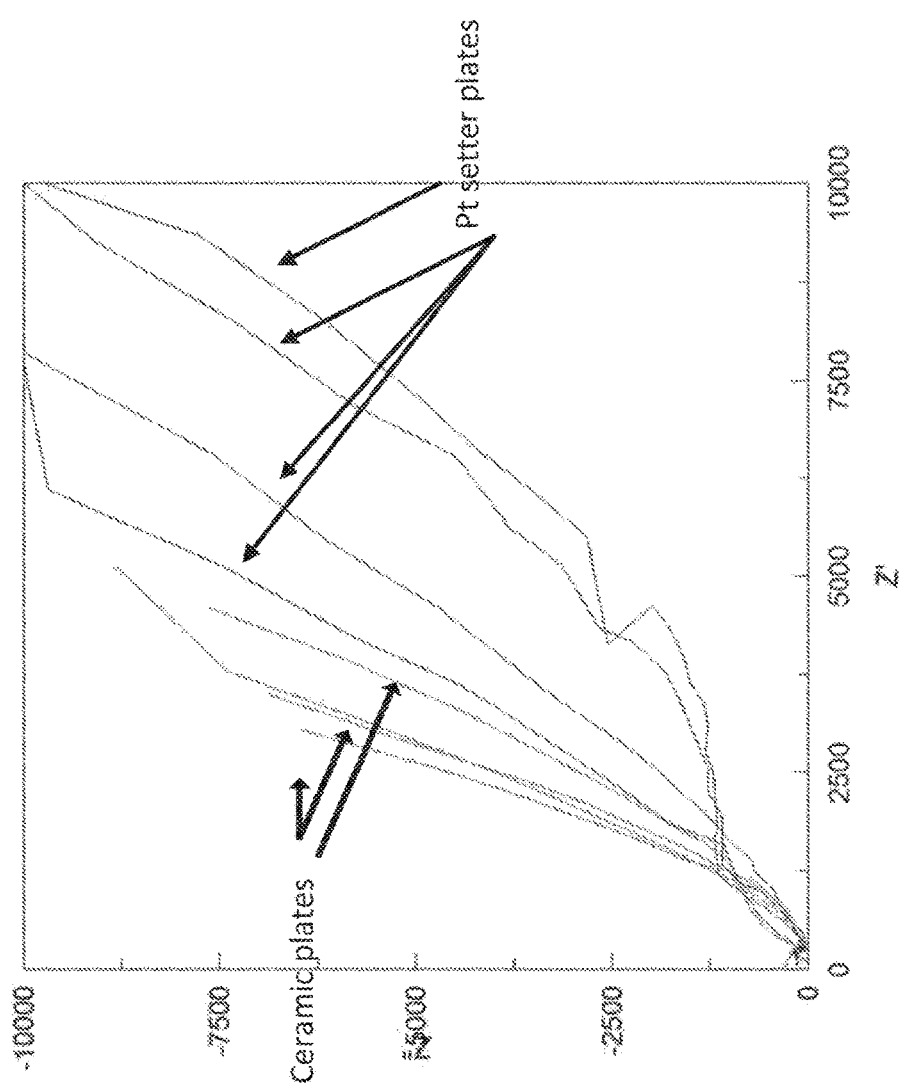
FIG. 61 shows a electrochemical impedance spectroscopy (EIS, y-axis is imaginary impedance in Ω, x-axis is real impedance in Ω) for lithium stuffed garnet comparing Pt setter plates to ceramic setter plates and a lower area specific resistance (ASR) for lithium stuffed garnet prepared by a sintering method using ceramic setter plates.

As shown in FIG. 61, the films sintered with ceramic setter plates had a lower ASR.

Results are also shown in the below Table.

TABLE 1

| Sintering style | R1 (Ohms) | R2 (Ohms) | Total conductivity, 60 C. (S/cm) |
| --- | --- | --- | --- |
| Pt plates | 220 | 2840 | 8.49E−05 |
| Pt plates | 230 | 293 | 4.97E−04 |
| Ceramic plates | 323 | 131 | 5.72E−04 |
| Ceramic plates | 261 | 98 | 7.24E−04 |
| Pt plates | 181 | 3326 | 7.41E−05 |
| Pt plates powder | 288 | 399 | 3.78E−04 |
| Ceramic plates | 237 | 71 | 8.44E−04 |
| Ceramic plates | 334 | 136 | 5.53E−04 |

These examples show the compatibility of garnet with Li anodes and the lower tendency to form a solid electrolyte interfacial high resistance layer.

n. Example 14—Low Area Specific Resistance (ASR) at Pellet Surface

Figure 62:
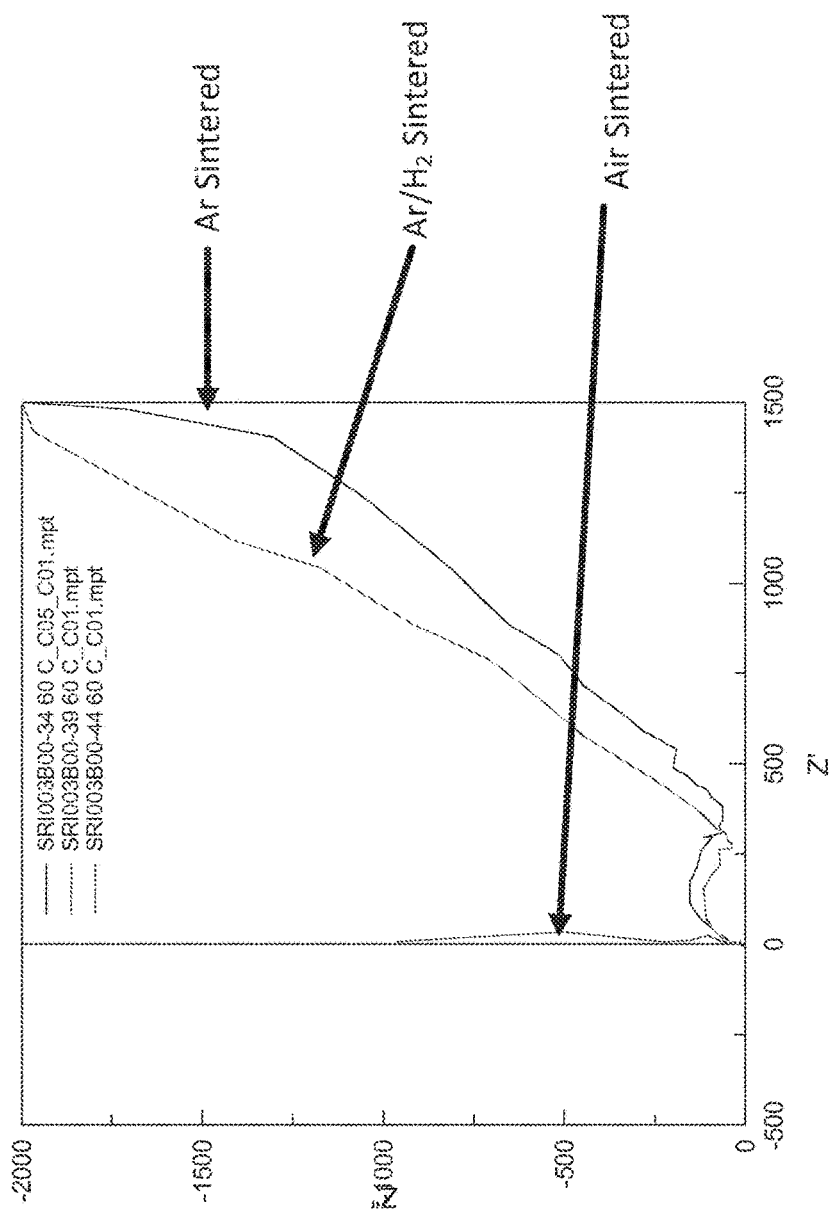
FIG. 62 shows impedance comparison for sintering pellets in Ar, in $Ar/H_2$, or in Air.
Figure 63:
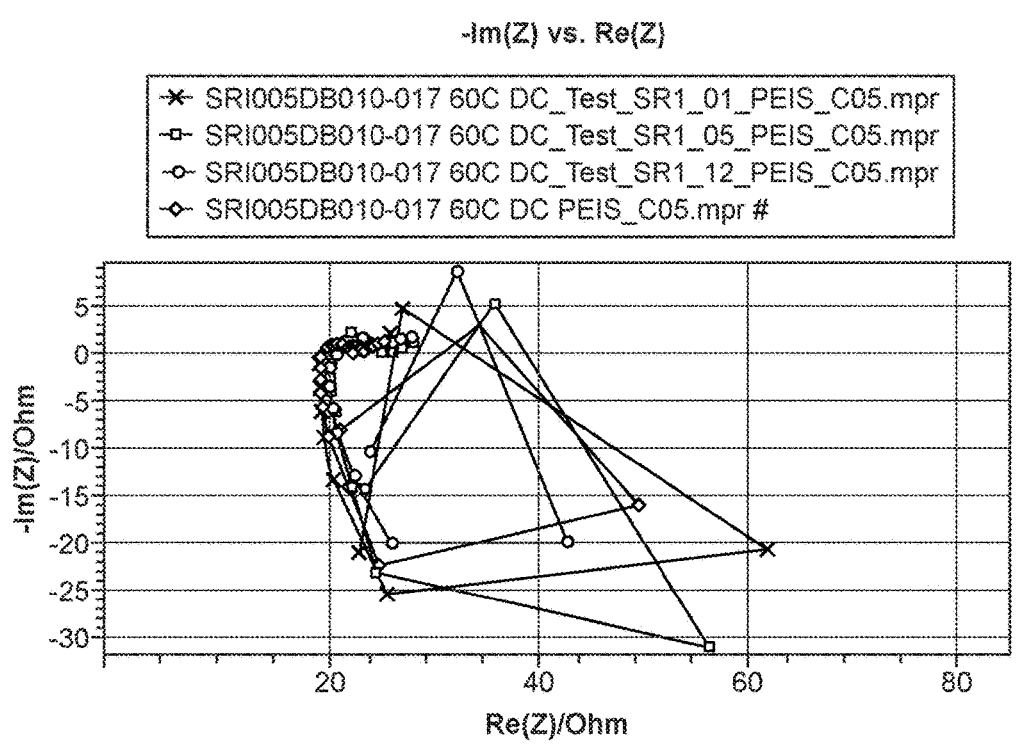
FIG. 63 shows EIS, showing less than 10 Ωcm² for free standing film of FIG. 46, wherein the film was cut to a 13 mm disc with 7 mm diameter Li deposited thereupon.

Pellets of lithium stuffed garnet were prepared as detailed above. Pellets were sintered in either Ar, or a mixture of Ar/$H_2$, or in Air. Impedance results are shown in FIG. 62. ASR lower for Ar and Ar/$H_2$ than for Air.

Although the foregoing embodiments have been described in some detail for purposes of clarity of understanding, it will be apparent that certain changes and modifications may be practiced within the scope of the appended claims. It should be noted that there are many alternative ways of implementing the processes, systems and apparatus of the present embodiments. Accordingly, the present embodiments are to be considered as illustrative and not restrictive, and the embodiments are not to be limited to the details given herein.

What is claimed is:

1. A thin unsintered film, comprising
lithium-stuffed garnet precursor powders or calcined lithium-stuffed garnet powder;
at least one member selected from the group consisting of a binder, a solvent, a dispersant, and combinations thereof;
wherein the solid loading of the lithium-stuffed garnet precursor powders or the calcined lithium-stuffed garnet powder is at least 65% by volume (v/v); and
wherein the film thickness is less than 100 μm; and wherein the median grain size of the lithium-stuffed garnet precursor powders or the calcined lithium-stuffed garnet powder is between 0.1 μm and 10 μm.

2. The thin unsintered film of claim 1, wherein the lithium-stuffed garnet is characterized by the empirical formula $Li_A La_B M'_C M''_D Zr_E O_F$, wherein $5<A<8$, $1.5<B<4$, $0.1 \leq C \leq 2$, $0 <D \leq 2$; $1 \leq E \leq 2$, $10<F \leq 13$, and
M' is Al; and
M" is selected from the group consisting of Mo, W, Nb, Sb, Ca, Ba, Sr, Ce, Hf, and Rb.

3. The thin unsintered film of claim 1, wherein the lithium-stuffed garnet is characterized by the empirical formula
$Li_A La_B M'_C M''_D Zr_E O_F$, wherein $6.5<A<8$, $1.5<B<4$, $0.1 \leq C \leq 2$, $0<D \leq 2$; $1 \leq E \leq 2$, $10<F \leq 13$,
M' is Al; and
M" is Ta.

4. The thin unsintered film of claim 1, wherein the thin unsintered garnet film is adhered to a substrate.

5. The thin unsintered film of claim 4, wherein the substrate is selected from the group consisting of a polymer, a metal foil, a metal powder, a metal powder film, or a metal coating.

6. The thin unsintered film of claim 5, wherein the metal is selected from the group consisting of Ni, Cu, Al, steel, alloys, and combinations thereof.

7. The thin unsintered film of claim 1, wherein the solid loading is at least 65 v/v to 80% v/v.

8. The thin unsintered film of claim 1, wherein the thin unsintered garnet film thickness is less than 50 μm and greater than 10 nm.

9. The thin unsintered film of claim 1, wherein the thin unsintered garnet film is free standing.

10. The thin unsintered film of claim 8, wherein:
the thin unsintered garnet film is bonded to a current collector (CC) film on at least one side of the thin unsintered garnet film; and
the CC film comprises a metal or metal powder, wherein the metal is selected from the group consisting of Nickel (Ni), Copper (Cu), combinations thereof, and alloys thereof.

11. The thin unsintered film of claim 10, wherein the thin unsintered garnet film is bonded to a CC film on one side of the film.

12. The thin unsintered film of claim 10, wherein the thin unsintered garnet film is bonded to a CC film on two sides of the film.

13. A bilayer comprising a metal foil or metal powder positioned in contact with a thin unsintered film according to claim 2.

14. A trilayer comprising a metal foil or metal powder and two unsintered films according to claim 2, wherein the metal foil or metal powder is positioned between and in contact with the two thin unsintered films according to claim 2.

15. The thin unsintered film 2, wherein the film thickness is 10 μm to 100 μm.

* * * * *